US010779196B2

(12) United States Patent
Roy et al.

(10) Patent No.: US 10,779,196 B2
(45) Date of Patent: Sep. 15, 2020

(54) PCP HANDOVER IN A MESH NETWORK AFTER A CHANGE OF ROLE OF A STATION ASSOCIATED WITH A FIRST NODE RECEIVING FROM ANOTHER NODE AN INDICATION OF ASSOCIATION

(71) Applicant: INTERDIGITAL PATENT HOLDINGS, INC., Wilmington, DE (US)

(72) Inventors: Arnab Roy, Phoenixville, PA (US); Yugeswar Deenoo, Chalfont, PA (US); Ravikumar V. Pragada, Warrington, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 16/192,497

(22) Filed: Nov. 15, 2018

(65) Prior Publication Data

US 2019/0090162 A1 Mar. 21, 2019

Related U.S. Application Data

(63) Continuation of application No. 15/119,896, filed as application No. PCT/US2015/018963 on Mar. 5, 2015, now abandoned.
(Continued)

(51) Int. Cl.
*H04W 36/00* (2009.01)
*H04W 36/14* (2009.01)
(Continued)

(52) U.S. Cl.
CPC ....... *H04W 36/0005* (2013.01); *H04W 36/14* (2013.01); *H04W 48/16* (2013.01); *H04W 84/045* (2013.01); *H04W 84/20* (2013.01)

(58) Field of Classification Search
None
See application file for complete search history.

(56) References Cited

U.S. PATENT DOCUMENTS

2008/0043637 A1* 2/2008 Rahman ................ H04L 45/48
370/254
2008/0305744 A1* 12/2008 Furuskar ............ H04L 43/0882
455/67.11
(Continued)

FOREIGN PATENT DOCUMENTS

WO 2013/089765 6/2013

OTHER PUBLICATIONS

IEEE, "Part 11: Wireless LAN Medium Access Control (MAC) and Physical Layer (PHY) Specifications", IEEE Std 802.11™-2012, Mar. 29, 2012, 2793 pages.
(Continued)

*Primary Examiner* — Jamaal Henson
(74) *Attorney, Agent, or Firm* — Volpe and Koenig, P.C.

(57) ABSTRACT

A station (STA) may include an antenna and a processor operatively coupled to the antenna. The antenna and the processor may be configured to receive a request message from an access point (AP). The request message may include identity information of one or more other STAs and an indication to perform measurements of the one or more other STAs. The antenna and the processor may be further configured to perform the measurements of the one or more STAs to determine a link metric associated with each STA of the one or more other STAs. The antenna and the processor may be further configured to send a reply message to the AP after the link metric associated with each STA of the one or more STAs is determined. The reply message may include results of the determination.

16 Claims, 55 Drawing Sheets

Related U.S. Application Data

(60) Provisional application No. 62/030,053, filed on Jul. 28, 2014, provisional application No. 61/948,477, filed on Mar. 5, 2014.

(51) Int. Cl.
  *H04W 48/16* (2009.01)
  *H04W 84/04* (2009.01)
  *H04W 84/20* (2009.01)

(56) References Cited

U.S. PATENT DOCUMENTS

| | | | |
|---|---|---|---|
| 2009/0011768 A1* | 1/2009 | Seok | H04W 24/08 455/450 |
| 2009/0228983 A1* | 9/2009 | Qin | H04W 12/06 726/26 |
| 2010/0331028 A1* | 12/2010 | Cordeiro | H04B 17/24 455/509 |
| 2011/0199966 A1 | 8/2011 | Cordeiro et al. | |
| 2011/0206004 A1 | 8/2011 | Kwon et al. | |
| 2011/0207460 A1 | 8/2011 | Kim et al. | |
| 2011/0274084 A1 | 11/2011 | Chu et al. | |
| 2011/0274098 A1 | 11/2011 | Jung et al. | |
| 2011/0276665 A1 | 11/2011 | Kim et al. | |
| 2012/0039196 A1* | 2/2012 | Zhang | H04L 25/03343 370/252 |
| 2012/0182893 A1* | 7/2012 | Trainin | H04W 52/248 370/252 |
| 2012/0315859 A1* | 12/2012 | Lee | H04L 5/0051 455/67.13 |
| 2013/0089000 A1 | 4/2013 | Hansen et al. | |
| 2013/0343247 A1 | 12/2013 | Kasher | |
| 2015/0071185 A1* | 3/2015 | Trainin | H04B 7/0617 370/329 |
| 2015/0092676 A1* | 4/2015 | Periyalwar | H04W 4/18 370/329 |
| 2016/0241314 A1 | 8/2016 | Ferrante et al. | |
| 2017/0359734 A1* | 12/2017 | Lee | H04B 7/086 |

OTHER PUBLICATIONS

IEEE, "Part 11: Wireless LAN Medium Access Control (MAC) and Physical Layer (PHY) Specifications, Amendment 3: Enhancements for Very High Throughput in the 60 GHz Band", IEEE Std 802.11ad™-2012, Dec. 28, 2012,628 pages.

* cited by examiner

PCP HANDOVER IN A MESH NETWORK AFTER A CHANGE OF ROLE OF A STATION ASSOCIATED WITH A FIRST NODE RECEIVING FROM ANOTHER NODE AN INDICATION OF ASSOCIATION

CROSS REFERENCE TO RELATED APPLICATIONS

This application is a continuation of U.S. patent application Ser. No. 15/119,896 filed on Aug. 18, 2016, which was filed as the U.S. National Stage Application, under 35 U.S.C. § 371, of International Application No. PCT/US2015/018963 filed Mar. 5, 2015, which claims the benefit of U.S. Provisional Application No. 62/030,053 filed on Jul. 28, 2014 and U.S. Provisional Application No. 61/948,477 filed on Mar. 5, 2014, the contents of which are hereby incorporated by reference herein.

In wireless communications systems, such as Long Term Evolution (LTE) systems, backhaul may be provided by a macro node sending data to the Internet, e.g., via a fiber or wirelessly. Small cells may be: added to existing wireless communications systems. However, providing backhaul in such systems may add complexity, degrade performance, and/or crate undue expense.

SUMMARY

Systems, methods, and instrumentalities are disclosed for joining a node to a network. Joining a node to a network may comprise, a station associated with a first node sending a first beacon, wherein the first beacon is sent with an indication that the first beacon is sent from a station entity, and wherein the station associated with the first node belongs to a first personal basic service set (PBSS). The station associated with the first node may receive a transmission from a station associated with a second node that indicates that the station associated with the second node wants to associate with the station associated with a first node, wherein the station associated with the second node is unassociated with the first PBSS. The station associated with the first node may send a message to a PBSS Control Point (PCP) associated with a third node, wherein the message is associated with handover preparation. The station associated with the first node may receive acceptance to change personality to a PCP and perform handover. The station associated with the first node may change to a PCP and perform handover, wherein the station associated with the first node may form a second PBSS and does not belong to the first PBSS, and wherein handover comprises the PCP associated with the first node associating with the station associated with the second node.

Systems, methods, and instrumentalities are disclosed for a first node comprising a plurality of sectors, wherein a sector of the first node is configured as a station. The station may be configured to send a first beacon, wherein the first beacon is sent with an indication that the first beacon is sent from a station entity, and wherein the station associated with the first node belongs to a first personal basic service set (PBSS). The station may be configured to receive a transmission from a station associated with a second node that indicates that the station associated with the second node wants to associate with the station associated with a first node, wherein the station associated with the second node is unassociated with the first PBSS. The station may be configured to send a message to a PBSS Control Point (PCP) associated with a third node, wherein the message is associated with handover preparation. The station may be configured to receive acceptance to change personality to a PCP and perform handover. The station may be configured to change to a PCP and perform handover, wherein the station associated with the first node forms a second PBSS and does not belong to the first PBSS, and wherein handover comprises the PCP associated with the first node associating with the station associated with the second node.

DETAILED DESCRIPTION

A detailed description of illustrative embodiments will now be described with reference to the various figures. Although this description provides a detailed example of possible implementations, it should be noted that the details are intended to be exemplary and in no way limit the scope of the application. In addition, the figures may illustrate one or more message charts, which are meant to be exemplary. Other embodiments may be used. The order of the messages may be varied where appropriate. Messages may be omitted if not needed, and, additional messages may be added.

Figure 1A:
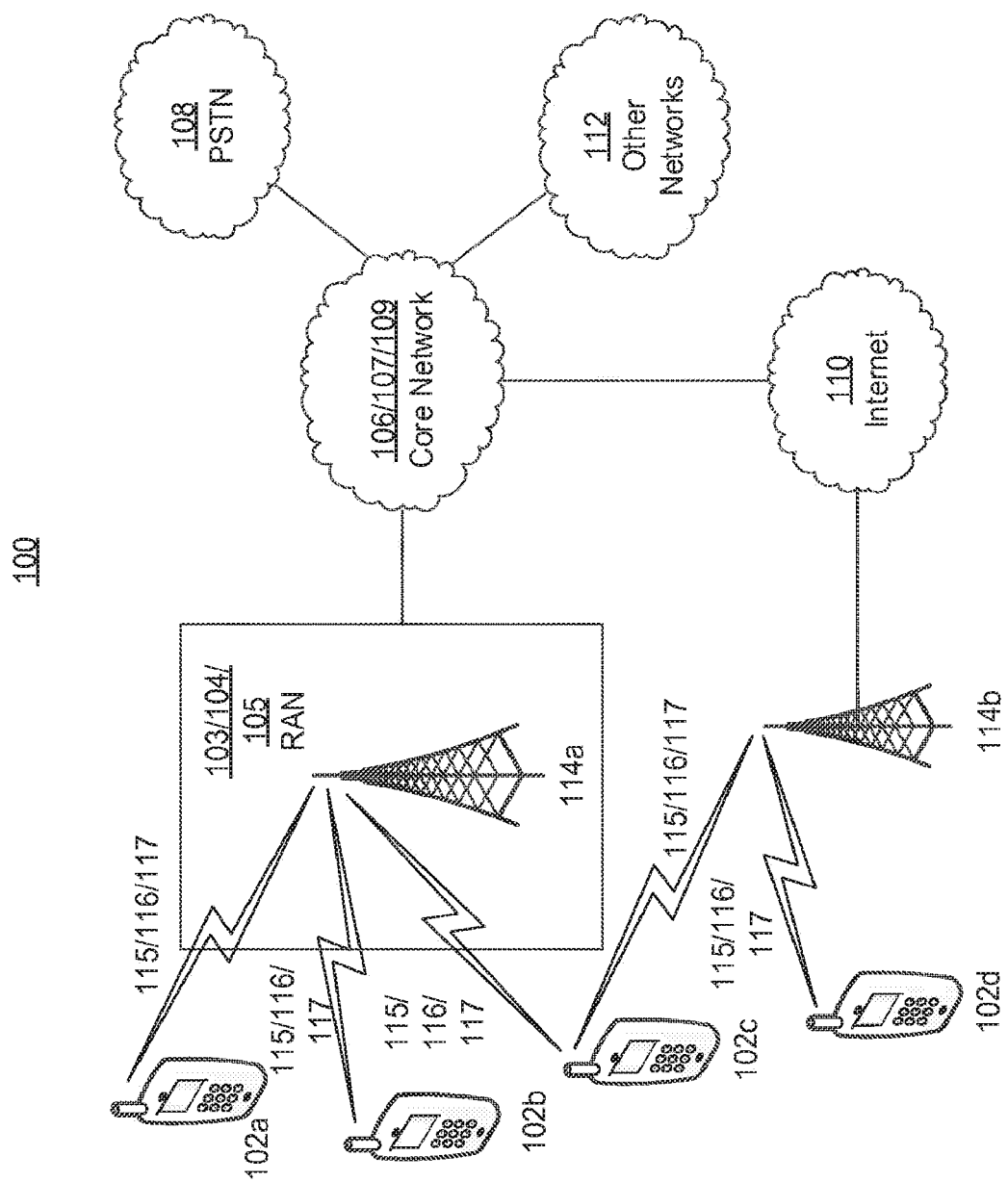
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access-system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA-(SC-FDMA), and the like.

As shown in FIG. 1A, the communications system 100 may include wireless transmit/receive units. (WTRUs) 102a, 102b, 102c, and/or 102d (which generally or collectively may be referred to as WTRU 102), a radio access network (RAN) 103/104/105, a core network. 106/107/109; a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (pH), a mobile station, a fixed or mobile subscriber unit, a pager, a cellular telephone, a personal digital assistant (FDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not Shown), such as a base-station controller (BSC); a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interirm Standard 95 (IS-95), interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base-station 114b, which may employ an IEEE 802 radio technology.

Figure 1B:
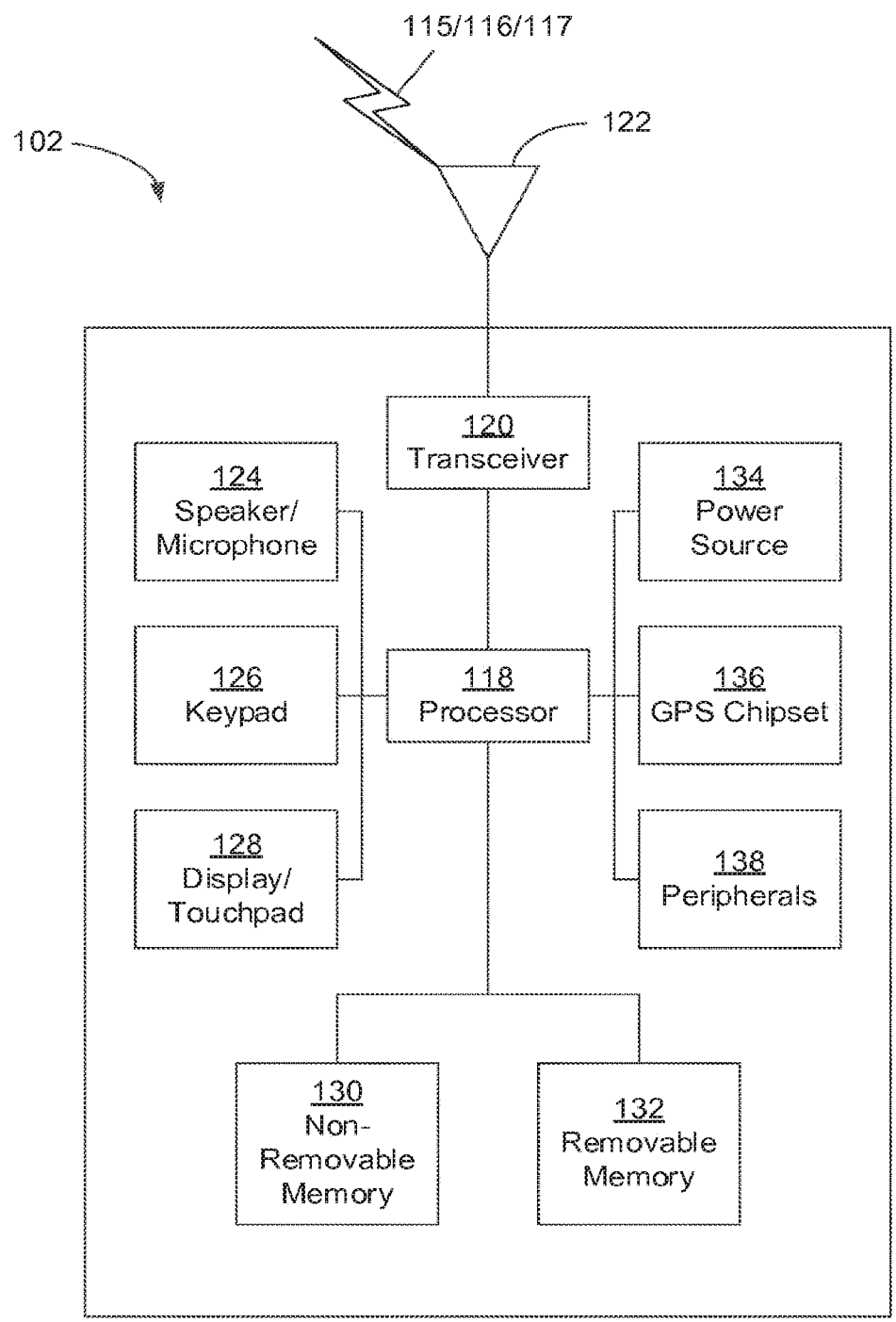
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker microphone 124, a keypad 126 a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB or HeNodeB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., Multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells; fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination implementation while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver; a hands free headset, a Bluetooth® module, a frequency modulated (FM) radio unit, a digital music player, a media player, a video game player module, an Internet browser, and the like.

Figure 1C:
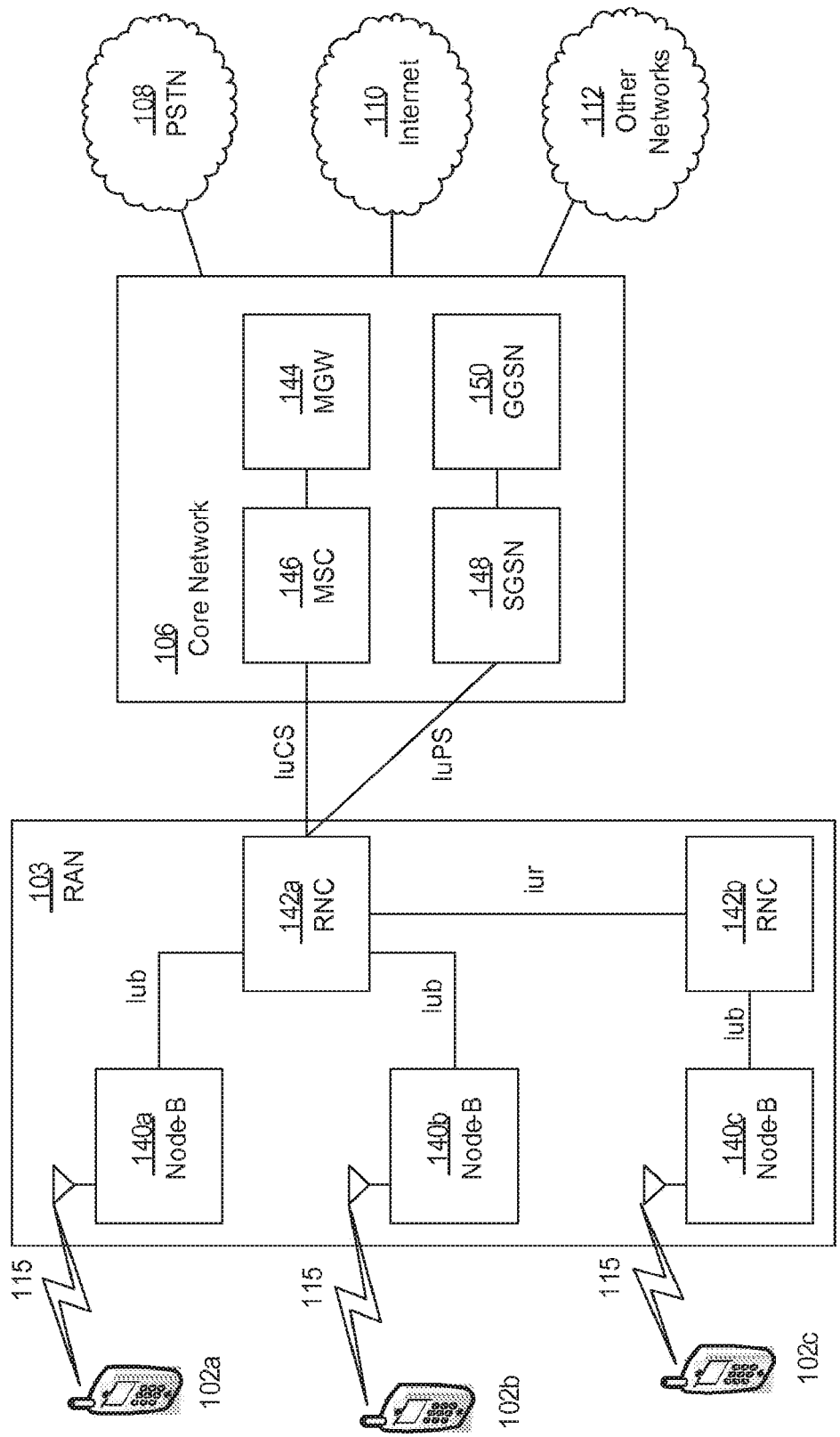
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140c, 140b, 140c, which may each include one or more transceivers for communicating with the WTRUs 102a, 102b, 102c over the air interface 115. The Node-Bs 140c, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140c, 140b may be in communication with the RNC 142a. Additionally, the Node-B 140c may be in communication with the RNC 142b. The Node-Bs 140c, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140c, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
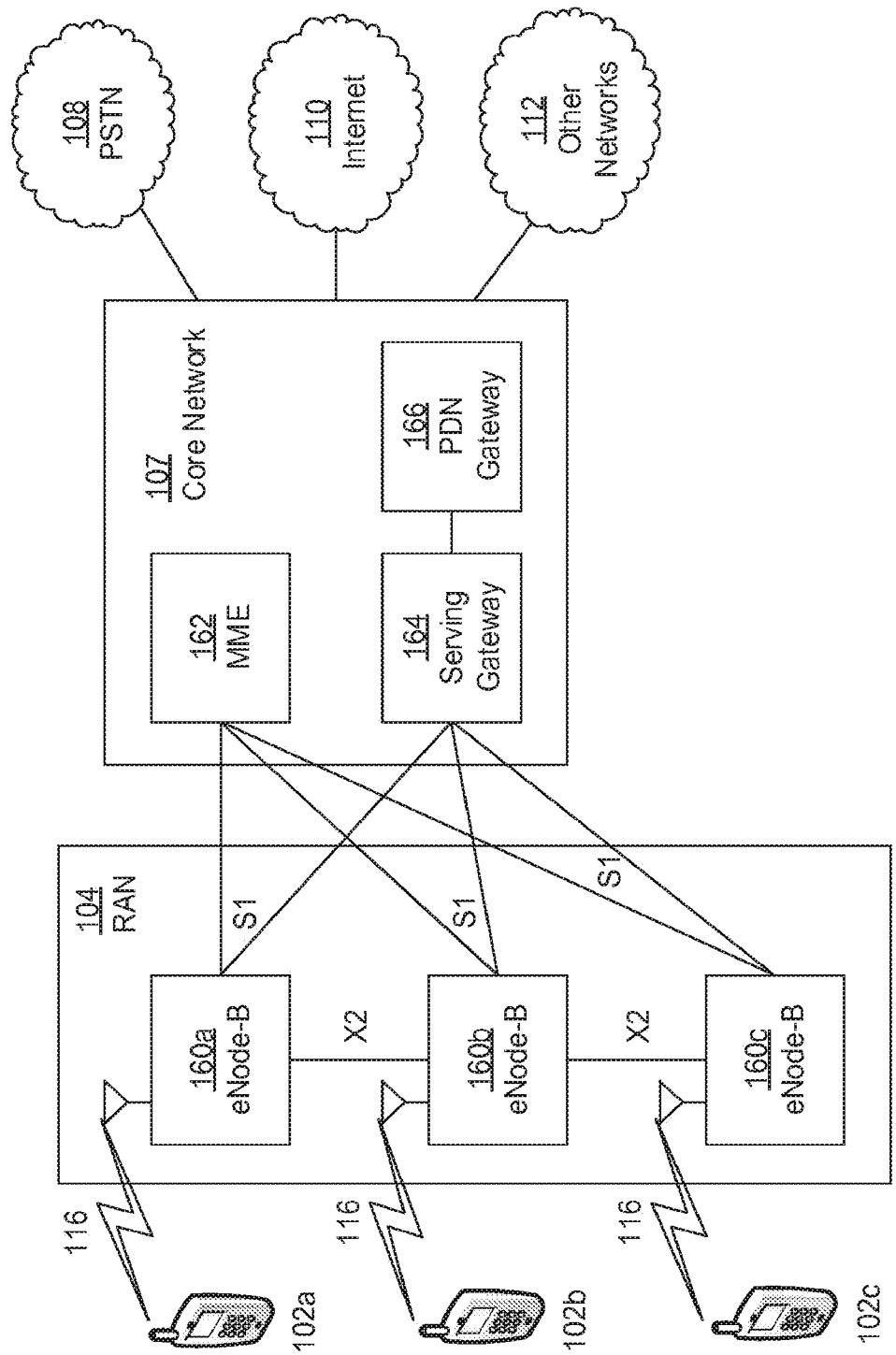
FIG. 1D is a system diagram of another example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
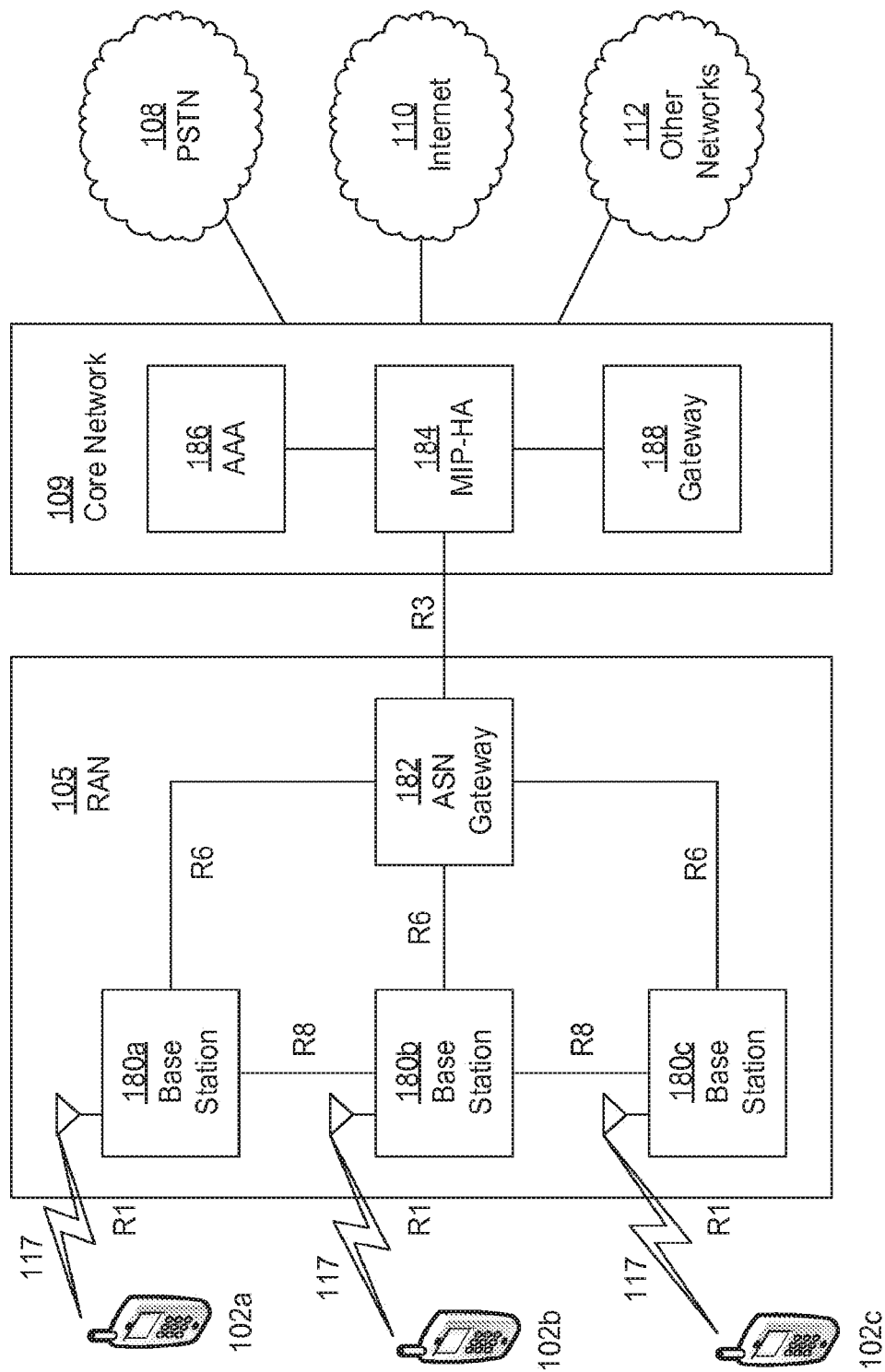
FIG. 1E is a system diagram of another example radio access network and another example core network that may be used within the communications system illustrated in FIG.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use Multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Figure 1F:
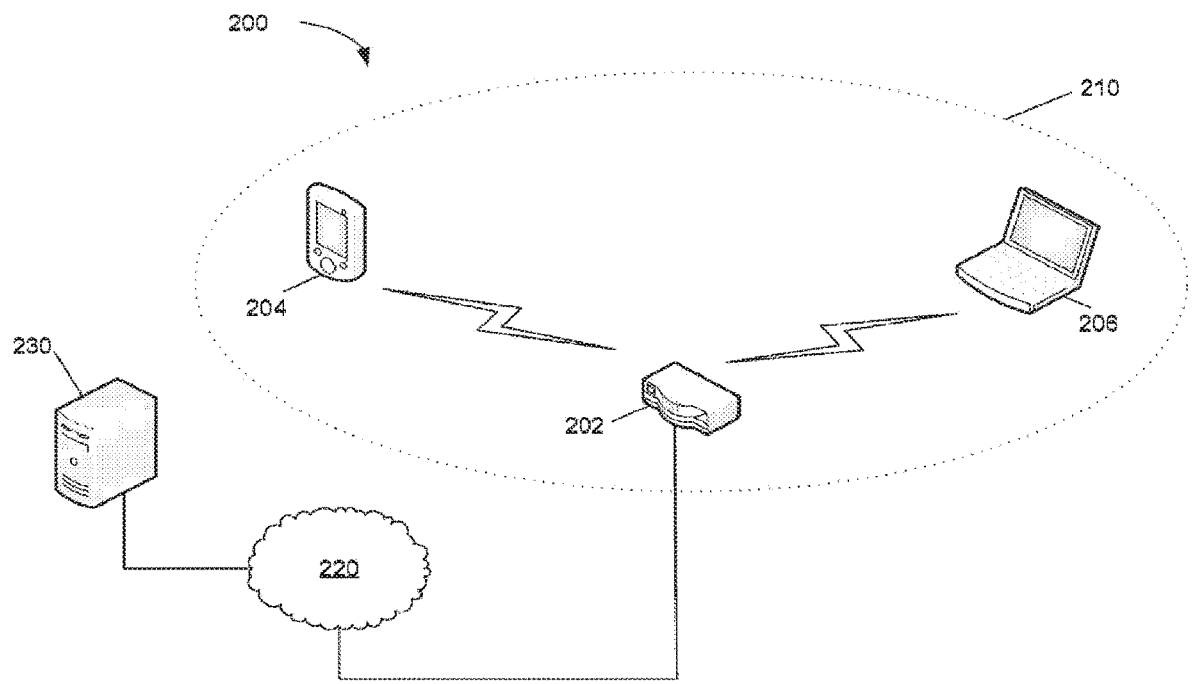
FIG. 1F is a diagram depicting exemplary wireless local area network (WLAN) devices.

FIG. 1F illustrates exemplary wireless local area network (WLAN) devices. One or more of the devices may be used to implement one or more of the features described herein. The WLAN may include, but is not limited to, access point (AP) 202, station (STA) 204, and STA 206. STA 204 and 206 may be associated with AP 202. The WLAN may be configured to implement one or more protocols of the IEEE 802.11 communication standard, which may include a channel access scheme, such as DSSS, OFDM, OF DMA, etc. A WLAN may operate in a mode, e.g., an infrastructure mode, an ad-hoc mode, etc.

A WLAN operating in an infrastructure mode may comprise one or more APs communicating with one or more associated STAs. An AP and STA(s) associated with the AP may comprise a basic service set (BSS). For example, AP 202, STA 204, and STA 206 may comprise BSS 210. An extended service set (ESS) may comprise one or more APs (with one or more BSSs) and STA(s) associated with the APs. An AP may have access to, and/or interface to, distribution system (DS), which may be wired and/or wireless and may carry traffic to and/or from the AP. Traffic to a STA in the WLAN originating from outside the WLAN may be received at an AP in the WLAN, which may send the traffic to the STA in the WLAN. Traffic originating from a STA in the WLAN to a destination outside the WLAN, e.g., to server 230, may be sent to an AP in the WLAN, which may send the traffic to the destination, e.g., via DS to network 220 to be sent to server 230. Traffic between STAs within the WLAN may be sent through one or more APs. For example, a source STA (e.g., STA 204) may have traffic intended for a destination STA (e.g., STA 206). STA 204 may send the traffic to AP 202, and, AP 202 may send the traffic to STA 206.

A WLAN may operate in an ad-hoc mode. The ad-hoc mode WLAN may be referred to as independent basic service set (IBBS). In an ad-hoc mode WLAN, the STAs may communicate directly with each other (e.g., STA 204 may communicate with STA 206 without such communication being routed through an AP).

IEEE 802.11 devices (e.g., IEEE 802.11 APs in a BSS) may use beacon frames to announce the existence of a WLAN network. An AP, such as AP 202, may transmit a beacon on a channel, e.g., a fixed channel, such as a primary channel. A STA may use a channel, such as the primary channel, to establish a connection with an AP.

A Multi-Sector Millimeter Wave Mesh node may also be referred to as Millimeter Wave Hotspot (mmH). A cost-effective, high-capacity and low-latency solution for small-cell backhaul based on the IEEE 802.11ad standard may be described herein. Features covering operations from start-up to steady-state may be described herein.

802.11ad nodes employing electronically steerable phased array antennas may allow one or more antenna to form (e.g., simultaneously) multiple directional links, such as if the node is an AP/PCP. 802.11ad nodes employing electronically steerable phased array antennas may simplify network formation, for example, by automating neighbor discovery or association. Nodes with phased array antennas may steer beams over an angular range in azimuth or elevation. The antenna gain may fall off, for example, beyond a particular angular offset from the broadside direction. If the antenna gain may fall off, the useful communication range may be affected. Multiple phased array antennas pointing in directions may be used, for example, to achieve uniform or near uniform coverage over 360 degrees in azimuth.

Figure 2:
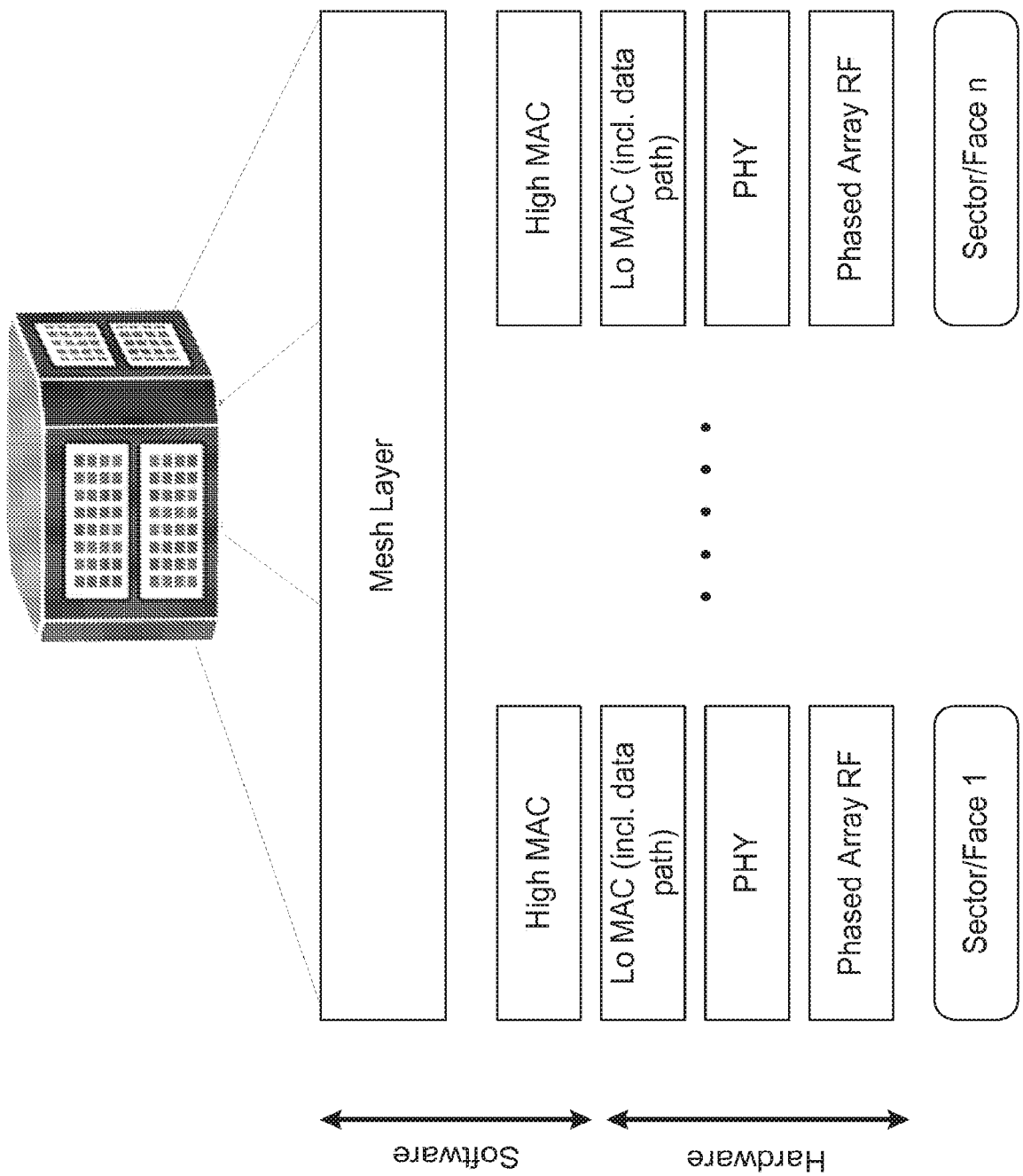
FIG. 2 is a diagram of an example mmH node configuration.

FIG. 2 is an example mesh node (e.g., which may be illustrated herein as a backhaul node, mmH node, etc.) and mesh node configuration. The multi-sector architecture of the mmH node may address coverage limitations of phased array antennas. One or more sectors (e.g., or face) may include a pair of phased array antennas. Phased array antennas may transmit and/or receive RF components and/or baseband blocks that may comprise the physical (PHY) and Media Access Control (MAC) layers. MAC, PHY and RF layers may be controlled by a Mesh Layer (e.g., a common Mesh Layer). The Mesh Layer may provide an interface to higher layers. FIG. 2 may depict an example physical appearance and/or protocol stack of a mmH node. For example, a phased array antenna (PAA) may have +/−45 degree coverage in azimuth may comprise four sectors and/or faces for 360 degree coverage. Any number of sectors or faces may be used or admitted, for example, depending on the PAA capabilities.

One or more mmH node sectors may be configured to operate as a regular 802.11ad station (STA), Access Point (AP) or Personal Basic Service Set Control Point (PCP). As used herein, the terms AP and PCP may be used interchangeably. A sector may perform, discovery, neighbor selection, association, network formation, routing, or data transfer, etc. Cross-layer interactions may occur.

A mmH system may include mmH nodes. For example, mmH nodes may be positioned throughout densely populated areas (e.g., on top of lamp posts) and connected to a Small Cell that may provide access connectivity to mobile units or WTRUs. The Small Cell may follow the LTE standard. The Small Cell and/or backhaul technology equally applies to other access technologies, such as Wi-Fi. The backhaul technology developed may be separate from access link technology being used.

A mmH node may act as a Gateway (GW) mmH node or Non-Gateway (Non-GW) mmH node. Whether a node acts as a Gateway or Non-Gateway may depend on the deployment or software configuration. Gateway (GW) mmH nodes may have a wired connection to the internet. GW mmH nodes may be co-located with points-of-presence (PoPs). The PoP may be fiber or wireless, such as E-band/LMDS. Non-Gateway (Non-GW) mmH nodes may have an indirect connection to the internet. Non-GW nodes may rely on other non-GW nodes to reach a GW node. Non-GW nodes may rely on other non-GW nodes to wire to the internet.

Non-GW nodes and GW nodes may be capable of operating when collocated with small-cells or when used in relay framework, such as when non-GW nodes and GW mmH nodes may be located individually in small-cells.

Figure 3:
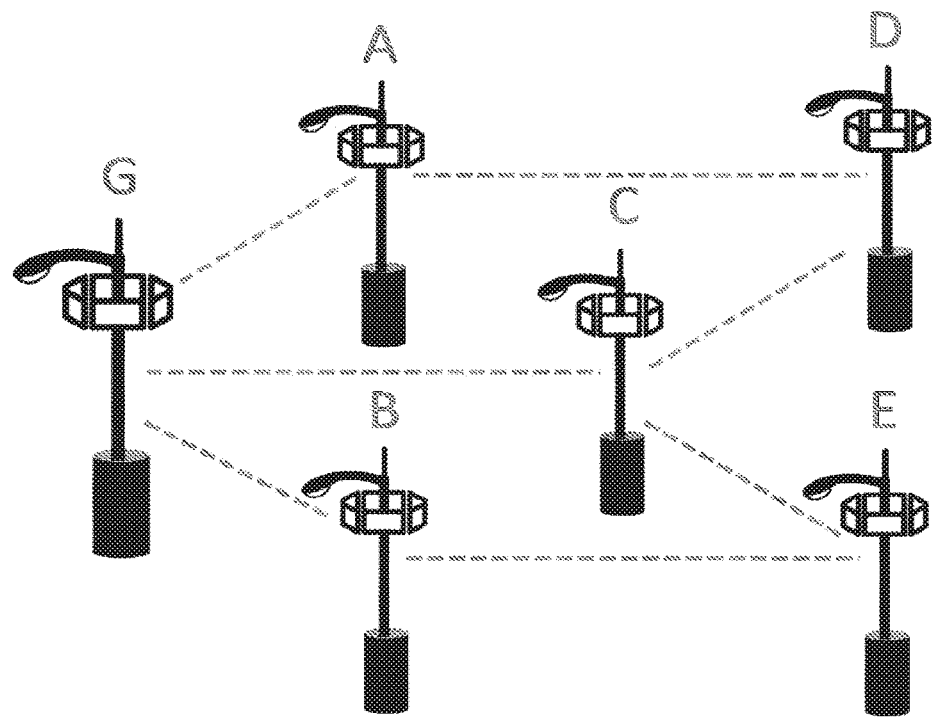
FIG. 3 is a diagram of an example mmH network topology.

FIG. 3 is an example of network topology. In FIG. 3, Node G may be a GW mmH node. Nodes A, . . . , E may be non-GW mmH nodes. Non-GW mmH nodes D and E may be indirectly connected to the GW mmH node G. Non-GW mmH nodes D and E may use two hops to reach node G. Multiple links at a particular node may be associated with a single sector or may be spread over multiple sectors, for example, when a node may be oriented relative to other neighboring nodes. A node sector acting as a PCP may have multiple links. STAs may be limited to a single link.

The mmH system may include nodes that may be static. Nodes that may be static may be affected by environmental factors, such as motion due to poll sway, foliage movements, etc. The mmH system may include directional beams for transmission and reception. Directional beams for transmission and reception may render links susceptible to blockages. The mmH system may include inter-node distances that may be large (e.g., in the range of hundreds of meters). The mmH system may include topology changes in the network (e.g., infrequent topology changes). The mmH system may include mmH nodes that may provide throughput or latency guarantees to attached access nodes. The mmH system may include mmH nodes that may use provision resources to meet the commitments.

Figure 4:
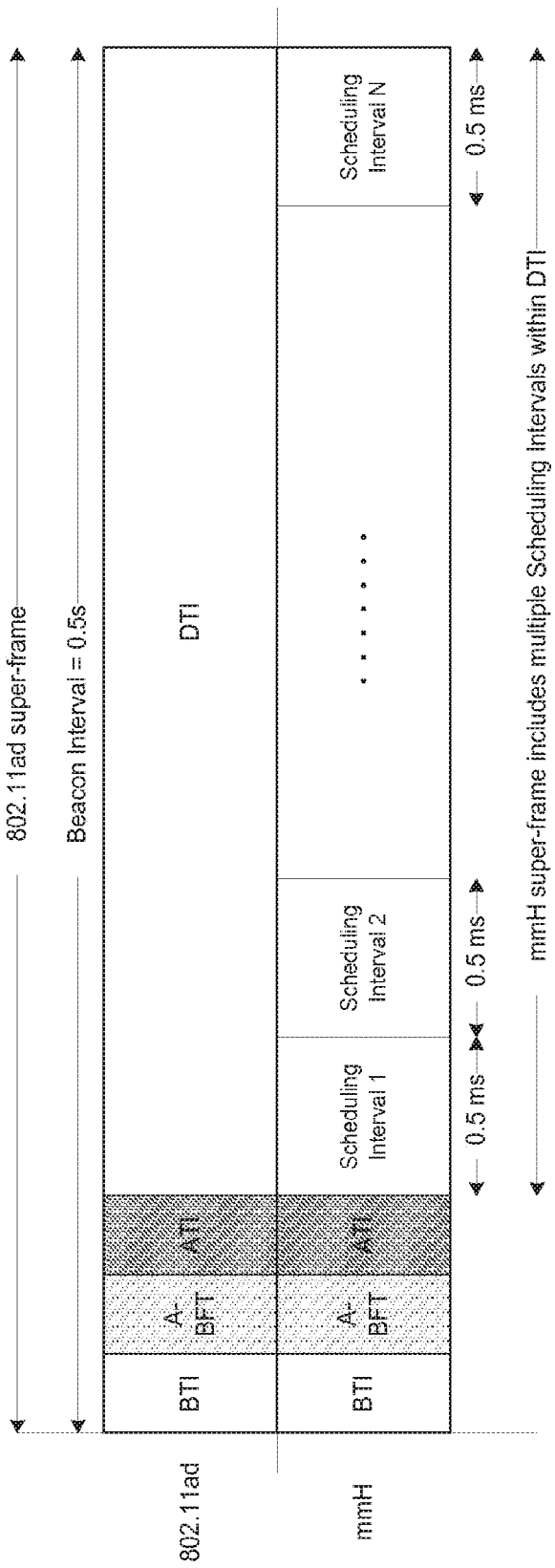
FIG. 4 is a diagram of an example 802.11ad and mmH super-frames.

A super-frame may be adopted for mmH system. The super-frame may be similar to the 802.11ad super-frame. FIG. 4 is an example of the two super-frames including mmH and 802.11ad subframes. The Beacon Transmission Interval (BTI), Association-Beamforming Training-Interval (A-BFT) and Announcement transmission interval (ATI) access periods in the mmH super-frame may be similar to those in 802.11ad and may have similar purposes, such as Directional Multi-Gigabit (DMG) Beacon transmissions during BTI, beamforming training with anode during A-BET, or request-response based management access period during ATI. The DTI period may be used for scheduled transmissions, for example, with a CBAP period at the start that may be used for node discovery signaling. 802.11ad super-frame may include a combination of contention based access periods (CBAPs) and service periods (SPs). The mmH DTI may be divided into multiple Scheduling Intervals (SIs). Data transmissions may be scheduled on one or more links at the periodicity of SIs. FIG. 4 depicts examples of values for the Beacon and Scheduling Intervals.

Figure 5:
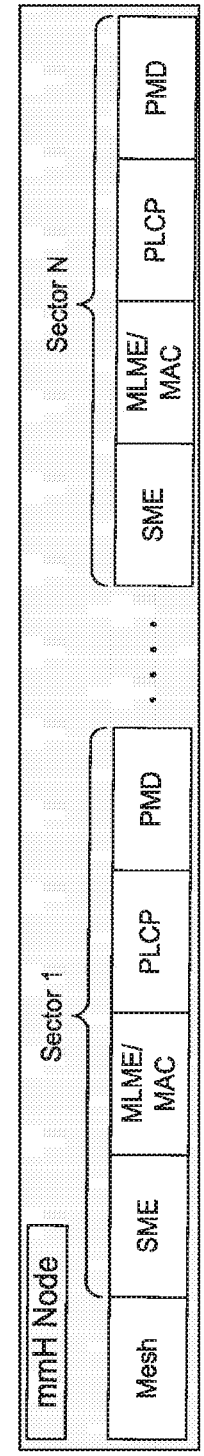
FIG. 5 is a diagram of an example functional architecture for an mmH node.

FIG. 5 is an example of mmH node functional architecture. mmH nodes may consist of N sectors. Each N sector may comprise an 802.11ad protocol stack or a protocol stack similar to 802.11ad. Sectors may operate as a PCP or a STA. The operational mode (e.g., PCP or STA) may be determined at node start-up. The operational mode (e.g., PCP or STA) may change during operations (e.g., when changes are made to the system, such as anode being added). FIG. 5 is an example of the functional view of an mmH node with N sectors. As shown in FIG. 5, there may be a common Mesh Layer for one or more sectors. One or more sectors may include 802.11ad protocol layers. Architecture, as shown in FIG. 5, may allow re-use from standard 802.11ad implementations. The Mesh to Station Management Entity (SME) interface may be used. One or more primitives between the SME and the MLME/MAC and the MLME/MAC and PLCP may be modified. A sector within an node may operate like a regular 802.11ad node (e.g., PCP or STA mode), for example with inter-sector coordination provided by the Mesh Layer.

Figure 6B:
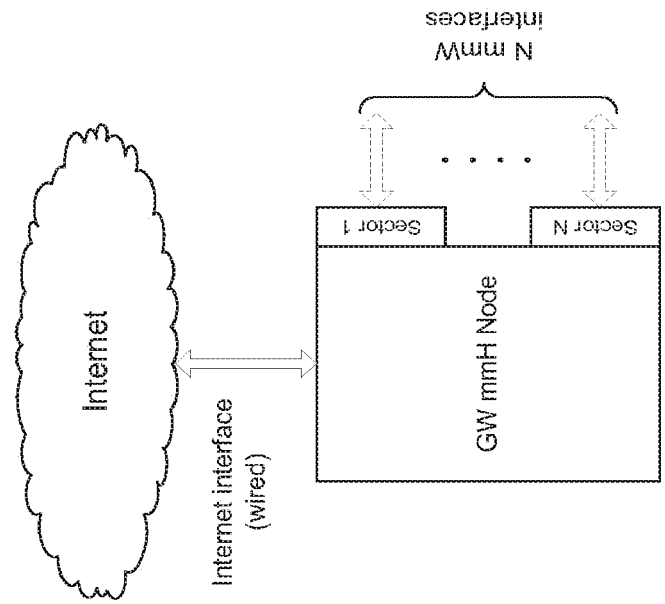
FIG. 6B is a diagram interfaces of a Gateway (GW) node.
Figure 6A:
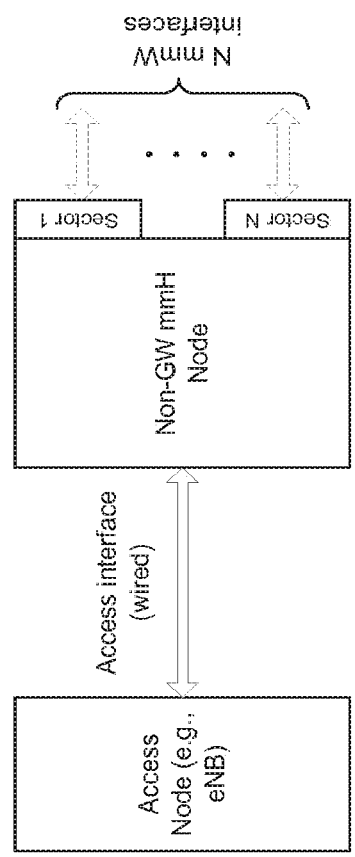
FIG. 6A is a diagram of example functional interfaces of a non-Gateway (non-GW) node.

FIG. 6A is an example of functional interfaces for the non-GW mmH nodes and FIG. 6B an example of functional interfaces for the GW mmH nodes.

Figure 7:
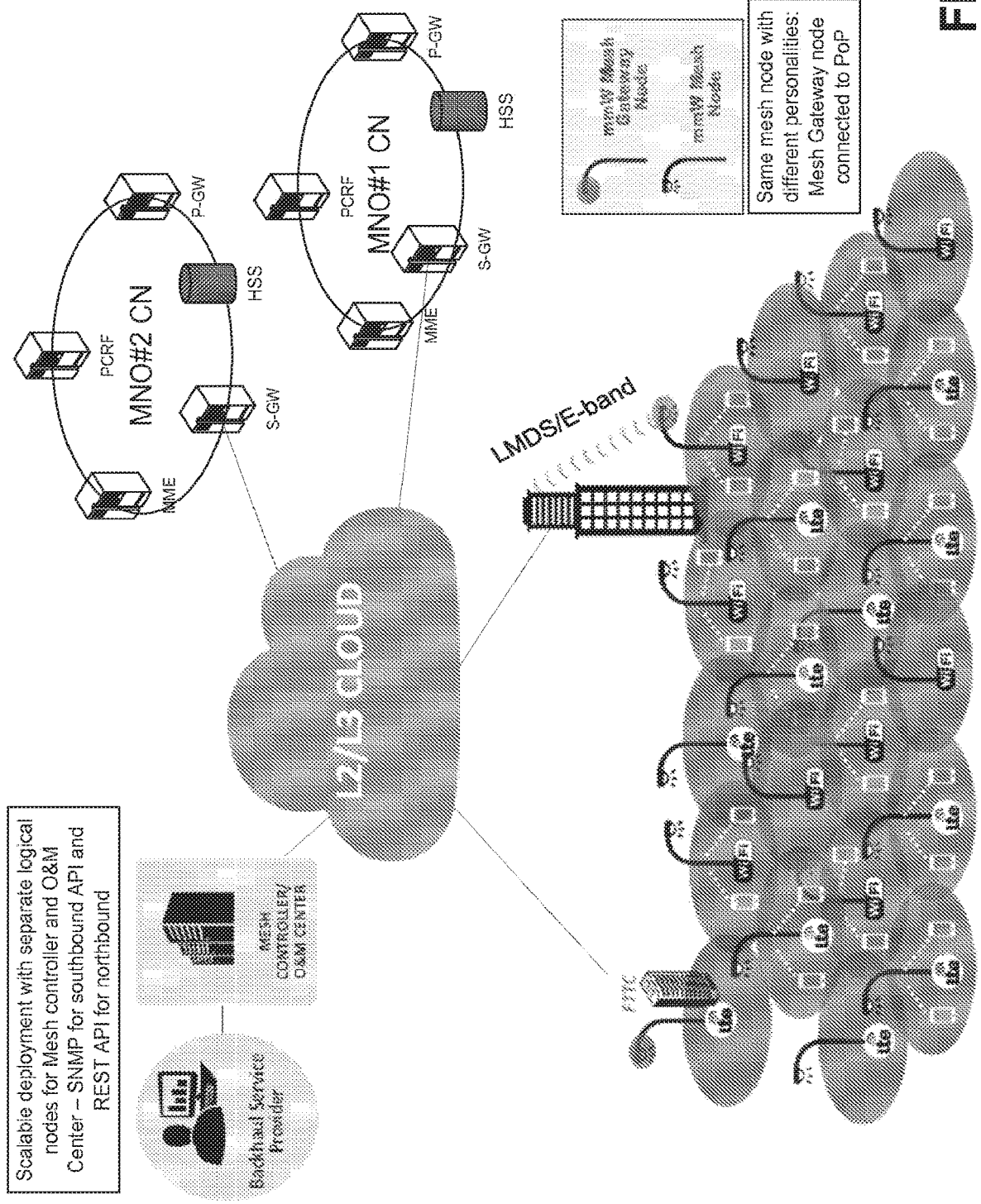
FIG. 7 is a diagram of an example deployment view of mmW-based directional mesh BH network.

FIG. 7 depicts an example deployment view of a mmW-based directional mesh BH network. The mesh network may include the mmW Mesh Gateway Node, mmW Mesh Node and/or the Mesh Controller/O&M Center. The Mesh Controller may provide delay-insensitive control or management functions to the BH Mesh-network. The Mesh Controller may provide admission control and configuration of new nodes, neighbor selection for new nodes, route formation per semi-static/dynamic traffic and QoS for one or more mmW Mesh Node, periodic route updates (e.g., routing table updates), such as re-routing due to link failures, and/or coordinating interference measurement and management, such as measurement schedule determination, collection of results and transmission schedule determination to manage inter-node interference, etc.

A mesh controller may be inside or outside of a mobile operator's core network. In the example of FIG. 7, the mesh controller is shown outside of the mobile operator's core network, e.g., mesh backhaul may be used in multi-tenant scenarios involving multiple mobile network operators (MNO). The mesh controller may reside in one or more of the operators' core network, for example, in single operator configuration or if the operator's core network is reachable via an L2/L3 interface. In FIG. 7, the mesh controller is collocated with O&M center for simpler depiction. The mesh controller and O&M center may allow for a scalable deployment with separate logical functions. The mesh network architecture may be flexible to suit multiple deployment scenarios or network configurations.

The data-plane traffic (e.g., user data) may not flow through the mesh-controller. The interface to the mesh-controller may be a control interface (e.g., may only be a control interface) used for mesh configuration or management purposes. The data plane traffic may go through the serving gateway (S-GW) interface of the MNO, for example, in LTE deployments.

Figure 8:
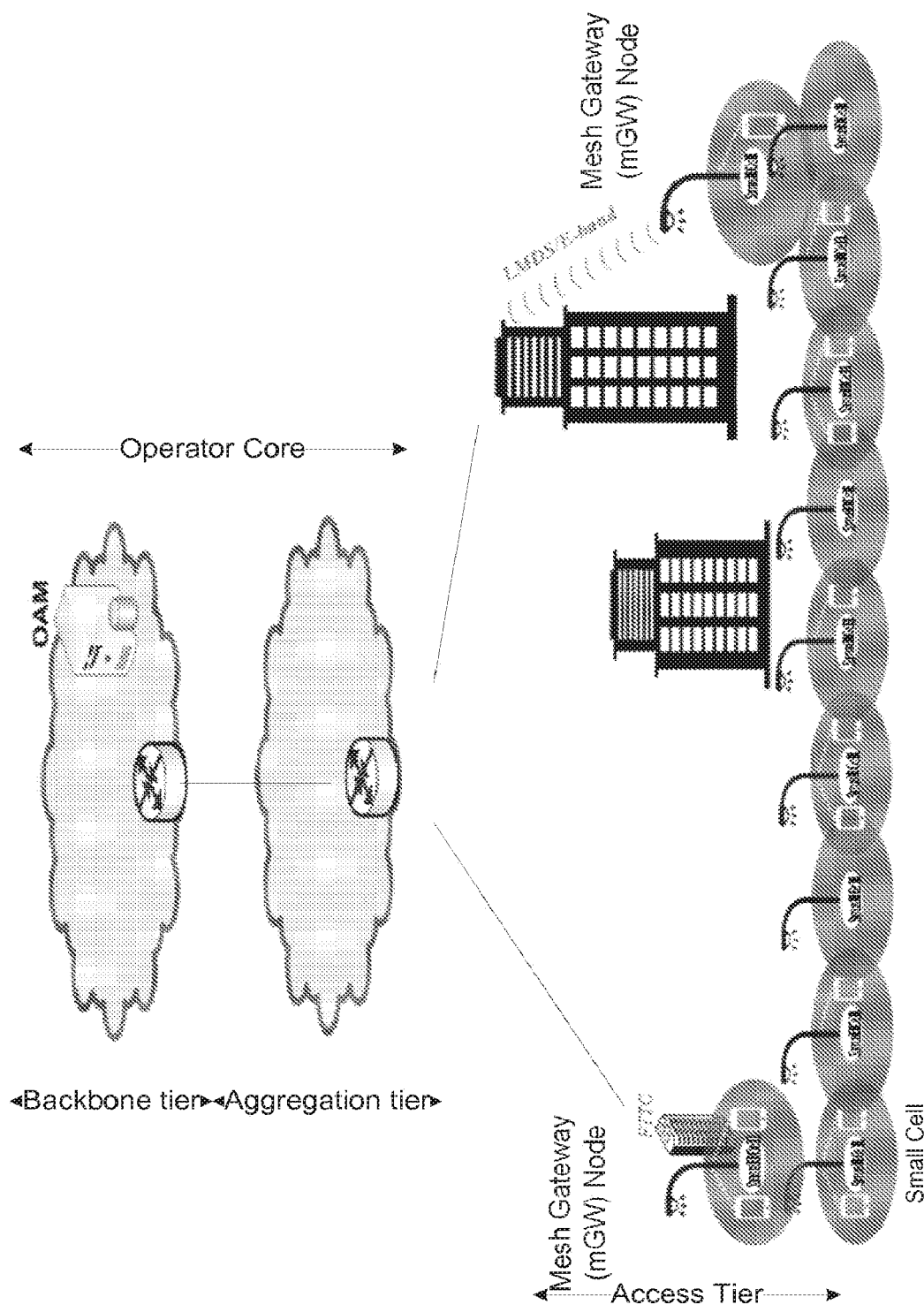
FIG. 8 is a diagram of an example backhaul network configuration.

FIG. 8 is an example network configuration for a backhaul mesh network. The backhaul mesh network may comprise mmW mesh gateway nodes that may be directly connected to fiber PoPs or may have a wireless interface that connects to the access operator's core network. The mesh gateway and non-gateway mesh nodes may comprise the access tier of the backhaul network. The mesh controller may provide mesh network formation and management. The mesh-controller may be within the mobile operator's core network. The mesh controller may provide delay insensitive functions (e.g., only delay insensitive functions). For example, the mesh controller may reside in the backbone tier of the backhaul, as shown in FIG. 8

Figure 9:
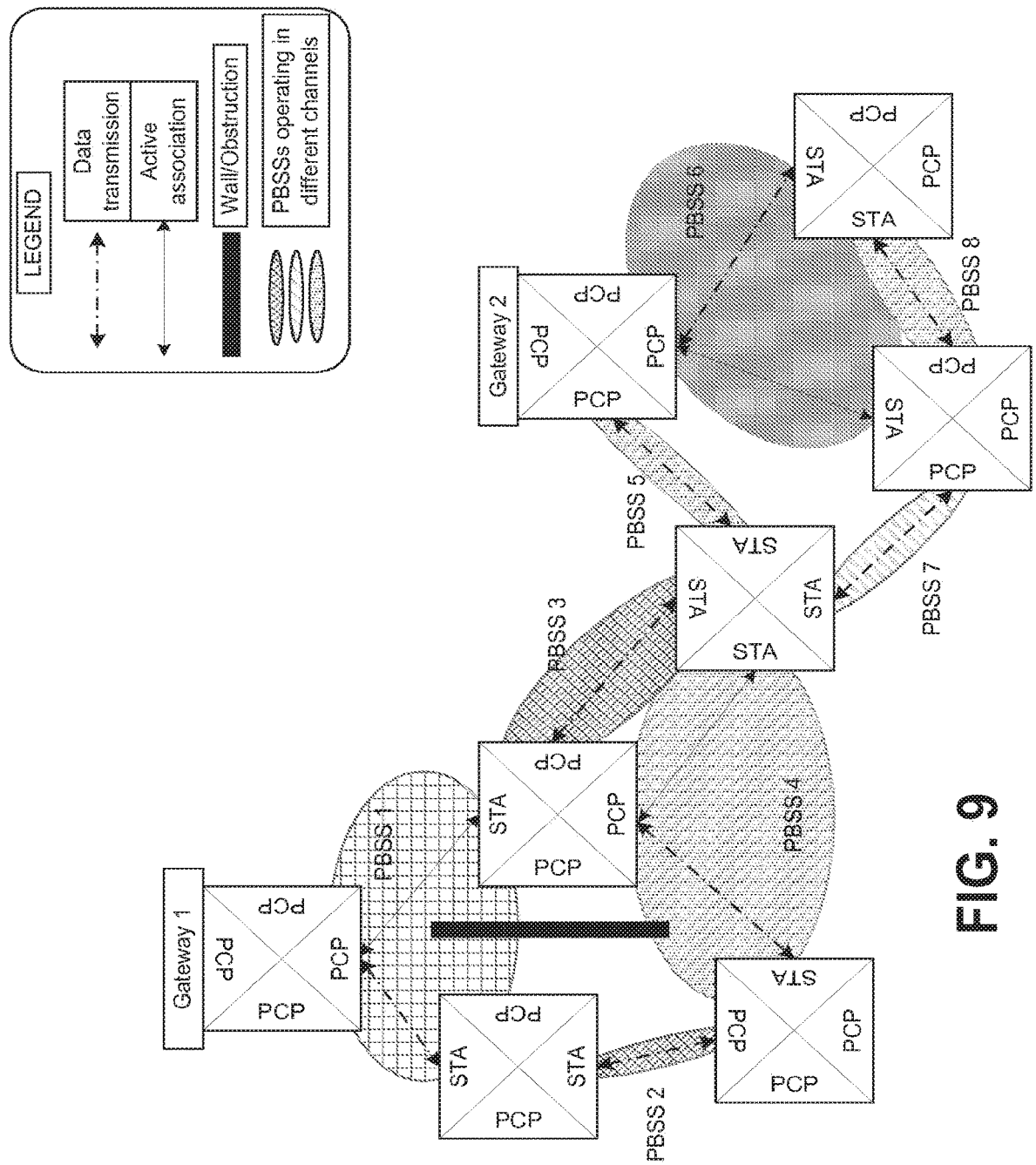
FIG. 9 is a diagram of an example multi-hop mesh using individual basic service sets (BSSs).

FIG. 9 is an example of a multi-hop mesh network. A multi-hop mesh network may be formed by bringing together a series of links (e.g. one-hop links) that may belong to separate PBSSs, as shown in FIG. 9. A multi-hop route may connect the source to the destination, for example, by connecting a series of one-hop links. A mmW Mesh Node, such as illustrated in the example of FIG. 9, may comprise multiple sectors. A sector may be capable of acting as a PCP or STA (e.g., a 802.11ad PCP or STA) Nodes may join existing mesh nodes, for example, when the joining node performs network discovery. Nodes may form a series of PBSSs, for example, which may be controlled by an individual PCP sector. A controlling PCP may schedule data transmissions within the PBSS controlled by it, e.g., at any time. Multiple data transmissions may occur in the mesh network in different PBSSs, for example, if the beams selected by each result in acceptable interference. In FIG. 9, eight simultaneous transmissions may be possible between pairs of sectors forming eight different PBSSs.

Node initialization may include long-range device discovery, assisted discovery, personality switch, neighbor selection, and/or association. One or more of these may be performed in order for the node to join a mesh network with other nodes.

The node start-up for a GW mmH node may differ from node start-up for a non-GW mmH node. A GW mmH node may have a direct wired connection to the internet through a fiber PoP. A GW mmH node may not require wireless link to a neighboring node to reach a fiber PoP. A non-GW mmH node may establish wireless connection with one of its neighboring nodes to reach a GW mmH node that has a wired interface, e.g., to a fiber PoP. A non-GW node may provide BH traffic service to a co-located access node, for example, after (e.g., only after) establishing (e.g., successfully establishing) a route to reach a GW mmH node (e.g., directly or indirectly) via another non-GW mmH node.

Figure 10:
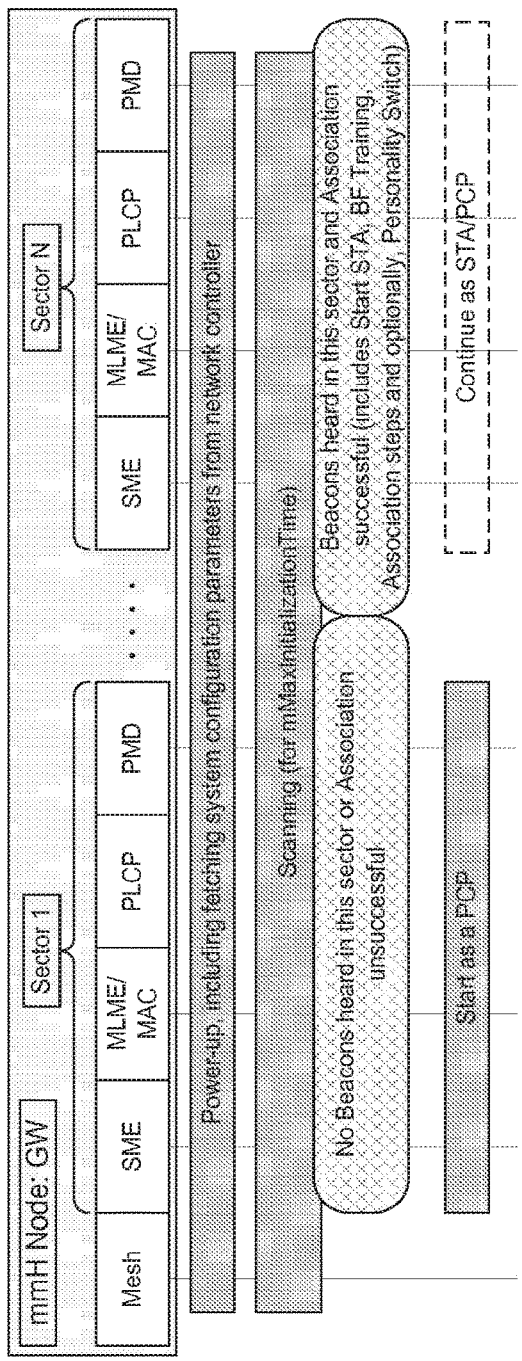
FIG. 10 is a diagram of an example start-up for a GW mmH node.

FIG. 10 is an example GW mmH node start-up. The GW mmH node may power up and/or initialize one or more protocol layers and/or modules. The GW mmH may fetch configuration parameters from the Mesh Controller. The Mesh Controller may be reached via the Internet interface. The Mesh Controller address may be pre-configured in GW mmH node memory. GW mmH node memory may provide configuration parameters or settings, such as SSID, personality (PCP/STA), etc., to the GW mmH node. GW mmH node memory may help neighbor selection.

The GW mmH node may scan for DMG Beacon transmissions, for example, from existing PCPs or STAB. The scan may continue for mMaxScanDuration period. The mMaxScanDuration may be the amount of time one or more sectors of the new GW mmH node scans for DMG Beacon transmissions.

The quantity mMaxScanDuration may be:

mMaxScanDuration=mScanDurationPerBeam*mMaxBeamsPerSector wherein:
mScanDurationPerBeam may be the amount of time spent by one or more sectors scanning a particular direction (e.g., using a particular beam).
mScanDurationPerBeam may be:

mScanDurationPerBeam=mMinBIsPerScanDirection*mBIDuration+mBTISlotDuration mMinBIsPerScanDirection may be the minimum number of BIs scanned per beam/direction. The default value may be 1.
mBIDuration may be BI duration. The default value may be 0.5 sec.
mBTISlotDuratibn may be duration of one or more BTI period slot, for example, meant for DMG Beacon transmission in a direction.
mMaxBeanisPerSector may be the maximum number of beams used per sector for scanning.

Scanning for mMaxScanDuration period may ensure that a sector may receive one or more DMG Beacons from other mmH nodes that may be within discovery range. One or more sectors may report scan results to the Mesh Layer, for example, at the end of mMaxScanDuration.

For example, at the end of the scanning period, a sector that receives (e.g., successfully receives) a DMG Beacon through scan beams may be directed by the Mesh Layer to continue the Network Formation including but not limited to Beamforming (BF) Training, Association or Personality Switch, such as at the end of scanning period. The GW mmH node sector may transition to the STA mode or PCP mode, for example depending on the mode of the discovered sector on the other side of the link.

The GW mmH node sector that may not have received a DMG Beacon may be directed by the Mesh Layer to start operating as a PCP, for example, at the end of a scanning period.

Figure 11:
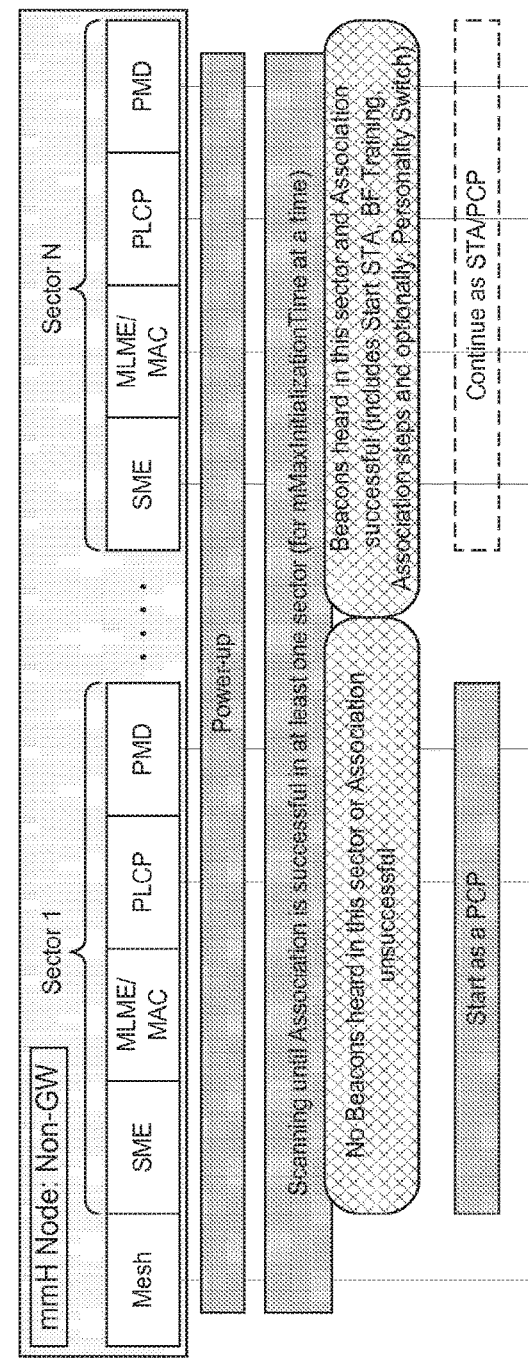
FIG. 11 is a diagram of an example start-up for a non-GW node.

FIG. 11 is an example non-GW mmH node start-up. The non-GW mmH node may power up and initialize one or more protocol layers and/or modules. A non-GW mmH node may not fetch operational parameters from the Mesh Controller. A non-GW mmH may wait for Temporary Association to be completed to fetch operational parameters from the Mesh Controller.

The non-GW mmH node may start scanning for DMG Beacon transmissions from existing PCPs or STAs. The scan may continue until one or more scanning sectors receives one or more DMG Beacon from a PCP or STA; performs BF Training with PCPs or STAs, for example, as directed by Mesh Layer; and/or performs association with a PCP or STA, for example, as directed by the Mesh Layer. A node sector may establish a wireless path (e.g., directly or indirectly via other non-GW mmH nodes) to the GW mmH node. The node sector may use the GW mmH node to access wired Internet. A scan may be performed one mMaxScanDuration period at a-time. At the end of each mMaxScanDuration period, one or more sectors may report the scan results to the Mesh Layer. The Mesh Layer may direct one or more new node sectors to continue scanning for DMG Beacons aMaxScanDuration at a time, for example if none of the new node sectors report DMG Beacon reception.

One or more sectors that may receive (e.g., successfully receive) DMG Beacon frames from peer sectors (e.g., PCP or STA) may report the results to the Mesh Layer. The Mesh Layer may direct one or more of the sectors reporting DMG Beacon reception to continue with Network Initialization, including but not limited to Beamforming (BF) Training and Association, in a scanning period. A temporary association with the neighboring sector may result from a sector continuing with Network Initialization. A temporary association with the neighboring sector may allow a new node to communicate with the Mesh Controller to fetch configuration parameters. The Mesh Controller may perform Neighbor Selection for the new node. The Mesh Controller may communicate results to the mesh node Mesh Layer. The Mesh Layer at the new node may direct the sectors identified by the Mesh Controller to perform Permanent Association with peer neighbor sectors.

The Mesh Layer may direct sectors that did not join existing PBSSs to start as PCPs at an indicated time, for example, at the end of a portion of Association, such as Permanent Association. This may cause one or more sectors to transmit DMG Beacons at an indicated time, advertise sector presence or enable new nodes that may appear within discovery range to join the network through the sectors. One or more sectors of mmH nodes in a network (e.g., operating as PCPs or STAB) may have a common DMG Beacon transmission period. For example, a STA may retransmit a received beacon in the transmission period.

Figure 12:
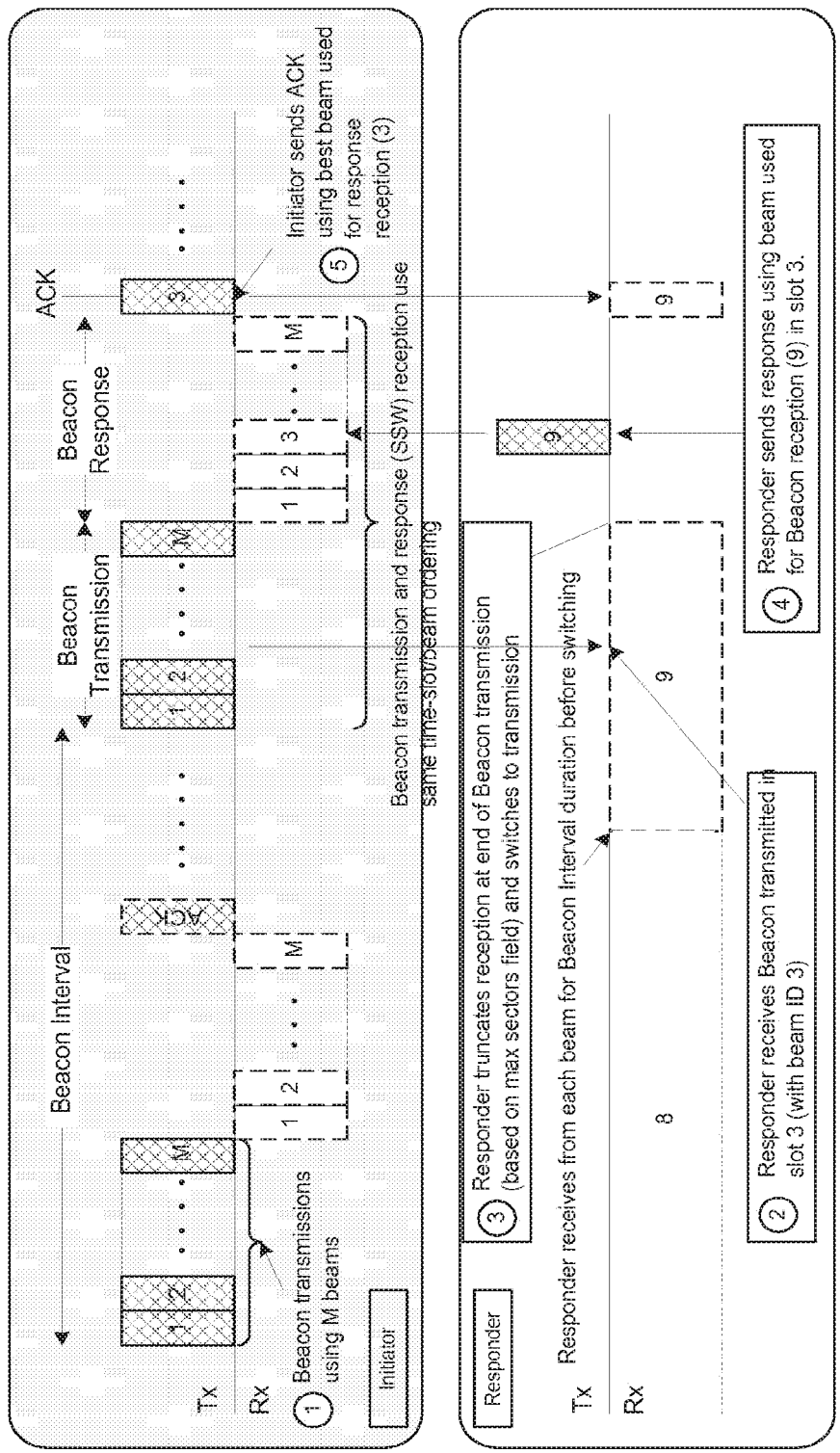
FIG. 12 is a diagram of an example long-range device discovery.

Long-range device discovery may be used for large inter-node distances. Long-range device discoverymay use the new node to perform directional reception of DMG Beacons, for example, while the mesh node performs directional transmission of the response and the Sector Sweep (SSW) frames. FIG. 12 is an example diagram of long-range device discovery.

In FIG. 12, the Initiator may be a sector of an existing mmH node operating as a PCP. The Initiator may transmit DMG Beacons during the BTI, such as at the start of a Beacon Interval. The DMG Beacon frames may be transmitted in multiple time-slots. The DMG Beacon frames may use a different transmit antenna beam, for example, so that a new node within discovery range may be able to discover the presence of the network. The PCP May transmit M DMG Beacons using M beams in M time-slots. An antenna beam may refer to a stored antenna configuration that may be used to transmit the DMG Beacon frames. The antenna configuration may depend on tire antenna/RF implementation. The antenna configuration may be chosen such that one or more supported directions are covered by the set of antenna beams used for DMG Beacon transmissions.

In FIG. 12, the Responder may be a new node. The Responder may scan (e.g., directionally) using one or more beams to search for the presence of a DMG Beacon. The presence of a DMG Beacon may indicate that the Responder is within range of an operational network. The new mmH node may not be connected to the mesh network. The new mmH node may not have achieved frame synchronization. The new mmH node scan period may be unaligned with the Beacon Interval of the PCP transmitting the Beacons. The new node may scan a particular direction using one or more of its beams for a period equal to the Scan Interval. The value of the Scan interval may be known, for example, when the Message Information Block (MIB) is loaded from memory. The Scan Interval may be equal or similar to the Beacon Interval or the Beacon interval in combination with a Beacon slot. Scanning for the duration of the Scan Interval may enable the new node to hear a beacon if it is within range of a PCP.

FIG. 12 depicts an example of general device discovery. In FIG. 12, the Responder may switch from reception to transmission mode, such as when the Responder receives a DMG Beacon frame. The Responder may send a response message (SSW frame) in the same or near time-slot in the Beacon Response period (e.g., corresponding to the A-BFT period in 802.11ad super-frame) in which the Responder receives the DMG Beacon during the BTI. In FIG. 12, the Responder received the Beacon in the third time-slot during BTI, In FIG. 12, the Responder may respond in time-slot three during A-BFT to send the SSW frame. The Responder may synchronize with the PCP that transmitted the DMG Beacon, for example, by reading the Timestamp field in the DMG Beacon frame.

The Responder node may have a delayed response with a SSW frame when receiving a DMG Beacon, for example, in disco very. The Responder may complete a scan cycle. The Responder may report the scan results to the Mesh Layer. The Mesh Layer may instruct the MAC operating within the particular sector to respond to one of the discovered DMG Beacon transmitters (e.g., PCPs or STAs, if Assisted Discovery is enabled) at a time with the same or similar beam that may be used to receive the DMG Beacon during scanning. The Mesh Layer may select the PCP/STA to respond to during the A-BFT period. The Mesh Layer may communicate to the MAC layer the selected PCP/STA (e.g., the PCP/STA with which to attempt to set up a path to the GW, for example, for backhaul). The selected PCP/STA may depend on the link quality reported by the sectors to the Mesh Layer, for example, based on DMG Beacon reception. Transmission of response (e.g., SSW frame) by the new node may signal the start of Temporary Association with the chosen neighbor sector.

The Mesh Layer may control the order of DMG Beacon transmissions by the PCP. The PCP sector may transmit the beacon frames in the same order in consecutive BTI slots. The PCP may transmit beacon frames in the order specified by the Mesh Layer. The PCP may transmit beacon frames in random order, for example, as determined by a random generator that may be initialized by a seed value provided by the Mesh Layer. The PCP transmitting behavior may be controlled by the Beaconing Mode element present in the Mesh-Start.request or MLME-START.request primitives.

The Initiator/PCP may scan for SSW frame responses from new nodes using Rx beams in the same or similar direction or order used in original DMG Beacon transmissions during BTI, for example, during A-BFT period. The PCP may use the same beam for reception during A-BFT slot 1 that the PCP used for DMG Beacon transmission in the first slot in BTI slot 1. The Tx beams and Rx beams may be numbered such that Tx and Rx beams of the same number will point in the same direction, such as for the subset of beam. The combination of directional transmission at the Responder and directional reception at the Initiator during A-BFT may increase the discovery range of the new node.

The Initiator/PCP may transmit an SSW-Fbck frame using the same transmit beam used for SSW reception, such as in the final slot of the A-BFT period. The Responder may use the same beam used for SSW transmission for reception of SSW-Fbck frame. This may complete Discovery.

mmH node sectors in the STA mode may transmit DMG Beacons during the BTI period, for example, if Assisted Discovery functionality is enabled. During A-BFT period, the mmH node sectors may scan for SSW frames, for example, similar to sectors operating as PCPs. During BTI and A-BFT periods, one or more sectors of mmH nodes may operate in a steady state. A steady state may indicate that nodes have performed association and may be part of the mesh network. During BTI and A-BFT periods, one or more sectors of mmH nodes may transmit DMG Beacon frames. During BTI and A-BFT periods, one or more sectors of mmH nodes may scan for SSW frames. New nodes may be discovered by existing mmH nodes belonging to the network, for example, if the new nodes are within discovery range. New nodes may be discovered by an existing mmH node sector when the mmH node sector is in PCP or STA mode. A new node that is within discovery range of an existing mmH node sector operating in STA mode may be discoverable. The new node may be able to hear the DMG Beacon frames transmitted by the mmH sector operating in STA mode and the new node may respond to the mmH sector.

Figure 13:
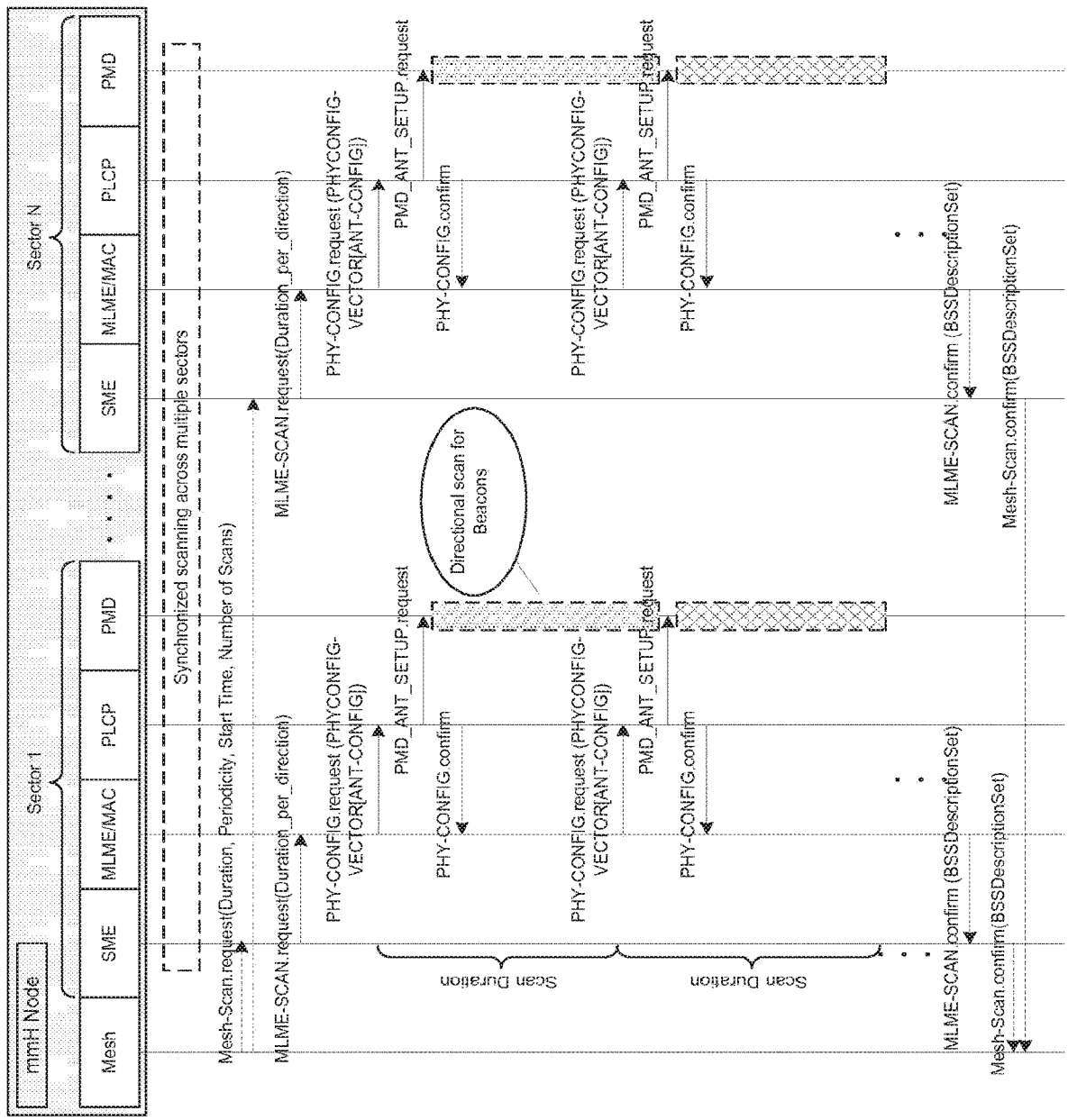
FIG. 13 is a diagram of an example scanning.

FIG. 13 illustrates an example scanning. Scanning may occur during the A-BFT period. A sector within a mesh node may listen in one or more directions in pre-defined timeslots to determine if one or more SSW frames may be transmitted by new node sectors that may perform the first stage of BF-Training (SLS). The order of receive directions or antenna beams used for reception during scanning may be the same or similar as the order used for DMG Beacon transmissions during BTI. One or more sectors within an mmH node may initiate the scanning. This may be done simultaneously. The Mesh-Scan.request message from the Mesh Layer may initiate the scan in one or more sectors of the node. The Mesh-Scan.request message may include parameters, such as the Start time, Periodicity, Duration, and/or Number of Scans requested by the Mesh Layer. The Mesh-Scan.request message parameters may enable the scanning in one or more sectors to proceed synchronously.

The SME may send an MLME-SCAN.request message to the MLME/MAC layer, for example, upon receiving the Mesh-Scan.request message from the Mesh Layer. The SME sending an MLME-SCAN.request message may trigger the MAC to initiate the directional scan. The MLME-SCAN.request primitive may have a new parameter, Duration_per_direction. Duration_per_direction may inform the MAC how long to listen at a particular direction/beam. The MLME-SCAN.request primitive may be transmitted when the PHY layer may listen for incoming packet. The start time may be contained in the Mesh-Scan.request from the Mesh Layer. The number of requested directions to scan may be derived at the MAC from the parameters, such as Duration_per_scan and MaxChannelTime. MaxChannelTime may be a regular parameter in MLME-SCAN.request primitive.

The MLME/MAC may sends a PHY-CONFIG.request primitive to the Physical Layer Convergence Protocol (PLCP) for one or more scan direction at the start or intended start of one or more directional scan. The PLCP layer may sends a PMD_ANT_SETUP.request primitive to the Physical Medium Dependent (PMD) layer, for example, upon receiving the PHY-CONFIG.request primitive. The PLCP layer may sends a PMD_ANT_SETUP.request primitive to the Physical Medium Dependent (PMD) layer to initiate directional scanning.

The MLME/MAC layer may send the MLME-SCAN.confirm primitive to the SME, for example, at the end of scanning one or more directions/beams. The MLME-SCAN: confirm primitive may include the BSSDescriptionSet parameter. The BSSDescriptionSet parameter may be similar to the 802.11ad parameter. The BSSDescriptionSet may includes zero or more instances of a BSSDescription. The BSSDescription parameter may include quantities parsed from received DMG Beacons and quantities related to received signal strength. Upon receiving the MLME-SCAN.confirm primitive, the SME may send a Mesh-Scan.confirm primitive to the Mesh Layer. This primitive may include the relevant quantities of one or more discovered peer PCPs and STAs that may have been received as part of the MLME-SCAN.confirm primitive.

Figure 14:
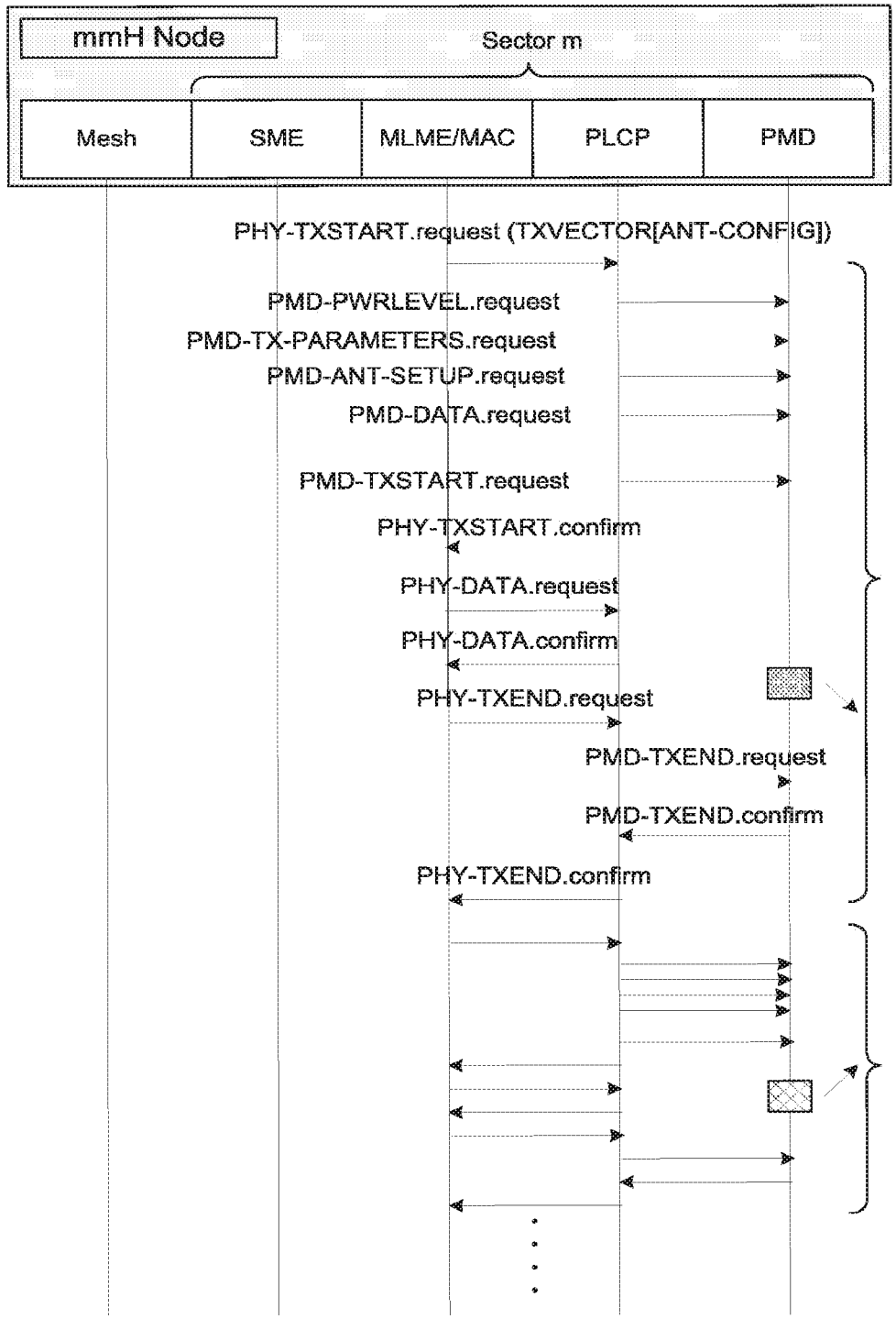
FIG. 14 is a diagram of an example beaconing.

FIG. 14 illustrates an example Beaconing. Beaconing may start with the transmission of PHY-TXSTART.request primitive by the MLME/MAC. The PHY-TXSTART.request primitive may include the ANT-CONFIG parameter. The PHY-TXSTART.request primitive may be part of TXVECTOR. The ANT-CONFIG parameter may indicate the antenna configuration that may be used throughout the transmission of the packet (e.g., DMG Beacon). The ANT-CONFIG parameter may indicate when to switch between configurations. Specific values may be implementation dependent.

A PHY-TXSTART.request primitive may be enabled for the PHY entity to be in the transmit state, for example, to transmit data. The PHY may be set to operate at the appropriate frequency through the SME via the PLME. Other transmit parameters (e.g., MCS, antenna configuration and transmit power) may be set via the PHY-SAP with the PHY-TXSTART.request(TXVECTOR).

Figure 15:
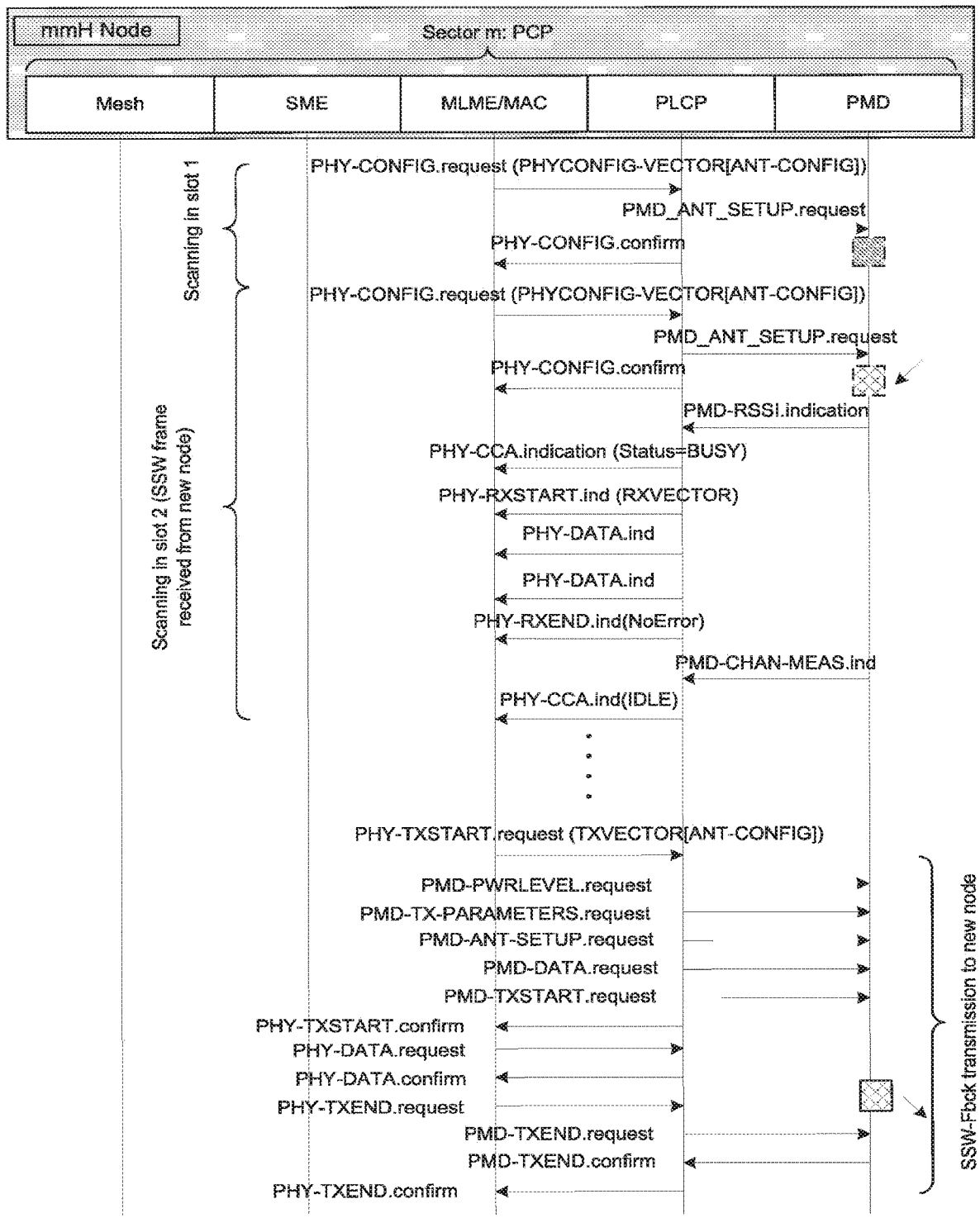
FIG. 15 is a diagram of an example discovery and sector level sweep (SLS) phase.

FIG. 15 illustrates an example discovery and first phase of BF Training. FIG. 15 depicts an example of SLS phase from a PCP's perspective. Discovery may involve scanning for SSW frames during A-BFT period. Discovery may involve SSW-Feedback transmission and SSW reception in one or more A-BFT slots.

Scanning an A-BFT slot, which may be performed for each A-BFT slot, may start with transmission of PHY-CONFIG.request primitive to the PLCP layer. The PITY-CONFIG.request primitive may include the ANT-CONFIG vector as part of the PPHYCONFIG-VECTOR. The ANT-CONFIG vector parameter may set the antenna configuration for reception in a direction. PHY-CONFIG.confirm primitive may inform the MLME about the status of the instruction execution. One or more of the above may be repeated at the start of an A-BFT slot. In those slots where an SSW frame is received, additional primitives may be generated to deliver the message contents to the MLME/MAC. The PMD-RSSI.indication primitive may report the received signal strength to the PLCP. The PMD-RSSI.indication primitive may indicate activity to the MAC through the PHY-CCA.indication(BUSY) primitive.

After scanning one or more directions/beams during an A-BFT scanning slot (e.g., for each A-BFT scanning slot), the PCP may switch to transmission mode. The PCP may send an SSW-Fbck frame to a node from which the PCP received a SSW frame in a A-BFT scanning slot. The ANT-CONFIG parameter may set to the same or similar value used for reception of SSW frame in the A-BFT scanning slot. Transmission of the SSW-Fbck frame may signal the end of the first BF Training, the SLS.

Figure 16:
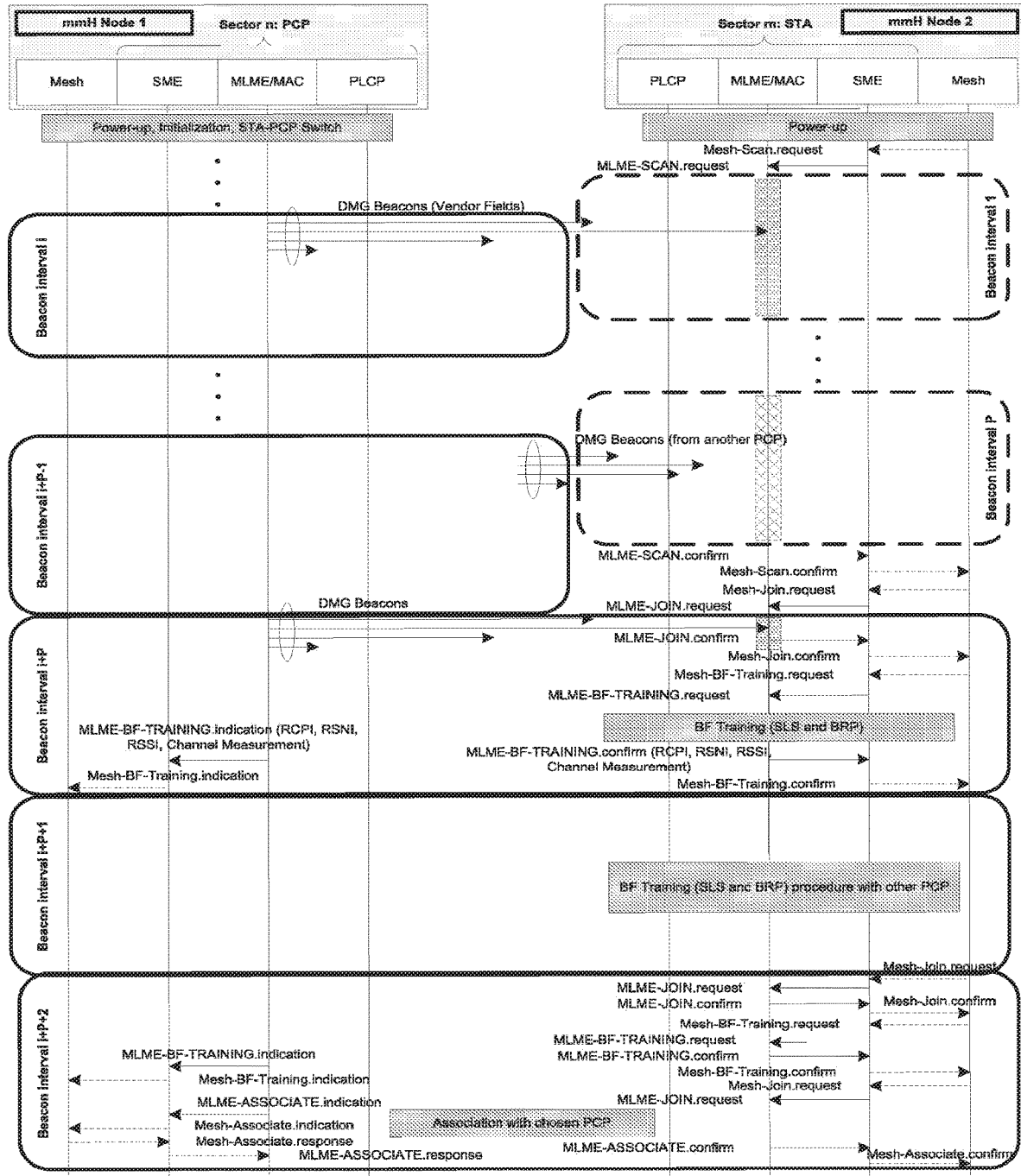
FIG. 16 is a diagram of an example discovery, beamforming (BF) training, and association.

FIG. 16 depicts an example of synchronizing with a PBSS. FIG. 16 is an example of BF Training and Association leading up to an STA joining the network. FIG. 16 illustrates features that may be involved in a STA initialization starting from start-up to Association. In FIG. 16, after power-up, scanning for DMG Beacons may be initiated by the Mesh Layer via transmission of Mesh-Scan.request primitive to the SME. This may trigger one or more directional scans by the MAC. Each scan may have a different beam and may last mScanDurationPerBearn. This attribute may be specified in the Mesh-Scan.request primitive and in the VendorSpecificInfo field of MLME-SCAN.request. In FIG. 16, the STA may complete its directional scan after P Beacon Intervals. At that point, the MLME/MAC may send scan results to the SME via the MLME-SCAN.confirm primitive, fields parsed from the received DMG Beacons, and signal strength related quantities.

The Mesh Layer may determine a sub-set of the reported PCPs and STAs to continue with the next joining based on a variety of factors, including but not limited to the received signal strength, or the message contents. Synchronization may be performed. BF Training may be performed with the selected PCPs and STAs. The Mesh Layer may send a Mesh-Join.request primitive to the SME. The Mesh Layer may send the SelectedBSS parameter to the SME. The SME may issue an MLME-JOIN.request primitive that may signal the MAC to synchronize with the chosen PCP. BF Training may occur. The STA may perform synchronization and BF Training with other discovered PCPs, for example, as directed by the Mesh Layer.

The synchronization and BF Training with a neighbor node may be triggered, for example, when Mesh-Join.request message is received from the Mesh Layer containing a SelectedBSS value. The results of the BF Training may be sent to the Mesh Layer and/or the Mesh Controller. The Mesh Controller may determine the Association, for example, based on Neighbor Filtering outcome. The Mesh Layer may communicate the Association decision to the SME via the Mesh-Associate.request primitive. The leading up to Association at a new node sector may comprise one or more of the following: network discovery via directional scanning, synchronization, BF Training, initial neighbor selection (e.g., performed by Mesh Layer), temporary association, final neighbor selection (e.g., performed by Mesh Controller), or final association (e.g., following disassociation, if required with initial neighbor).

Figure 17:
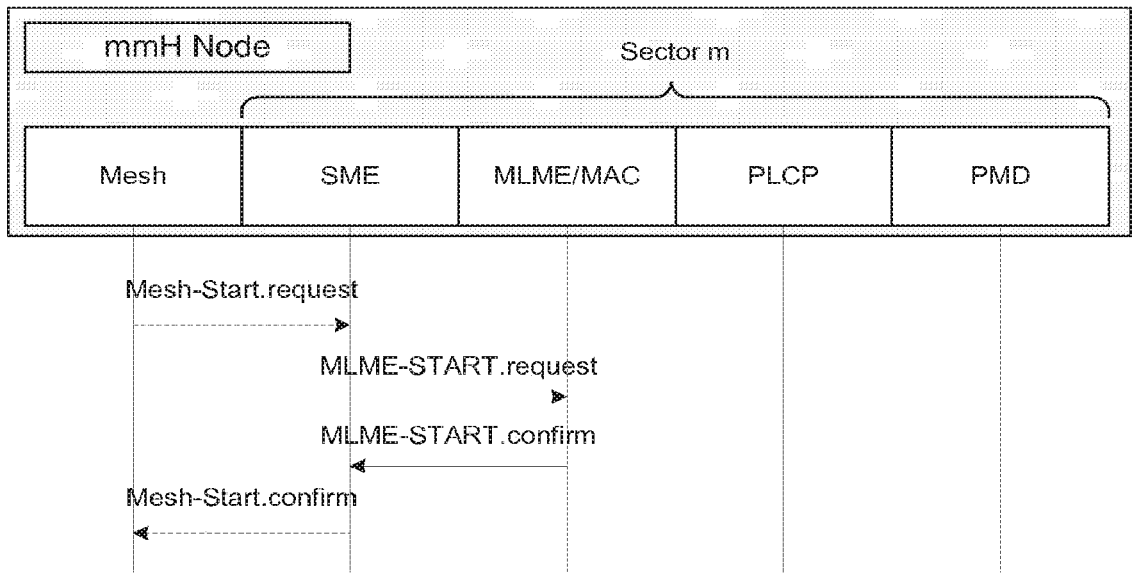
FIG. 17 is a diagram of an example personal basic service set control point (PCP) Start.

FIG. 17 is an example of a PCP start. The PCP start may be initiated by the Mesh Layer by sending a Mesh-Start request primitive to the SME of the concerned sector. This Mesh-Start.request primitive may include a parameter that tells the SME to start the sector as a PCP or STA. If Mesh-Start.request included Type=PCP, then a MLME-RESET.request may be issued by the SME. The SME may send the MLME-START.request primitive to the MLME/MAC layer. The SME may receive the MIME-START.confirm primitive that may confirming the status. The Mesh-Start.confirm may transmit to the Mesh Layer an indication regarding the status of the initialization:

The PCP Start may cause the MAC layer to start DMG Beacon transmissions with periodicity. Timing information may be provided by the Mesh Layer in the Mesh-Start.request primitive. The start time of DMG Beacon transmissions may be synchronized with the start time of other existing mmH nodes. The SME may include the start time in the MLME-START.request primitive (e.g., in the VendorSpecificInfo at the end of the primitive parameter set). The primitive may be issued at the time the MAC is expected to start DMG Beacon transmissions (e.g., with some allowance for MAC processing delay).

Figure 18:
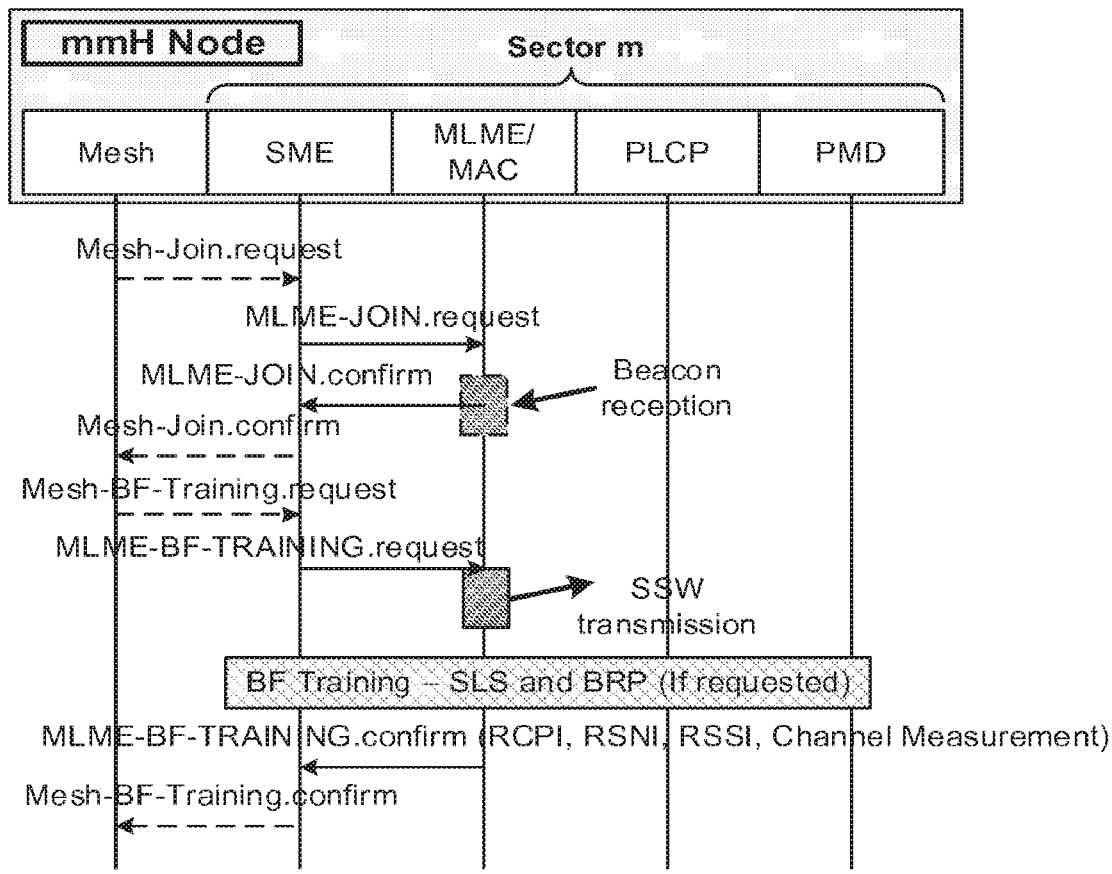
FIG. 18 is a diagram of an example station (STA) Start.

FIG. 18 is an example of a STA Start. The STA Start may be initiated by the Mesh Layer by sending a Mesh-Join.request primitive to the SME of the concerned sector. The SME may send an MLME-JOIN.request primitive to the MLME/MAC. The MLME-JOIN.request primitive may request synchronization with a PBSS. Synchronizing with a PBSS may involve waiting for a DMG Beacon transmission by the PCP or STA that may have been discovered during earlier scan. Synchronizing with a PBSS may involve adopting parameters, such as the Timestamp, from the received DMG Beacon. The STA's clock may be synchronized with the clock in the PCP or STA from which the DMG Beacon was received. The MLME may synchronize its timing with the PBSS based on the elements provided in the SelectedBSS parameter that is a part of the MLME-JOIN.request primitive. The SME may be informed of the result of the synchronization via the MLME-JOIN.confirm primitive.

The SME may forward the MLME-JOIN.confirm primitive to the Mesh via the Mesh-Join.confirm message, for example, upon receiving the MLME-JOIN.confirm primitive from the MLME/MAC. The Mesh Layer may send Mesh-BF-Training:request to the SME. The SME may send a MLME-BF-TRAINING.request primitive to the MLME/MAC, directing it to start the BF Training. The Mesh-BF-Training.request and MLME-BF-TRAINING.request may include a field called RequestBRP. If the RequestBRP is set to True, the BRP may be performed. If the RequestBRP is not set to True, the BRP may be skipped and BF Training may end after the SLS phase. The MAC may respond to the received DMG Beacon frame during the BTI period with a SSW frame at a time during the A-BFT period, for example, upon receiving MLME-BF-TRAINING.request. A step in the BF training, referred to herein as the Sector Level Sweep (SLS), may be completed. If requested by the Mesh Layer and communicated by the SME, the two sectors forming the link may proceed to the second step in BF Training, referred to herein as the Beam Refinement Protocol (BRP).

The MLME may send the MLME-BF-TRAINING.confirm primitive to the SME, for example, at the end of the BF Training, The MLME-BF-TRAINING.confirm primitive may include new parameters related to signal strength measurement such as Received Channel Power Indicator (RCPI), Received Signal to Noise Indicator (RSNI), Received Signal Strength Indicator (RSSI) and Channel Measurement. The SME may send the Mesh-BF-Training.confirm primitive to the Mesh Layer to indicate the status of the BF Training, for example, following receipt of the MLME-BF-TRAINING.confirm primitive.

The STA may respond with a MLME-JOIN.confirm with ResultCode=INVALID_PARAMETERS, for example, if the STA fails to receive a DMG Beacon frame within mBeaconReceptionTimeout period after reception of MLME-JOIN.request. Synchronization re-attempts may be handled by the Mesh Layer. If BF training may not be completed within BFTrainingTimeout period, then MAC may respond with MLME-BF-TRAINING.confirm with ResultCode=TIMEOUT. BF Training re-attempts may be initiated by the Mesh Layer.

Figure 19:
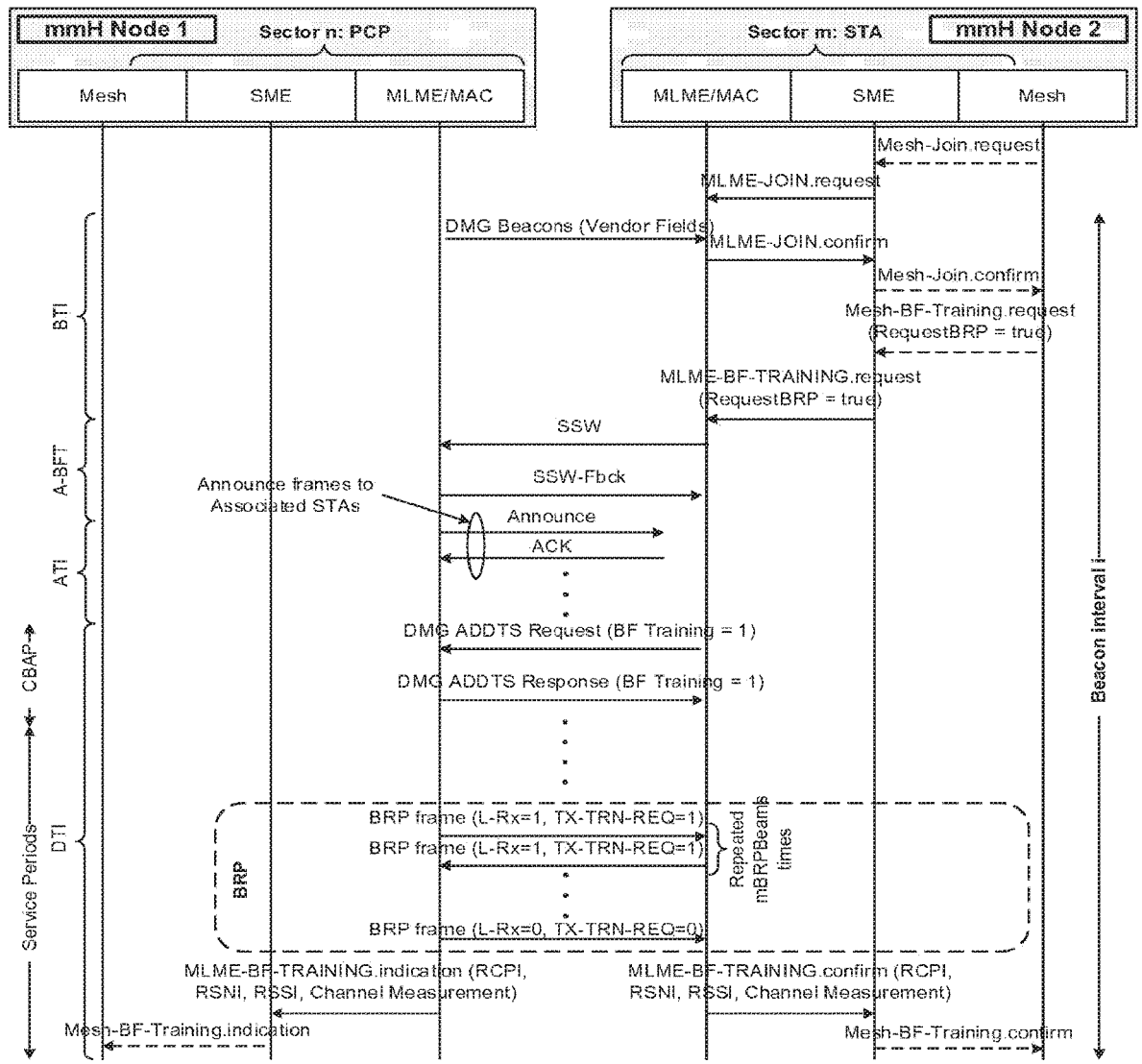
FIG. 19 is a diagram of an example BF Training.

FIG. 19 depicts an example of a two-step BF Training between a PCP and an STA. BF Training may consist of steps, including SLS and BRP. The SLS may be completed in the BTI and A-BFT periods of the super-frame. The BRP may be performed within the mmH super-frame.

The DTI may consist of a CBAP period. The DTI may consist of one or more Service Periods. The BRP phase of BF Training between the PCP and the new STA may be performed during the scheduled portion of the DTI, for example, due to insufficient duration of the CBAP period. The BRP phase of BF Training may be achieved by exchanging the BRP schedule during the CBAP period. The new STA may transmit a DMG ADDTS Request frame during the CBAP period, for example, after following the appropriate Medium access. The PCP may respond with a DMG ADDTS Response frame that may include the decision about resource reservation requested by the STA. The DMG ADDTS Request and DMG ADDTS Response frames may include the DMG TSPEC element that may enable scheduling of a SP for BRP.

The PCP may allocate time for BRP in one of the SIs, for example, based on the BF Training Request received in the DMG ADDTS Request frame from the STA. At a time, the PCP may initiate the process by transmitting the first BRP packet. Upon receiving the DMG ADDTS Response frame from the PCP, the new STA may orient its receive antenna beam towards the PCP and may wait to receive the first BRP frame. If the new STA may not receive the BRP packet within mBRPTimeout period, the STA may abandon BF Training with PCP. The STA MLME/MAC may send the MLME-BF-Training.confirm primitive to its SME, for example, at the end of the BRP. The PCP MLME/MAC may send the MLME-BF-TRAINING.indication primitive to its SME. The primitives may convey to the SME the parameters of the newly established link including but not limited to link quality. The information may be conveyed to the Mesh Layer via Mesh-BF-Training.confirm and Mesh-BF-Training.indication at the STA and PCP. Information may be forwarded to the Mesh Layer, for example, at the new STA. Information may be an input to the Neighbor Filtering. The Neighbor Filtering may be performed at the end of Synchronization and BF Training with one or more discovered PCPs. The outcome of the Neighbor Selection may be an Association decision based on inputs.

Figure 20:
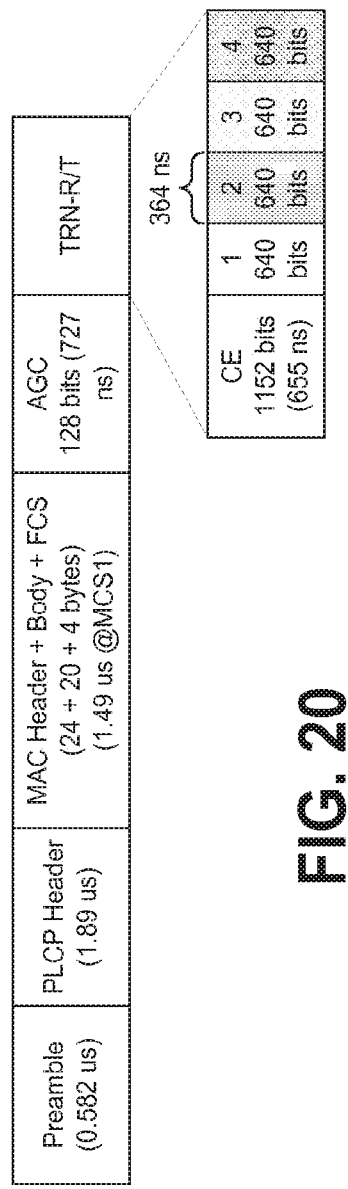
FIG. 20 is a diagram of an example beam refinement protocol (BRP) frame.

FIG. 20 is an example of a BRP frame structure and timing values for one or more fields. One or more of the TRN-R/T fields (e.g., at the end) may be transmitted using one or more antenna patterns. For example, contents of the frame may include TABLE 1.

TABLE 1

Example Frame Contents

| Order | Information | Size [Bytes] |
|---|---|---|
| 1 | Category | 1 |
| 2 | Unprotected DMG Action | 1 |
| 3 | Dialog Token | 1 |
| 4 | BRP Request field | 4 |
| 5 | DMG Beam Refinement element | 7 |
| 6 | Channel Measurement Feedback element | 6 |

An example of the contents of the Channel Measurement feedback element may be listed in TABLE 2.

TABLE 2

Example Channel Measurement feedback element contents

| Field | Size | Meaning |
|---|---|---|
| Element ID | 8 bits | |
| Size | 8 bits | |
| SNR | $SNR_1$ 8 bits | SNR as measured in the first TRN-T field. |
| | $SNR_2$ 8 bits | SNR as measured in the second TRN-T field. |
| | $SNR_3$ 8 bits | SNR as measured in the third TRN-T field. |
| | $SNR_4$ 8 bits | SNR as measured in the fourth TRN-T field. |

Figure 21:
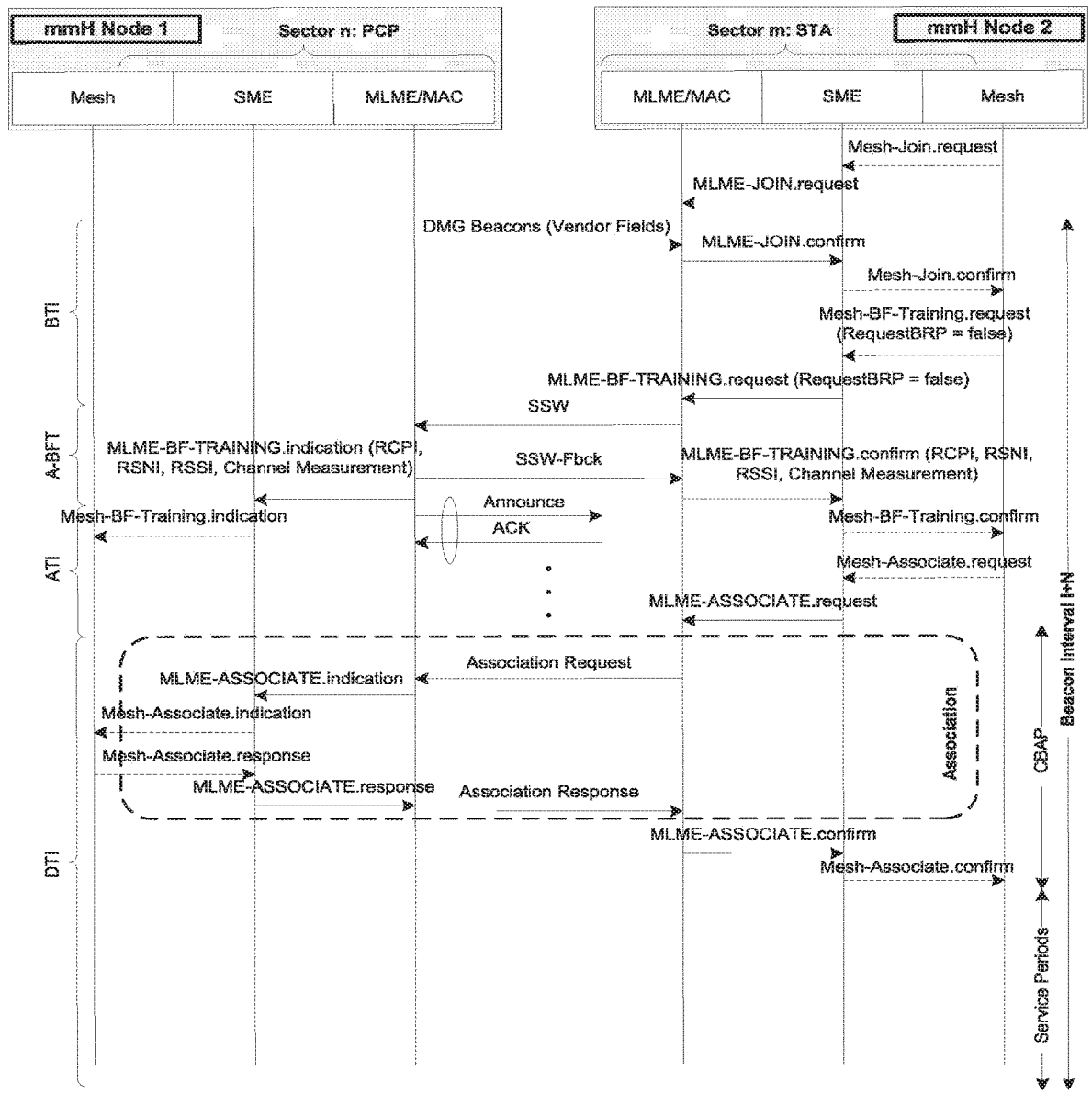
FIG. 21 is a diagram of an example association.

FIG. 21 depicts an example Association. The Mesh Layer may collect the frame contents of received DMG Beacons and associated signal strength measurements at the end of the BF training. The Mesh Layer may use the frame contents of received DMG Beacons and associated signal strength measurements as inputs to the Neighbor Filtering/Selection. The Mesh Layer may determine a PCP or STA to associate. The Mesh Layer may send a Mesh-Join.request message to the SME of the STA. The SME may transmit MLME-JOIN.request to the MLME/MAC. The MAC may respond with a MLME-JOIN.confirm, for example, upon receiving a DMG Beacon from the PCP.

The SME may forward the MLME-JOIN.confirm primitive to the Mesh via the Mesh-Join.confirm message, for example, upon receiving the MLME-JOIN.confirm primitive from the MLME/MAC. The Mesh Layer may send Mesh-BF-Training.request to the SME. The SME may send a MLME-BF-Training.request primitive to initiate BF Training. The BRPRequest field may be set to False, for example, to indicate that BRP phase is not requested. The MAC may send an SSW frame to the PCP at a time during A-BFT period. The STA MAC may receive a SSW-Fbck frame from the PCP. The STA MAC/MLME may send MLME-BF-TRAINING.confirm primitive, for example, after receiving SSW-Fbck. The SME may send a Mesh-BF-Training.confirm primitive to Mesh Layer. At the PCP, upon receiving the SSW frame and responding with SSW-Fbck frame, the MAC may send MLME-BF-TRAINING.indication message to the SME. The SME may forward MLME-BF-TRAINING.indication message to the Mesh Layer via Mesh-BF-Training.indication.

The synchronization and BF Training may be repeated. The STA MAC may report the parameters associated with the chosen PCP. The parameters may include the path metrics. The path metrics may have changed since the last DMG Beacon reception, for example, if the STA performs synchronization and BF Training with one or more neighboring nodes. Synchronization may inform the PCP that the STA may be ready for Association. The STA being ready for Association may be signaled to the PCP by transmitting the SSW frame during A-BFT period. The PCP may use the receive beam associated with the new STA during the CBAP period.

The new STA may send an Association Request frame to the PCP, for example, during the CBAP period. The sending of an Association Request frame may be triggered by the Mesh-Associate.request or MLME-ASSOCIATE.request primitives from the Mesh Layer or SME. The Associate.request reception may trigger MLME-ASSOCIATE.indication or Mesh-Associate.indication primitives, such as at the PCP. The Mesh Layer may convey the association decision through Mesh-Associate.response or MLME-ASSOCIATE.response primitives to the MLME/MAC. Association Response frame may be transmitted by the PCP. The association may be completed. The association result may be conveyed to the Mesh Layer by MLME-ASSOCIATE.confirm or Mesh-Associate.confirm primitives.

The neighbor selection may be used by the mesh layer, for example, during new node power-up to select one or More discovered neighbors to perform association. The neighbor selection may be used by the mesh layer, for example, when the mesh node loses connectivity (e.g., one or more links fail).

The inputs to the neighbor selection may include one or more of the following: a list of neighbors discovered in one or more sectors; or link metric for one or more neighbor, interference metric for one or more neighbor, and/or path metric for one or more neighbor. A Link metric may include the SNR of the beam formed link between the sector and its neighbor.

The output of the neighbor selection may be a chosen neighbor node for the new node. The output of the neighbor selection may span one or more sectors. A chosen neighbor node may be referred to herein as a primary node.

The sector index may be $s=1, 2, \ldots, S_{max}$. $S_{max}$ may be the number of sectors in a mesh node. The number of discovered neighbors in a sector may be $N(s)$. The selection metric for a neighbor n discovered by sector s may be $m(s)(n)=f(\text{link metric})$ The discovered neighbors may be sorted in an order of decreasing $m(s)(n)$ for one or more s and n. The sector index, number of sectors in a mesh node, number of discovered neighbors, selection metric or sorted discovered neighbors may be parameters used in the neighbor selection.

The neighbor (e.g., top neighbor) in the list sorted by f(link metric) may be chosen as a primary node. A new node may delete the primary node from the sorted neighbor list, for example, if the primary node experiences association failure. The new node may perform association with a different neighbor in the sorted neighbor list. The new node may perform association with the selected primary node or a neighbor node, for example, until the sorted neighbor list becomes empty or successful association is achieved. The new node may trigger a new scan, for example, if the sorted neighbor list becomes empty.

Neighbor selection and network formation may include initial temporary association (e.g., based on autonomous neighbor selection, for example as disclosed herein) and final neighbor selection and network formation decision-making, for example by a central node (e.g., Controller).

In initial temporary association based on autonomous neighbor selection, a new node may perform neighbor discovery. A new node may associate with the sector of a neighboring node, for example, based on the result of autonomous neighbor selection. Initial temporary association based on autonomous neighbor selection may not include the whole network view while arriving at the association decision. Initial temporary association based on autonomous neighbor selection association may be used to establish an initial route between the new node and the Mesh Gateway node or the Network Controller via the internet.

Figure 22:
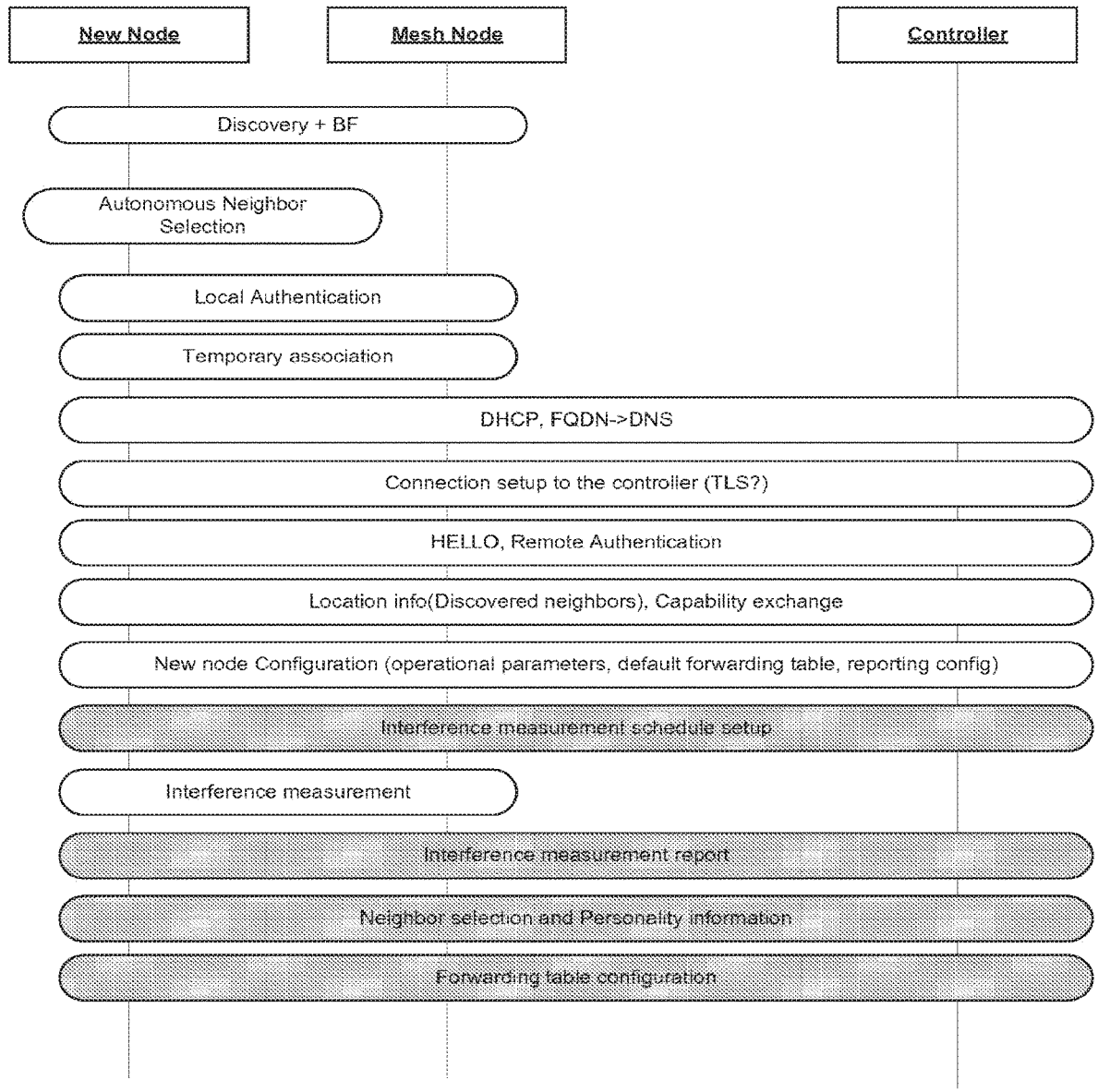
FIG. 22 is a diagram of a simplified example two-step neighbor selection and association.
Figure 23:
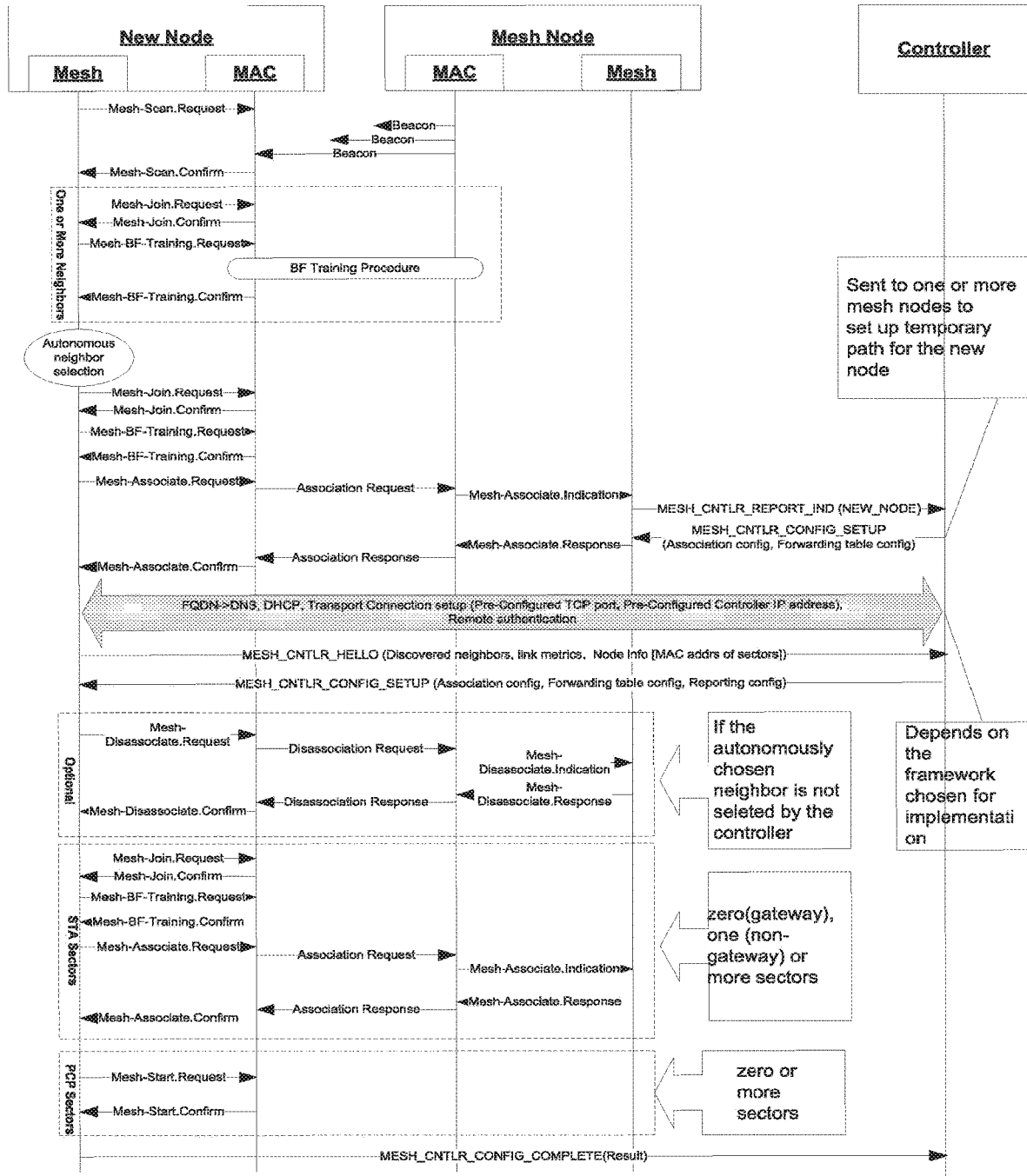
FIG. 23 is a diagram of a detailed example two-step neighbor selection and association.

FIG. 22 and FIG. 23 is an example of neighbor selection and association. In final neighbor selection and network formation decision-making by central node, information used in neighbor selection may be forwarded to the Controller. The Controller may make an association decision, e.g., based on network-wide information. Network-wide information may help end-to-end route selection for semi-static and/or dynamic data.

Discovery and BF may be similar to methods discussed herein. The new node may be associated with a neighboring PCP, e.g., after and/or at the end discovery and/or BF. The neighboring PCP may be chosen by the autonomous neighbor selection. The Mesh Layer level messages may be exchanged between the New/Leaf Node and the Controller. The Mesh Layer level message may pass through the chosen neighboring sector and/or the Mesh Gateway node. The new node may transfer capability parameters, location parameters and/or metrics related to discovered neighbors to the Controller, for example, after initial connection establishment. The Controller may set up schedules for interference measurements to be performed. Neighbor selection and/or personality switch decisions may be conveyed to the new node.

FIG. 22 and FIG. 23 is an example MSC with neighbor selection and association. One or more aspects of network discovery and autonomous neighbor selection may be similar to methods described herein. After Transport Connection setup, the new node may send a HELLO message to the Controller. The HELLO message may include one or more identifier of discovered neighboring sectors, associated link metrics and/or the sector IDs of the new node. The Controller may run a centralized routing and neighbor selection for the new node. The Controller may send the CONFIG SETUP message (e.g., with the forwarding table updates and/or reporting config updates) to intermediate mesh nodes. The Controller may send a CONFIG SETUP message (e.g., with association config, forwarding table config, etc.) to one or more hop mesh nodes. The controller may send the CONFIG SETUP message to the new node with one or more of the association decision, the personalities of one or more of the sectors of the new node, the forwarding table and/or configuration settings (e.g., final configuration settings) for buffer and link status reporting, etc.

The association config may include a valid entry for the neighbor corresponding to the existing temporary association. If the association config contains a valid entry for the neighbor corresponding to the existing temporary association, the new node may continue to remain associated with the current sector, for example, based on the received association decision from the Controller. If the association config does not have a valid entry for the neighbor corresponding to the existing temporary association, the new node may disassociate with the existing neighboring sector. If the association config does not have a valid entry for the neighbor corresponding to the existing temporary association, the new node may form a new association with another neighboring sector, for example, as specified in the association config. The sector in the new node may start as a PCP, for example, if a Personality Switch is requested by the Controller.

One hop mesh nodes may differentiate the temporary association from permanent association. One hop mesh nodes may differentiate the temporary association from permanent association, for example, by the presence of valid association config from the controller. The mesh layer may receive Mesh-Associate.Indication from the MAC. If the mesh layer receives Mesh-Associate.Indication from the MAC and if a valid association config was not received from the controller, the mesh node may send REPORT IND message to the controller.

Figure 24:
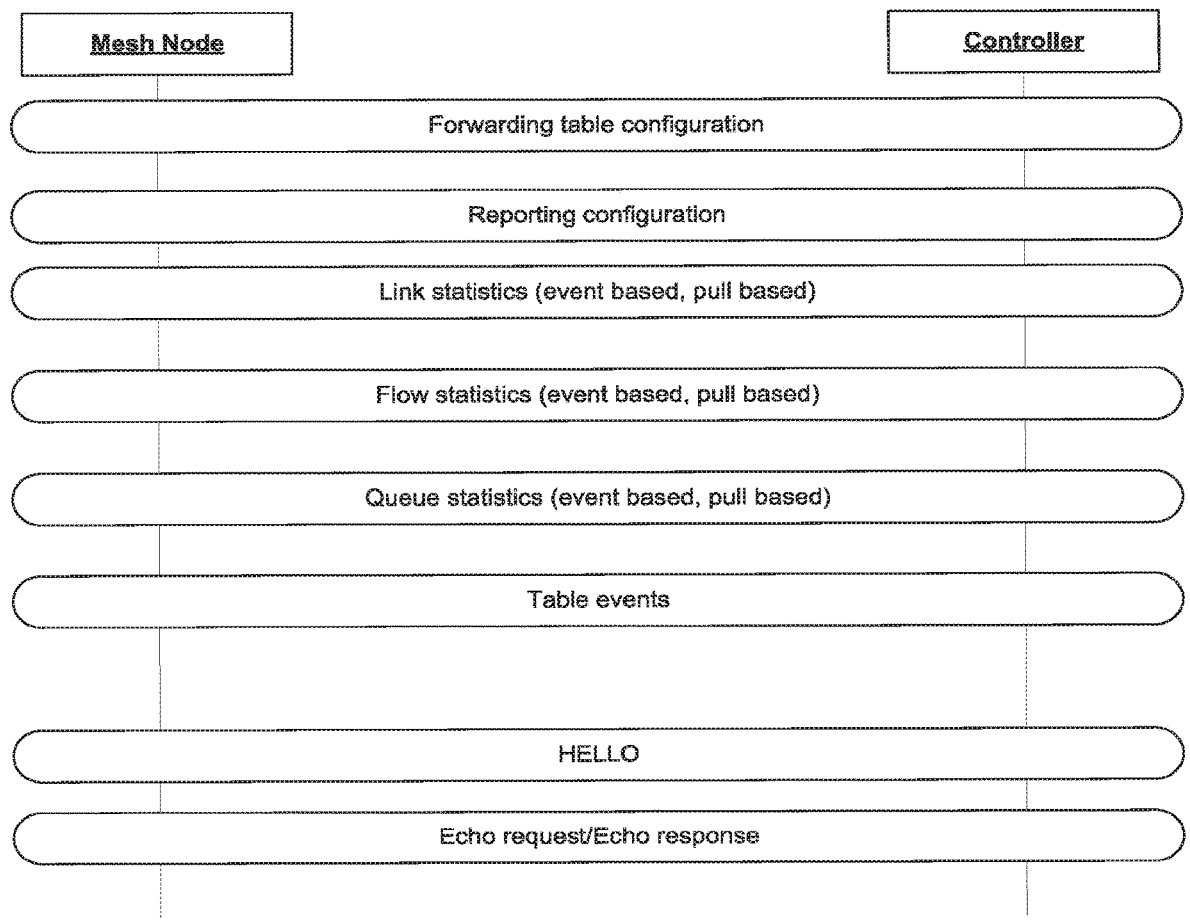
FIG. 24 is a diagram of an example mesh-controller reporting.

FIG. 24 is an example of reporting and/or feedback. The reports may include Link statistics, Flow Statistics and Queue/Buffer statistics. The reports may be periodic and/or trigger-based.

One or more sector MACs (e.g., each MAC in each respective sector) in the mesh node may monitor links, e.g., according to failure detection as described herein. The mesh layer may receive Mesh-Link-Report.indication message with the throughput value as zero from the sector MAC, for example, if there is link failure. The throughput value zero may indicate that MAC may have detected a temporary link failure and/or that Link re-establishment may be ongoing. The Mesh layer may receive Mesh-Link-Report indication with throughput value as zero. The Mesh layer may set the status of the link in the forwarding table to be inactive, for example, when the mesh layer receives the mesh-link-report indication with throughput value as zero. Entries in the forwarding table may be disabled. When an entry in the forwarding table is disabled, routing logic in the mesh layer may use the next matching entry in the table to make forwarding decisions. The Controller may configure multiple entries per matching rule to enable switchover to backup paths. When the backup path may be configured or may be available, the mesh layer may make an autonomous decision to switch-over to a backup path.

Permanent link failure may be failure of the link re-establishment at MAC layer. The MAC layer may send Mesh-Disassociate.indication, for example, if permanent link failure occurs. The Mesh-Disassociate.indication message may trigger the mesh layer to send MESH_CNTRL_REPORT_IND to the controller with the report code as REPORT_LINK_FAILURE. The Mesh-Disassociate.indication message may include the neighbor information corresponding to the failed link. The controller may configure a path (e.g., an optimized path) to the mesh node(s) affected by the link failure, for example, upon receiving a link failure report. The forwarding table entries corresponding to the old path configuration in the mesh nodes may not be purged, for example, during the path switch-over. The controller logic may determine removal of the unused path. For example, the controller may configure a flow expiry timer to the mesh nodes using the old path. The flow entries may expire after one or more packets in the intermediate mesh nodes are delivered. Mesh nodes may report the flow expiry using MESH_CNTRL_REPORT_IND to the controller with the report code as REPORT_FLOW_EXPIRY. The controller may send a MESH_CNTLR_CONFIG_SETUP with forwarding table config to remove one or more flow entries.

The backup paths may not be configured. The backup paths may not be available. The mesh layer may trigger a PACKET_IN event towards the controller. PACKET_IN event may be triggered, for example, when the mesh may receive a packet. PACKET_IN event may be triggered, for example, when there may be no valid matching entry in the forwarding table. The mesh layer may forward the packet header to the controller in the MESH_CNTLR_REPORT_IND message, such as when a PACKET_IN event is triggered. The controller may calculate the path for the reported packet. The controller may send a MESH_CNTLR_CONFIG_SETUP with the forwarding table update.

A new node may be able to discover a neighbor. A new node's ability to discover its neighbor may depend on the personality of the mesh sectors in the new node's neighborhood. The new node's ability to discover the mesh neighbors may depend (e.g., only depend) on the physical constraints (e.g., distance, link quality, etc.) and/or the personality of the sectors (e.g., STA or AP). Assisted discovery may enable a new node to discover neighbors when the personality of the mesh node sectors is an STA. Assisted discovery may enable a new node to discover neighbors when the personality of the mesh node sectors is an AP.

A mesh node with an STA sector may provide assisted discovery service to a new node. The assisted discovery service may include, but is not limited to, transmission of a DMG beacon. The assisted discovery service may include beam forming assistance (RSS).

The Assisted Discovery service may be triggeredby the Mesh Layer. The Assisted Discovery service may be triggered by the Mesh Layer, for example, by transmitting a Mesh-STA-Beaconing.request message. The Mesh-STA-Beaconing.request message may provide parameters to the MAC to initiate DMG Beacon transmissions.

The 11ad MAC module with STA personality may implement active scanning in network initialized state, for example, to provide assisted discovery service. Active scanning may change the STA state machine. Active scanning may accept triggers for active scan from mesh/SME. Active scanning may schedule beacon transmissions at a time (e.g., a time specified in the Mesh-STA-Beaconing.request message).

Figure 25:
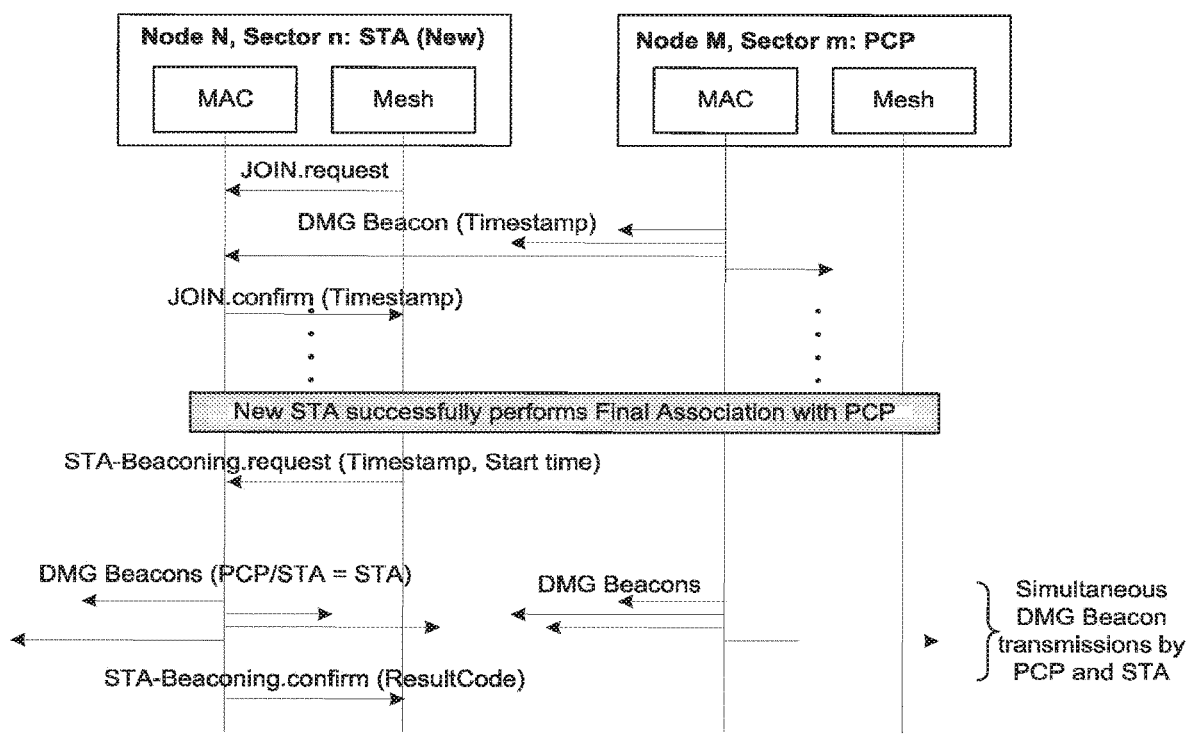
FIG. 25 is a diagram of an example assisted discovery.

FIG. 25 is an example message diagram with the mesh MAC interface for the assisted discovery.

Assisted Discovery may be performed at the mesh node sector operating in STA mode, for example, after the mesh node sector joins the network, Assisted Discovery may be performed at the mesh node sector operating in STA mode, for example, after performing association with a mesh node sector functioning as a PCP. The mesh node sector functioning as a PCP may be a PCP or an STA newly converted to PCP mode, such as after a Personality Switch. The Mesh Layer at the new STA sector may send the Mesh-STA-Beaconing.request message to the SME of the sector, for example, after association with a neighboring PCP. The SME of the sector may forward the Mesh-STA-Beaconing.request message to the MAC as MLME-STA-Beaconing.request message. The MLME-STA-Beaconing.request message may include the Timestamp value maintained by the Mesh Layer. The MLME-STA-Beaconing.request message may include the Start time for DMG Beacon transmissions by the STA MAC. The Mesh Layer may obtain the Timestamp value when one or more sectors sends a Mesh-Join.confirm message. The Mesh-Join.confirm message may include the timestamp value copied from the received DMG Beacon at the sector.

DMG Beacon transmission by the STAB may be the same or similar to regular Beacon transmissions by PCPs. The Beacons may have the same or similar frame contents as those transmitted by PCPs. The PCP/STA field may be set to indicate STA mode in DMG Beacons transmitted by STA sectors.

A new node MAC may receive a DMG Beacon from an STA. The PCP/STA bit may be set to indicate STA mode. The new node may send MLME-BF-Training.confirm message to a local SME, for example, upon receiving the SSW-Fbck frame. The sending of the MLME-BF-Training.confirm message may complete the first step of BF Training. The first step of the BF training may be referred to herein as the Sector-Level Sweep (SLS) phase. Upon receiving Mesh-BF-Training.indication message from, the STA SME (e.g., the Target PCP), the Mesh Layer may initiate the PCP Handover Preparation. The PCP Handover Preparation may determine if PCP Handover or Personality Switch are possible. A new node may be admitted into the mesh network. The second step of BF Training may be referred to herein as Beam Refinement Protocol (BRP). BRP may be performed between the new node and the mesh node sector that may be operating in STA mode.

Fixed personality of the sectors in mesh node may result in decreased connectivity for a new node that may be trying to join the mesh network. Fixed personality of the sectors in mesh node may result in zero connectivity for a new node that may be trying to join the mesh network. A mesh node with a STA sector may perform the 'personality switch', such as to enable a new node to join the mesh network.

A PBSS, PBSS1 with STAs S2, S3, S4 may be associated with PCP, P1. A new node N1 may hear a beacon from S2. A new node N1 may respond to the beacon (e.g., when a beacon is not received from a PCP, when a beacon is not received from a PCP with sufficient signal quality, etc.). The sector S2 may perform a personality check. The personality check may have several outcomes. For example, if the personality check is successful, the P1 may become S1. If the personality check is successful, the S2 may become PCP, P2. If the personality check is successful, the S3 may associate to P2. If the personality check is successful, the PBSS2 may be formed with P2, S1, S3 and N1. If the personality check is successful and/or there are one or more dropped nodes, S4 may not form a link with P2, may not form PBSS2 and/or may no longer be associated to PBSS2. If the personality check fails, the PBSS1 may stay the same and/or the new node may not be admitted to the mesh network. If the personality check determines that a parallel PBSS may be formed, the S2 may disassociate from PBSS1. If the personality check determines that a parallel PBSS may be formed, the S2 may become a PCP, P2 or the S2 may start a PBSS2. If the personality check determines that a parallel PBSS may be formed, the new node N1 may join the PCP P2 and/or become part of PBSS2. If the personality check determines that a parallel PBSS may be formed, the PBSS1 may be made of P1, S3 and S4. A Source PCP may be the sector with PCP personality before the switch (e.g., P1). A Target PCP may be the sector with PCP after the switch (e.g., P2). A member node may be a node which is a part of a PBSS. A member node may not be a source PCP, target PCP and/or a new node. A dropped node may be a node that may not form links to the target PCP. The dropped node may not be associated to one or more nodes in the source PBSS, for example, if personality switch is successful. (e.g., S4). A source PBSS may be the PBSS controlled by source PCP (e.g., PBSS1). A target PBSS may be the PBSS controlled by the target PCP (e.g., PBSS2). A source node may be a node containing the Source PCP sector. A target node may be a node containing the Target PCP sector. A path to the gateway may refer to one or more paths to the gateway that may satisfy the QoS requirements of a node. A Mesh Node may refer to one or more sectors of a node.

Figure 26:
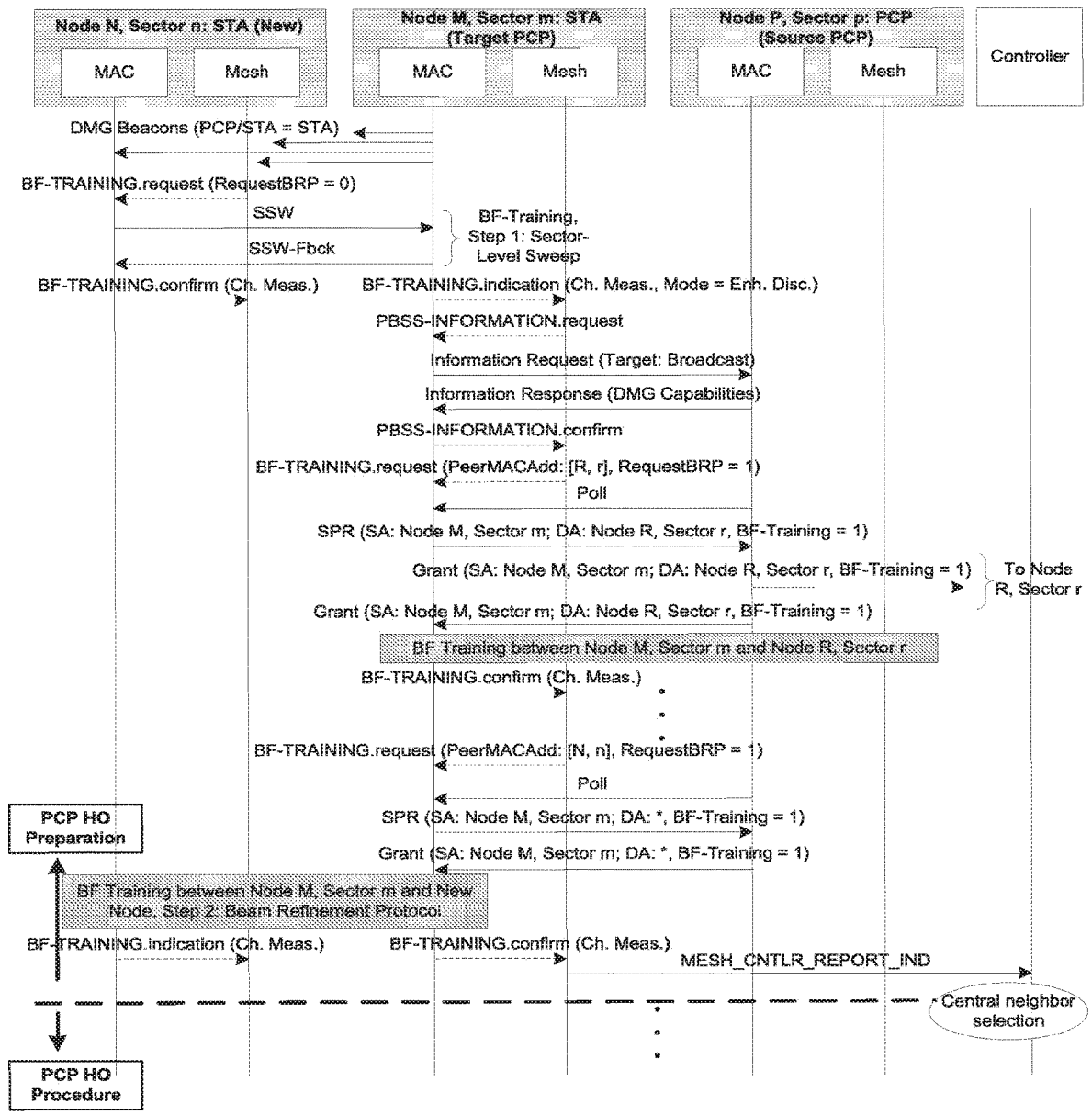
FIG. 26 is a diagram of an example personality switch in Phase 1 (Enhanced Discovery and PCP Handover Preparation).
Figure 27:
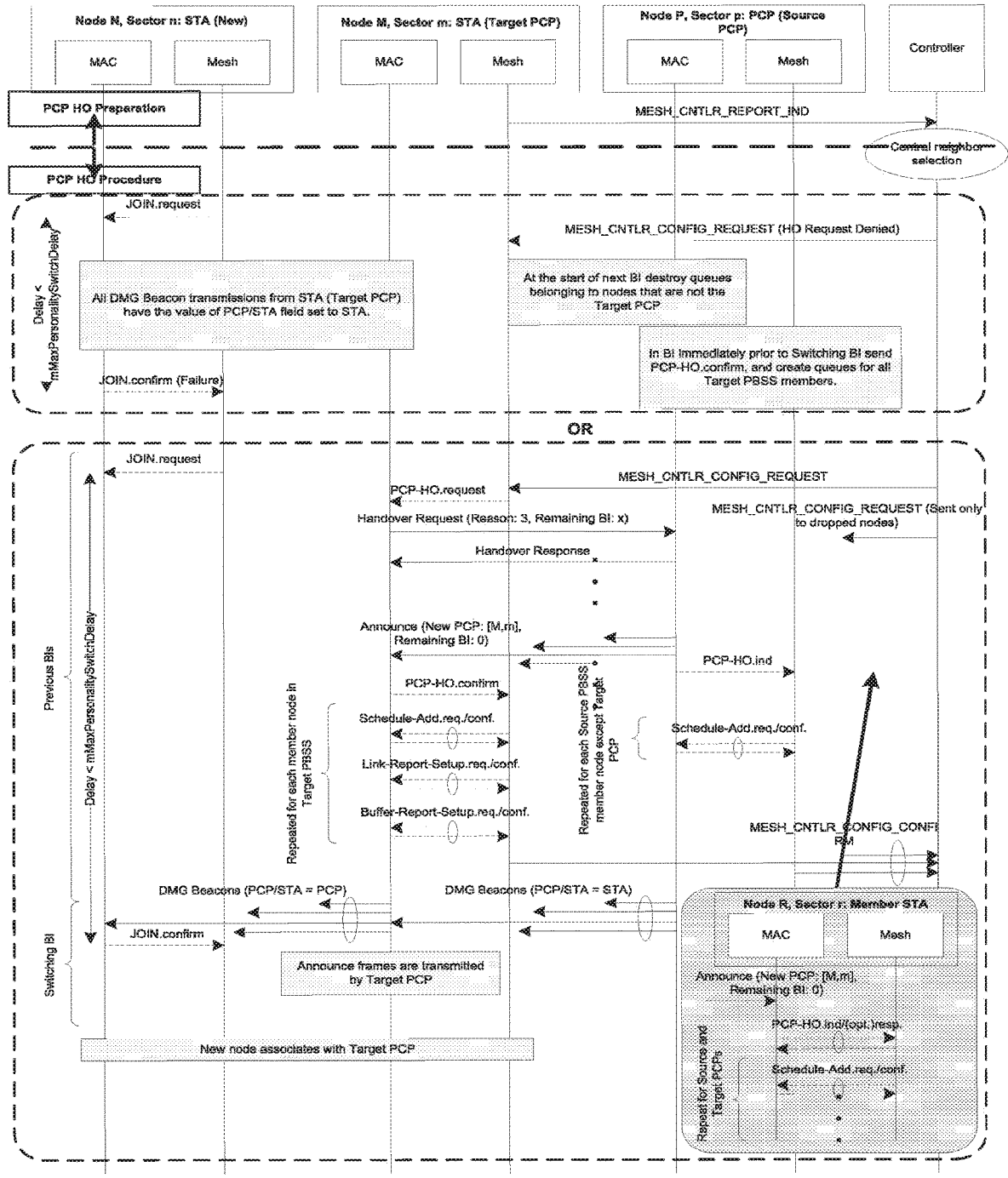
FIG. 27 is a diagram of an example personality switch in Phase 2 (PCP Handover).

FIG. 26 is an example message diagram associated with the mesh MAC interface for personality switch. FIG. 27 is an example personality switch with PCP handover.

FIG. 26 and FIG. 27 may depict example personality switches. The mesh STA sector may transmit DMG Beacons similar to a PCP. The mesh STA sector may set the PCP/STA bit to indicate STA. Upon receiving a DMG Beacon frame, a new node sector may respond with an SSW frame. A new node sector may respond with an SSW frame, for example, when the following conditions are satisfied: if a new node could not find a mesh node sector operating in the PCP mode though each of its sectors; and/or if the mesh node sector operating as an STA may be optimum with respect to the initial link metric observed during scanning and/or traffic load. In an example, the mesh node sector operating as an STA may be optimum if a threshold with respect to the initial link metric observed during scanning and/or traffic load is exceeded.

The new node MAC may receive a JOIN.request from a SME/Mesh Layer, such as before receiving the BF-TRAINING.request message, The new node MAC may respond with a JOIN.confirm.

The new node sector may send an SSW frame to the mesh node sector operating as a STA in a time-slot. The mesh STA sector may respond with an SSW-Fbck message in a time-slot of the BHI (e.g., the last time-slot of the BHI). The STA MAC at the new node may send MLME-BF-TRAINING.confirm message to the SME, for example, to communicate the results of the first step of the BF Training. The STA MAC at the new node may send MLME-BF-TRAINING.confirm message to the SME, for example, in response to the MLME-BF-TRAINING.request message. The MLME-BF-TRAINING.confirm message may be sent at the end of the first BF Training. The MLME-BF-TRAINING.confirm message may be sent at the end of the BF Training, including the BRP. The mesh node sector that may transmit the DMG Beacons may operate in the STA mode. The MAC at the mesh node operating as an STA may send MLME-BF-Training.indication message to local SME with Mode=ENHANCED_DISCOVERY. MLME-RF-Training-.indication message with Mode=ENHANCED_DISCOVERY may indicate the results of the first step of the BF Training.

The mesh node STA sector may enter the PCP Handover Preparation stage, for example, upon receiving the PBSS-INFORMATION.request message from the Mesh Layer. The mesh node STA sector entering the PCP Handover Preparation stage may cause the MAC at the Target PCP to transmit an Information Request message to the current/Source PCP. The target address may be set as the Broadcast address. The current/Source PCP may send the Information Response message. The Information Response message may include the DMG Capabilities of one or more associated PCPs within the PBSS. Information, such as the DMG Capabilities of one or more associated PCPs within the PBSS, may be conveyed to the Mesh Layer by the PBSS-INFORMATION.confirm primitive.

The Target PCP may send an SPR message to the PCP that the Target PCP it is associated with. The Target PCP may send the SPR message in response to a received Poll frame during semi-static period, for example, with Beamforming Training subfield set to 1. The Target PCP may set the Source Address to the Target PCP's MAC address. The Target PCP may set the Destination Address to the MAC address of one of the STAs reported by the current/Source PCP in the Information Response message. The Target PCP setting the Source Address and/or the Destination Address may indicate to the PCP that the STA may wish to perform BF-Training with the indicated STA. The PCP may set up SPs in the SIs for the STA to complete BF Training with one or more associated STAs (e.g., each associated STA) within the PBSS, for example, as may be requested in subsequent SPR frames. After completing BF Training with other PBSS members, the Target PCP may request time for BF Training with the new node. To request time, the Target PCP may set the Source Address as the STA's MAC address and/or the Destination Address as wildcard in the SPR frame. To request time, the Target PCP may set a similar addressing scheme that may be used by a PCP in a Grant frame. At the end of the BF Training, the MAC at the new node may start an internal clock. The internal clock may be a Personality Switch Timer.

The mesh node STA sector (e.g., Target PCP) may obtain the link metric information for one or more STAs in the PBSS and/or the new node sector, e.g., at the end of BF training. The mesh node STA sector (e.g., Target PCP) may convey this information to the Controller using MESH_CNTLR_REPORT_INDICATION message. The Controller may execute the central neighbor selection to decide if the mesh node STA sector (e.g., Target PCP) may proceed with PCP Handover. The decision may be communicated to the mesh node associated with Target PCP using MESH_CNTLR_CONFIG_REQUEST message. If a configuration change (e.g., personality switch) request is granted, the mesh layer may send Mesh-PCP-HO.request to the SME of the sector. The SME of the sector may send MLME-PCP-HO.request message to the STA sector MAC. The sending of the MLME-PCP-HO.request message may trigger a Handover Request frame transmission, for example, by the STA sector to the Source PCP that it may be associated. The Source PCP may communicate the result of Handover Request with a Handover Confirm frame. This decision may be conveyed to the Mesh Layer of the Target PCP by a pair of MLME-PCP-HO.confirm and Mesh-PCP-HO.confirm messages, for example, in the BI prior to the Switching BI. If the PCP Handover request is accepted, the Mesh Controller may inform one or more sectors that may belong to the Source PBSS that the sectors may be dropped after PCP Handover is completed. The Mesh controller may inform the sectors via MESH_CNTLR_CONFIG_REQUEST messages. The MESH_CNTLR_CONFIG_REQUEST may be sent to one or more members of the Source PBSS.

After sending a Handover Confirm frame to the Target PCP, the current/Source PCP may include the PCP Handover element in the Announce frames. The current/Source PCP may include the PCP Handover element in the Announce frames, for example, starting from a BI (e.g., a next BI) until the PCP Handover may be triggered. The current/Source PCP may include the identity of the new PCP. The BI may include the Remaining BIs field indicating the number of BIs. When the Remaining BIs field reaches 0, the Mesh Layer may be informed of the forthcoming PCP Handover using the MLME-PCP-HO.indication and/or Mesh-PCP-HO.indication messages. The PCP Handover may be performed. The new/Target PCP may start transmitting DMG Beacons (e.g., with PCP/STA field=PCP). The new/Target PCP may announce frames from the next BI. The new node sector may perform association with the new/Target PCP. After successful association with the Target PCP, the new node may transmit higher layer messages to establish connection, authentication, etc.

At the new/Target PCP, the result of the PCP Handover may be communicated to the SME using MLME-PCP-HO.confirm message; this may be followed by a Mesh-PCP-HO.confirm message sent to the Mesh Layer in the BI before the Switching BI. A MESH-CNTLR_CONFIG_CONFIRM message may be sent to the Controller that may indicate the result of the configuration change.

One or more STAs that may belong to the Source PBSS may learn about the PCP Handover, for example, when the MACS receive Announce frames from a Source PCP including the PCP Handover element with Remaining BIs field including a positive number. When the Remaining BI field counts down to 0, the STA MAC may send a MLME-PCP-HO.indication message to the MLME. The MLME may send a Mesh-PCP-HO.indication message to the Mesh Layer. The MAC may create new queues corresponding to the Target PCP, for example, following receipt of Mesh-Schedule-Add.request/MLME-Schedule-Add.request from the SME/Mesh Layer. A Mesh-Schedule-Add.request may be sent by the Mesh Layer. A Mesh-Schedule-Add.request may be relayed by the SME, for example, via MLME-Schedule-Add.request message. The MLME-Schedule-Add.request message may signal that the queues associated with Source PCP may be deleted at the start of Switching BI.

When the Mesh Layer receives Mesh-PCP-HO.indication message, the mesh layer may send a MESH_CNTLR_CONFIG_CONFIRM message to the Mesh Controller. The Mesh-PCP-HO.indication message may include the address of the Target PCP. The MESH_CNTLR_CONFIG_CONFIRM message may inform the Mesh Controller about the status of the re-configuration.

The controller may reject a Personality Switch Request. If the Controller rejects the Personality Switch request from the mesh STA (e.g., Target-PCP), the rejection may be communicated in the MESH_CNTLR_CONFIG_REQUEST message. The new node may learn that the Personality Switch request was rejected, for example, when its internal Personality Switch Timer reaches mBeaconReceptionTimeout without receiving a modified DMG Beacon from the mesh STA sector (e.g., Target PCP) with PCP/STA bit set to indicate PCP mode. The other nodes in the Source PBSS may be unaffected.

An overhead may be associated with a personality switch. Frequent personality switch may be avoided. The source PCP may evaluate the possibility of one of its associated STAs becoming PCP. The PCP may allow or prohibit the associated STAs to provide assisted discovery service. The PCP may configure the STAs not to trigger the personality switch. The source PCP may configure a PS prohibit timer to one or more of its STAs. The STAs may not trigger personality switch, for example, when PS prohibit timer is running.

A new node may limit personality switches. For example, the new node may not respond to beacons received from STA sectors, such as when beacons from PCP sectors are received and/or links can be formed with those PCP sectors.

The personality switch may be allowed if (e.g., only if) the mesh nodes in the source PBSS may be migrated to target PBSS and/or new PBSS. The personality switch may be allowed if the QoS requirements of the mesh nodes may be met after the personality switch is complete.

The centralized controller may receive MESH_CNTRL_REPORT_IND with the report code as REPORT_PERSONALITY_SWITCH. The centralize controller may execute the personality switch.

At the start of the personality switch, the active link graphs may be backed-up. A copy of the active graph may be passed as an input. The personality switch may take the report indication from the target PCP as an input.

The personality switch may check for the presence of dropped nodes. The dropped nodes may be nodes in the source PBSS that cannot establish links to the target PCP. Dropped nodes may be determined based on the results of beamforming between the target PCP and the nodes in the source PBSS.

If no-dropped nodes are present, the active edge between the target PCP and the source PCP may be removed. A centralized routing may be executed for the target PCP and/or one or more nodes in source PBSS. If a gateway path is present and/or the new node has a path to the gateway, then decision to form a parallel PBSS may be made. Parallel PBSS may means that the target PCP and/or the new node forms a new PBSS. The source PCP may maintain the source PBSS. The source PCP may not maintain the target PCP. The Target PCP may be disassociated from the source PCP.

If there is no path to the gateway, for example, from the target PCP or the new node, the personality switch may add the edge from the target PCP to the source PCP. One or more edges between the source PCP and the dropped nodes may be removed. A centralized routing may be executed for the dropped nodes. If there are no paths from the dropped nodes to the gateway, the personality switch may fails and/or the centralized controller may revert back to the backup active link graph.

If the dropped nodes have a path to gateway, the personality switch may mark those nodes for disassociation from the source PCP. No dropped nodes may exist. The dropped nodes may be marked to be disassociated. The edges from the source PCPs to one or more nodes in the report indication may be removed. The edges may be added from the target PCP to one or more nodes in the report indication. The centralized routing may be executed for one or more nodes in the source PBSS and/or the new node. If one or more nodes have a path to the gateway, the personality switch may be successful. The personality switch may fail if one or more nodes do not have a path to the gateway. The centralized controller may revert back to the backup active link graph.

If the decision is made to create a parallel PBSS, the controller may send one more MESH_CNTLR_CONFIG_SETUP messages. The MESH_CNTLR_CONFIG_SETUP message may be sent to the target PCP. The number of association config may be set to one. The contents of association config for the target PCP contents may be filled with the own sector addr that may be set to the target PCP address, the peer sector addr that May be set to NULL, and/or the personality field that may be set to PCP.

Figure 28:
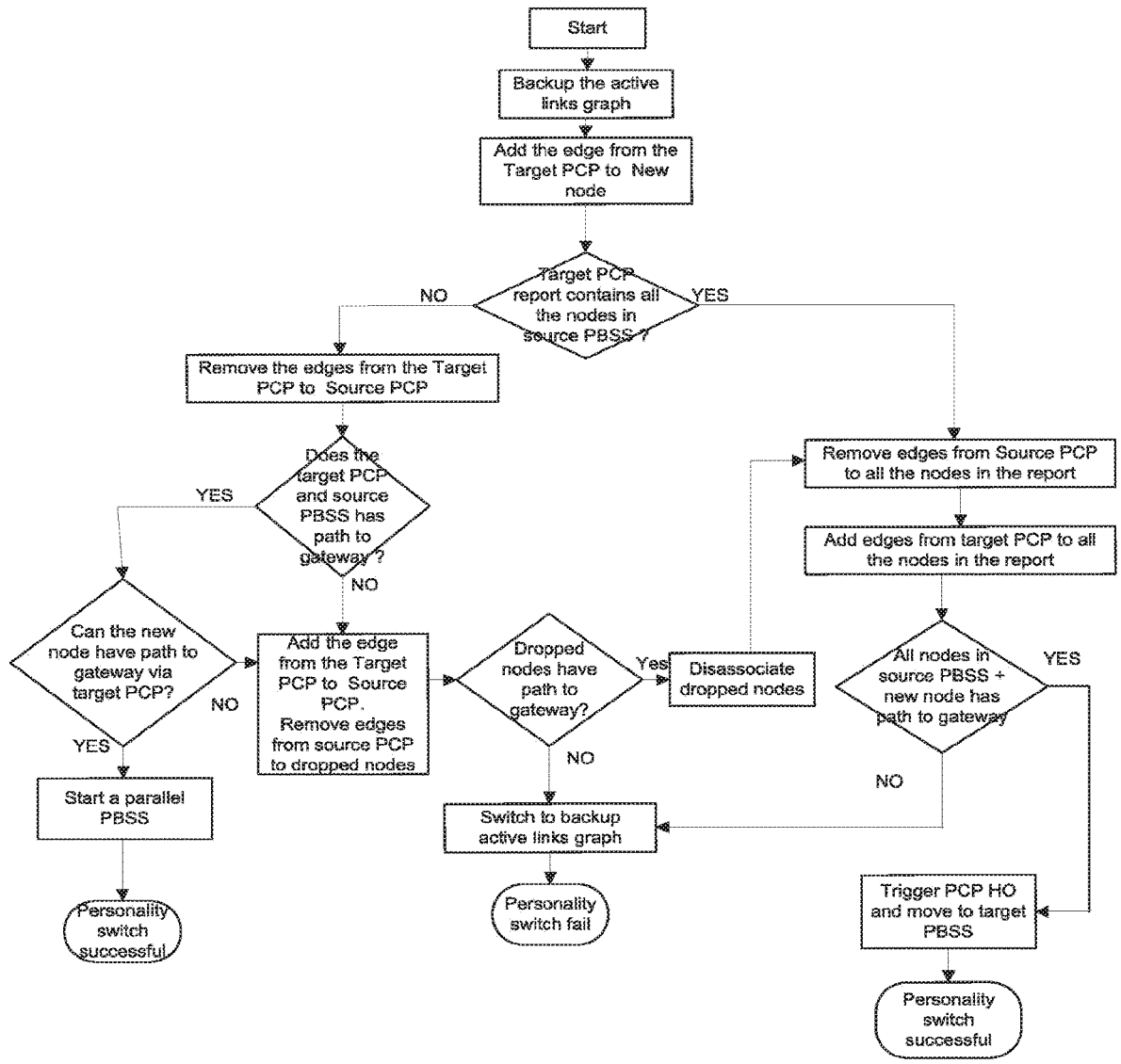
FIG. 28 is an example flow chart of a personality switch.

FIG. 28 is an example personality switch. The target PCP may trigger disassociation towards the source PCP, for example, upon receiving the association config with the sector personality as PCP. After successful disassociation, the target PCP may become a PCP. The target PCP May initiate a PCP start After PCP start, the target PCP may send a MESH_CNTLR_CONFIG_CONFIRM message to the controller: A set of MESH_CNTLR_CONFIG_SETUP messages may be sent to the nodes in source PBSS. The set of MESH_CNTLR_CONFIG_SETUP messages may include (e.g., may only include) the forwarding table updates for one or more paths involving the target PCP.

If the decision is made to perform PCP handover, the controller may send one or more sets of MESH_CNTLR_CONFIG_SETUP messages. A MESH_CNTLR_CONFIG_SETUP message may have the forwarding table updates for one or more nodes in the source PBSS. A second set of MESH_CNTLR_CONFIG_SETUP messages may be sent to the source PCP. The number of association config may be set to one. The contents of association config for the target PCP contents may be filled with the own sector addr that may be set to the source PCP address, the peer sector addr that may be set to target PCP address, and/or the personality field that may be set to STA.

The source PCP may trigger PCP handover towards the target PCP, for example, upon receiving the association config with the sector personality as STA. After successful PCP HO, the source PCP may send a MESH_CNTLR_CONFIG_CONFIRM message to the controller.

Interference measurement and/or management may be provided. In the mesh network with sectored multi-MAC architecture, interference may include intra-node (e.g., inter-sector) interference, intra-PBSS interference, inter-PBSS interference, and/or inter-system interference.

The intra-node (e.g., inter-sector) interference may be mitigated (e.g., partly mitigated) by shielding. Shielding may occur between the sectors. Residual interference may be mitigated by inter-MAC coordination functionality. Inter-MAC coordination functionality may be provided by the mesh layer. The inter-MAC coordination functionality may manage conflicting links. For example, the inter-MAC coordination functionality may manage conflicting links such that each conflicting link may be transmitting at the same or similar time. The inter-MAC coordination functionality may manage conflicting links such that conflicting links are time multiplexed. The STA sector may report to the associated PCP a TSCONST element that may capture the interference/conflicting time slots, for example, when STA sector within a node may be observing interference from a co-located sector. The PCP may take into account the constraints provided by TSCONST element, such as when scheduling the affected. STA. The TSCONST element may be provided to the SME/MAC of the affected STA by the mesh layer, for example, using mac co-ordination function.

The intra-PBSS interference may exist (e.g., may only exist) if STA-STA links are active within the PBSS. The intra-PBSS interference may exist if spatial sharing is enabled between two or more links within the PBSS. The intra-PBSS interference may exist if STA-STA links are active within the PBSS and if spatial sharing is enabled between two or more links within the PBSS. The intra-PBSS interference may be mitigated by the PCP by collecting periodic channel quality reports from the associated STAs. The intra-PBSS interference may be mitigated by the PCP by scheduling the conflicting service periods in a time multiplexed fashion. The intra-PBSS interference may be mitigated by the PCP by collecting periodic channel quality reports from the associated STAs and by scheduling the conflicting service periods in a time Multiplexed fashion.

Inter-PBSS interference may require coordination between PCPs for measurements and/or management of the interference. The centralized controller may be responsible for providing the schedule for the interference measurements. The centralized controller may be responsible for managing, interference. Interference may be managed according to the interference measurement reports. The PCP sectors in each mesh node may be responsible for coordinating the interference measurement within the PBSS. The centralized controller may manage inter-PBSS interference by taking into account the interference caused by active such as while performing route reservation for CIR traffic.

Figure 29:
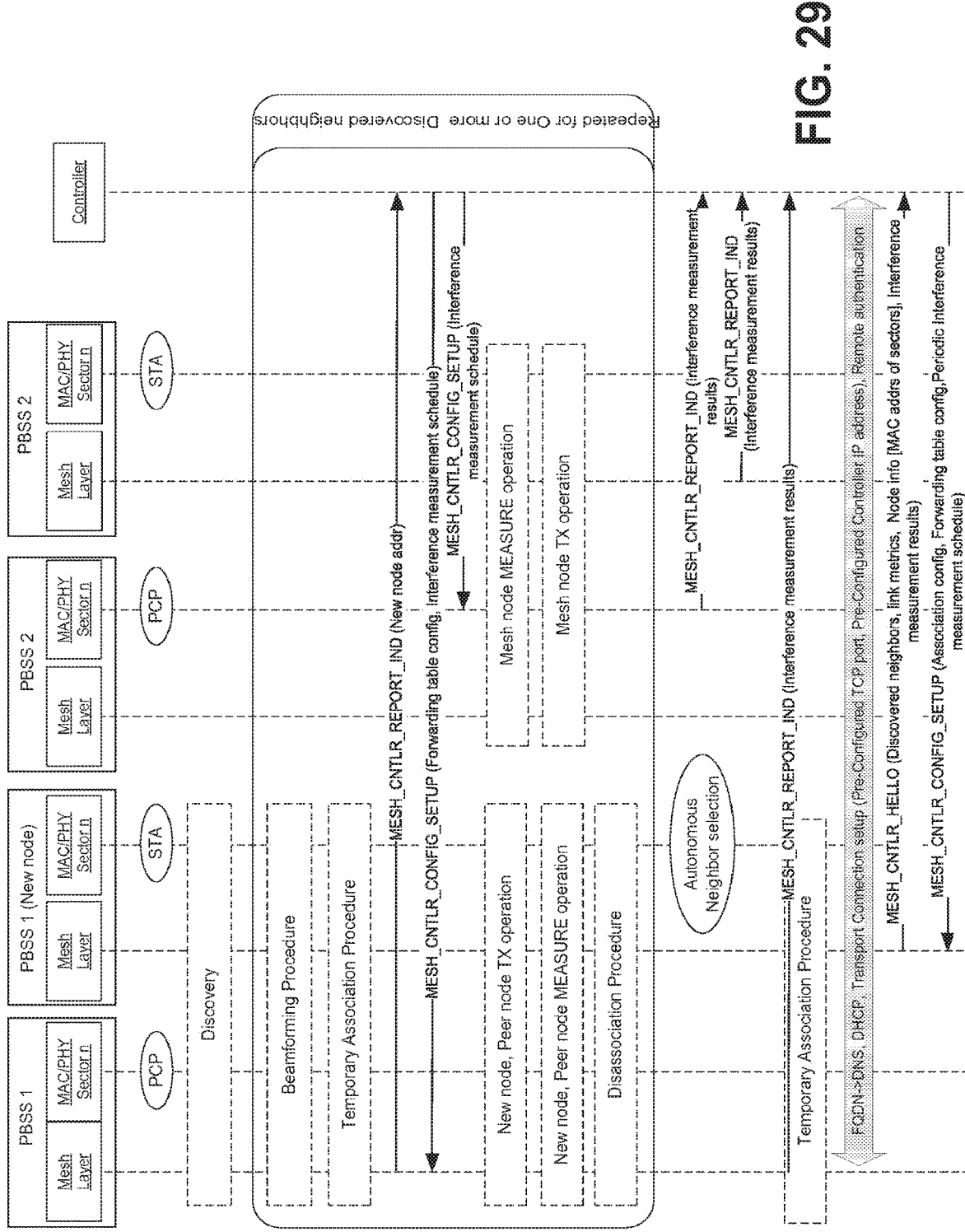
FIG. 29 is a diagram of an example interference measurement.

Inter-PBSS interference measurement may be periodic. The inter-PBSS interference measurement may be event triggered. For example, event triggered interference measurement may be a new node joining the mesh network. FIG. 29 is an example diagram of the mesh-controller interface for interference measurement.

Intereference measurement may build on the for new node bring-up and/or centralized route selection described herein. After initial scan, the new node may discover one or more neighbors. The new node may perform beamforming and/or association with discovered neighbors (e.g., each of the discovered neighbors). The beamforming and/or association with each of the discovered neighbors may be performed sequentially. When the mesh nodes receive association request from the new node, the mesh nodes may send MESH_CNTLR_REPORT_IND to the controller. The mesh node sending MESH_CNTLR_REPORT_IND message may trigger the controller to provide event triggered interference transmission. The mesh node sending MESH_CNTLR_REPORT_IND message may trigger measurement schedule to the new node, the PCP and/or one or more nodes in the interference zone of the new node.

The controller may calculate the interference zone for the new node using an estimate (e.g., using the hop-count metric). The controller may send the interference measurement schedule to the mesh nodes using MESH_CNTLR_CONFIG_SETUP message. The PCP of the new node and/or the PCPs controlling the PBSSs in the interference zones may coordinate the interference measurements. The interference measurement may consist of one or more of the following.

The new node and/or its peer node (e.g., PCP) may transmit towards each other using the beam formed link. The mesh nodes in the interference zone may measure the interference caused on the existing links, e.g., interference due to the new link between the new node and its PCP. During interference measurement, the mesh nodes may cycle through the Rx beams used for one or more of the active neighbor links.

In the interference measurement, the new node and/or its PCP may measure the interference caused on the new link by the existing links in the interference zone. The mesh node in the interference zone may transmit towards the formed links between its neighbors (e.g., one at a time). The new node may store the interference measurement results, for example and/or disassociate from its PCP, e.g., at the end of the interference measurement. The mesh nodes and/or the new node's PCP may report the results of interference measurement to the controller. For example, the mesh nodes and/or the new node's PCP may report results at a time after the measurements may be performed using the MESH_CNTLR_REPORT_IND message.

The procedural sub-blocks may include, but are not limited to, new node—peer node TX operation, new node—peer node MEASURE operation, mesh node MEASURE operation, and mesh node TX operation, etc. Procedural sub-blocks may be part of MAC for interference measurement and management.

The new node may repeats described herein, for example, beam forming, temporary association, interference measurement, and/or disassociation, etc., towards one or more discovered neighbors. When one or more of the discovered neighbors are exhausted, the new node may perform autonomous neighbor selection to select a neighbor. Transport connection may be established to the controller, which may be followed by a remote authentication. The new node may send MESH_CNTLR_HELLO message, for example, with the accumulated interference measurement results. The controller may execute the centralized routing, neighbor selection, and/or interference management. The configurations may be provided with MESH_CNTLR_CONFIG_SETUP message. The controller may include periodic interference measurement schedule in the MESH_CNTLR_CONFIG_SETUP message, for example, from the interference measurement/management perspective.

The controller may track the mesh network timing; for example, at a granularity of Super frame. The controller related to interference measurement/management may use this timing information to schedule the mesh nodes. The timing information may be obtained using the same or similar master clock used by the mesh nodes for mesh wide synchronization.

Interference measurement/management terminology may be used herein. Time taken to measure one Tx-Rx beam pair may be referred to as Tmeas. Time taken to measure all the beams (e.g., corresponding to active connections) of a mesh node may be Tmeas*Nmax*Nmax. Nmax may be the maximum number one hop connectivity allowed per mesh node.

An interference measurement/management schedule may comprise one or more of the following: Start Super frame number, Schedule Period Offset, or Start time Offset. The Start Super frame number may be the reference beacon interval from which offset to individual allocations may be provided. The Schedule Period Offset may be Offset to the scheduling interval within the beacon interval indicated by Start super frame number. The Start time Offset may be offset to the actual operation within the scheduling interval.

Operations may be used in interference measurement/management. The INTF_MEASURE operation may include the mesh nodes performing interference measurement during the scheduled period. The INTF_TRANSMIT operation may include the mesh nodes performing transmission to enable other mesh nodes in the interference zone to perform measurement during the scheduled period. The INTE_FORBIDDEN operation may include the mesh nodes reserving the time period and/or no transmit/receive activity being performed during this period. The Inter_tx_gap operation may be the minimum gap between interference measurement transmit schedule of the same mesh node. The Inter_pode_gap operation may be the minimum gap between interference measurement transmit schedule of one or more mesh nodes.

Interference measurements can be classified into types. For example, TABLE 3 is an example of two types of interference measurements.

TABLE 3

Interference Measurements

| INTF MEAS TYPE | WHEN PERFORMED | NODES INVOLVED | LINKS EVALUATED |
|---|---|---|---|
| Event triggered measurement | During new node bring up | New node and the mesh nodes in the interference zone of the new node | Links between new node and one or more mesh nodes discovered by the new node |
| Periodic measurement | Periodically during the life time of the mesh node | One or more nodes in the mesh network | Links between mesh nodes and the neighbors with which the association may be active |

Figure 30:
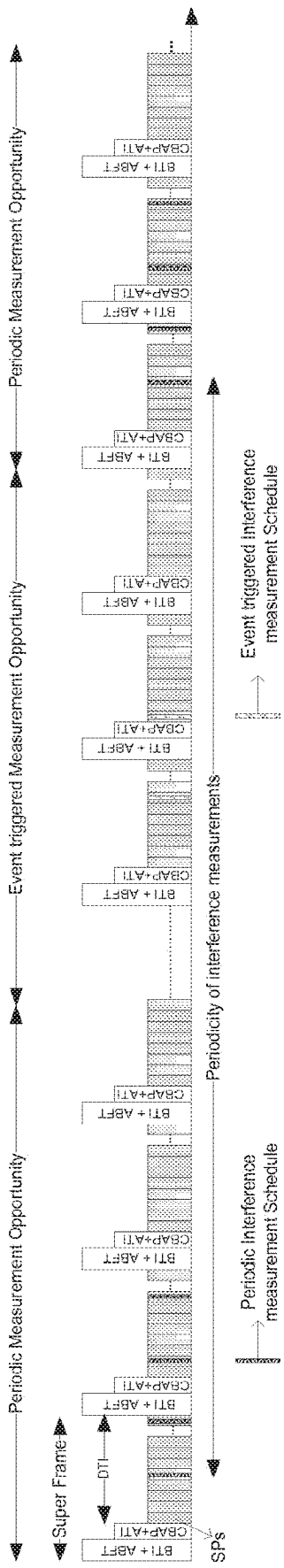
FIG. 30 is a diagram of an example interference measurement in the overall frame structure.

FIG. 30 is an example of placement of the interference measurement in the hyper frame structure. FIG. 30 depicts scheduling opportunities for periodic and/or event triggered measurements in an overall frame structure. Interference measurements may be performed during the service periods. Periodic measurements may be grouped together. Event triggered measurements may be performed. Individual periodic measurement schedules may be spaced so that the data rate within the service periods do not suffer, for example, within the periodic measurement opportunity. The periodic interference measurement schedule may be shown in FIG. 30. Event triggered measurements may be scheduled on demand within the event triggered measurement opportunity. Event triggered measurement schedules may be shown in FIG. 30. The controller may ensure that the event triggered measurements are completed before the next periodic measurements opportunity.

Mesh nodes may perform periodic interference measurements to evaluate the interference in the mesh network.

For a given time base, there may be a Tx_list. In Tx_list, one or more entries in the list may identify a mesh node that may be scheduled to transmit during the time base. For one or more entries in the Tx_list, there may be an Rx_list. One or more entries in the Rx_list may identify a mesh node that may be scheduled to measure the interference caused by the transmitter for the duration starting from the time base. There may be an Unsched_list for a time base. The Unsched_list may include mesh nodes that may not be included in the Tx_list or the Rx_list during a given time. Tbase may be added to Unsched_list.

The Periodic Interference measurement schedule for a new node may be calculated. The Tz_list may get one or more mesh nodes in the interference zone of a new node. The interference zone may be calculated by a combination of number of neighbors of discovered by the new node and/or number of hops metric. For one or more mesh node in Iz_list, the time base where the mesh node is in Tx_list may be found, the new node may be added to the corresponding Rx_list, and/or the scheduling element for INTF_MEASURE may be added to the new node. For one or more time base in the time_base_list, if one or more nodes in Iz_list is contained in Unsched_list, the current time base may be used and the new node may be added to the Tx_list, a scheduling element for INTF_TRANSMIT may be added to the new node for one or more active link separated by Intet_Tx_Gap, the nodes in Iz_list may be added to the Rx_list, a scheduling element for INTF_MEASURE may be added to one or more nodes in Tz_list, and/or a break may occur. If new node is not added to the Tx_list, the time base may be incremented, the time base may be added to the time_base_list, the time base may be used, the new node may be added to the Tx_list, the nodes in Iz_list may be added to the Rx_list, a scheduling element for INTIF_TRANSMIT may be added to the new node for one or more active links separated by Inter Tx_Gap, a scheduling element for INTF_MEASURE may be added to one or more of the nodes in Iz_list.

Event triggered Interference measurement schedule for a new node may be calculated. The D_list may be the list of one or more one hop mesh nodes discovered by the new node. The Iz_list may be the list of one or more mesh nodes in the interference zone of new node. The interference zone may be calculated by a combination of number of neighbors of discovered by the new node and/or number of hops metric. A free time period for event triggered measurement may be found from the existing time_base_list and/or the periodicity of the interference measurements. The Start super frame number may be used as a time base. For one or more mesh node m in D_list, a scheduling element for INTF_TRANSMIT for the new node may be added, a scheduling element for INTF_TRANSMIT for the node m may be added, a scheduling element for INTF_MEASURE for one or more nodes in Iz_list may be added, and/or time base by inter_node_gap may be incremented. For one or more mesh node in in Iz_list, a scheduling element for INTF_MEASURE for the new node may be added, a scheduling element for INTF_MEASURE for the node in may be added, a scheduling element for INTF_TRANSMIT for one or more nodes in Iz_list may be added, and/or time base by inter_node_gap may be incremented. For one or more of the scheduling elements configured, the periodicity may be set to zero.

MAC may be used for performing interference measurement and management. The MAC may be directed by the Mesh Layer to perform transmissions and/or directional measurements, for example, as part of interference measurement. When directed to perform measurements, the MAC may conveys the results to the Mesh Layer. The mesh layer may forward the results to the Mesh Controller, for example, for processing and analysis.

The MAC may receive requests related to interference measurement from the Mesh Layer. Requests related to interference measurement may include a request to transmit a dummy packet to one or more peer MAC entities at a time for a duration, a request to make measurements towards one or more peer MAC entities at a time for a duration, and/or a request to avoid transmissions towards peer MAC entities at a time for a duration. Requests may be conveyed to the MAC via the Mesh-Measurement-Config.request message. The configuration status may be communicated via the Mesh-Measurement-Config.confirm message to the Mesh Layer. Measurement results. The configuration status may be returned using the Mesh-Measurement-Report.indication message to the Mesh Layer.

Figure 31:
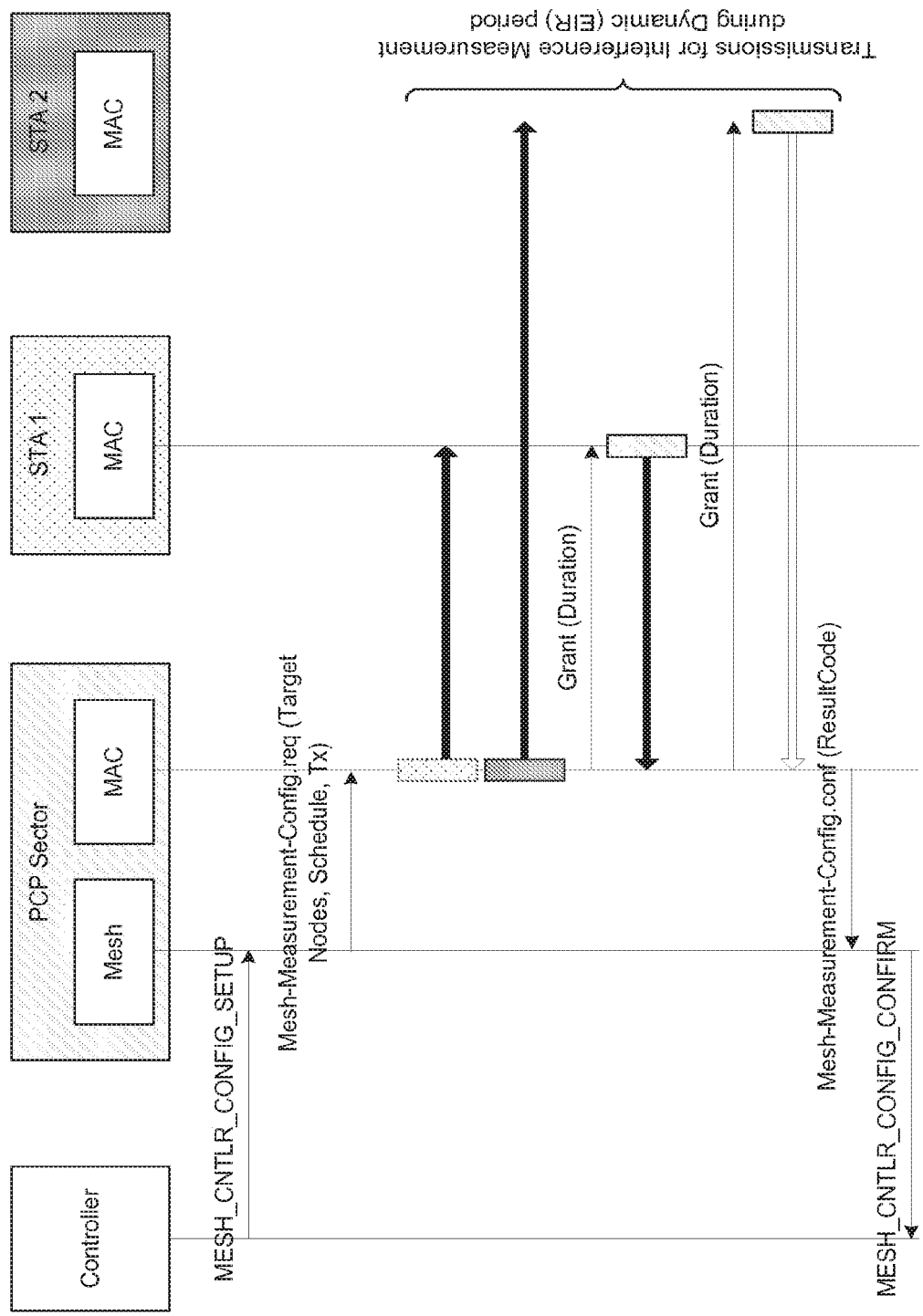
FIG. 31 is a diagram of an example message exchange for setting up dummy transmissions for interference measurement.

FIG. 31 is an example diagram of setting up transmission of dummy packets for interference measurements. As shown in FIG. 31, the setting up transmission of dummy packets for interference measurements may begin with the Mesh Controller sending the MESH_CNTLR_CONFIG_SETUP message with parameters to the node containing the PCP sector controlling the PBSS from which transmission for interference measurements may be requested. The message may include the index of the BI in which the measurements may be requested. The Mesh Layer in the node may forward requests to the MAC of a sector in which the measurements are requested, for example, at the start of the indicated BI. Depending on the parameters in the request, the PCP MAC in the sector may transmits a dummy packet for the specified duration towards destinations and/or send Grant frame to an associated STA to transmit a dummy packet towards itself at a time. For packet transmissions, the Ack Policy bits may be set to indicate No Ack, for example, if no actual information is conveyed in the packet transmissions. When requested transmissions may be completed, the MAC may send a Mesh-Management-Config.confirm message to the Mesh Layer. The mesh layer may send a MESH_CNTLR_CONFIG_CONFIRM message to the Controller indicating the status.

Figure 32:
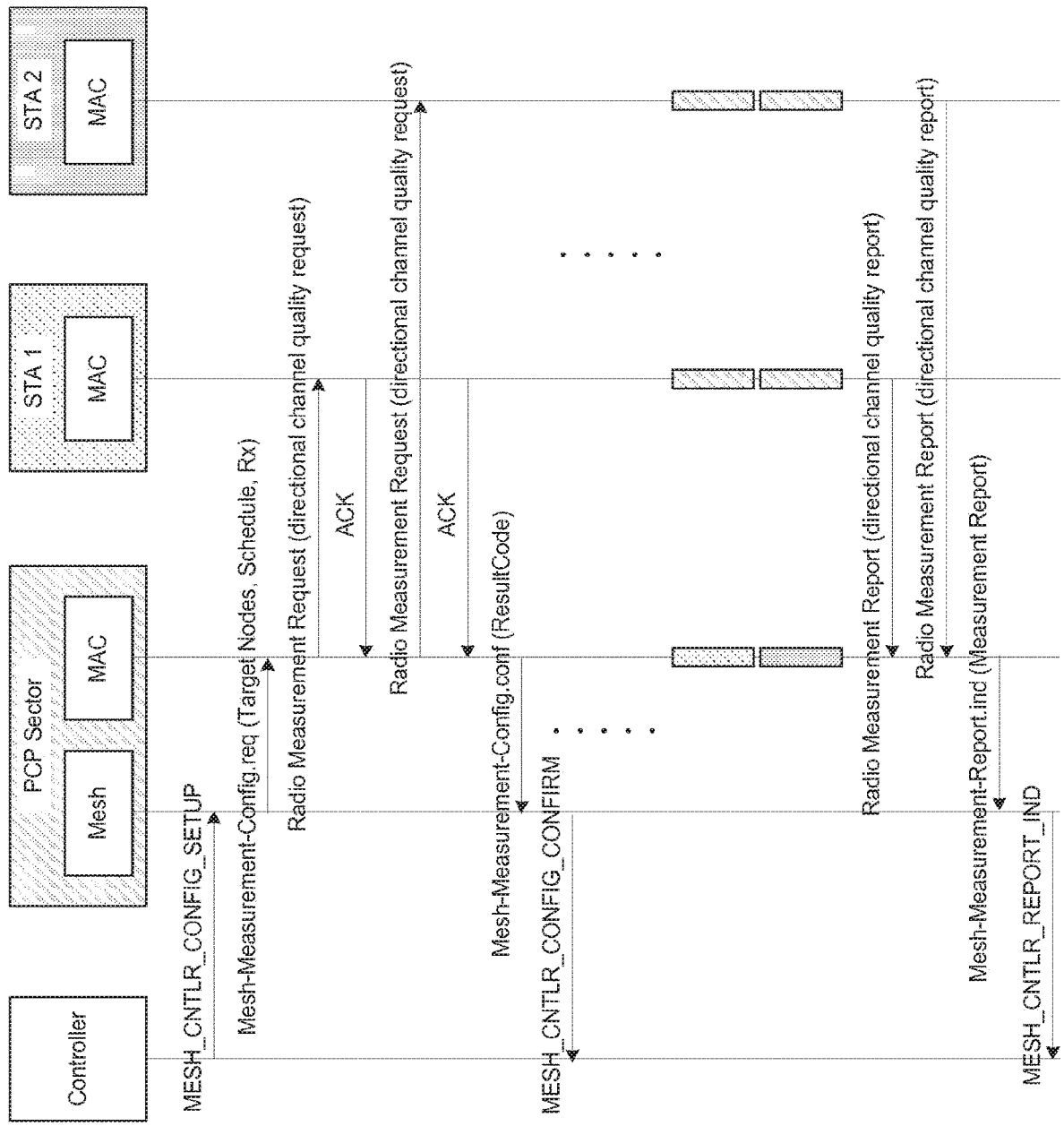
FIG. 32 is a diagram of an example message exchange for setting up and reporting interference measurements.

FIG. 32 is an example of:setting up directional reception for interference measurements. Setting up directional reception for interference measurements may begin with the Mesh Controller sending the MESH_CNTLR_CONFIG_SETUP message with parameters to the node containing the PCP sector controlling the PBSS from which measurements may be requested. The message may include the index of the BI in which the measurements may be requested. The Mesh Layer in the node may forward the request to the MAC of the sector in which the measurements may be requested, for example, at the start of the indicated BI. Depending on the parameters in the request, the PCP MAC in the sector may transmit one or more Radio Measurement Request frames to the associated STAs from which measurements may be requested. If one or More of the requested measurements are from the PCP itself, no Radio Measurement Request frame may be transmitted.

The Radio Measurement Request frame may include the Directional Channel Quality Request element. The Directional Channel Quality Request element may include the Target Node ID, Start time, Duration and/or Periodicity of the requested measurements. Upon receiving ACKs for one or more transmitted Radio Measurement Request messages, the MAC may send Mesh-Measurement-Config.confirm message to the Mesh Layer. The Mesh Layer may send a MESH-CNTLR_CONFIG-CONFIRM to the Mesh Controller. The MESH-CNTLR_CONFIG_CONFIRM may convey the result of measurement setup. The MAC entities may configure their reception antennas to perform directional measurements in directions. The PCP and/or it associated STAs may perform directional:measurements, for example, based on the requested measurement schedule.

After completing measurements, the STAs may send their measurement results to the peer PCP via Radio Measurement Report frames. The Radio Measurement Report May include the directional channel quality report. The directional channel quality report may include the measurement result, for example, in terms of the average noise plus interference power indicator (ANIPI) parameter (e.g., as defined by the IEEE 802.11ad specification). After receiving one or more reports from STAs, the MAC at the PCP sector may forward one or more measurement results to the local Mesh Layer via the Mesh-Measurement-Report.indication Message. The Mesh Layer may send a MESH-CNTLR_REPORT_IND message to the Mesh Controller. The MESH-CNTLR_REPORT_IND message may include one or more measurement results for the PBSS.

The Mesh-Controller may request mesh nodes to cease transmissions for a time. Interference measurements may be performed within the mesh network, for example, without being affected by ongoing data transmissions. The request for mesh nodes to cease transmissions may be conveyed via the INTF_FORBIDDEN flag in the INTF_SCHEDULE field in the MESH_CNTLR_CONFIG_SETUP message to the Mesh Layer. The request for mesh nodes to cease transmissions may be conveyed in the Measurement Quiet Period Request element contained in the Mesh-Measurement-Config.request element to the PCP MAC.

Figure 33:
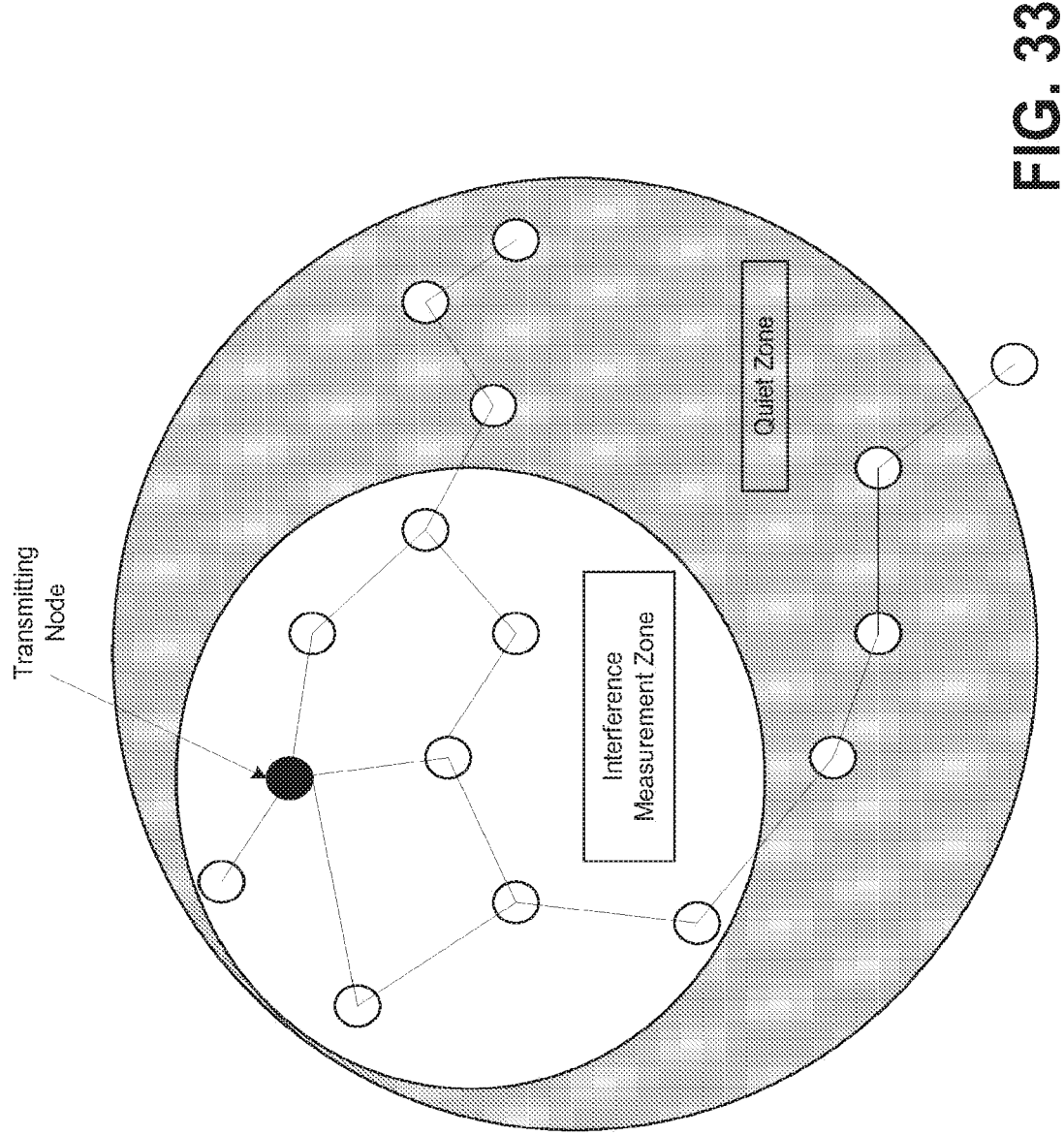
FIG. 33 is a diagram of example interference measurement and quiet zone.

The PCP MAC may not schedule uplink or downlink transmissions at the indicated time to the peer STAs within the PBSS. The Measurement Quiet Period Request element may include the Starting SI and/or the Start Time relative to the starting SI, for example, when transmission may cease. FIG. 33 is an example of interference Measurement and Quiet Zones. Mesh nodes may belong to the Interference Measurement Zone. Mesh nodes that belong to the Interference Measurement Zone may transmit interference measurement packets and/or make interference measurements during interference measurement periods. Mesh nodes may lie in the Quiet Zone. Mesh nodes that lie in the Quiet Zone may not perform transmission and/or measurements during the interference measurement period. Mesh nodesone may cease transmissions during a time to facilitate interference measurements by the nodes belonging to the Interference Measurement Zone.

Figure 34:
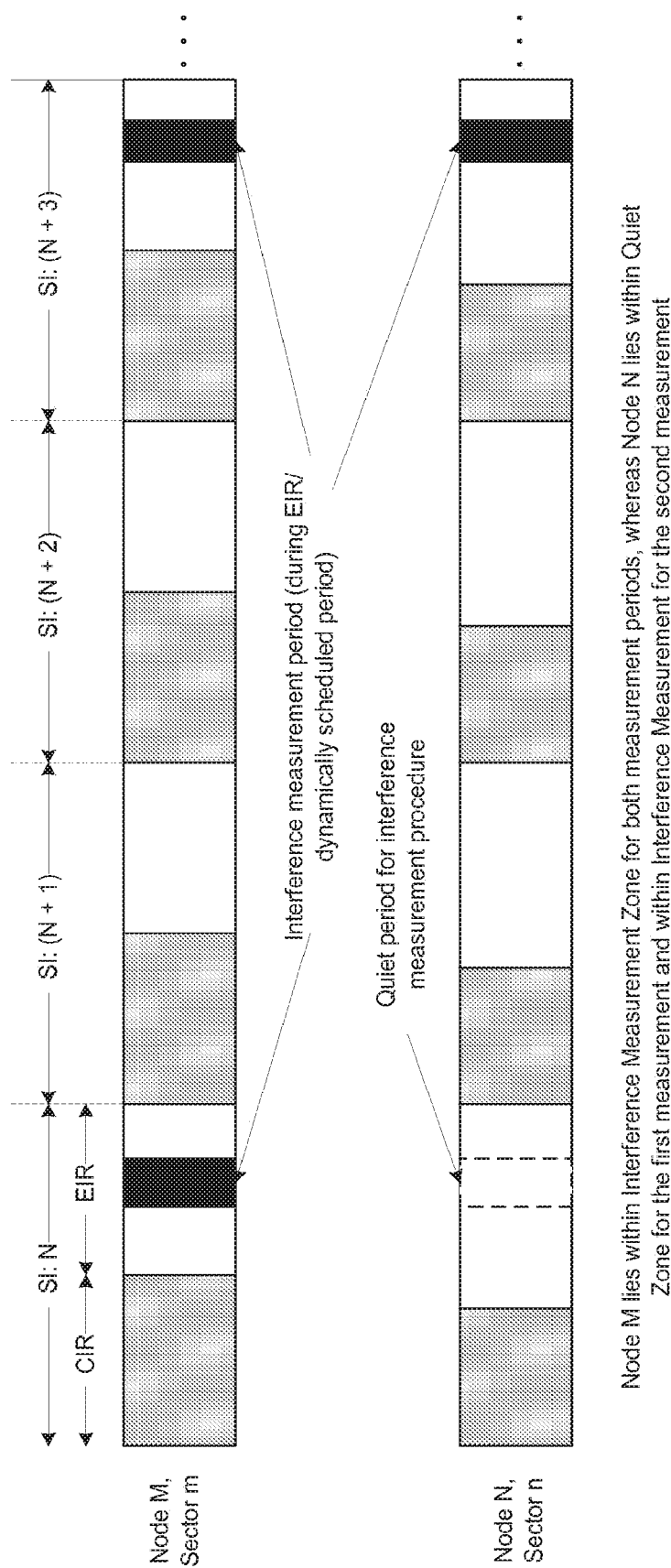
FIG. 34 is a diagram of an example position of interference measurement periods in a super-frame.

FIG. 34 is an example super-frame structure and the time reservations for interference measurements for two sectors belonging to two different mesh nodes. In FIG. 34, for the first interference measurement period, Node M belongs to the Interference Measurement Zone, while Node N belongs to the Quiet Zone. Node M may perform transmission and/or measurement during the interference measurement period. Node N may cease transmissions during that time. During the second interference measurement period, both nodes may lie within the Interference Measurement Zone and may take part in transmission and/or measurements. The operations of one or more sectors belonging to the PBSS may be controlled by the corresponding PCP for interference measurement.

The data scheduling mechanism may be the scheduled transmission framework. The DTI may be used for scheduled transmissions in the mmH system. The Dynamic Allocation of SPs mechanism may be utilized for data transfer scheduling. Multiple Scheduling intervals (SIs) may be accommodated within the DTI. In one or more SI, portions of time may be pre-allocated for predictable backhaul data traffic from the access node. The portions of time may be referred to as Committed Information Rate (CIR). Access node backhaul traffic may be allowed to exceed CIR allotment, for example, up to a higher limit called Excess Information Rate (EIR). The EIR traffic may be accepted with more relaxed latency guarantees. The EIR traffic may be unpredictable and/or may be provisioned for high frequency.

The backhaul traffic flowing into the mmH system may belong to Quality of Service (QoS) categories. The scheduling mechanism may take into account traffic volumes corresponding to QoS categories, for example, while allocating resources in one or more SI. A portion of the time in one or more SI may be pre-allocated for CIR traffic. A portion of time in one or more SI may be available for dynamic allocation to satisfy the requirements of EIR traffic.

When the requirements of traffic categories may be combined, a small SI may be chosen. For example, the SI chosen may be based on the twin aspects of a maximum of 5 allowed network hops between the GW mmH node and a non-GW (e.g., leaf) mmH node, and/or maintaining a 10 msec latency limit for all traffic kinds. The SI may be chosen as 0.5 msec. The first part of one or more SI may be allotted to CIR-traffic that may have originated at the attached access node. The first part of one or more SI may be allotted to CIR traffic that may be relay traffic originating at another non-GW node. The relay traffic may reach the GW mmH node or another non-GW mmH node (e.g X2 traffic in case of LTE SCs). If remaining time in an SI after allotting time for CIR traffic exists, the remaining period may be dynamically allotted using the Dynamic Allocation of SP protocol, for example from 802.11ad specification. Dynamic Allocation of SP protocol may utilize the Poll, Service Period Request (SPR) and/or Grant frames for dynamic allocation of resources among one or more STAs.

Figure 35:
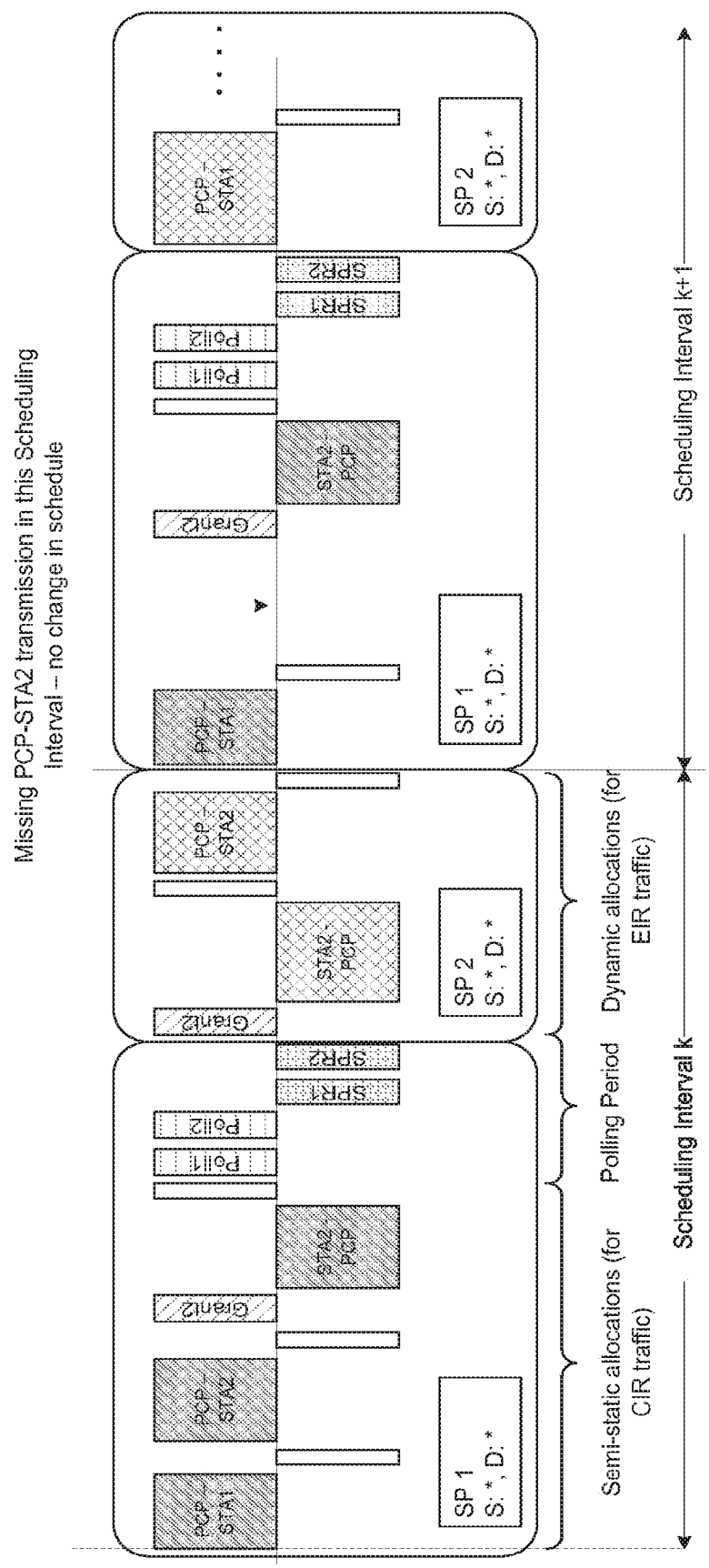
FIG. 35 is a diagram of an example frame structure during data transmission interval (DTI).

In one or more SI there may be one or more SPs. For example, in one or more SI, there may be two SPs. The SP in an SI may include the semi-static allocation and/or the Poll and SPR frames associated with the dynamic allocation. The actual dynamic allocation may occur in a different SP in the SI. There may be two channel allocation mechanisms, such as semi-static and dynamic. The schedule of the SPs may be announced in the Extended Schedule. The Extended Schedule may be included in the Announce frame transmission during ATI to one or more associated STA by the PCP. There may be mMaxAssociationPerSector number of ATI slots for transmissions of Announce frames and/or the corresponding ACK. The SPs may have the Source and Destination as the broadcast address. One or more associated STAs may orient reception beam in the direction of the PCP for the duration of the SPs. FIG. 35 is an example of the detailed frame structure over two SIs. For example, one or more SI may be made up of two SPs, one for semi-static data and another for dynamic data transfer.

When a new mmH node joins the network and/or associates with a peer mmH node, semi-static allocations may be made on one or more links from the new mmH node to the GW mmH node, for example, with provisions for uplink and/or downlink traffic. Decisions may be made at the Mesh Controller and/or communicated to one or more nodes along the path. One or more intermediate nodes along the chosen path may have spare channel resources to accommodate the traffic requirements of the new mmH node. Resource allocations between pairs of mmH nodes between the source and/or the destination may be performed via Mesh-Schedule-Add.request and/or Mesh-Schedule-Add.confirm messages.

Figure 36:
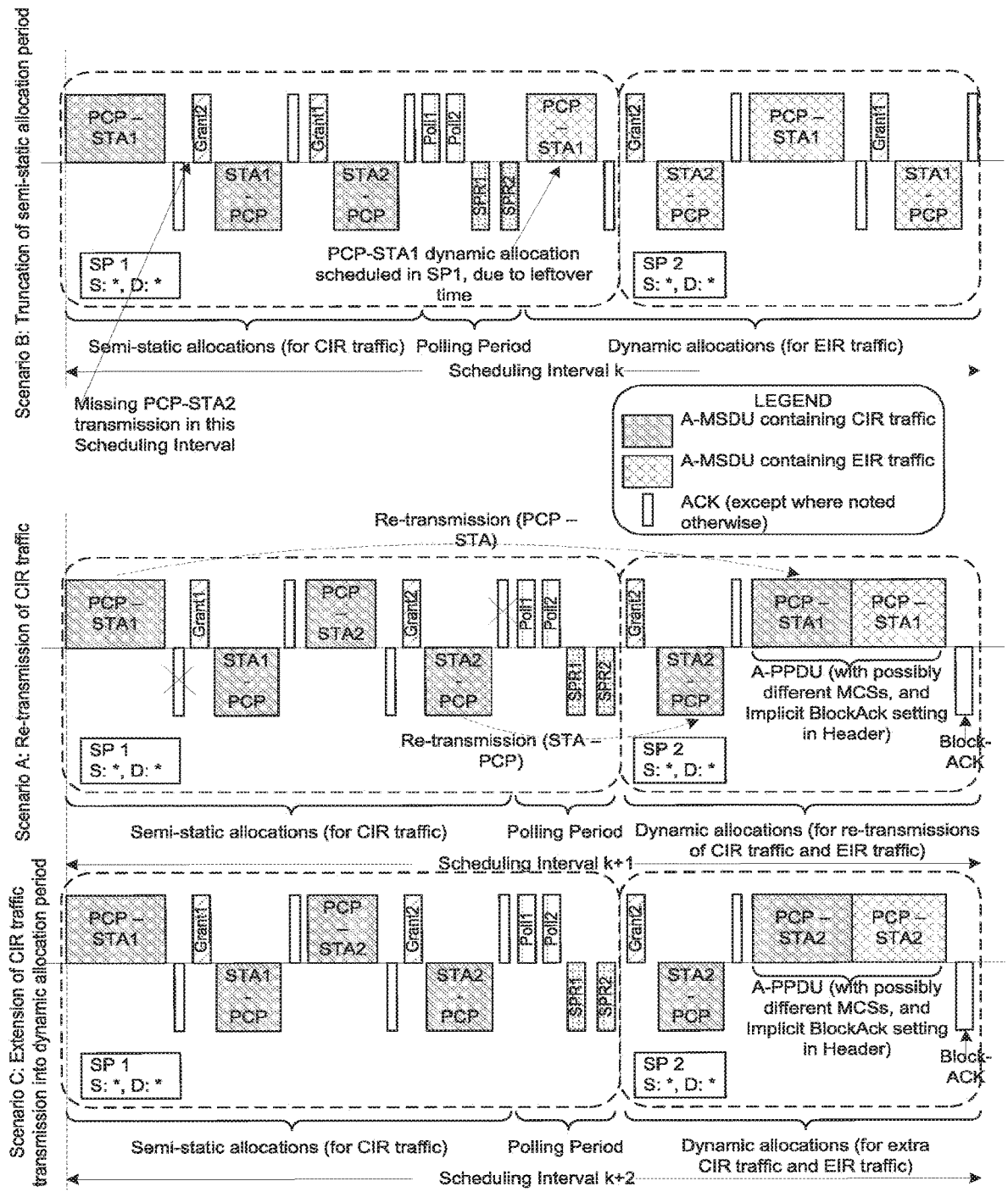
FIG. 36 is a diagram of example data exchange in scheduling intervals.

FIG. 36 is an example of semi-static allocations within an SI. Downlink (e.g., PCP-STA) transmissions may be scheduled in the SP. For example, downlink (e.g., PCP-STA) transmissions may be scheduled first in the SP. The uplink transmissions may be followed by uplink transmissions (e.g., STA-PCP). One or more uplink transmissions may be preceded by a Grant frame transmission from the PCP. The grant fram transmission may indicate to the STA that it is the STAs turn to transmit data. This structure may allow the uplink transmissions' schedules to be moved ahead, for example, so that the semi-static allocation may be completed earlier than scheduled. A greater portion of the SI may be available for dynamic allocations for EIR traffic. The PHY Layer aggregation (e.g., A-PPDU), for example as depicted in FIG. 36 Scenario C, may not be supported. Semi-static data transmissions may be re-scheduled in one or more SI, for example, depending on queue lengths. The system design may not support this semi-static data transmissions. Semi-static allocations may not change, for example, if a particular PCP or STA does not have data to transmit.

Figure 37:
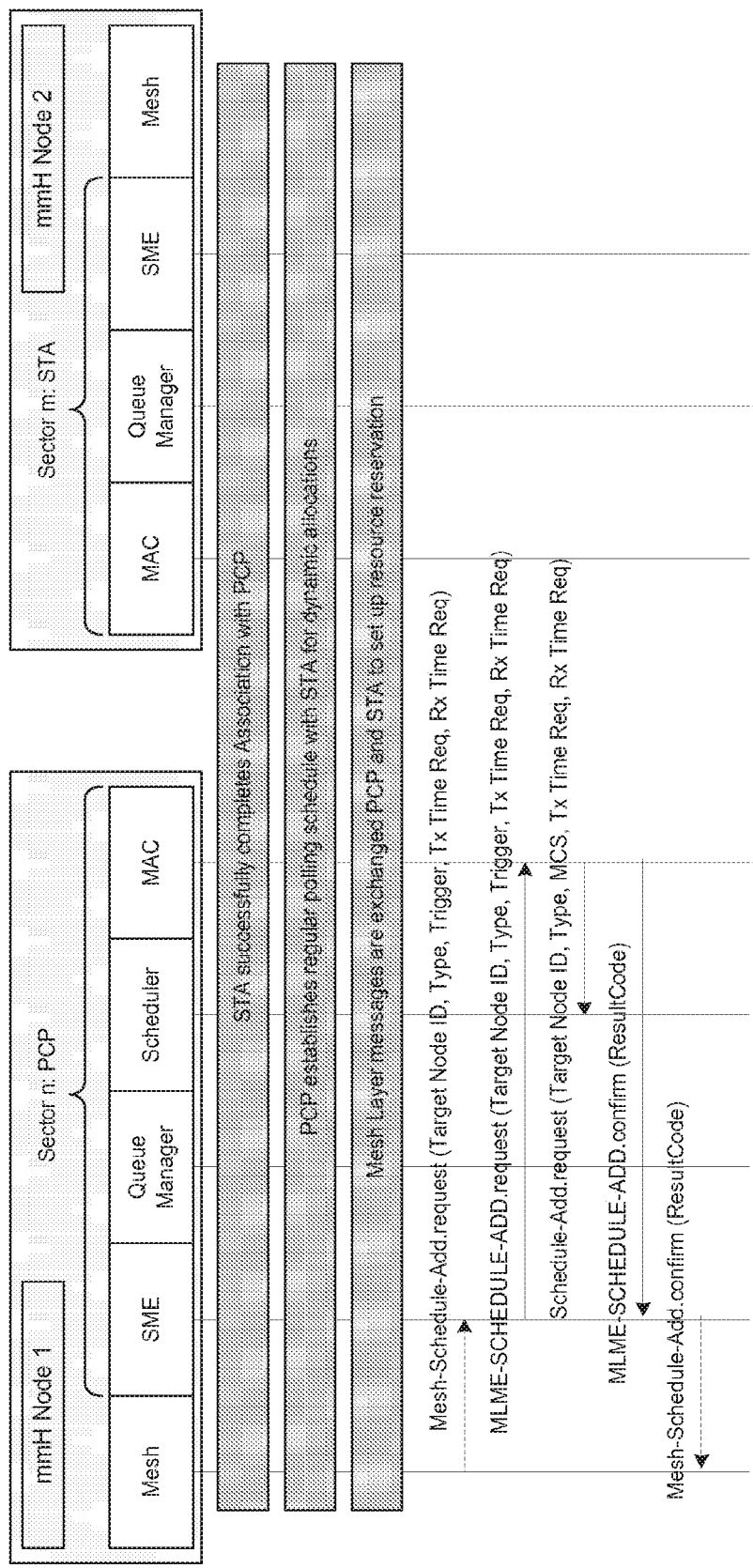
FIG. 37 is a diagram of an example semi-static schedule setup.

FIG. 37 is an example semi-static schedule setup.

Figure 38:
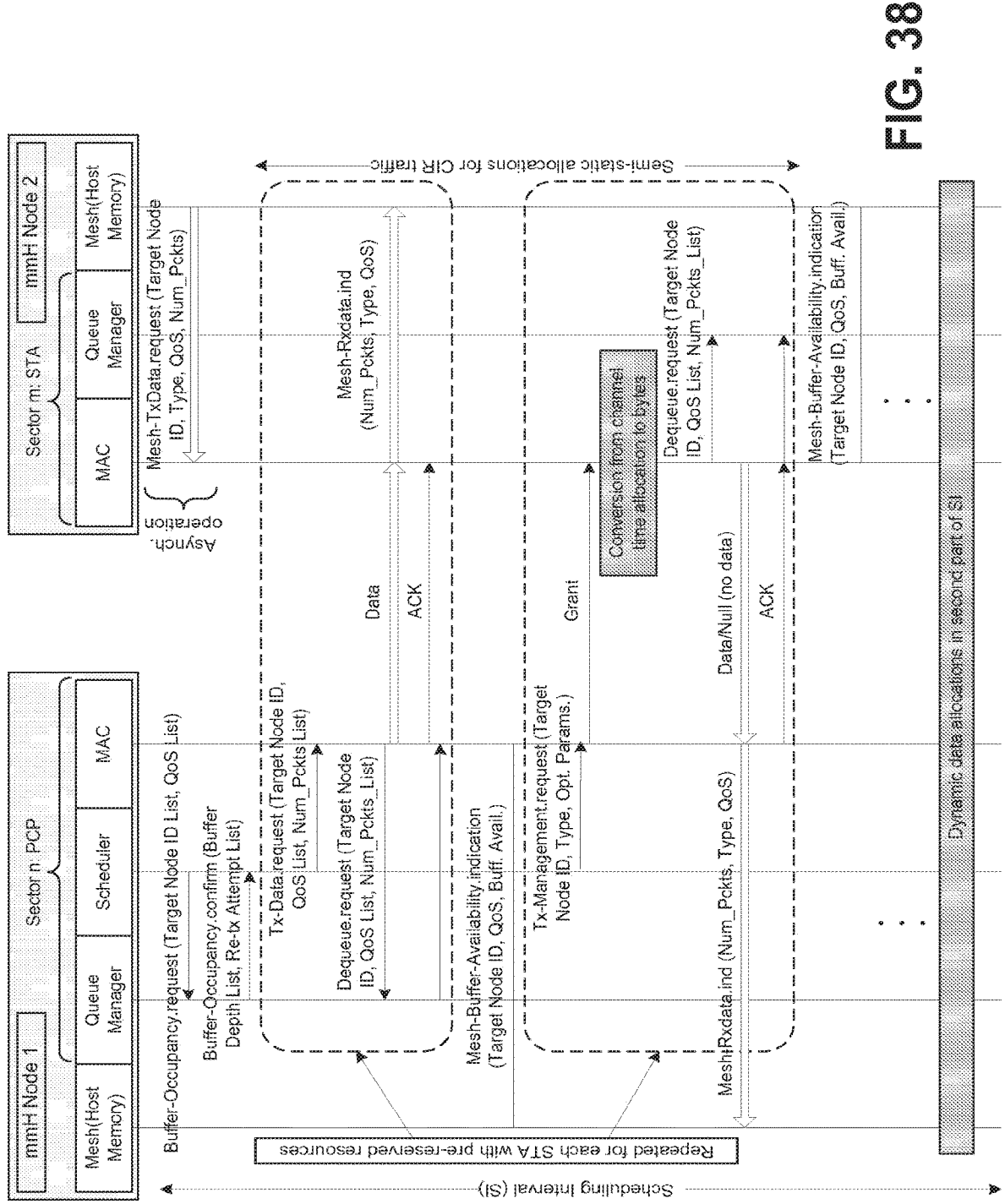
FIG. 38 is a diagram of an example semi-static allocation and data transfer.

FIG. 38 is an example semi-static allocation and data transfer.

Remaining time after semi-static allocations may be used for dynamic allocation of EIR traffic. The PCP may poll one or more associated STAs about buffered traffic. The PCP may determine resource allocations. Resource allocations may last one or more (e.g., only one) SI. The PCP may make new allocations in an SI, for example, based on the traffic requirements of the nodes.

Figure 39:
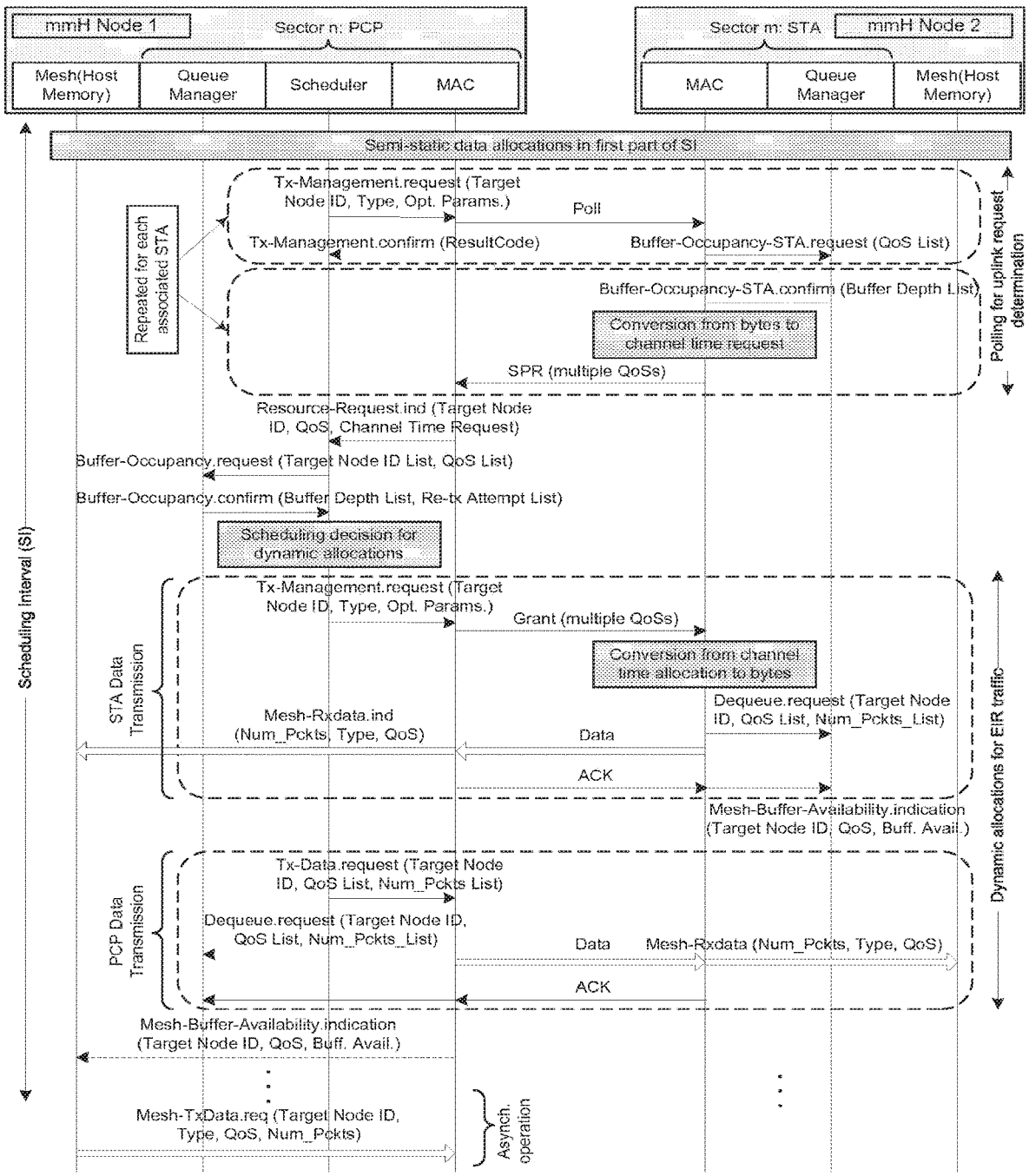
FIG. 39 is a diagram of an example dynamic scheduling and data transfer.

FIG. 39 is an example message sequence chart for dynamic allocations. The semi-static portion of the traffic may occur in one or more SI. The remaining time in the SI/SP may include management messages, for example, for setting up-dynamic traffic allocations and/or the data transmission. Dynamic traffic allocations may be set up using Dynamic Allocation of SP from 802.11ad specification. Dynamic allocation may use frames, such as Poll, SPR and/or Grant. The PCP may sends Poll frame to one or more STA. The STAs may respond with SPRs. The SPR message may be modified to include multiple Dynamic Allocation Info fields. The fields may correspond to a separate QoS category. The PCP may be provided with the requested channel time for one or more QoS category at the STAB. The PCP may apply prioritization, for example, while making channel reservations. The transmission of Poll and/or SPR frames may occur at the end of the semi-static traffic transmission in one or more SI. The transmission of Poll and/or SPR frames may be referred to as the Polling Period The data transfer for dynamic traffic may occur. The PCP may start transmitting downlink data to one of the STAs, for example, at the start of the dynamic allocation period or at another time during the dynamic allocation period. To allow an STA to transmit uplink data, the PCP may transmit a Grant frame. The Grant frame may be modified from 802.11ad specification to include multiple Dynamic Allocation Info fields. One or more field may correspond to a separate QoS category, for example, similar to the SPR frame modification. The PCP may allocate channel times for one or more QoS queue within an STA.

Figure 40:
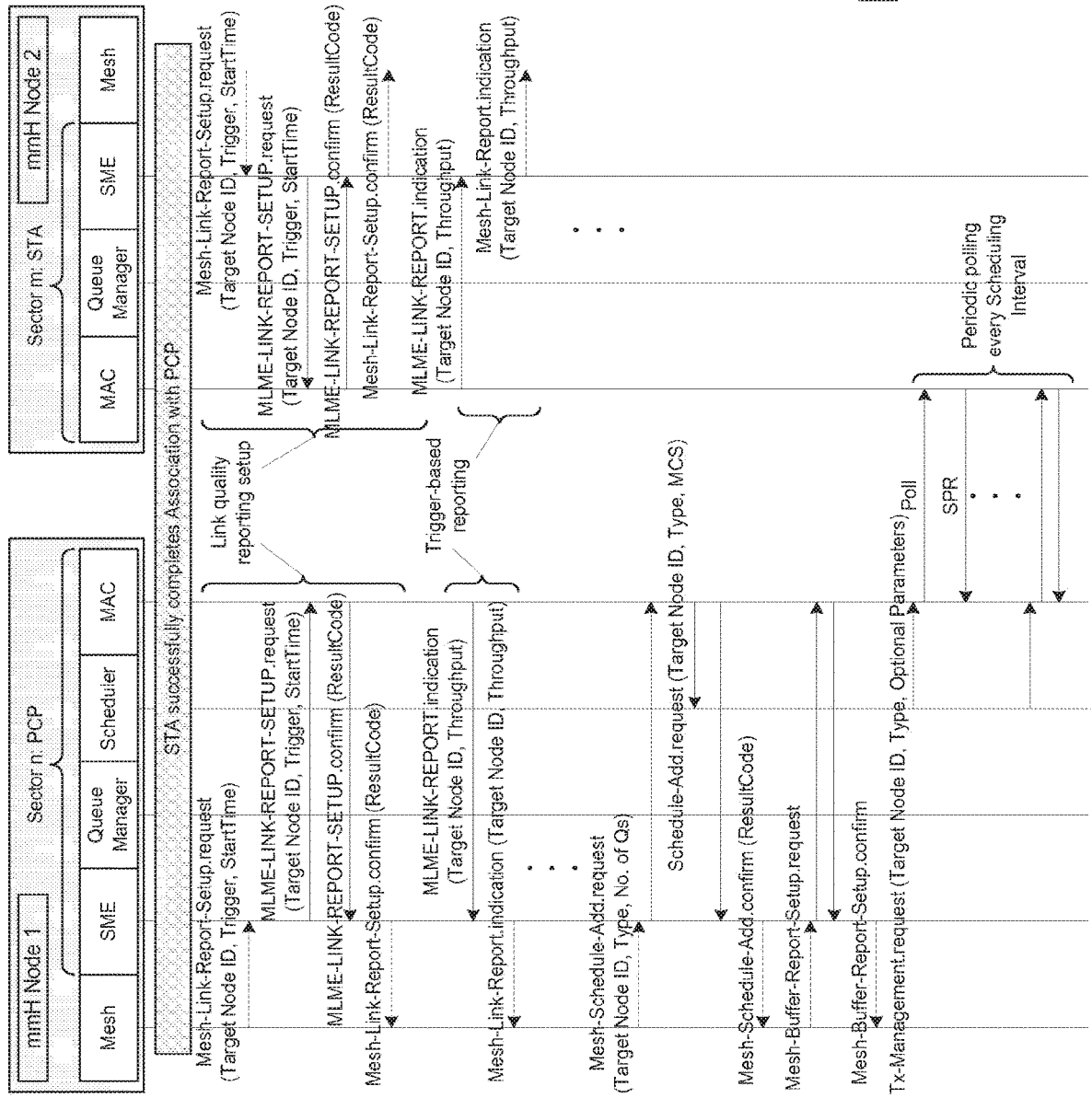
FIG. 40 is a diagram of an example dynamic schedule setup at a newly associated STA.

FIG. 40 is an example of dynamic schedule setup at a newly associated STA with a PCP.

The scheduling may operate to determine data transmission schedules for semi-statically scheduled data and/or dynamically scheduled data. One or more SI lasting 0.5 ms may coincide with a 802.11ad SP. In the first part of the SP in each SI, semi-statically scheduled data may be transmitted. The transmission schedule for data may be pre-determined, for example, when the traffic stream may be initially admitted in the uplink (e.g., from STA to PCP) and/or downlink (e.g., PCP to STA) directions on one or more wireless link from source mmH node to destination mmH node. The uplink direction on a particular link (e.g., from STA to PCP) may be different from the overall uplink/upstream direction from a leaf mmH node to a gateway mmH node. Transmission schedules may be decided at traffic stream admittance. Pre-determined Schedule may impose an upper bound on the transmission schedule. The actual transmission-schedule in one or more SI may be determined by the queue lengths, The actual transmission schedule may be less than or equal to the pre-determined limit.

Figure 41:
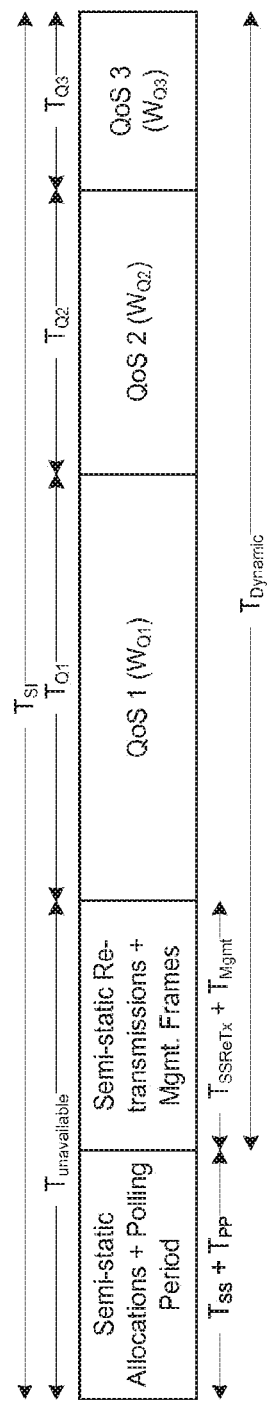
FIG. 41 is a diagram of an example resource allocation by a scheduler.

A part of the SP in one or more SI, such as the second part of the SP, may be utilized for dynamically scheduled data transmission. The exchange of Poll-SPR-Grant frames between the STA and the PCP may facilitate dynamically scheduled data transmission. The PCP may collect the uplink resource requirements from the associated STAs by polling. The PCP may determine the transmission schedule for the SP. FIG. 41 is an example resource allocation by a scheduler.

Figure 42:
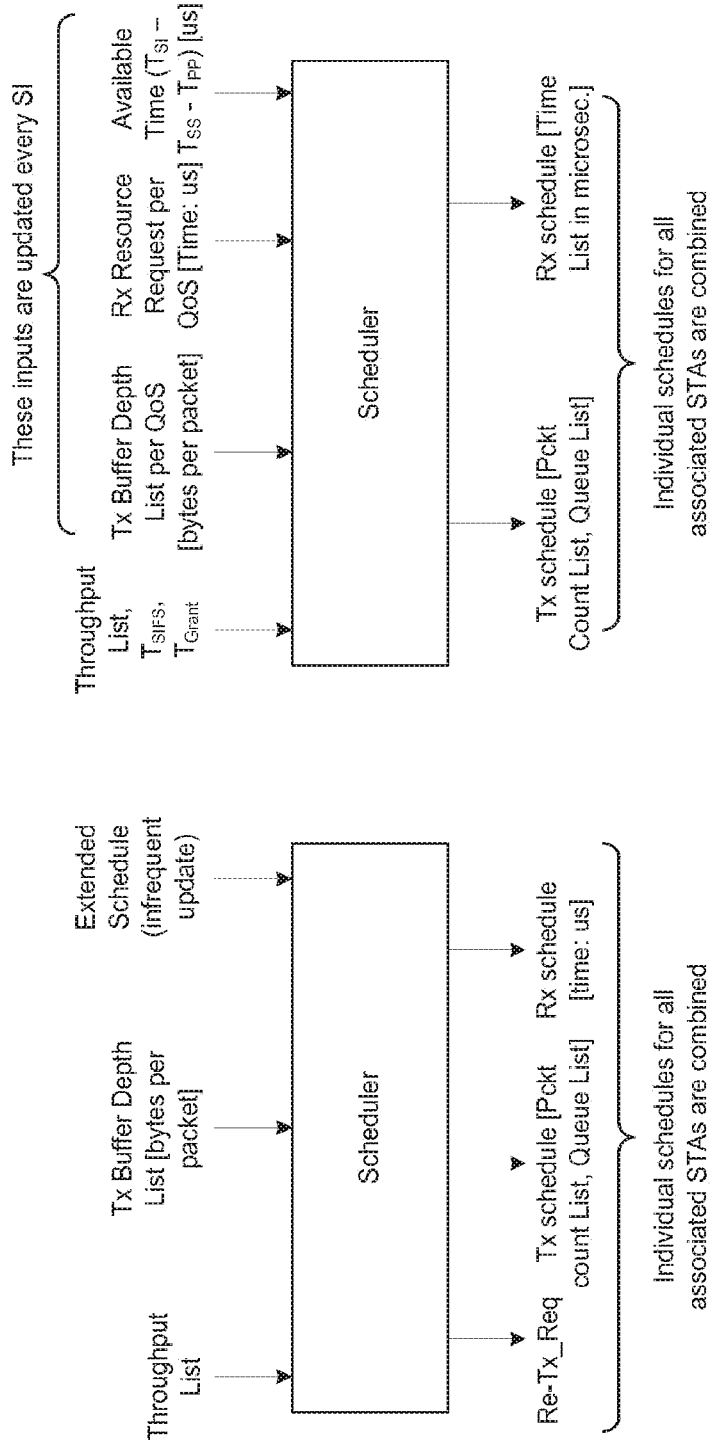
FIG. 42 is a diagram of an example scheduler interface for two modes of operation.

The scheduler may have two modes of operation. The scheduler may be queried twice per SI, for example, for semi-static allocations and/or for dynamic traffic allocation. FIG. 42 is an example scheduler interface for two modes of operation.

The allocation for semi-static traffic may be determined when a traffic stream is admitted by the PCP. The actual channel time requirement in one or more SI may depend on the current buffer occupancy at the PCP and/or STA. The downlink transmissions may be scheduled within the SI, for example, followed by the uplink transmissions. The PCP signals may start uplink transmission from the STA, for example, by transmitting a Grant frame. Packets belonging to a QoS class may be combined to form an A-MSDU. One or more A-MSDUs addressed to a receiving node may be concatenated to form an A-MPDU. An A-MPDU transmission for CIR traffic per neighbor, per direction in an SI may exist.

The channel time allocation per STA for semi-static downlink allocations may be calculated using (e.g., A-MPDU mode isused for CIR data transmissions):

$$(T_i)_{requested} = \sum_{m=1}^{t_{max}} \left\{ \sum_{k=\sum_{n=0}^{m-1}(N_{pckts})_n+1}^{((N_{pckts})_{i,j})_m} \left[ \frac{L_k + L_{A-MSDU\_Hdr}}{\rho_j} \right] + T_{MAC\_Hdr} \right\} +$$

$$T_{Preamble+PHY\_Hdr} + T_{SIFS} + T_{B-ACK} + T_{SIFS}$$

$$T_i = \min\{(T_i)_{baseline\_Tx}, (T_i)_{requested}\}$$

Time allocation for one or more QoS class is may be calculated. The baseline resource allocations may be determined per QoS, for example based on pre-configured weights.

$$T_{i,j} = \frac{w_{Q_i}}{\sum_{j=1}^{Q_{max}} w_{Q_j}} \cdot T_i$$

$$((N_{pckts})_{i,j})_{Tx} = \max_{k=1:(N_{pckts})_i} k, : \sum_{m=1}^{k}\left(\frac{L_m}{\rho_i}\right) + T_{Hdr} + T_{SIFS} + T_{ACK} + T_{SIFS} \leq T_{i,j}$$

$(T_i)_{requested}$ may be the channel time to transmit one or more en-queued packets for $STA_i$. $(T_i)_{baseline\_Tx}$ may be channel time allocated for downlink transmission to $STA_i$, for example, during traffic stream admittance. For example, $(T_i)_{baseline\_Tx}$ may equal $0.5^*(T_i)_{baseline\_Total}$. $(T_i)_{baseline\_Total}$ may be the total channel time allocated for CIR traffic for $STA_i$ (e.g., Uplink and downlink). $L_k$ may be the length (in bits) of packet k. $p_i$ may be the transmission rate (e.g., corresponding to current MCS) for $STA_i$. $T_{Hdr}$ may be time to transmit MAC Header and/or FCS at transmission rate. $T_{SIFS}$ may be Short Inter-frame Spacing $T_{ACK}$ may be the time to transmit an acknowledgement frame. $T_{B-ACK}$ may be the time to transmit a block-acknowledgement (BACK) frame. $(N_{pckts})_i$ may be the number of packets in queue for $STA_i$.

$$((N_{pckts})_{i,j})_{Tx}$$

may be the number of packets to be transmitted in allocation corresponding to STA i and QoS j. $N_{QoS\_SS}$ may be the number of QoS classes for CIR or semi-static traffic. $w_{Q_i}$ may be the weight for QoS i.

The STA MAC may perform calculations to determine the number of packets that may be accommodated in the pre-allocated channel time. When the pre-allocated time is not sufficient to transmit one or more packets in the queues, channel times may be allocated to different QoS classes according to pro-configured weights.

Dynamically allocated traffic may be scheduled for transmission, for example, at the end of semi-static allocations in one or more SI. At the start of dynamic traffic allocation, the PCP may poll one or more associated STA. The PCP may receive channel time requirements in response to the poll. The PCP may allocate the remaining time in the current SI (e.g., after semi-static allocation and/or possible semi-static re-transmission) for dynamic traffic transmission, for example, based on scheduler outputs. The STAs may use unique Traffic Identifiers (TIDs) for traffic. Unique Traffic Identifiers (TIDs) for traffic may belong to semi-static type and/or one or more of the QoS classes corresponding to dynamic traffic.

The scheduler may allocate time for required re-transmissions of data belonging to semi-static allocation queues (e.g., CIR re-transmission). The priority may be for frames in the Management frame queue (e.g., MAC and/or Mesh Management queues). The remaining time may be allocated for dynamically allocated data transfer in the uplink and/or downlink directions for one or more STA. The scheduler may prioritize the allocations. The scheduler may prioritize the allocations based on QoS class and/or link quality. In QoS class, the available channel time may be split according to the weights associated with one or more QoS class. In Link quality, for one or more QoS class, the channel time may be divided according to the link qualities of one or more associated STA. The MCS and/or associated transmission rate may be used as an indicator of link quality for scheduling decisions.

The scheduler decision may be communicated to the STAs via Grant frames for uplink transmissions. If multiple QoS classes are enabled, channel time allocations for one or more class may be included (e.g., separately) in the Grant frame. The STA may aggregate data for one or more QoS classes for transmission as a PPDU (e.g., a single PPDU). There may be one or more (e.g., up to two) Grant frames per STA in the dynamic part of SI, for example, for semi-static/CIR data re-transmission and/or for dynamic (EIR) uplink data. If no CIR data re-transmission may be in a particular SI, a Grant frame (e.g., only one grant frame) may be sent containing dynamic uplink traffic resource allocation.

The channel time allocation per STA for dynamic traffic allocations may be calculated. For example, the resource may be split based on QoS class. $T_{Dynamic}$ may be calculated at the beginning of dynamic allocation period.

$$T_{Dynamic} = T_{available} - T_{Management} - T_{SS\_ReTx}$$

where, $$T_{available} = T_{SI} - T_{SS\_actual} - T_{PollingPeriod}$$

$$T_{Mgmt} = \sum_{j=1}^{N_{STA}} \left( ((T_{Mgmt}))_{j,Tx} + ((T_{Mgmt}))_{j,Rx} \right)$$

When neither A-MSDU nor A-MPDU is used (e.g., no A-MSDU, no A-MPDU), the number of MSDUs for a particular neighbor j may be given by:

$$t_{max,j} = (N_{pckts})_{Mgmt,j} ((N_{pckts})_{Mgmt,j})_t$$

may be calculated. For $0 < t \leq t_{max,j}$, where $$t_{max,j} = \min_{t=1:\infty} (t-1): ((N_{pckts})_{Mgmt,j})_t = 0$$

(e.g., for A-MSDU and/or A-MPDU) and $$((N_{pckts})_{Mgmt,j})_0 = 0$$

For example, for no A-MSDU and/or no A-MPDU:

$$((N_{pckts})_{Mgmt,j})_t = 1$$

For A-MSDU and/or A-MPDU:

$$((N_{pckts})_{Mgmt,j})_t = \max_{m=1:(N_{pckts})_{i,j}} m: \sum_{r=\sum_{n=1}^{m-1}(N_{pckts})_n+m}^{(N_{pckts})_{Mgmt,j}} [L_r + L_{A-MSDU\_Hdr}] \leq$$

$$\min \left\{ mAMSDUMaxSize, \sum_{p=1}^{m-1} \sum_{r=\sum_{q=0}^{p-1}((N_{pckts})_q)+1}^{\sum_{q=1}^{p}((N_{pckts})_q)} [L_r + L_{A-MSDU\_Hdr}] - [L_r + L_{A-MSDU\_Hdr}] \right\}$$

Calculations for $(T_{Mgmt})_{j, Tx}$ may be calculated. For no A-MSDU, no A-MPDU:

$$(T_{Mgmt})_{j,Tx} = \sum_{m=1}^{t_{max,j}} \sum_{k=\sum_{n=0}^{m-1}(N_{pckts})_n+1}^{((N_{pckts})_{Mgmt,j})_m} \left\{ \left[ \frac{L_k}{\rho_j} \right] + T_{Preamble+PHY\_Hdr+MAC\_Hdr} + T_{SIFS} + T_{ACK} + T_{SIFS} \right\}$$

For A-MSDU:

$$(T_{Mgmt})_{j,Tx} = \sum_{m=1}^{t_{max,j}} \sum_{k=\sum_{n=0}^{m-1}(N_{pckts})_n+1}^{((N_{pckts})_{Mgmt,j})_m} \left\{ \left[ \frac{L_k + L_{A-MSDU\_Hdr}}{\rho_j} \right] + T_{Preamble+PHY\_Hdr+MAC\_Hdr} + T_{SIFS} + T_{ACK} + T_{SIFS} \right\}$$

For A-MPDU:

$$(T_{Mgmt})_{j,Tx} = \begin{cases} \sum_{m=1}^{t_{max,j}} \left\{ \sum_{k=\sum_{n=0}^{m-1}(N_{pckts})_n+1}^{((N_{pckts})_{Mgmt,j})_m} \left[ \frac{L_k + L_{A-MSDU\_Hdr}}{\rho_j} \right] + T_{MAC\_Hdr} \right\} + T_{Preamble+PHY\_Hdr} + T_{SIFS} + T_{B-ACK} + T_{SIFS}, \\ \quad \text{if } t_{max}, j > 0 \\ 0, \quad \text{else} \end{cases}$$

After the polling period, channel time allocations may be determined. Channel time may be allocated to re-transmissions of semi-statically allocated data and/or excess semi-statically allocated data that may not be accommodated within the pre-defined channel time reservation. Channel time may be allocated to management frames. Channel time may be allocated to dynamically allocated data belonging to different QoS classes.

The baseline resource allocations may be determined per QoS, for example, based on pre-configured weights.

$$(T_{Q_i})_{baseline} = \frac{w_{Q_i}}{\sum_{j=1}^{Q_{max}} w_{Q_j}} \cdot T_{Dynamic}$$

Calculations to determine number of A-MSDUs (e.g., each A-MSDU may be limited to mAMSDUMaxSize):

For $0 < t \leq t_{max}$, where $t_{max} = \min_{t=1:\infty} t: ((N_{pckts})_{i,j})_t = 0$ and $$((N_{pckts})_{i,j})_0 = 0$$

For no A-MSDU, no A-MPDU:

$$((N_{pckts})_{i,j})_t = 1$$

For A-MSDU and A-MPDU:

$$((N_{pckts})_{i,j})_t = \max_{m=1:(N_{pckts})_{i,j}} m: \sum_{r=\sum_{n=1}^{m-1}(N_{pckts})_n+m}^{(N_{pckts})_{i,j}} [L_r + L_{A-MSDU\_Hdr}] \leq$$

-continued $$\min \left\{ mAMSDUMaxSize, \begin{array}{c} \sum_{r=1}^{(N_{pckts})_{i,j}} [L_r + L_{A-MSDU\_Hdr}] - \\ \sum_{p=1}^{m-1} \sum_{r=\sum_{q=0}^{p-1}((N_{pckts})_q)+1}^{\sum_{q=1}^{p}((N_{pckts})_q)} [L_r + L_{A-MSDU\_Hdr}] \end{array} \right\}$$

For no A-MSDU, no A-MPDU:

$$(T_{Q_{i,j}})_{requested,Tx} =$$

$$\sum_{m=1}^{t_{max}} \sum_{k=\sum_{n=0}^{m-1}(N_{pckts})_n+1}^{((N_{pckts})_{i,j})_m} \left\{ \left[ \frac{L_k}{\rho_j} \right] + T_{Preamble+PHY\_Hdr+MAC\_Hdr} + T_{SIFS} + T_{ACK} + T_{SIFS} \right\}$$

For A-MSDU:

$$(T_{Q_{i,j}})_{requested,Tx} = \sum_{m=1}^{t_{max,j}} \sum_{k=\sum_{n=0}^{m-1}(N_{pckts})_n+1}^{((N_{pckts})_{i,j})_m} \left\{ \left[ \frac{L_k + L_{A-MSDU\_Hdr}}{\rho_j} \right] + T_{Preamble+PHY\_Hdr+MAC\_Hdr} + T_{SIFS} + T_{ACK} + T_{SIFS} \right\}$$

For A-MPDU:

$$(T_{Q_{i,j}})_{requested,Tx} =$$

$$\begin{cases} \sum_{m=1}^{t_{max}} \left\{ \sum_{k=\sum_{n=0}^{m-1}(N_{pckts})_n+1}^{((N_{pckts})_{i,j})_m} \left[\frac{L_k + L_{A-MSDU\_Hdr}}{\rho_j}\right] + T_{MAC\_Hdr} \right\} + & \text{if } i = N_{QoS}, \\ T_{Preamble+PHY\_Hdr} + T_{SIFS} + T_{B-ACK} + T_{SIFS} & \text{and no management frames} \\ \\ \sum_{m=1}^{t_{max}} \left\{ \sum_{k=\sum_{n=1}^{m-1}(N_{pckts})_n+1}^{((N_{pckts})_{i,j})_m} \left[\frac{L_k + L_{A-MSDU\_Hdr}}{\rho_j}\right] + T_{MAC\_Hdr} \right\}, & \text{if } i = N_{QoS} \text{ and management frame present;} \\ & \text{or } i < N_{QoS} \end{cases}$$

$$(T_{Q_{i,j}})_{requested} = (T_{Q_{i,j}})_{requested,Tx} + (T_{Q_{i,j}})_{requested,Rx}$$

For no A-MSDU no A-MPDU, $$(T_{Q_{i,j}})_{requested,Rx}$$

may be calculated at the STA (e.g., $i$ is decremented from $N_{QoS}$ to 1):

$$(T_{Q_{i,j}})_{requested,Rx} =$$

$$\begin{cases} \sum_{m=1}^{t_{max}} \sum_{k=\sum_{n=0}^{m-1}(N_{pckts})_n+1}^{((N_{pckts})_{i,j})_m} \left\{ \left[\frac{L_k}{\rho_j}\right] + T_{Preamble+PHY_{Hdr}+MAC\_Hdr} + \right\}, \\ T_{SIFS} + T_{ACK} + T_{SIFS} + T_{Grant} + T_{SIFS} \end{cases}$$

for first non-zero queue, including management $$\sum_{m=1}^{t_{max}} \sum_{k=\sum_{n=1}^{m-1}(N_{pckts})_n+1}^{((N_{pckts})_{i,j})_m} \left[\frac{L_k}{\rho_j}\right] +$$

$$T_{preamble+PHY\_Hdr+MAC\_Hdr} + T_{SIFS} + T_{ACK} + T_{SIFS},$$

for subsequent non-zero queues

For A-MSDU, $$(T_{Q_{i,j}})_{requested,Rx}$$

may be calculated at the STA (e.g., $i$ is decremented from $N_{QoS}$ to 1):

$$(T_{Q_{i,j}})_{requested,Rx} =$$

$$\begin{cases} \sum_{m=1}^{t_{max}} \sum_{k=\sum_{n=0}^{m-1}(N_{pckts})_n+1}^{((N_{pckts})_{i,j})_m} \left\{ \left[\frac{L_k + L_{A-MSDU\_Hdr}}{\rho_j}\right] + \right. \\ \left. T_{Preamble+PHY_{Hdr}+MAC\_Hdr} + T_{SIFS} + T_{ACK} + \right. \\ \left. T_{SIFS} + T_{Grant} + T_{SIFS} \right\}, \end{cases}$$

for first non-zero queue, including management $$\sum_{m=1}^{t_{max}} \sum_{k=\sum_{n=1}^{m-1}(N_{pckts})_n+1}^{((N_{pckts})_{i,j})_m} \left[\frac{L_k + L_{A-MSDU\_Hdr}}{\rho_j}\right] +$$

$$T_{Preamble+PHY\_Hdr+MAC\_Hdr} + T_{SIFS} + T_{ACK} + T_{SIFS},$$

for subsequent non-zero queues

With A-MPDU, $$(T_{Q_{i,j}})_{requested,Rx}$$

may be calculated (e.g., $i$ is decremented from $N_{QoS}$ to 1):

$$(T_{Q_{i,j}})_{requested,Rx} =$$

$$\begin{cases} \sum_{m=1}^{t_{max}} \left\{ \sum_{k=\sum_{n=0}^{m-1}(N_{pckts})_n+1}^{((N_{pckts})_{i,j})_m} \left[\frac{L_k + L_{A-MSDU\_Hdr}}{\rho_j}\right] + T_{MAC\_Hdr} \right\} + \\ T_{Preamble+PHY\_Hdr} + T_{SIFS} + T_{B-ACK} + T_{SIFS} + T_{Grant} + T_{SIFS}, \end{cases}$$

for first non-zero queue, including management $$\sum_{m=1}^{t_{max}} \left\{ \sum_{k=\sum_{n=1}^{m-1}(N_{pckts})_n+1}^{((N_{pckts})_{i,j})_m} \left[\frac{L_k + L_{A-MSDU\_Hdr}}{\rho_j}\right] + T_{MAC\_Hdr} \right\},$$

for subsequent non-zero queues

Total channel time request for each QoS class may be given $$(T_{Q_i})_{requested} = \sum_{j=1}^{N_{STA}} (T_{Q_i,j})_{requested}$$

$$T_{Q_i} = \begin{cases} (T_{Q_i})_{requested}, & \text{if } (T_{Q_i})_{requested} \le (T_{Q_i})_{baseline} \\ \min\left\{T_{Dynamic} - \sum_{j=i+1}^{N_{QoS}} T_{Q_j} - \min\left(\sum_{j=1}^{i-1} (T_{Q_j})_{requested}, \sum_{j=1}^{i-1} (T_{Q_j})_{baseline}\right), (T_{Q_i})_{requested}\right\}, \\ & \text{if } (T_{Q_i})_{requested} > (T_{Q_i})_{baseline} \end{cases}$$

Resource may be split based on link quality for one or more QoS class.

$$(T_{Q_{i,j}})_{baseline} = \frac{\rho_j}{\sum_{m=1}^{N_{STA}} \rho_m} \cdot T_{Q_i}$$

$$T_{Q_{i,j}} = \begin{bmatrix} (T_{Q_{i,j}})_{requested}, \text{ if } (T_{Q_{i,j}})_{requested} \le (T_{Q_{i,j}})_{baseline} \\ \min\left\{(T_{Q_{i,j}})_{requested}, \left(\frac{T_{Q_i} - \sum_{k=1}^{j-1} T_{Q_{i,k}} - \sum_{k=j+1,(T_{Q_{i,k}})_{requested} \le (T_{Q_{i,k}})_{baseline}}^{N_{STA}} (T_{Q_{i,k}})_{requested}}{\frac{\rho_j}{\sum_{m=j,(T_{Q_{i,m}})_{requested} > (T_{Q_{i,m}})_{baseline}}^{N_{STA}} \rho_m}}\right)\right\}, \\ \text{if } (T_{Q_{i,j}})_{requested} > (T_{Q_{i,j}})_{baseline} \end{bmatrix}$$

$$(T_{Q_{i,j}})_{Tx} = \frac{(T_{Q_{i,j}})_{requested,Tx}}{(T_{Q_{i,j}})_{requested,Tx} + (T_{Q_{i,j}})_{requested,Rx}} \cdot T_{Q_{i,j}}$$

$$(T_{Q_{i,j}})_{Tx} = \max\left(\min\left(T_{Q_{i,j}} - (T_{Q_{i,j}})_{requested,Rx}, (T_{Q_{i,j}})_{requested,Tx}\right),\right.$$

$$\min\left(\frac{(T_{Q_{i,j}})_{requested,Tx}}{(T_{Q_{i,j}})_{requested,Tx} + (T_{Q_{i,j}})_{requested,Rx}} \cdot T_{Q_{i,j}},\right.$$

$$\left.\left.\frac{(T_{Q_{i,j}})_{requested,Tx} + (T_{Q_{i,j}})_{requested,Rx}}{2}\right)\right)$$

where, $(T_{Q_{i,j}})_{requested}$ may be channel time to transmit one or more en-queued packets for QoSi for $STA_j$.

$(T_{Q_i})_{baseline}$ may be channel time allocated for transmission of one or more packets belonging to $QoS_i$, for example, based on pre-determined weights.

$(T_{Q_{i,j}})_{baseline}$ may be channel time allocated for QoSi to $STA_j$, for example based on QoS weights and link quality. $T_{Dynamic}$ may be channel time remaining in SI for dynamic traffic allocation, for example, after allocations may be made for semi-static traffic and/or management frames.

For dynamically allocated data, the Queue Manager may calculate the number of packets to be transmitted from queues, for example, based on the Scheduler output and/or knowledge of MCS used on a link (e.g., for no A-MSDU, no A-MPDU):

$$((N_{pckts})_{i,j})_{Tx} = \max_{k=1:(N_{pckts})_{i,j}} k: \sum_{m=1}^{t_{max}} \sum_{k=\sum_{m=1}^{m-1}(N_{pckts})_n+1}^{((N_{pckts})_{i,j})_m} \left[\frac{L_k}{\rho_j}\right] +$$

$$T_{Preamble+PHY_{Hdr}+MAC\_Hdr} + T_{SIFS} + T_{ACK} + T_{SIFS} \le (T_{Q_{i,j}})_{Tx}$$

$$(T_{Q_{i,j}})_{Tx,actual} = \sum_{m=1}^{t_{max}} \sum_{k=\sum_{m=1}^{n-1}(N_{pckts})_n+1}^{\min\{((N_{pckts})_{i,j})_m, ((N_{pckts})_{i,j})_{Tx}\}} \left[\frac{L_k}{\rho_j}\right] +$$

$$T_{Preamble+PHY_{Hdr}+MAC\_Hdr} + T_{SIFS} + T_{ACK} + T_{SIFS}$$

$$(T_{Q_{i,j}})_{RX,actual} = T_{Q_{i,j}} - (T_{Q_{i,j}})_{Tx,actual}$$

$$(T_{Q_{i,j}})_{Rx,Grant} =$$

$$\begin{cases} \text{floor}\left((T_{Q_{i,j}})_{Rx,actual} - T_{Grant} - T_{SIFS}\right), & \text{for first non-zero queue, including managment} \\ \text{floor}\left((T_{Q_{i,j}})_{Rx,actual}\right), & \text{for subsequent non-zero queues} \end{cases}$$

For A-MSDU, the calculations may follow:

$$((N_{pckts})_{i,j})_{Tx} = \max_{k=1:(N_{pckts})_{i,j}} k: \sum_{m=1}^{t_{max}} \sum_{k=\sum_{n=1}^{m-1}(N_{pckts})_n+1}^{((N_{pckts})_{i,j})_m} \left[\frac{L_k + L_{A\text{-}MSDU\_Hdr}}{\rho_j}\right] +$$

$$T_{Preamble+PHY_{Hdr}+MAC\_Hdr} + T_{SIFS} + T_{ACK} + T_{SIFS} \le (T_{Q_{i,j}})_{Tx}$$

$$(T_{Q_{i,j}})_{Tx,actual} = \sum_{m=1}^{t_{max}} \sum_{k=\sum_{n=1}^{m-1}(N_{pckts})_n+1}^{\min\{((N_{pckts})_{i,j})_m, ((N_{pckts})_{i,j})_{Tx}\}} \left[\frac{L_k + L_{A\text{-}MSDU\_Hdr}}{\rho_j}\right] +$$

$$T_{Preamble+PHY_{Hdr}+MAC\_Hdr} + T_{SIFS} + T_{ACK} + T_{SIFS}$$

$$(T_{Q_{i,j}})_{Rx,acutal} = T_{Q_{i,j}} - (T_{Q_{i,j}})_{Tx,actual}$$

$$(T_{Q_{i,j}})_{Rx,Grant} =$$

$$\begin{cases} \text{floor}\left((T_{Q_{i,j}})_{Rx,actual} - T_{Grant} - T_{SIFS}\right), & \text{for first non-zero queue, including managment} \\ \text{floor}\left((T_{Q_{i,j}})_{Rx,actual}\right), & \text{for subsequent non-zero queues} \end{cases}$$

For A-MPDU, the calculations may follow:

$$((N_{pckts})_{i,j})_{Tx} = \begin{cases} \max_{k=1:(N_{pckts})_{i,j}} k: \sum_{m=1}^{t_{max}} \left\{ \sum_{k=\sum_{n=0}^{m-1}(N_{pckts})_n+1}^{((N_{pckts})_{i,j})_m} \left[\frac{L_k + L_{A\text{-}MSDU\_Hdr}}{\rho_j}\right] + T_{MAC\_Hdr} \right\} + \\ T_{Preamble+PHY_{Hdr}+MAC\_Hdr} + T_{SIFS} + T_{B\text{-}ACK} + T_{SIFS} \le (T_{Q_{i,j}})_{Tx}, \\ \text{for first non-zero queue, including management} \\ \max_{k=1:(N_{pckts})_{i,j}} k: \sum_{m=1}^{t_{max}} \left\{ \sum_{k=\sum_{n=1}^{m-1}(N_{pckts})_n+1}^{((N_{pckts})_{i,j})_m} \left[\frac{L_k + L_{A\text{-}MSDU\_Hdr}}{\rho_j}\right] + T_{MAC\_Hdr} \right\} \le (T_{Q_{i,j}})_{Tx}, \\ \text{for subsequent non-zero queues} \end{cases}$$

$$(T_{Q_{i,j}})_{Tx,acutal} = \begin{cases} \sum_{m=1}^{t_{max}} \left\{ \sum_{k=\sum_{n=1}^{m-1}(N_{pckts})_n+1}^{\min\{((N_{pckts})_{i,j})_m, ((N_{pckts})_{i,j})_{Tx}\}} \left[\frac{L_k + L_{A\text{-}MSDU\_Hdr}}{\rho_j}\right] + T_{MAC\_Hdr} \right\} +, \\ T_{Preamble+PHY\_Hdr} + T_{SIFS} + T_{B\text{-}ACK} + T_{SIFS} + T_{SIFS} \\ \text{for first non-zero queue, including management} \\ \sum_{m=1}^{t_{max}} \left\{ \sum_{k=\sum_{n=1}^{m-1}(N_{pckts})_n+1}^{\min\{((N_{pckts})_{i,j})_m, ((N_{pckts})_{i,j})_{Tx}\}} \left[\frac{L_k + L_{A\text{-}MSDU\_Hdr}}{\rho_j}\right] + T_{MAC\_Hdr} \right\}, \\ \text{for subsequent non-zero queues} \end{cases}$$

$$(T_{Q_{i,j}})_{Rx,actual} = T_{Q_{i,j}} - (T_{Q_{i,j}})_{Tx,actual}$$

$$(T_{Q_{i,j}})_{Rx,Grant} = \begin{cases} \text{floor}\left((T_{Q_{i,j}})_{Rx,actual} - T_{Grant} - T_{SIFS}\right), & \text{for first non-zero queue, including managment} \\ \text{floor}\left((T_{Q_{i,j}})_{Rx,actual}\right), & \text{for subsequent non-zero queues} \end{cases}$$

where, $((N_{pckts})_{i,j})_{Tx}$ may be the number of packets from QoSi queue of $STA_j$ that may be transmitted in the current dynamic traffic allocation.

$$(T_{Q_{i,j}})_{Tx,actual}$$

may be the actual channel time allocation for transmission froth queue for STA QoS j (Scheduler output).

$$(T_{Q_{i,j}})_{Rx,actual}$$

may be the actual channel time allocation for reception from queue for STA i, QoS j (e.g., Scheduler output).

$$(T_{Q_{i,j}})_{Rx,Grant}$$

may be the value (e.g., in microsec.) that may be used to fill Allocation Duration field in Dynamic Allocation Info. Information Element that may be contained in Grant frame transmitted to STA i. $T_{Grant}$ may be the time to transmit a Grant frame.

Figure 43:
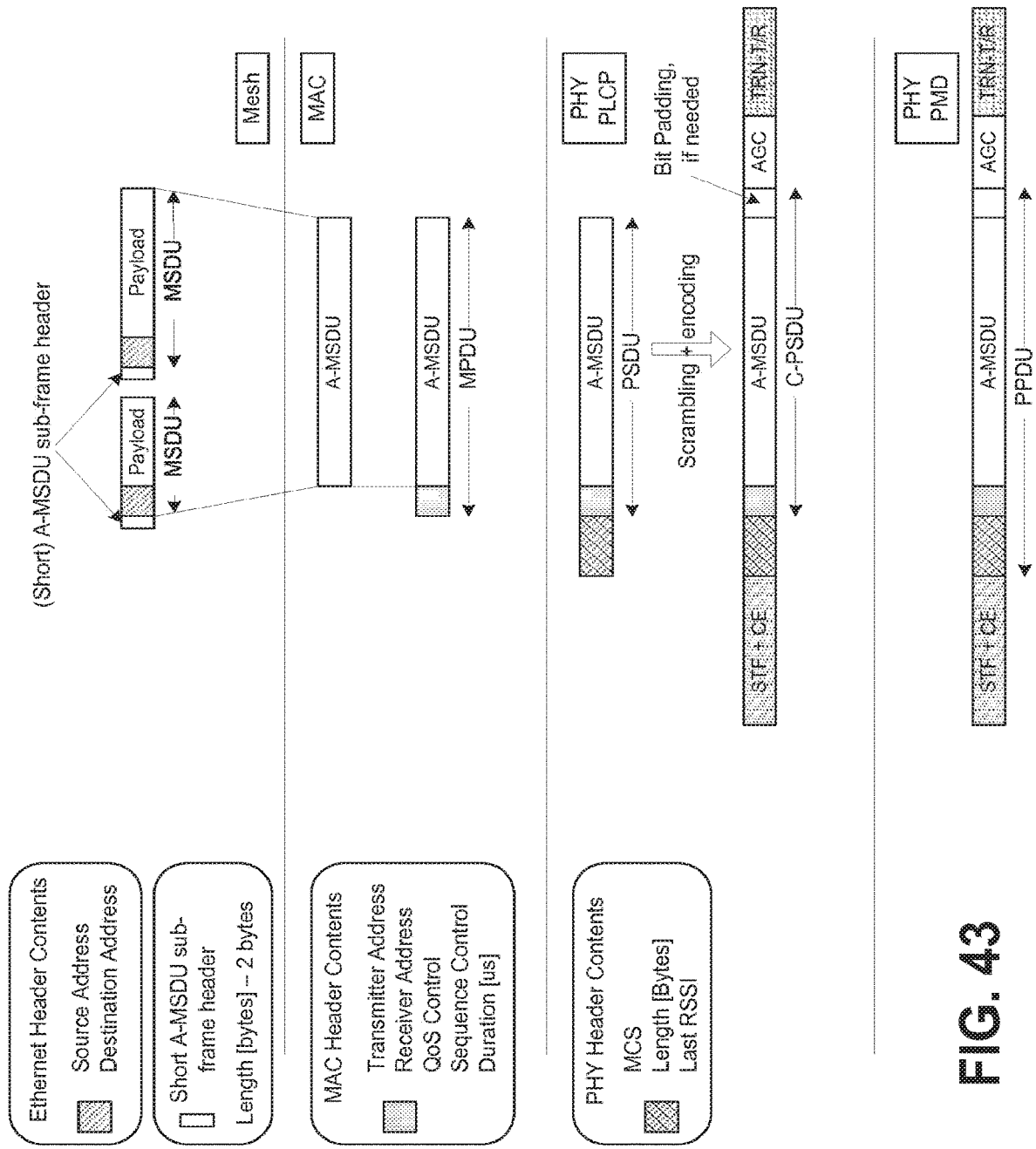
FIG. 43 is a diagram of example header formats.

FIG. 43 is an example header formats associated with protocol layers. The PHY/PLCP and MAC header formats may be similar to 802.11ad frames. Fields in one or more of the headers may be listed in FIG. 43. The payload arriving at the Mesh Layer from the access side may be encapsulated in the Mesh Header. The contents of the payload may be listed in FIG. 43. As shown in FIG. 43, multiple Mesh packets may be combined to form a Aggregated-MAC Service Data Unit (A-MSDU), for example, if mesh packets are forwarded to the next hop neighbor. Mesh packets may be treated as regular 802.11ad packets through the lower protocol layers. The Source and Destination Addresses in the Mesh Header may correspond to the MAC addresses of the mmH mesh node that may be originated in the packet and/or the final mmH mesh node destination.

Mesh packets (MSDUs) within an A-MSDU may be separated by a short A-MSDU sub-frame header, for example, including the length of the MSDU, by bytes. The size of this field may be 2 bytes.

TABLE 4 and TABLE 5 may list the Mesh Header fields for Data and Mesh Management frames.

TABLE 4

Mesh header contents for data frames

| Field | Size [bits] | Description |
|---|---|---|
| Source ID | 48 | Node ID of source mesh node |
| Destination ID | 48 | Node ID of destination mesh node |
| Packet type | 2 | 0: Mesh management |
| | | 1: Dynamically allocated data |
| | | 2: Semi-statically allocated data |
| | | 3: Reserved |
| QoS | 4 | QoS class |

TABLE 5

Mesh header contents for mesh management frames

| Field | Size [bits] | Description |
|---|---|---|
| Source ID | 12 | Node ID of source mesh node |
| Destination ID | 12 | Node ID of destination mesh node |
| Packet type | 2 | 0: Mesh management |
| | | 1: Dynamically allocated data |
| | | 2: Semi-statically allocated data |
| | | 3: Reserved |
| Management Sub-type | 8 | Mesh management message classification |

Short A-MSDU sub-frame headers may be appended to mesh data packet, for example, before aggregation to form an MPDU.

TABLE 6 may show an example header contents for data frames.

TABLE 6

MAC Header contents for data frames

| Field | Size [bytes] | Notes |
|---|---|---|
| Frame Control | 2 | Retry = 1 for retransmission attempts; To DS = 0/1 and From DS = 1/0 for downlink and uplink traffic; For Mesh Management frames may use Type: 0, Sub-type: 13, Category (See Error! Reference source not found.): 126 (Vendor-specific Protected Action frame); for other MAC Management/Control frames may use other values. |
| Duration/ID | 2 | |
| Address 1 | 6 | Receiver Address |
| Address 2 | 6 | Transmitter Address |
| Address 3 | 6 | BSSID |
| Sequence Control | 2 | |
| QoS Control | 2 | |
| Frame Body | 0-7920/ 7935 | MSDU/A-MSDU |
| FCS | 4 | |

TABLE 7 may shows an example of header contents for data frames.

TABLE 7

MAC Header contents for management frames

| Field | Size [bytes] | Notes |
|---|---|---|
| Frame Control | 2 | Retry = 1 for retransmission attempts; To DS = 0/1 and From DS = 1/0 for downlink and uplink traffic; Rest of the fields can be set to 0. |
| Duration/ID | 2 | |
| Address 1 | 6 | Receiver Address |
| Address 2 | 6 | Transmitter Address |
| Address 3 | 6 | BSSID |
| Sequence Control | 2 | |
| Frame Body | 0-2320 | |
| FCS | 4 | |

At the mesh level, frames may be classified into one or more QoS classes. QoS classes may include management, semi-statically scheduled data, and/or dynamically scheduled data, etc. The management class may include Mesh Management and/or MAC Management frames. TABLE 4 may include the adopted numbering scheme for the QoS classes. The numbering scheme may be similar to the numbering scheme used for 802.11 Access Category Index (ACI).

TABLE 8

QoS classes

| Type | QoS Class | Description |
| --- | --- | --- |
| MANAGEMENT | N/A | Management frames may include Mesh Management and/or 802.11ad MAC Management frames. This class may have higher transmission priority than EIR traffic. Multiple QoS classes may not be available for management frames. |
| SEMI_STATIC | $[0 - N_{SSQMax} - 1]$ | Semi-statically scheduled data may correspond to CIR data. Data belonging to this QoS class may be scheduled for transmission first in each Scheduling Interval, and/or corresponding resources may be guaranteed. |
| DYNAMIC | $[0 - N_{DynQMax} - 1]$ | Dynamically scheduled data may correspond to EIR data. Any remaining time available in a Scheduling Interval may be made available for transmission of data belonging to these QoS classes. The QoS classes may be prioritized according to their indices. |

Figure 44:
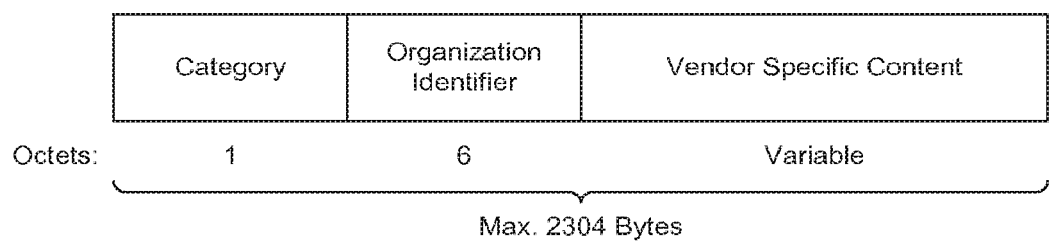
FIG. 44 is a diagram of an example vendor-specific action frame format.

Mesh management frames may be transmitted as vendor-specific action frames. FIG. 44 is an example vendor-specific action frame format. Category value may be 126 for Vendor-specific Protected type or 127 for Vendor-specific type. Organization Identifier may include FF-FF-FF (e.g., hex). Mesh management frame and/or mesh headers may be contained within a field (e.g., third field) in the frame.

An MSDU may be partitioned into smaller MAC level frames. MPDUs may be referred to as Fragmentation or segmentation. Fragmentation may create MPDUs smaller than the original MSDU length, for example, to fit the data into the available scheduled service period. Retransmissions may be given priority that may be higher than new transmissions. An MSDU may be fragmented. MPDUs may be recombined into a single MSDU. MPDUs recombined into a single MSDU may be referred to as defragmentation or re-assembly. Defragmentation may be accomplished at one or more immediate recipient (e.g., one or more hop). Re-assembly may follow the standard mechanisms defined in IEEE 802.11AD specification. MAC layer at one or more intermediate mesh node may deliver complete packet (e.g., only complete packet) to the mesh layer. The received fragment may be buffered until one or more fragments that make up the packet may be received. Retransmission may be performed hop by hop using procedures defined in IEEE 802.11AD specification.

Reordering may be the process of delivering the packets in sequence to the higher layers. In the mesh network, the reordering may be performed end-to-end. End-to-End may mean the mesh egress point and/or the actual destination mesh node. For packets sent from the mesh node to the gateway, the reordering may be performed at the gateway node. For packets sent from leaf node to leaf node (e.g., X2 traffic) and/or from gateway to the leaf node, the reordering may be done at the destination leaf node. To enable reordering functionality the gateway and/or destination, mesh nodes may buffer the packets, for example, until in-sequence packets may be received. A mesh header may be added to one or more MSDU. A mesh header may include the sequence number and/or the source and/or destination address. The end nodes may maintain a source and/or flow context of a last missing sequence number and/or reordering timer, etc., to perform reordering. Upon reordering timer expiry, the end node may deliver the held packets (e.g., waiting for missing sequence number) to the upper layer.

Performing reordering end-to-end may yield reduced latency, for example, compared to hop-by-hop reordering. In end-to-end reordering, out of sequence packet arrival may not delay packets to be forwarded in the intermediate hops. If block ACK is not enabled, packets may arrive in order in each hop. Route changes may affect reordering functionality. If a flow is switched to a different route due to route update, the packet buffered in the intermediate nodes may be lost and/or the source may re-establish the flow again. The route update may involve gateway change. The source gateway may receive the packets buffered in the intermediate nodes and/or the packets may be reordered outside the mesh (e.g., higher layers) with the packet received from the new gateway.

The reordering functionality may be optional. The reordering functionality may be disabled. In the absence of reordering functionality, the packet reordering may occur in the higher layer, for example, at the GTP layer (e.g., for LTE backhaul) or at the TCP layer. Absence of reordering functionality in the mesh layer may allow for data packets to be sent without a mesh header, for example, if source and/or destination addresses may be added as a part of MAC header. When reordering functionality is pushed to higher layers, the data loss due to route changes may be avoided.

MAC level aggregation may be employed. MAC level aggregation may mean that individual MAC PDUs (MPDUs) may be combined and/or transmitted as a PHY-layer PDU (PDU), for example, with a MAC Header and/or FCS. The MAC level aggregation may be adopted in uplink (e.g., STA to PCP) and/or downlink (e.g., PCP to STA) directions. A PPDU may include packets from different QoS classes. One or more MPSUs may be acknowledged (e.g., individually) using the Block ACK One or more MPDUs may include Multiple packets from the same or similar queue. One or more MPDU may be an Aggregated MSDU (A-MSDU). MSDUs may not be individually acknowledged. MSDUs may not have their own FCS.

Figure 45:
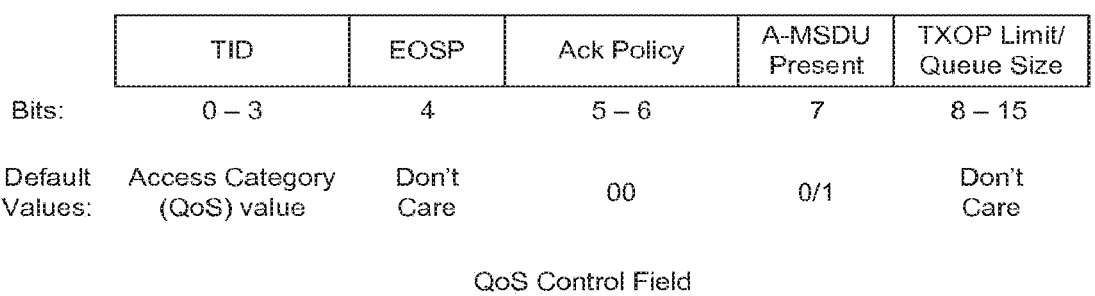
FIG. 45 is a diagram of an example medium access control (MAC) Header sub-field values (for QoS Control field) for Block acknowledgement (ACK).

Multi-TID Block ACK variant of Block ACK may be used. For Block ACK, certain values may be used in the MAC Header sub-fields, for example, in the QoS Control field. FIG. 45 is an example MAC Header sub-field values (for QoS Control field) for Block ACK. The QoS Control field may be present in one or more MAC Header.

Figure 46:
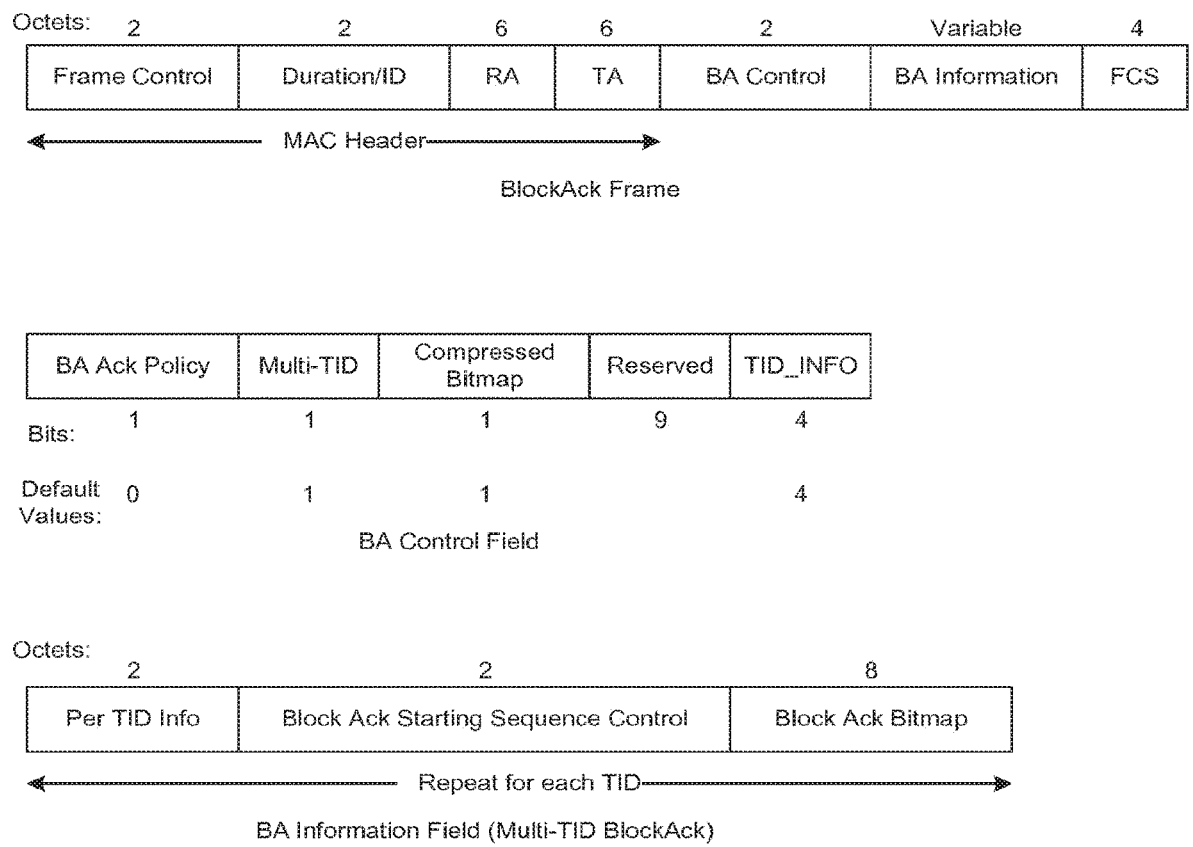
FIG. 46 is a diagram of an example BlockAck frame.

FIG. 46 is an example BlockAck frame. FIG. 46 depicts example details of the BlockAck frame, its various fields and the default sub-field values for the present configuration. The TID_INFO subfield of the BA Control field of the Multi-TID BlockAck frame may include the number of TIDs, less one, for which information may be reported in the BA Information field. For example, a value of 2 in the TID_INFO subfield may mean that the information for three TIDs may be present.

The BA Information field of the Multi-TID BlockAck frame may comprise one or more instances of the Per TID Info, Block Ack Starting Sequence Control, and/or the Block Ack Bitmap subfields.

The Starting Sequence Number subfield of the Block Ack Starting Sequence Control subfield may be the sequence number of the first MSDU and/or the A-MSDU for which BlockAck frame may be sent. The Block Ack Bitmap subfield of the BA Information field of the Multi-TID BlockAck frame may include an 8-octet Block Ack bitmap. One or more bit that may be equal to 1 in the Block Ack bitmap may acknowledge the reception of a single MSDU or A-MSDU, for example, in the order of sequence number with the first bit of the Block Ack bitmap corresponding to the MSDU or A-MSDU with the sequence number that may match the value of the Starting Sequence Number subfield of the Block Ack Starting Sequence Control subfield.

Figure 47:
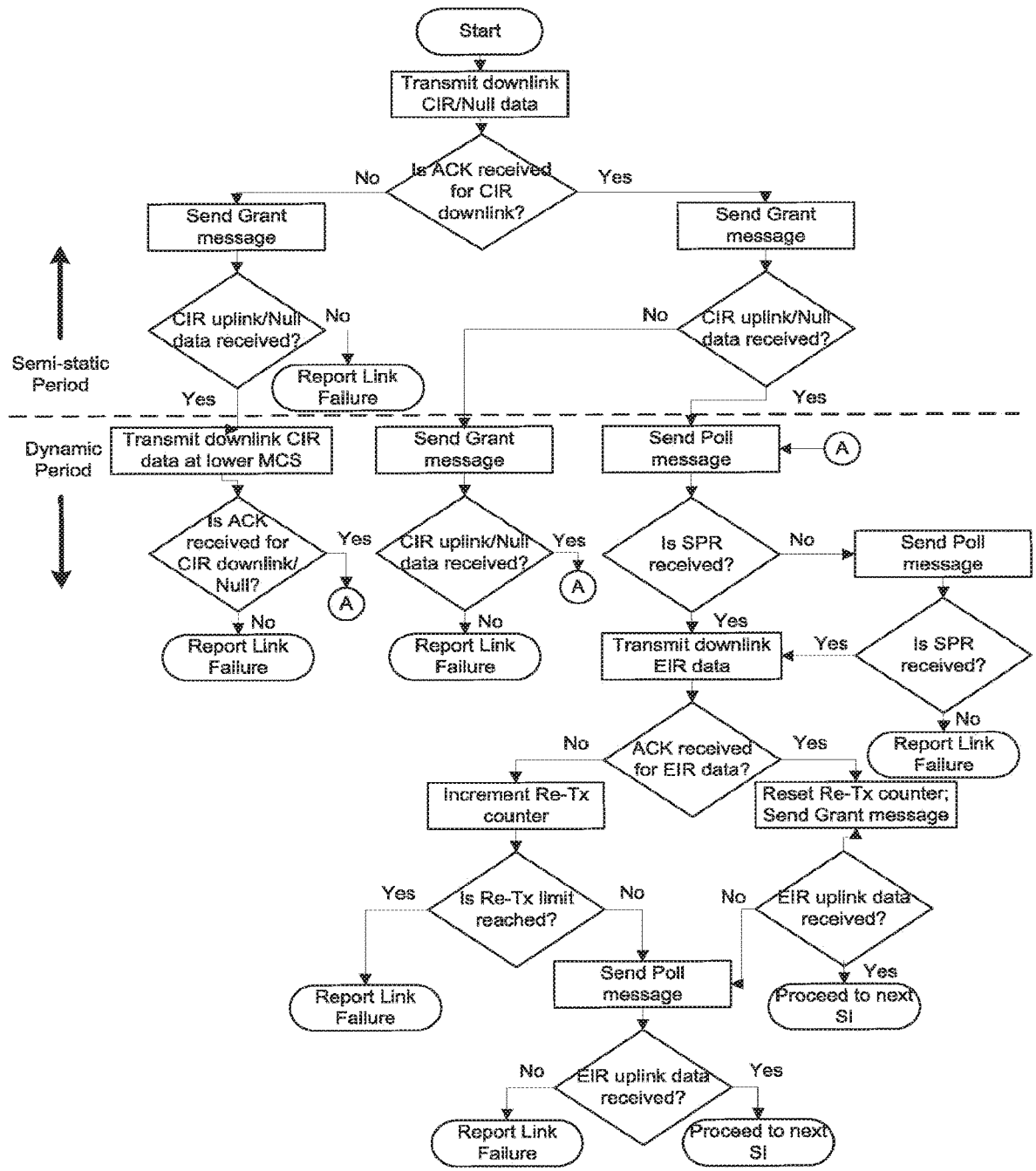
FIG. 47 is a flow chart of an example link failure detection at the PCP MAC.
Figure 48:
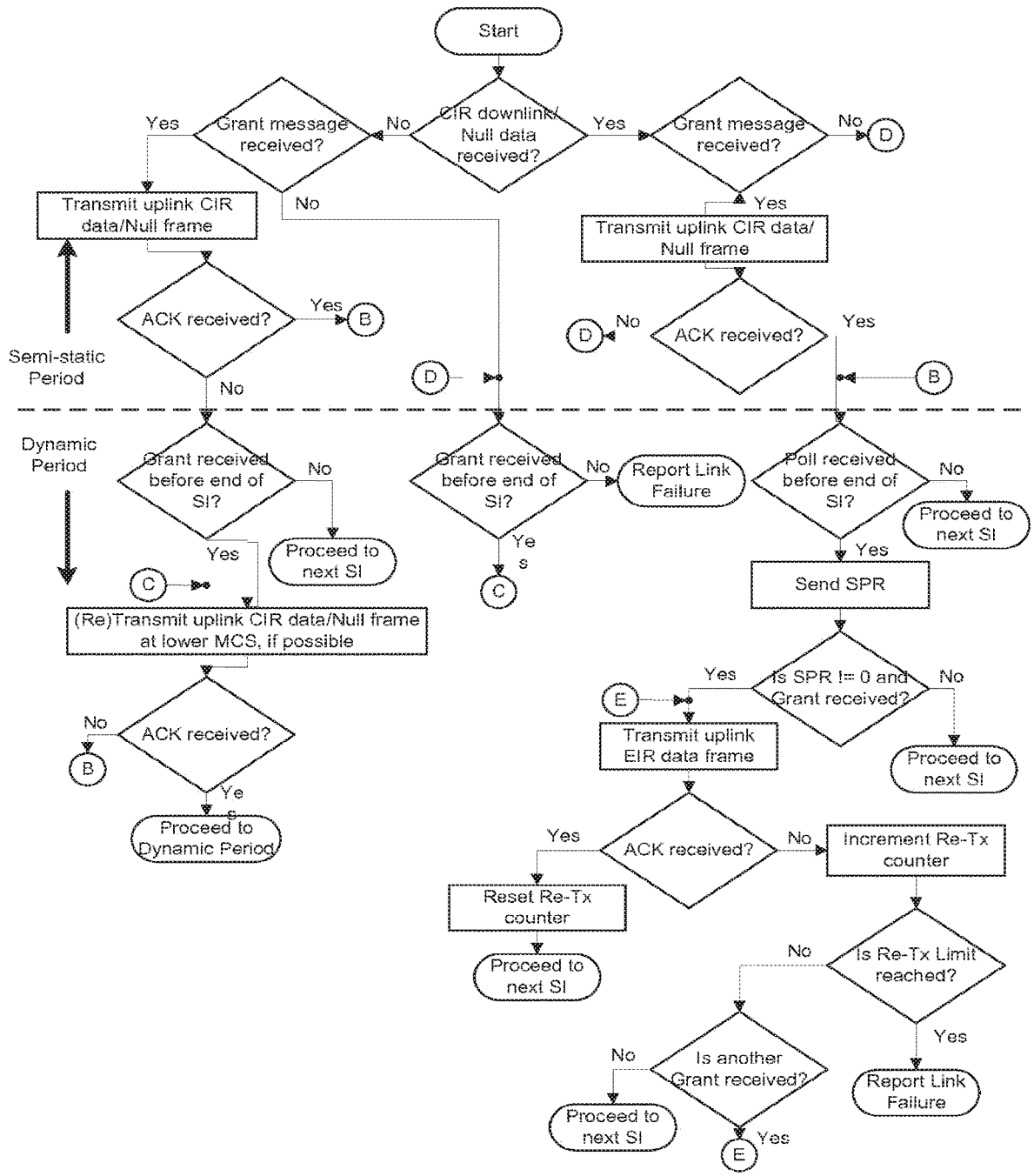
FIG. 48 is a flow chart of an example link failure detection at the STA MAC.

FIG. 47 is an example link failure detection at the PCP MAC. FIG. 48 is an example link failure detection at the STA MAC. FIG. 47 depicts the decision tree for link failure detection by the local MAC in a particular sector operating as a PCP and FIG. 48 depicts the decision tree for a STA sector. Link failure may be reported by the MAC after one or more successive failures in receiving Grant and/or data in response to Grant message within a SI. A trigger for link failure report may occur when transmissions of EIR data fail for mMaxRetryLimit times, for example, as indicated by failure to receive ACKs. Link failure may be indicated to the Mesh Layer via the Mesh-Link-Report.indication and/or the MLME-LINK-REPORT.indication messages using a predefined throughput value.

Figure 49:
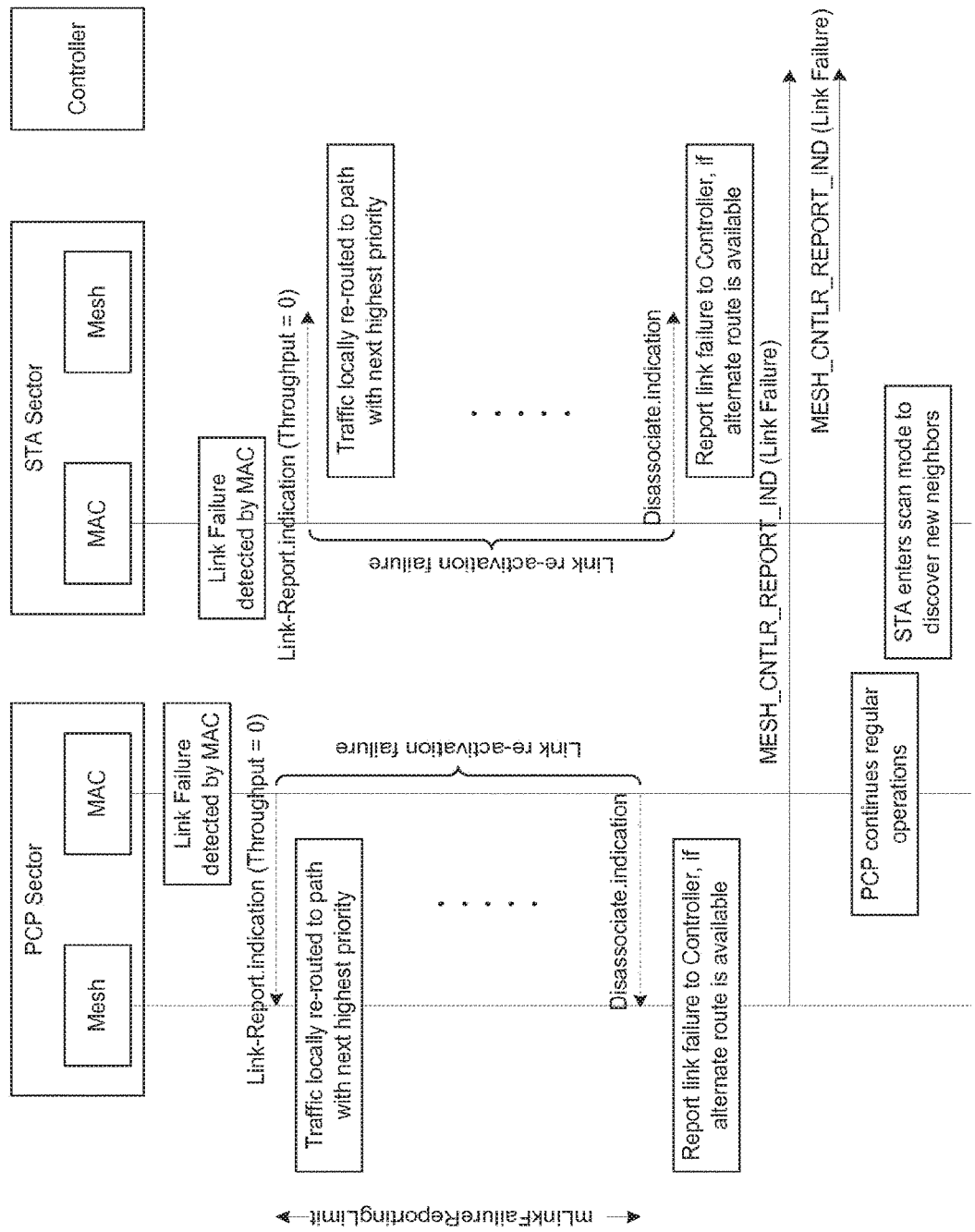
FIG. 49 is a diagram of an example link failure handling by Mesh Layer.

FIG. 49 is an example link failure handling by Mesh Layer. Link failures may be reported by the MAC to the Mesh Layer. Link failures that may be reported include, but are not limited to, temporary link failure and/or permanent link failure. Temporary Link Failure may be triggered by transmission failure and/or polling failure, for example as described herein for PCP or STA. Temporary link failure may be reported by the MAC by setting the Throughput field to 0 in the Link-Report.indication message. The Mesh Layer may re-route existing data packets that may use the affected link in the next hop to another link that may have the next highest priority. The MAC may attempt to transmit the packets in its EIR queues to the mMaxRetryLimit a number of times, for example, before discarding the packets.

After reporting Temporary Link Failure condition to the Mesh Layer, the MAC may continue to monitor the link quality for nLinkFailureReportingLimit amount of time. During this time, the PCP MAC may transmit packets remaining in its EIR queues for the affected STA. The PCP MAC may send poll frames, for example, at least one or more mMaxPollingDelay interval. A PCP polls its STAs in one or more SI. Polling for STAs may be skipped in an Sis, for example, to accommodate higher priority data transmissions. The PCP may ensure that one or more associated STA may be polled at mMaxPollingDelay interval. If a PCP MAC does not receive an ACK for any of its downlink data transmissions or does not receive an SPR frame in response to a Poll for mLinkFailureReportingLimit amount of time, the PCP MAC may disassociates with the STA and/or may report Permanent Link Failure to the Mesh Layer via Disassociate.indication message. If the STA MAC fails to receive a Poll frame for mLinkFailureReportingLimit amount of time after reporting Temporary Link Failure to its local Mesh Layer, the STA may disassociate with the PCP and report this to the Mesh Layer by sending a Disassociate.indication message.

At the Mesh Layer, the receipt of Permanent Link Failure report via the Disassociation.indication message from the local STA or PCP MAC may trigger a Link Failure report transmission to the. Controller. The Permanent Link Failure report may be carried using the MESH_CNTLR_REPORT_IND message between the Mesh Layer and/or the Controller.

After disassociation, the PCP sector may operate as it operated previously and/or may communicate with itsother associated STAs within the PBSS. The disassociated STA may enter scan mode to discover neighboring mesh nodes. Default values for the timeout parameters may be described herein. Link failure may influence the choice of values.

A PCP MAC may communicate (e.g., periodically) the status of its transmissions to one or more associated STAs to the Mesh Layer. Transmission status reporting may be configured by the Mesh Layer using Transmission_Status_Reporting_Config.request messages. The status of the configuration change may be reported by the Transmission_Status_Reporting_Config.confirm message from the MAC. The Mesh Layer may configure the reporting per STA and/or per queue. The reporting periodicity and/or start times may be included in the configuration message.

The MAC may report the values for the STAs and/or queues configured by the Mesh Layer at the times using Transmission-Status-Reporting.indication message. The report may consist of (e.g., possibly one or more copies of) the Channel Utilization element and/or the Transmission Attempt element. One or more Channel Utilization element may include the average channel time allotted for an STA and QoS, for example, separately for uplink and downlink directions. One or more report may include one or more (e.g., up to two) Transmission Attempt elements per associated STA. One of the elements may contains the average number of transmission attempts for CIR data frames addressed to a particular STA and/or the average number of dropped packets. Other elements may include corresponding values for EIR data packets. One or more values may be averaged over the time since the last report transmission to the Mesh Layer.

The functions performed by the Mesh Controller may include neighbor selection, route selection including route failure handling, and/or interference measurement and management, etc. The mesh network topology may be represented as a Graph G(V,E), for example, with the mesh nodes as vertices and the links between mesh nodes as edges. Different MAC sectors within the same mesh node may be represented by sub-vertices within the vertex (e.g., mesh node).

The inputs may include, but are not limited to, G(V,E), AvaiCAP, AllocEIR per QoS, AllocCIR per QoS AllocINTF, AvaiCIRCAP, AvePacket_Delay(QoS) on each Edge. AvaiCAP may be the available capacity (e.g., average unused (free) time in a service period) from a PCP point of view. AvaiCAP=Scheduling_Interval—QoS)—AllocINTF—AllocEIR(All QoS). AllocEIR(QoS) may be allocated EIR resources for a given QoS (e.g., average allocated EIR time in a service period for the given QoS) for a particular link. AllocCIR(QoS) may be allocated OR resources for a given QoS (e.g., allocated CIR time in a service period for given QoS) for a particular link. AllocCIR_BKUP(QoS) may be backup CIR resources allocated for a given QoS on a particular link. AllocINTF may be resources that may be forbidden for use in a service period as a part of interference management (e.g., in terms of time per service period). AvaiCIRCAP may be the available free time for CIR transmission. AvaiCIRCAP may equal MaxCIR—AllocClR(All QoS)—AllocINTF. The SLA for one or more QoS constraints for small cell (MaxHOPs, MinCAP=(CAP_UL+CAP_DL)), MinCAP may be converted into time per service period considering the MCS of the link. The network level parameter may equal the Virtual_Mux_Factor conditioned on the network load. The MaxCIR may be the maximum amount of time per service period that may be allocated for CIR traffic.

Centralized routing and neighbor selection for new node may be performed. For one or more QoS_in QoS with CIR configuration, the source node may be choosen as new node and/or destination as a set of closest gateway nodes (e.g., d1,d2,d3 . . . dg), the CIR_Path(QoS_in) may equal Find_CIR_Path (G,QoS_in, Source(=s), Destination(=d1,d2 . . . dg)), the CIR resources on the CIR_Path(QoS_in) may be reserved, AllocCIR (QoS_in) may be incremented by MinCAP for one or more edge in the CIR_Path, AllocINTF may be incremented by MinCAP for one or more edge in the interference zone for one or more edge in the CIR_Path, backup_CIR_Path_list(QoS_in) may equal Find_Backup_CIR_Paths (e.g., G,CIR_Path(QoS_in), Source, Destination), AllocCIR_BKUP(QoS_in) may be incremented by MinCAP, for one or more edge in one or more path returned in Backup_CIR_Path_list(QoS_in), duplicates may be ignored if the edge has a reservation (e.g., either active or backup) for the active CIR path(QoS_in).

For one or more QoS_in in QoS with FIR configuration without CIR, the source node may be choosen as new node and/or destination as set of closest gateway nodes. (e.g., d1,d2,d3 . . . dg), EIR_Path(QoS_in) may equal Find EIR_Path (e.g., G,QoS_in, Source(=s), Destination(=d1,d2 . . . dg)), Backup_EIR_Path_list(QoS_in) may equal Find_Backup_EIR_Paths (e.g., G,CIR_Path(QoS_in), Source, Destination).

The Association config may be filled for one or more sub-vertex in source node s with assigned edge (e.g., for either Pda or one of Pnb), the peer sub-vertex may be assigned as the PCP node, other sub-vertexes may be promoted to PCP.

The forwarding table config may include for one or more path in (CIR_Path(All QoS), Backup_CIR_Path(All QoS)) for one or more vertex in the path, adding on the incoming edge a matching rule for destination node mac address and the action as forward to peer MAC address on the outgoing edge and/or adding on the outgoing edge a matching rule for the source mac address and the action as forward to the peer MAC address on the incoming edge.

Route failure handling may be performed Using. Input: Failed_link. If the failed link is removed from the graph, the route failure handling may end. If the failed link is not removed from the graph, the route failure handling may continue. The set of source, destination pairs may be identified using the failed link from the edge context. The CIR, Backup_CIR allocation corresponding to the source, destination pairs may be removed using the failed link. The failed link may be removed from the graph. For all the source, destination pairs, for one or more QoS_in in QoS with CIR configuration (e.g., in the order of decreasing priority), the source node may be choosen as a new node and destination as set of closest gateway nodes (e.g.,d1,d2,d3 . . . dg), the set may have the destination node d1 for non-gateway destination, the CIR_Path(QoS_in) may equal Find_CIR_Path (G,QoS_in, Source(=s), Destination(=d1,d2 . . . dg)), the CIR resources on the CIR_Path(QoS_in) may be reserved, AllocCIR (QoS_in) may be incremented by MinCAP for one or more edges in the CIR_Path, AllocINTF may be incremented by MinCAP for one or more edge in the interference zone for one or more edges in the CIR_Path, Backup_CIR_Path_list(QoS_in) may equal Find_Backup_CIR_Paths (G,CIR_Path(QoS_in), Source, Destination), AllocCIR_BKUP(QoS_in) may be incremented by MinCAP for one or more edges in one or more patties returned in Backup_CIR_Path_list(QoS_in), duplicates may be incremented if the edge has a reservation (e.g., either active or backup) for the active CIRpath(QoS_in). For one or more QoS_in in QoS with EIR configuration without CIR, the source node may be choosen as new node and destination as set of closest gateway nodes (e.g., d1,d2,d3 . . . dg), the EIR_Path (QoS_in) may equal Find_EIR_Path (G,QoS_in, Source (=s), Destination(=d1,d2 . . . dg)), the Backup_EIR Path_list (QoS_in) may equal Find_Backup_EIR_Paths (G, CIR_Path(QoS_in), Source, Destination). Forwarding table config may include CONFIG_SETUP message(s) formed with the forwarding table config, the path(s) may be removed according to CIR, Backup_CIR allocation corresponding to the source, destination pairsusing the failed link, a matching rule may be added on the incoming edge for destination node mac address and the action as forward to peer MAC address on the outgoing edge for one or more vertex in the path for one or more path in (CIR_Path(All QoS), Backup_CIR_Path(All QoS)), on the outgoing edge a matching rule may be added for the source mac address and the action as forward to the peer MAC address on the incoming edge for one or more vertex in the path for one or more path in (CIR_Path(All QoS), Backup_CIR_Path(All QoS)).

CIR_Path (G,QoS_in, Source(=s), Destination(=d1, d2 . . . dg)) may be found. Pruning State 1 (Input: G and MinCAP(QoS_in), Output: Sub-graph SG1)

lf(s==new node)

For each Edge from s, prun E's with corresponding sub-vertex degree=3 Pruning Stage 2 (Input: SG1 and MinCAP(QoS_in), Output: Sub-graph SG2)

Prim E's with (AvaiCIRCAP<MinCAP(QoS_in)) Pruning Stage 3 (Input SG2 and Virtual_Mux_Factor, Output: Sub-graph SG)

Prun E's with (AllocCIR_BKUP(All QoS)>Virtual_Mux_Factor*(AllocEIR(all QoS)+AvaiCAP))

The cost metric for shortest path may be set as AvePacket_Delay(QoS)

In the graph SG, for one or more di in (d1,d2,d3 . . . dg), with source node as s, the Dijkstra may be run using priority queue (e.g., heap structure) with constraints. The contraints may include for one or more edge E added to the final path, NumHops<MaxHOPs, and/or for one or more edge E added to the final path, one or more edges in the interference zone of F may have AvaiCIRCAP>=MinCAP(QoS_in). The paths returned by Dijkstra may be added to Pdi. The paths Pdi may be sorted based on max of min (AvaiCIRCAP) for one or more path. If there is tie, criteria may be used in sequence until a winner is determined. The criteria may include path with min of max(AllocINTF) path with min of max(AllocEIR(All QoS)), path with min of max(AllocCIR_BKUP (All QoS)), a path choosen in random. The top path may be returned in Pdi.

The Backup_CIR_Paths (G,Pda, Source, Destination) may be found. From the active path Pda, n may be made as the source node. In the Path Pda, one or more predecessors of n may be pruned. The n→next_vertex in the path may be pruned. Find_CIR_Path (G,QoS_in, S, D) may be found (e.g., skip step:b, step: e.i.2). If a path is found and if vertex n→next vertex fails, the path may be treated as the backup path Pnb. If a path is found, the path Pub may be added to Pnbl list. If a path is found and if n is new node, one or more other edges from the sub-vertex which do not correspond to Pnb may be pruned. If the path is not found, the edge in the Pda connecting n and its next vertex in path may be pruned. If the path is not found, Find_CIR_Path (G,QoS_in, S, D)

(e.g., skip step:b, step: e.i.2). If path found after the path was not found, the path maybe treated as the backup path Pnb, if link from vertex n fails. If path found after the path was not found, the path Pnb may be added to Pnbl list. If path found after the path was not found, if n is new node, one or more other edges from the sub-vertex which do not correspond to Pnb may be pruned. If n is the destination node, then return list of Pnbl, else n=n→next vertex in the path Pda. In the Path Pda, one or more predecessors of n may be pruned. The process may be repeated.

_EIR_Path (G QoS_in, Source(=s), Destination(=d1, d2 . . . dg)) may be found. Pruning State 1 (Input: G and MinCAP(QoS in), Output: Sub-graph SG1)

If(s==new_node)
For each Edge from s, prun E's with corresponding sub-vertex degree=3 Pruning Stage 2 (Input: SG1 and MinCAP(QoS_in), Output: Sub-graph SG2)
Prun E's with (AvaiCAP+AllocEIR(QoS<QoS_in)) <MinCAP(QoS_in)
The cost metric for shortest path may be set as AvePacket_Delay(QoS).

In the graph SG, for one or more di in (d1,d2,d3 . . . dg), with source node as s, the Dijkstra may be run using priority queue (e.g., heap structure) with constraints. The constraints may include that for one or more edge E added to the final path, NumHops<MaxHOPs. The paths returned by Dijkstra may be added to Pdi. The paths Pdi may be sorted based on max of min (AvaiCAP) for each path. If there is tie, criteria may be used in sequence until the winner is determined. The criteria may include path with min of max(AllocEIR (QoS<QoS_in)), path with min of max(AllocCIR_BKUP (All QoS)), path with min of max(AllocCIR(All QoS)), a path may be choosen in random. The top path in Pdi may be returned.

The_Backup_EIR_Paths (G,Pda, Source, Destination) may be found. From the active path Pda, n may be made as the source node. In the Path Pda, one or more predecessors of n may be pruned. The n→next_vertex in the path may be pruned. _EIR_Path (G,QoS_in, S, D) may be found. If path is found, the path may be treated as the backup path Pnb, if vertex n→next_vertex fails. If path is found, the path Pnb may be added to Pnbl list. If the path is found and if n is new node, one or more other edges from the sub-vertex which do not correspond to Pnb may be pruned. If the path is not found, the edge in the Pda connecting n and its next vertex in path may be pruned. If the path is not found, _EIR_Path (G,QoS_in, S, D) may be found. If path found after not being found, the path may be treated as the backup path Pnb, if link from vertex n fails. If path found after not being found, the path Pnb may be added to Pnbl list. If path found after not being found and if n is new node, one or more other edges from the sub-vertex which do not correspond to Pnb may be pruned. If n is the destination node, then return list of Pnbl, else n=n→next vertex in the path Pda. In the Path Pda, one or more predecessors of n may be pruned. The process may be repeated.

Mesh synchronization may be performed. IEEE 802.11 specifications may include procedures for an AP/PCP and/or associated STAs within a BSS/PBSS to remain synchronized. Mutually drifting clocks may make it difficult to maintain network-wide synchronization when multi-sectored nodes may be used. For network-wide synchronization, one or more sectors within a multi-sectored node may be synchronized.

Figure 50:
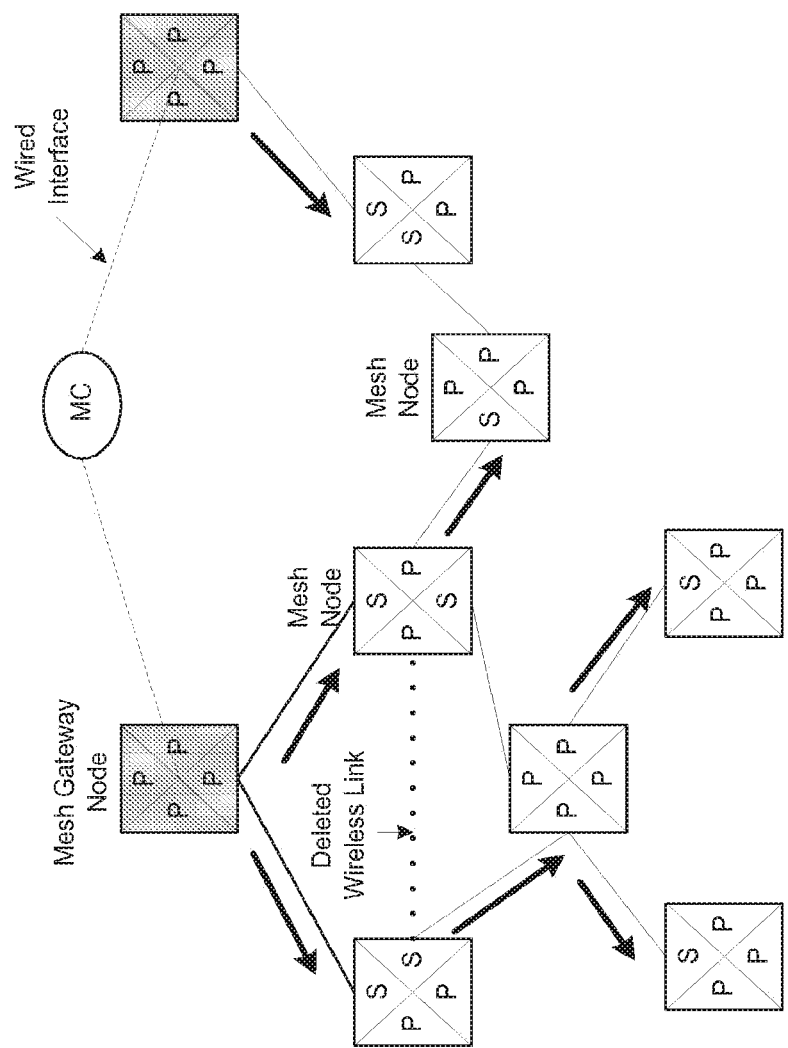
FIG. 50 is a diagram of an example time distribution tree.

FIG. 50 is an example time distribution tree. FIG. 50 depicts an example topology and the clock hierarchy for time distribution in a mesh network with multi-sectored nodes. A Master Clock (MC) may be at the top of the hierarchy. An MC may be situated at a central location (e.g., from a network control perspective). An MC may be connected to GW Mesh Nodes via wired links, such as over the internet. An MC may have an accuracy of $10^{-11}$. The accuracy of the MC being $10^{-11}$ may mean that a clock with this accuracy may be off by a second from the correct time every $10^{11}$ seconds (e.g., 3,172 years). An MC may be generated from a cesium (e.g., atomic) clock and/or from cesium clock-controlled radio signals, such as Global Positioning system (GPS), or another satellite based navigation system.

The MC may provides periodic timing messages to the GW Mesh Nodes. Periodic timing message may ensure that one or more GW nodes may share a common reference clock. The timing distribution tree may be used to distribute the timing reference to one or more Mesh nodes. The topology and/or direction of timing flow may be determined when a new node joins the network. When the timing flow may be determine, one of the sectors within the node may be designated as an Intra-Node Master and/or the other sectors may become Intra-node slaves. There may be a single master and/or multiple slaves per mesh node. The Intra-node timing master may derive the timing reference from one of the neighboring sectors to which the intra-node timing master may be connected. The timing reference may be the neighbor sector. The timing reference may be referred as Local Timing Source for the particular link. The timing flow determination may be made when the node joins the network. The timing flow determination may be maintained. The intra-node master may be an STA or a PCP. One or more sectors may act as a Local Timing Source for neighboring sectors with which it maintains association.

Figure 51:
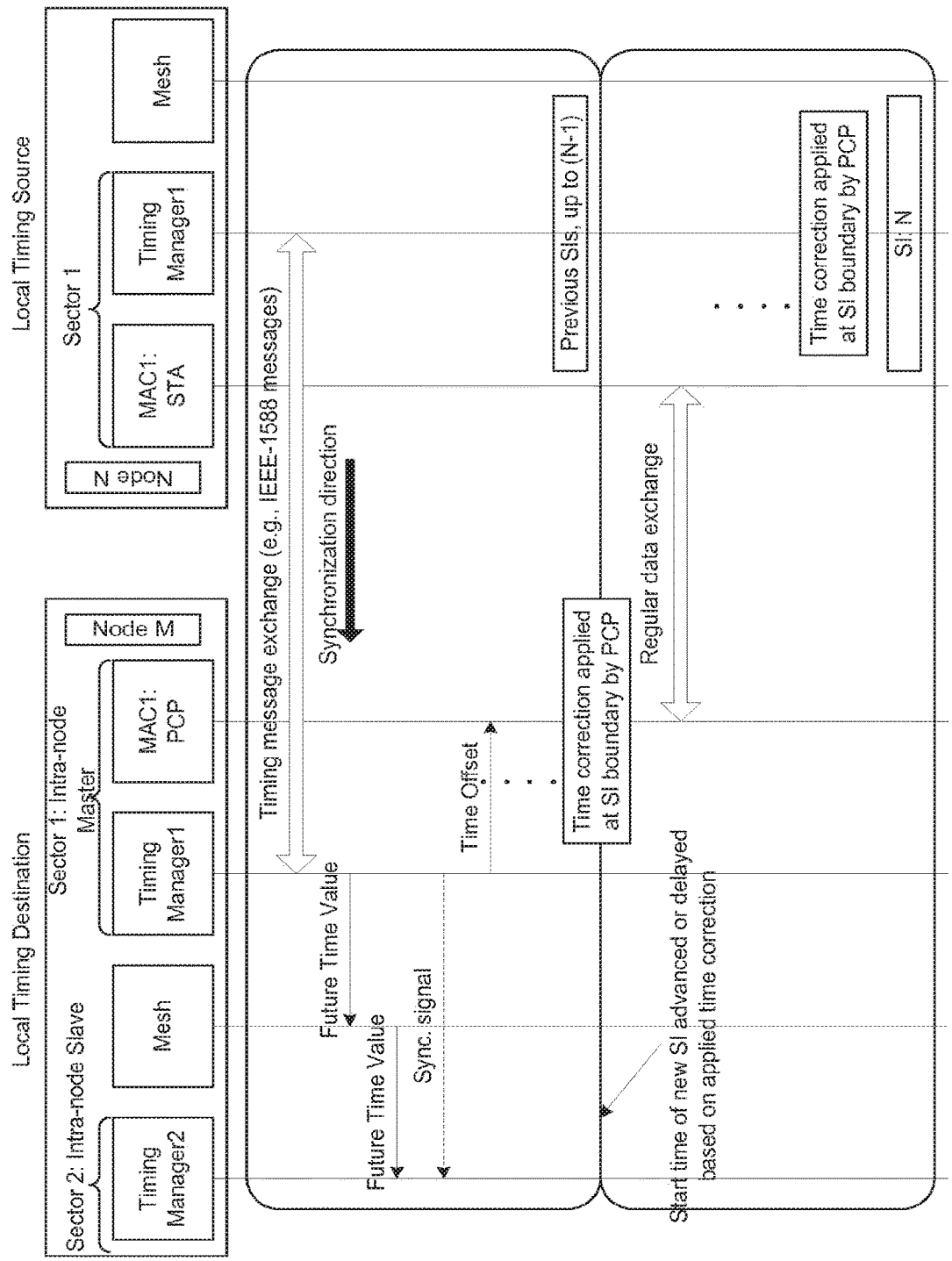
FIG. 51 is a diagram of an example synchronization protocol.

FIG. 51 is an example synchronization protocol. FIG. 51 depicts an example synchronization protocol. In FIG. 51, two sectors belonging to two mesh nodes are shown. One of the sectors is labeled as Local timing Source and the other is labeled Local Timing Destination for a link. In the node labeled Local timing Destination, one of the sectors may synchronize relative to the Local Timing Source. The sector may act as Intra-node Master for the remaining sectors within the node. The time value received by the Intra-node Master from the Local Timing Source sector may be distributed to the remaining sectors within the node via the Mesh Layer. The remaining sectors within the node may be called Intra-node Slaves.

Figure 52:
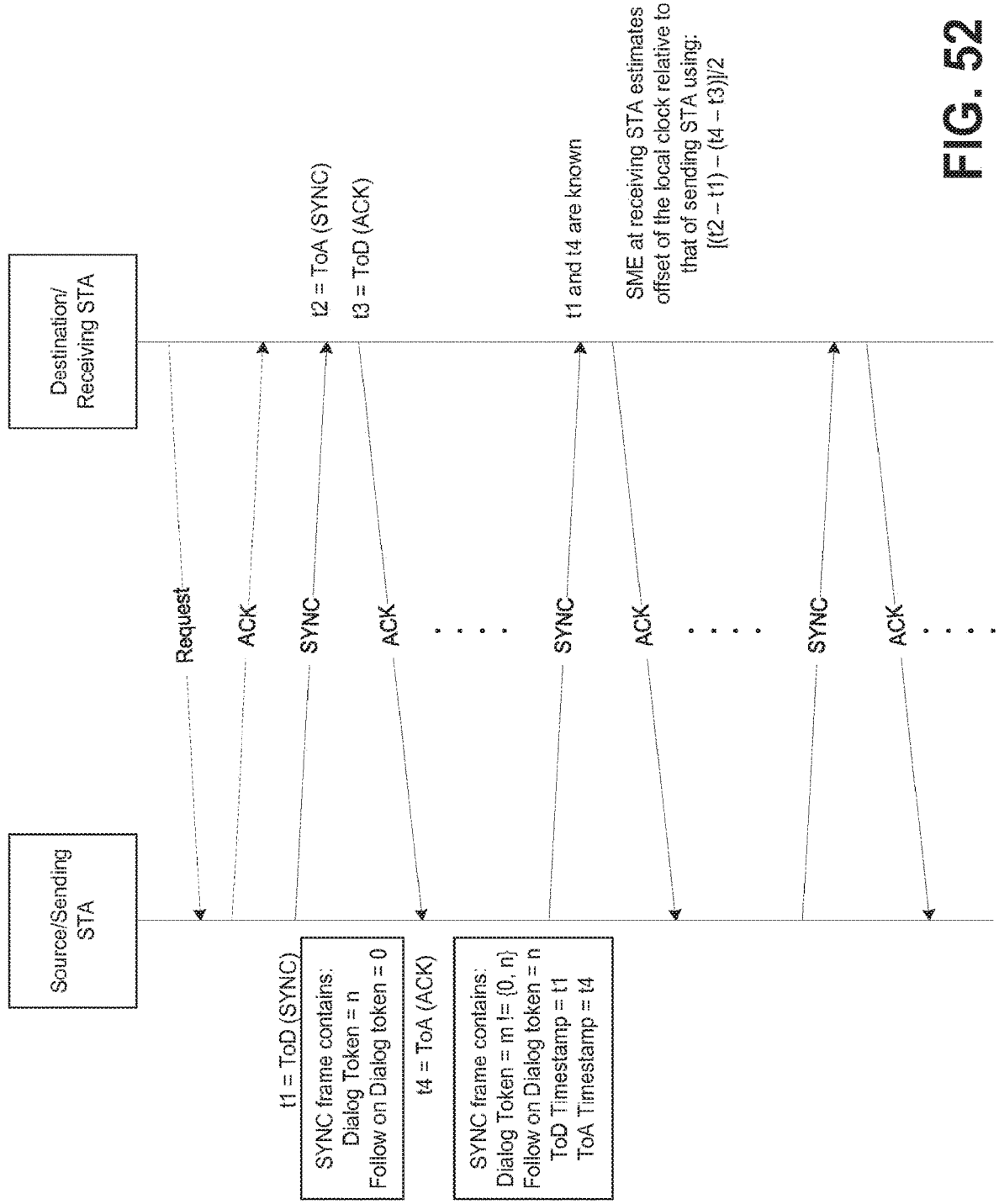
FIG. 52 is a diagram of example synchronization message exchange.
Figure 53:
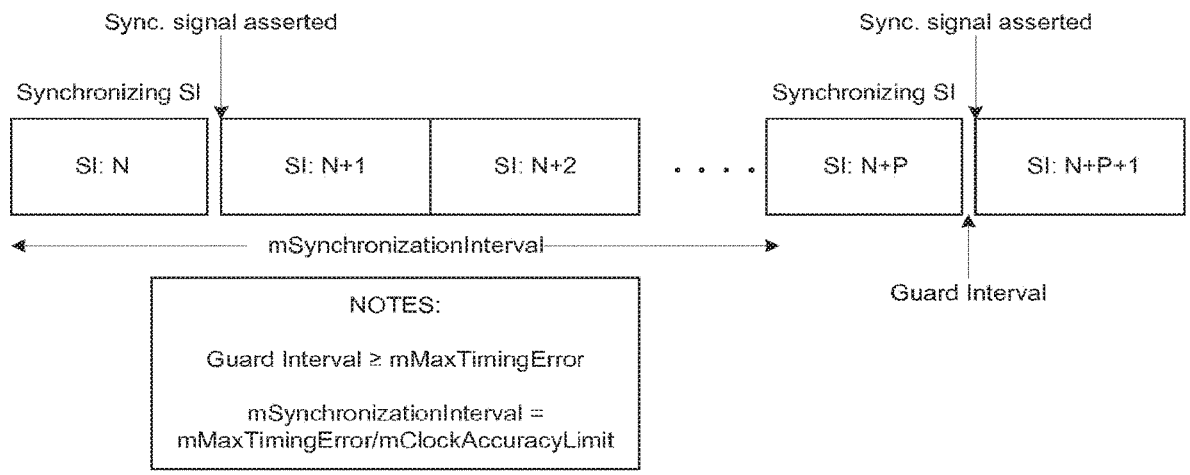
FIG. 53 is a diagram of a frame structure with guard intervals for synchronization.

Synchronization between the Local Timing Source and Local Timing Destination sectors may occur via exchange of higher-layer timing/synchronization messages. The messages may include IEEE-1588 messages, such as described herein. FIG. 52 is an example synchronization message exchange. FIG. 52 depicts synchronization packet exchange using IEEE-1588 messages. Synchronization packet exchange using IEEE-1588 messages may be initiated by the Local Timing Destination sector by sending a Timing Request message to the Local. Timing Source sector. Periodic SYNC messages may be sent by the Timing Source to the Timing Destination. The periodicity may depends on the internal clock accuracy available and/or the desired timing accuracy. Upon exchanging the timing synchronization messages, the Destination sector may calculate the timing offset relative to the Source sector. The destination sector may apply a correction to its internal counter. The corrected value may be conveyed to the Mesh Layer. The Mesh Layer may sends the corrected value to the other sectors to enable the sectors to correct their counters.

The time correction may be applied at the SI boundary by the PCP. The net effect may be a delay or advance in start time of the SI (e.g., subsequent SI). The SI in which the correction may be applied may be called a Synchronizing SI. The periodicity of the SI's occurrence may be determined by a timing accuracy. One or more synchronizing SI may have a Guard Interval at its end. Time correction applied at the SI boundary may take time during the Scheduling Interval. Less time may be available for data transfer in the SI. At the start of the SI following the Synchronizing SI, a synchronization signal may be transmitted and/or received by the PCP sector, for example, depending on whether it is the intra-node master sector or not. The counter value may be adjusted and the start time of the SI may be advanced or delayed, for example, to bring it in sync with the other sectors.

The Mesh-scan.request primitive may be sent by the Mesh Layer to the SME entity of a sector. The primitive may be a trigger to start the directional scan.

TABLE 9

Example Mesh-scan.request Service Primitives

| Name | Type | Valid Range | Description |
| --- | --- | --- | --- |
| Sector Number | Integer | 1-mMaxSectorPcrNode | This identifies the sector/MAC that may be the source or target of the current primitive. |
| Channel List | Ordered set of integers | One or more channel may be selected from the valid channel range for the appropriate PHY and carrier set. | Specifies a list of channels that may be examined when scanning for a PBSS. |
| MinChannelTime | Integer | N/A | The minimum time (e.g., in TU) to spend on one or more channel while scanning. |
| MaxChannelTime | Integer | ≥MinChannelTime | The maximum time (e.g., in TU) to spend on one or more channel while scanning. |
| Duration Per Direction | Integer | N/A | Indicates the amount of time (e.g., in TU or nanoseconds) per direction/beam. |
| Start Time | Integer | N/A | Time (e.g., in TU or nanoseconds) when directional scan may start. |
| Duration | Integer | N/A | Time (e.g., in nanoseconds) for one or more directional scans. This element may be present depending on implementation configuration. |
| Periodicity | Integer | >Duration | Time (e.g., in nanoseconds) between the start of successive directional scans (e.g., two scans) in different directions/beams. This element may be present depending on implementation configuration. |
| Number of Scans | Integer | >0 | The number of individual directions/beams to be scanned. This element may be present depending on implementation configuration. |
| Search type | Enumeration | BLIND SEARCH, TARGET SEARCH | Applicable only if Discovery Mode is 0. Indicates whether synchronization information may be available or not. |

The Mesh-scan.request primitive may be generated by the Mesh Layer to initiate directional scanning, for example, after node may power-up.

When the Mesh-scan.request primitive may be received by the SME of the sector, the primitive may trigger the directional scan at that sector. The SME may send a MLME-SCAN.request primitive to the MLME/MAC.

The Mesh-scan.com primitive may be sent by the SME entity of a sector to the Mesh Layer in response to a Mesh-Scan.request, for example, to report the results of the directional scan.

Figure 54:
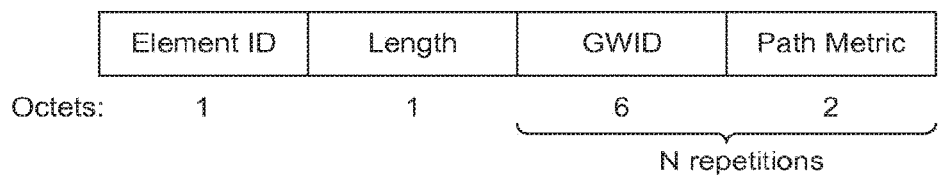
FIG. 54 is a diagram of an example GatewayDescription element format.

FIG. 54 is an example GatewayDescription element format. The structure of GatewayDescription element may be shown FIG. 54.

The GWID may stand for Gateway Identifier. The Path Metric may be the total path metric to reach the identified GW mmH node. The GWID and Path Metric fields may be repeated N times, for example, corresponding to N GW node sectors that are reachable through the particular sector from which the DMG Beacon may have been received. The Element ID and Length fields may be present when an element may be part of a MAC frame and/or omitted when part of a Mesh and/or MLME primitive.

TABLE 10

Example Mesh-scan.com Service Primitive

| Name | Type | Valid Range | Description |
|---|---|---|---|
| Sector Number | Integer | 1-mMaxSectorPerNode | This identifies the sector/MAC that may be the source or target of the current primitive. |
| ResultCode | Enumeration | SUCCESS, NOT_SUPPORTED | Indicates the result of the Mesh-Scan.request primitive. |
| Number Results | Integer | 1-255 | Number of PCPs or DMG Beacon transmitting STAs discovered during scan. |
| BSSDescriptionSet | Set of BSSDescriptions | N/A | The BSSDescriptionSet may be returned to indicate the results of the scan request. It is a set containing zero or more instances of a BSSDescription. |
| MeshDescriptionSet | Set of MeshDescriptions | N/A | The MeshDescriptionSet may be returned to indicate the results of the scan request. It may be a set containing zero or more instances of MeshDescription. |
| BSS Load | BSS Load | N/A | This element may include information on the current STA population and traffic levels at the node transmitting the DMG Beacon. |

One or more MeshDescription may consist of elements listed in TABLE 11.

TABLE 11

Example MeshDescription Elements

| Name | Type | Valid Range | Description |
|---|---|---|---|
| Personality | Enumeration | PCP, STA | Mode of operation for the sector from which a DMG Beacon was received. |
| GatewayDescriptionSet | GatewayDescription | N/A | GatewayDescriptionSet may be a set containing one or more instances of GatewayDescription. GatewayDescription indicates parameters of the gateway node that is reachable through the sector transmitting the DMG Beacon. |

The Mesh-scan.com primitive may be generated by the SME entity within a sector at the end of directional scan. The Mesh Layer may be notified of the results of the directional scan.

The Mesh-Join.request primitive may request synchronization with a BSS.

TABLE 12

Example of Mesh-Join.request service primitive

| Name | Type | Valid Range | Description |
|---|---|---|---|
| Sector Number | Integer | 1-mMaxSectorPerNode | This identifies the sector/MAC that may be the source or target of the current primitive. |
| SelectedBSS | BSSDescription | N/A | Contains multiple elements that may pertain to the BSS chosen to perform synchronization with. |

The Mesh-Join.request primitive may be generated by the Mesh Layer to direct the SME of a sector to establish synchronization with a PBSS.

The Mesh-Join.request primitive may initiate synchronization. The MLME may synchronize its timing with the specified PBSS, for example, based on the elements provided in the SelectedBSSSet parameter. The SME may issue a Mesh-Join.confirm primitive that reflects the results.

The Mesh-Join.confirm primitive may confirm synchronization with specified PBSS.

TABLE 13

Example Mesh-Join.confirm service primitive

| Name | Type | Valid Range | Description |
|---|---|---|---|
| Sector Number | Integer | 1-mMaxSectorPerNode | This identifies the sector/MAC that is the source or target of the current primitive. |
| ResultCode | Enumeration | SUCCESS, INVALID_PARAMETERS, FAILURE | Indicates result of Mesh-Join.request primitive. |
| Timestamp | Integer | $0\text{-}2^{64} - 1$ | This is the timestamp value extracted from the received DMG Beacon. |

The Mesh-Join.confirm primitive may be generated by the SME entity within a sector as a result of Mesh-Join.request primitive to establish synchronization with PBSS. The Mesh Layer may be notified of the results of the synchronization.

The Mesh-Start.request primitive may be sent by the Mesh Layer to the SME entity of a sector as a trigger to start operations as a PCP.

TABLE 14

Example Mesh-Start.request primitive

| Name | Type | Valid Range | Description |
|---|---|---|---|
| Sector Number | Integer | 1-mMaxSectorPerNode | This identifies the sector/MAC that may be the source or target of the current primitive. |

TABLE 14-continued

Example Mesh-Start.request primitive

| Name | Type | Valid Range | Description |
| --- | --- | --- | --- |
| Mesh Description | MeshDescription | N/A | Contains one or more elements containing parameters. |
| BSS Description | BSSDescription | N/A | This contains the parameters to use while starting new PBSS. |
| Start Time | Integer | N/A | Time (e.g., in TU or nanoseconds) when DMG Beacon transmissions should start. |
| Timestamp | Integer | $0\text{-}2^{64} - 1$ | This is the timestamp value supplied by the Mesh Layer. |
| Beaconing Mode | BeaconingDescription | N/A | This may include configuration parameters controlling Beaconing behavior. This element may be described herein |

One or more BeaconingDescription may consist of the elements listed in TABLE 15.

TABLE 15

| Name | Valid Range | Description |
| --- | --- | --- |
| Mode identifier | 0-3 | This sub-element may be interpreted as follows:<br>0: Default Beacon order.<br>1: Start beaconing at particular Beam number.<br>2: Use supplied beam number order for beaconing.<br>3: Use random order of beams for Beacon transmissions. |
| Parameters | N/A | This field may have different values depending on Mode identifier value:<br>0: This field contains no values.<br>1: Starting beam identifier. MAC starts beacon transmissions using supplied beam ID in one or more BTI. Subsequent beacon transmissions follow in regular order and wrap-around the last Beam ID.<br>2: Beam number order for Beacon transmissions. Beacon transmissions follow the same order in each BTI.<br>3: Seed value for random number generator. One or more BTI may include Beacon transmissions in random order as determined by the random generator. |

The Mesh-Join.confirm primitive may be generated by the Mesh Layer to direct the SME of a sector to start a Personal BSS with supplied parameters.

The Mesh-Join.confirm primitive may trigger PBSS initiation based on the parameters contained in supplied elements. The SME may issues a Mesh-Start.confirm primitive that reflects the results.

The Mesh-start.com primitive may report the results of a new PBSS creation.

TABLE 16

Example Mesh-start.com primitive

| Name | Type | Valid Range | Description |
| --- | --- | --- | --- |
| Sector Number | Integer | 1-mMaxSectorPerNode | This may identify the sector/MAC that may be the source or target of the current primitive. |
| ResultCode | Enumeration | SUCCESS, INVALID_PARAMETERS | Indicates result of Mesh-Start.request primitive. |

The Mesh-start.com primitive may be generated by the SME entity within a sector as a result of Mesh-Start.request primitive. The Mesh Layer may be notified of the results of the PBSS creation.

The Mesh-STA-Beaconing.request primitive may request DMG Beacon transmission by the STA MAC.

TABLE 17

Example Mesh-STA-Beaconing.request primitive

| Name | Type | Valid Range | Description |
| --- | --- | --- | --- |
| Sector Number | Integer | 1-mMaxSectorPerNode | This may identify the sector/MAC that is the source or target of the current primitive. |
| Mesh Description | MeshDescription | N/A | Contains one or more elements containing parameters. |
| BSS Description | BSSDescription | N/A | This contains the parameters to use while starting new PBSS. |
| Start Time | Integer | N/A | Time (e.g., in TU or nanoseconds) when DMG Beacon transmissions may start. |
| Timestamp | Integer | $0\text{-}2^{64} - 1$ | This may be the timestamp value supplied by the Mesh Layer. |
| Beaconing Mode | BeaconingDescription | N/A | This may include configuration parameters controlling Beaconing behavior. |

The Mesh-STA-Beaconing.request primitive may be generated by the Mesh Layer to direct the SME of a STA sector to start DMG Beacon transmissions.

The Mesh-STA-Beaconing.request primitive may trigger DMG Beacon transmission based on the parameters contained in supplied elements. The SME may issue a Mesh-STA-Beaconing.confirm primitive that may reflect the results.

The Mesh-STA-Beaconing.confirm primitive may report the results of initiation of DMG Beacon transmission by STA MAC.

TABLE 18

Example Mesh-STA-Beaconing.confirm Primitive

| Name | Type | Valid Range | Description |
| --- | --- | --- | --- |
| Sector Number | Integer | 1-mMaxSectorPerNode | This may identify the sector/MAC that is the source or target of the current primitive. |
| ResultCode | Enumeration | SUCCESS, INVALID_PARAMETERS | Indicates result of Mesh-STA-Beaconing.request primitive. |

The Mesh-STA-Beaconing.confirm primitive may be generated by the SME entity within an STA sector as a result of Mesh-STA-Beaconing.request primitive. The Mesh Layer may be notified of the results of the initiation of DMG Beacon transmission.

The Mesh-BF-Training.request primitive may request that BF Training occur with a peer DMG STA.

TABLE 19

Example Mesh-BF-Training.request Primitive

| Name | Type | Valid Range | Description |
| --- | --- | --- | --- |
| Sector Number | Integer | 1-mMaxSectorPerNode | This may identify the sector/MAC that is the |

TABLE 19-continued

Example Mesh-BF-Training.request Primitive

| Name | Type | Valid Range | Description |
| --- | --- | --- | --- |
| PeerSTAAddress | MACAddress | Any valid individual MAC address | source or target of the current primitive. Specifies the address of the peer MAC entity with which to perform BF Training. |
| RequestBRP | Boolean | True, False | If true, the BRP is performed as part of the BF Training. If false, SLS may be performed. |

The Mesh-BF-Training.request primitive may be generated by the Mesh Layer to request that BF Training be performed with a peer DMG STA.

On receipt of the Mesh-BF-Training.request primitive, the SME may send an MLME-BF-TRAINING.request primitive to trigger BF Training with indicated peer DMG STA.

The Mesh-BF-Training.confirm primitive may report the outcome of a requested BF Training.

TABLE 20

Example Mesh-BF-Training.confirm Primitive

| Name | Type | Valid Range | Description |
| --- | --- | --- | --- |
| Sector Number | Integer | 1-mMaxSectorPerNode | This may identify the sector/MAC that is the source or target of the current primitive. |
| PeerSTAAddress | MACAddress | Any valid individual MAC address | Specifies the address of the peer MAC entity with which BF Training was performed or attempted. |
| ResultCode | Enumeration | SUCCESS, TIMEOUT | Indicates result of BF Training. |
| Link Description | LinkDescription | N/A | Valid when ResultCode = SUCCESS Contains one or more elements pertaining to the node's MAC/Sector that performed BF Training. |

LinkDescription may consist of the elements listed in TABLE 21.

TABLE 21

| Name | Type | Valid Range | Description |
| --- | --- | --- | --- |
| BeamID | Integer | 1-mMaxBeamsPerSector | Identifies the beam chosen at the end of BF Training. |
| RCPI | Integer | 0-255 | It is a measure of the received RF power measured over the preamble of a received frame. |
| RSSI | Integer | 0-255 | This is a measure by the PHY of the power observed at the antennas used to receive the current PPDU. RSSI shall be measured during the reception of the PLCP preamble. |

TABLE 21-continued

| Name | Type | Valid Range | Description |
|---|---|---|---|
| SNR | Integer | 0-255 | This may indicate the SNR measured during the reception of a Control PHY packet. |
| Channel Measurement Feedback | Channel Measurement Feedback | N/A | This provides detailed channel measurements as measured on TRN-T fields of BRP packets or during sector sweep. |

The Mesh-BF-Training.confirm primitive may be generated by the SME entity within a sector to report the result of BF Training with peer DMG STA. The Mesh Layer may be notified of the result.

The Mesh-BF-Training.indication primitive may indicate that BF training with a peer DMG STA, and at the request of that peer, may have completed.

TABLE 22

Example Mesh-BF-Training.indication Primitive

| Name | Type | Valid Range | Description |
|---|---|---|---|
| Sector Number | Integer | 1-mMaxSectorPerNode | This may identify the sector/MAC that is the source or target of the current primitive. |
| PeerSTAAddress | MACAddress | Any valid individual MAC address | Specifies the address of the peer MAC entity with which BF Training was performed or attempted. |
| ResultCode | Enumeration | SUCCESS, TIMEOUT | Indicates result of BF Training. |
| Link Description | LinkDescription | N/A | Valid when ResultCode = SUCCESS Contains multiple elements pertaining to the node's MAC/Sector that performed BF Training. |
| Mode | Enumeration | NORMAL, ENHANCED_DISCOVERY | Indicates whether BF-Training occurred in normal mode or as part of Enhanced Discovery. |

The Mesh-BF-Training.indication primitive may be generated by the SME entity within a sector to indicate successful completion of a BF Training requested by a peer DMG STA. The Mesh Layer may be notified of the result.

The Mesh-Associate.request primitive may request association with a specified Peer MAC entity that is within a PCP.

TABLE 23

Example Mesh-Associate.request Primitive

| Name | Type | Valid Range | Description |
|---|---|---|---|
| Sector Number | Integer | 1-mMaxSectorPerNode | This may identify the sector/MAC that is the source or target of the current primitive. |

TABLE 23-continued

Example Mesh-Associate.request Primitive

| Name | Type | Valid Range | Description |
| --- | --- | --- | --- |
| PeerSTAAddress | MAC Address | Any valid MAC Address | Specifies the address of the peer MAC entity with which to perform the association process. |

The Mesh-Associate.request primitive may be generated by the Mesh Layer to start association process with a specified Peer MAC entity.

The Mesh-Associate.request primitive may initiate the association by the SME of the indicated sector.

The Mesh-Associate.confirm primitive may report the results of an association attempt with a specified Peer MAC entity that is within a PCP.

TABLE 24

Example Mesh-Associate.confirm Primitive

| Name | Type | Valid Range | Description |
| --- | --- | --- | --- |
| Sector Number | Integer | 1-mMaxSectorPerNode | This may identify the sector/MAC that is the source or target of the current primitive. |
| ResultCode | Enumeration | SUCCESS, REFUSED_REASON_UNSPECIFIED, etc. | Indicates result of Mesh-Associate.request primitive. |
| AssociationID | Integer | 0-255 | If the association request result was SUCCESS, then AssociationID specifies the association ID value assigned by the PCP. |

The Mesh-Associate.confirm primitive may be generated by the SME entity within a STA sector as a result of Mesh-Associate.request primitive. The Mesh Layer may be notified of the results of the association.

The Mesh-Association.indication primitive may indicate that a specific Peer MAC entity is requesting association with the local MAC entity, which may be a PCP.

TABLE 25

Example Mesh-Association.indication Primitive

| Name | Type | Valid Range | Description |
| --- | --- | --- | --- |
| Sector Number | Integer | 1-mMaxSectorPerNode | This may identify the sector/MAC that is the source or target of the current primitive. |
| PeerSTAAddress | MAC Address | Any valid MAC Address | Specifies the address of the peer MAC entity from which the association request was received. |
| RCPI | Integer | 0-255 | The RCPI of the received frame. It is a measure of the received RF power measured over the preamble of a received frame. |

TABLE 25-continued

| Example Mesh-Association.indication Primitive | | | |
|---|---|---|---|
| Name | Type | Valid Range | Description |
| RSNI | Integer | 0-255 | The RSNI of the received Association Request frame. |

The Mesh-Association.indication primitive may be generated by the SME entity within a sector as a result of the receipt of an association request from a specific Peer MAC entity. The Mesh Layer may be notified of the receipt of the association request.

The Mesh-Assoicate.response primitive may be used to send a response to a specific peer MAC entity that requested an association with the STA that issued this primitive, which may be within a PCP.

TABLE 26

| Example Mesh-Assoicate.response Primitive | | | |
|---|---|---|---|
| Name | Type | Valid Range | Description |
| Sector Number | Integer | 1-mMaxSectorPerNode | This may identify the sector/MAC that is the source or target of the current primitive. |
| PeerSTAAddress | MAC Address | Any valid MAC Address | Specifies the address of the peer MAC entity from which the association request was received.. |
| ResultCode | Enumeration | SUCCESS, REFUSED_REASON_UNSPECIFIED, etc. | Indicates result of Mesh-Associate.request primitive. |
| AssociationID | Integer | 0-255 | If the association request result was SUCCESS, then AssociationID specifies the association ID value assigned to the peer MAC entity by the PCP. |

The Mesh-Assoicate.response primitive may be generated by the Mesh Layer as a response to the Mesh-Associate.indication primitive.

The Mesh-Associate.response primitive may initiate the transmission of Association Response to a specific peer MAC entity that requested association.

The Mesh-Disassociate.request primitive may requests disassociation with a specified Peer MAC entity that is within an STA.

TABLE 27

| Example Mesh-Disassociate.request Primitive | | | |
|---|---|---|---|
| Name | Type | Valid Range | Description |
| Sector Number | Integer | 1-mMaxSectorPerNode | This identifies the sector/MAC that is the source or target of the current primitive. |

TABLE 27-continued

Example Mesh-Disassociate.request Primitive

| Name | Type | Valid Range | Description |
| --- | --- | --- | --- |
| PeerSTAAddress | MAC Address | Any valid MAC Address | Specifies the address of the peer MAC entity with which disassociation is requested. |
| ReasonCode | Reason Code field | May be discussed herein | Specifies the reason for initiating the disassociation. Default value may be 1. |

The Mesh-Disassociate.request primitive may be generated by the Mesh Layer to start disassociation process by a PCP sector with a specified Peer MAC entity operating in STA mode.

The Mesh-Disassociate.request primitive may initiate the disassociation by the SME of the indicated sector. The MAC may transmit a Disassociation frame to inform the Peer MAC entity about decision to disassociate.

The Mesh-Disassociate.confirm primitive may report the results of a disassociation with a specific peer MAC entity.

TABLE 28

Example Mesh-Disassociate.confirm Primitive

| Name | Type | Valid Range | Description |
| --- | --- | --- | --- |
| Sector Number | Integer | 1-mMaxSectorPerNode | This may identify the sector/MAC that is the source or target of the current primitive. |
| PeerSTAAddress | MAC Address | Any valid MAC Address | Specifies the address of the peer MAC entity with which disassociation is requested. |
| ResultCode | Enumeration | SUCCESS, INVALID_PARAMETERS | Indicates result of Mesh-Disassociate.request primitive. |

The Mesh-Disassociate.confirm primitive may be generated by the SME entity within a sector as a result of a Mesh-Disassociate.request primitive. The previous BF Training results may be maintained, for example, for the Peer MAC entity with which disassociation is performed. The Mesh Layer may be notified of the results of the disassociation.

The Mesh-Disassociate.indication primitive may report disassociation with a specific peer MAC entity.

TABLE 29

Example Mesh-Disassociate.indication Primitive

| Name | Type | Valid Range | Description |
| --- | --- | --- | --- |
| Sector Number | Integer | 1-mMaxSectorPerNode | This may identify the sector/MAC that is the source or target of the current primitive. |
| PeerSTAAddress | MAC Address | Any valid MAC Address | Specifies the address of the peer MAC entity with which disassociation is completed. |
| ReasonCode | Reason code field | May be discussed herein | Specifies the reason for initiating the disassociation. |

The Mesh-Disassociate.indication primitive may be generated by the SME entity within a sector as a result of the invalidation of an association relationship with a specific peer MAC entity. This may be triggered by reception of Disassociation frame from the Peer MAC entity. The Mesh Layer may be notified of the invalidation of the specific association relationship.

Mesh layer may use the Mesh-PBSS-Information.request primitive to obtain information about all associated STAs within the PBSS.

TABLE 30

Example Mesh-PBSS-Information.request Primitive

| Name | Type | Valid Range | Description |
| --- | --- | --- | --- |
| Sector Number | Integer | 1-mMaxSectorPerNode | This identifies the sector/MAC that is the source or target |

TABLE 30-continued

Example Mesh-PBSS-Information.request Primitive

| Name | Type | Valid Range | Description |
|------|------|-------------|-------------|
|      |      |             | of the current primitive. |

The Mesh-PBSS-Information.request primitive may be sent by the mesh layer to the SME/MAC sector in STA mode that may be designated as Target-PCP following the Assisted Discovery.

The SME/MAC may transmit Information Request message to the source/current PCP, with the Target field set to the Broadcast address.

The Mesh-PBSS-Information.confirm primitive may be sent by the MAC layer of the STA sector that is designated as Target PCP upon receiving a Information Response message from the current/Source PCP.

TABLE 31

Example Mesh-PBSS-Information.confirm Primitive

| Name | Type | Valid Range | Description |
|------|------|-------------|-------------|
| Sector Number | Integer | 1-mMaxSectorPerNode | This may identify the sector/MAC that is the source or target of the current primitive. |
| DMGCapabilities | List of DMG Capabilities | N/A | The DMG Capabilities element contains an STA identifier and several fields that are used to advertise the support of optional DMG capabilities of a DMG STA. |

The Mesh-PBSS-Information.confirm primitive May be generated by the MAC layer of STA sector to covey the contents of the received Information Response message to the Mesh Layer. The Mesh Layer may learn about one or more associated. STAs within the PBSS, Mesh layer may use the Mesh-PCP-HO.request primitive to initiate the PCP Handover and configure appropriate parameters.

TABLE 32

Example Mesh-PCP-HO.request Primitive

| Name | Type | Valid Range | Description |
|------|------|-------------|-------------|
| Sector Number | Integer | 1-mMaxSectorPerNode | This may identify the sector/MAC that is the source or target of the current primitive. |

The Mesh-PCP-HO.request primitive may be sent by the mesh layer to the SME/MAC sector in STA mode as part of the personality switch.

The SME/MAC may transmit Handover Request message to the peer MAC entity.

The Mesh-PCP-HO.confirm primitive may be sent by the MAC layer of the STA sector that may be designated as Target PCP upon receiving a Handover Response message from the current/Source PCP.

TABLE 33

Example Mesh-PCP-HO.confirm Primitive

| Name | Type | Valid Range | Description |
|------|------|-------------|-------------|
| Sector Number | Integer | 1-mMaxSectorPerNode | This may identify the sector/MAC that is the source or target of the current primitive. |
| Result code | ENUM | SUCCESS, FAILURE | Indicates the result of the PCP HO |

The Mesh-PCP-HO.confirm primitive may be generated by the MAC layer of STA sector that is designated Target PCP to indicate result of PCP Handover with current/Source PCP. The Mesh Layer may learn about the outcome of the PCP Handover.

The Mesh-PCP-HO.indication primitive may be sent by the MAC layer of the sector that is designated as Current/Source PCP and/or by the MAC layer of other-associated STAs in the Source PBSS in the BI prior to the Switching BI.

TABLE 34

Example Mesh-PCP-HO.confirm Primitive

| Name | Type | Valid Range | Description |
|------|------|-------------|-------------|
| Sector Number | Integer | 1-mMaxSectorPerNode | This identifies the sector/MAC that is the source or target of the current primitive. |
| New PCP ID | MAC Address | Any valid MAC address | MAC address of the Target PCP that is scheduled to take over as new PCP after Remaining BI. |

The Mesh-PCP-HO.confirm primitive may be generated by the MAC layer of a sector to indicate a forthcoming PCP Handover. The Mesh Layer may learn about the identity of the new PCP.

The Mesh-PCP-HO.response primitive may be sent by the Mesh Layer in response to a Mesh-PCP-HO.indication message to convey its decision.

TABLE 35

Example Mesh-PCP-HO.response Primitive

| Name | Type | Valid Range | Description |
|------|------|-------------|-------------|
| Sector Number | Integer | 1-mMaxSectorPerNode | This identifies the sector/MAC that is the source or target of the current primitive. |
| Result Code | Enumeration | CONFIRM, DENIED | Indicates PCP HO decision. Default value is CONFIRM. |

The Mesh-PCP-HO.response primitive may be generated by the Mesh Layer following receipt of Mesh-PCP-HO.indication message from MAC sector which is either Source PCP in PCP Handover, or a member STA of the Source PBSS.

The MAC may learn the PCP Handover decision and may proceed with switching to Target PCP and/or disassociates at tend of current BI.

The Mesh-Link-Report-Setup.request primitive may request setup of link quality reporting corresponding to Peer MAC entity.

TABLE 36

Example Mesh-Link-Report-Setup.request Primitive

| Name | Type | Valid Range | Description |
|---|---|---|---|
| Sector Number | Integer | 1-mMaxSectorPerNode | This may identify the sector/MAC that is the source or target of the current primitive. |
| Target Node ID | Association ID | Any valid AID | Specifies the AID of the peer MAC entity for which link quality indicator (in terms of throughput) is requested. |
| Trigger | Integer | [1-13] | Specifies the threshold for Link Report generation. This is the minimum change in MCS level that triggers the report. Value of 13 may correspond to no link quality reporting. |
| StartTime | Integer | N/A | Start time of report generation [e.g., in microseconds]. |

The Mesh-Link-Report-Setup.request primitive may be generated by the Mesh Layer to determine the link quality associated with specified Peer MAC entity.

The Mesh-Link-Report-Setup.request primitive may initiate the link quality determination by the SME of the indicated sector.

The Mesh-link-report-setup.confirm primitive may report the result of link quality reporting setup.

TABLE 37

Example Mesh-link-report-setup.confirm Primitive

| Name | Type | Valid Range | Description |
|---|---|---|---|
| Sector Number | Integer | 1-mMaxSectorPerNode | This identifies the sector/MAC that is the source or target of the current primitive. |
| ResultCode | Enumeration | SUCCESS, FAILURE | Specifies result of mesh link reporting setup. |

The Mesh-link-report-setup.confirm primitive may be generated by the SME entity within a STA or PCP sector as a result of Mesh-Link-Report-Setup.request primitive. The Mesh Layer may be notified of the link quality indicators for each Peer MAC entity.

The Mesh-Link-Report.indication primitive may report the results of link quality determination with the specified Peer MAC entity indicated in the previous request.

TABLE 38

Example Mesh-Link-Report.indication Primitive

| Name | Type | Valid Range | Description |
|---|---|---|---|
| Sector Number | Integer | 1-mMaxSectorPerNode | This may identify the sector/MAC that is the source or target of the current primitive. |
| Target Node ID | Association ID | Any valid AID | Specifies the AID of the peer MAC entity for which link quality indicator (e.g., in terms of throughput) is requested. |
| Throughput | Integer | Any valid 802.11ad throughput value | This contains the throughputs for Tx and Rx for each Peer MAC entity, in units of bits per second. A value of 0 in this report may indicate to the Mesh Layer that the particular link has failed. |

The Mesh-Link-Report.indication primitive may generate by the SME entity within a STA or PCP sector as a result of change in link quality (e.g., reflected by change in link throughput), for example, according to pre-defined reporting threshold/trigger. The Mesh Layer may be notified of the link quality indicators for each Peer MAC entity.

The Mesh-Schedule-Add.request primitive may request addition of new queues at a PCP or STA MAC and/or a new transmission schedule at a PCP MAC.

TABLE 39

Example Mesh-Schedule-Add.request Primitive

| Name | Type | Valid Range | Description |
|---|---|---|---|
| Sector Number | Integer | 1-mMaxSectorPerNode | This identifies the sector/MAC that is the source or target of the current primitive. |

TABLE 39-continued

Example Mesh-Schedule-Add.request Primitive

| Name | Type | Valid Range | Description |
|---|---|---|---|
| Target Node ID | Association ID | Any valid AID | Specifies the AID of the peer MAC entity for which the included schedule applies. |
| Type | Enumeration | MANAGEMENT, SEMI_STATIC, DYNAMIC | Corresponds to type of schedule request. In case of dynamic, this merely reserves channel time for Poll-SPR exchange. |
| Number of Queues | Integer | [1-$N_{SSQMax}$] OR [1-$N_{DynQMax}$] | Number of queues (e.g., corresponding to QoS classes) to be created by MAC. This field may be reserved when Type = MANAGEMENT. |
| Operation | Enumeration | ADD, DELETE | Specifies queue operation - addition of new queues or deletion of old ones. Queues are deleted only at end of current BI. |
| Tx Time Request | Integer | [0-0.5 * Scheduling Interval] | Present when Type = SEMI_STATIC and/or sector is a PCP. This corresponds to the amount of Tx time requested for semi-static allocations in microseconds. |
| Rx Time Request | Integer | [0-0.5 * Scheduling Interval] | Present when Type = SEMI_STATIC and/or sector is a PCP. This corresponds to the amount of Rx time requested for semi-static allocations in microseconds. |
| Tx Start Time | Integer | [0-Scheduling Interval] | This field may be present when sector is a PCP. This indicates the Tx start time [e.g., in microseconds]. |
| Rx Start time | Integer | [0-Scheduling Interval] | This field is optionally present when sector is a PCP. This indicates the Rx start time [e.g., in microseconds]. This field is currently Reserved. |
| Tx Restriction | Tx Restriction | N/A | This element may be present when a sector is a PCP. This includes parameters to restrict specific transmissions at certain times to avoid interference. Details may be presented herein |

One or more Tx Restriction Element may include the fields listed in TABLE 40.

TABLE 40

| Name | Type | Valid Range | Description |
|---|---|---|---|
| Source Node ID List | List of Association IDs | Any valid AID | Specifies the AID of the sectors from which transmissions may be restricted for time. |
| Target Node ID | Association ID | Any valid AID | Specifies the AID of the peer sector towards which transmissions may be restricted for time. |
| Start Time | Integer | 0-499 | Specifies the time offset [e.g., in microsecond] relative to start of SI for specified action. |
| Duration | Integer | [0-0.5 * Scheduling Interval] | Time [e.g., in microseconds] for which transmission restriction is requested. |

The Mesh-Schedule-Add.request primitive may generated by the Mesh Layer to request channel time allocation.

The Mesh-Schedule-Add.request primitive may direct the MAC to make channel time reservation according to included parameters, The Mesh-Schedule-Add.confirm primitive may confirm addition of new queues at a PCP or STA MAC and a new transmission schedule at a PCP MAC.

TABLE 41

Example Mesh-Schedule-Add.confirm Primitive

| Name | Type | Valid Range | Description |
|---|---|---|---|
| Sector Number | Integer | 1-mMaxSectorPerNode | This may identify the sector/MAC that is the source or target of the current primitive. |
| ResultCode | Enumeration | SUCCESS, FAILURE | Contains result of Mesh-Schedule-Add.request primitive. |

The Mesh-Schedule-Add.confirm primitive may be generated by the SME to report result of channel time allocation.

The Mesh-Schedule-Add.confirm primitive may report the result.

The Mesh-Buffer-Report-Setup.request primitive may request setting-up of buffer status reporting thresholds at the MAC.

TABLE 42

Example Mesh-Buffer-Report-Setup.request Primitive

| Name | Type | Valid Range | Description |
|---|---|---|---|
| Sector Number | Integer | 1-mMaxSectorPerNode | This may identify the sector/MAC that is the source or target of the current primitive. |
| Target Node ID | Association ID | Any valid AID | Specifies the AID of the peer MAC entity for which link quality indicator (e.g., in terms of throughput) is requested. |
| Type | Enumeration | MANAGEMENT, SEMI_STATIC, DYNAMIC | Corresponds to type of schedule request. In case of dynamic, this may reserve channel time for Poll-SPR exchange. |
| QoS List | List of Integers | $[0\text{-}N_{SSQMax} - 1]$ OR $[0\text{-}N_{DynQMax} - 1]$ | List of queues/QoS classes for which reporting triggers may be requested. |
| Trigger List | List of Integers | [0-100] | This may indicate the level at which buffer availability reporting to Mesh Layer is triggered by the MAC. This is expressed as a percent of the total buffer capacity for the particular Target Node ID and QoS. The size of this list is determined by size of QoS List field. |

The Mesh-Buffer-Report-Setup.request primitive may be generated by the Mesh Layer to set the buffer status reporting parameters.

The Mesh-Buffer-Report-Setup:request primitive may direct the MAC to provide buffer status reports to the Mesh Layer whenever the provided queue occupancy thresholds are reached.

The Mesh-Buffer-Setup.confirm primitive may confirm the establishment of buffer status reporting at the MAC.

TABLE 43

Example Mesh-Buffer-Setup.confirm Primitive

| Name | Type | Valid Range | Description |
|---|---|---|---|
| Sector Number | Integer | 1-mMaxSectorPerNode | This may identify the sector/MAC that is the source or target of the current primitive. |
| ResultCode | Enumeration | SUCCESS, FAILURE | Contains result of Mesh-Buffer-Report-Setup.request primitive. |
| Buffer Availability List | List of Integers | N/A | Available capacity for one or more queues successfully created by MAC, reported in terms of bytes. This field may be reserved, for example, if ResultCode = FAILURE. |

The Mesh-Buffer-Setup.confirm primitive may be generated by the SME to report the status of queue reporting request.

The Mesh-Buffer-Setup.confirm primitive may report the result.

The Mesh-Buffer-Availability.indication primitive may provide feedback to the Mesh Layer about available space in the MAC transmission buffers. This reporting may depend on the reporting trigger set using Mesh-Schedule-Add.request message.

TABLE 44

Example Mesh-Buffer-Availability.indication Primitive

| Name | Type | Valid Range | Description |
|---|---|---|---|
| Sector Number | Integer | 1-mMaxSectorPerNode | This identifies the sector/MAC that is the source or target of the current primitive. |
| Target Node ID | Association ID | Any valid AID | Specifies the AID of the peer MAC entity for which the buffer report may be generated. |
| Type | Enumeration | MANAGEMENT, SEMI_STATIC, DYNAMIC | High-level classification of packet type. |
| QoS | Integer | $[0\text{-}N_{SSQMax} - 1]$ or $[0\text{-}N_{DynQMax} - 1]$ | QoS class for which report may be generated. This field is reserved when Type = MANAGEMENT. |
| Buffer Availability | Integer | N/A | Available capacity in a particular queue, reported in terms of bytes. |

The Mesh-Buffer-Availability.indication primitive may be generated by the MAC Layer when the status of the queues may change.

The Mesh-Buffer-Availability.indication Mesh Layer may be informed of the currently available space in the specified MAC queue.

The Mesh-Transmission-Status-Reporting-Config.request primitive may configure transmission status reporting at the PCP MAC.

TABLE 45

Example Mesh-Transmission-Status-Reporting-Config.request Primitive

| Name | Type | Valid Range | Description |
|---|---|---|---|
| Sector Number | Integer | 1-mMaxSectorPerNode | This may identify the sector/MAC that is the source or target of the current primitive. |
| Target Node ID | Association ID | Any valid AID | Specifies the AID of the peer MAC entity for which the transmission status report is sought to be configured. |
| Type List | List of type Enumeration | MANAGEMENT, SEMI_STATIC, DYNAMIC | Indicates type of data for which transmission status reporting may be sought to be set up. |
| QoS List | List of Integers | $[0\text{-}N_{SSQMax} - 1]$ OR $[0\text{-}N_{DynQMax} - 1]$ | List of queues/QoS classes for which reporting may be requested. This has the same size as Type List. |
| Start Time Offset | Integer | Non-negative integer | Offset from current time (e.g., in microsecond) when reporting must start. |
| Periodicity | Integer | Non-negative integer | Duration (e.g., in microsecond) between successive reports. |

The Mesh-Transmission-Status-Reporting-Config.request primitive may be generated by the Mesh Layer to configure transmission status reporting by the PCP MAC.

The Mesh-Transmission-Status-Reporting-Config.request primitive may direct the MAC to provide periodic transmission status reports to the Mesh Layer at the indicated times.

The Mesh-Transmission-Status-Reporting-Config.confirm primitive may confirm the establishment of transmission status reporting at the MAC.

TABLE 46

Example Mesh-Transmission-Status-Reporting-Config.confirm Primitive

| Name | Type | Valid Range | Description |
| --- | --- | --- | --- |
| Sector Number | Integer | 1-mMaxSectorPerNode | This may identify the sector/MAC that is the source or target of the current primitive. |
| ResultCode | Enumeration | SUCCESS, FAILURE | Contains result of Mesh- |

TABLE 46-continued

Example Mesh-Transmission-Status-Reporting-Config.confirm Primitive

| Name | Type | Valid Range | Description |
| --- | --- | --- | --- |
| | | | Transmission-Status-Reporting-Config.request primitive. |

The Mesh-Transmission-Status-Reporting-Config.confirm primitive may be generated by the SME to report the status of transmission status reporting request.

The Mesh-Transmission-Status-Reporting-Config.confirm primitive may report the result.

The Mesh-Transmission-Status-Report.indication primitive may provide feedback to the Mesh Layer about the transmission status, such as average channel occupancy per STA and QoS and/or average number of transmission attempts per data packet. This reporting may depends on the reporting trigger set using Mesh-Schedule-Add.request message.

TABLE 47

Example Mesh-Transmission-Status-Report.indication Primitive

| Name | Type | Valid Range | Description |
| --- | --- | --- | --- |
| Sector Number | Integer | 1-mMaxSectorPerNode | This may identify the sector/MAC that is the source or target of the current primitive. |
| Channel Utilization Element Count | Integer | [0-mMaxAssociationsPerSector * ($N_{DynQMax}$ + $N_{SSQMax}$ + 1) | Number of Channel Utilization Elements included in the message |
| Channel Utilization Element | ChannelUtilization | N/A | Contains the amount of time allotted per STA and per QoS. Details may be discussed herein |
| Transmission Attempt Element Count | Integer | [0-mMaxAssociationsPerSector * 3 | Number of Transmission Attempt Elements included in the message |
| Transmission Attempt Element | TransmissionAttempt | N/A | Contains the number of transmission attempts per CTR/EIR/Management frames and also number of packet drops for each data type. Details may be described herein. |

One or more Channel Utilization Element may include fields. Examples of fields may be listed in TABLE 48.

TABLE 48

| Name | Type | Valid Range | Description |
| --- | --- | --- | --- |
| Target Node ID | Association ID | Any valid AID | Specifies the AID of the peer MAC entity addressed by current Channel Utilization Element. |
| Type List | List of Type Enumeration | MANAGEMENT, SEMI_STATIC, DYNAMIC | Indicates type of data for which transmission status reporting is sought to-be setup. |
| QoS List | List of Integers | [0-$N_{SSQMax}$ − 1] OR [0-$N_{DynQMax}$ − 1] OR [0-1] | List of QoS classes for which channel utilization values are included in the element. QoS List = 0 or 1, when Type List = MANAGEMENT, refers to Mesh Management and MAC |

TABLE 48-continued

| Name | Type | Valid Range | Description |
|---|---|---|---|
| Total Downlink Data Time List | List of Integers | [0-SI] | management queues, respectively. This has the same or similar size as Type List. One or more value in this list corresponds to the average amount of time (e.g., in microsecond) per SI allotted for downlink transmissions for each QoS listed in the QoS list, for the STA corresponding to Target Node ID. |
| Total Uplink Data Time List | List of Integers | [0-SI] | One or more value in this list corresponds to the average amount of time (e.g., in microsecond) per SI allotted for uplink transmissions for each QoS listed in the QoS list, for the STA corresponding to Target Node ID. |
| Downlink Higher Layer Data Time List | List of integers | [0-SI] | Average amount of time (e.g., in usec) per SI used for downlink transmission of higher layer data, excluding MAC and PHY overheads. This is reported per QoS, per STA corresponding to the request. |
| Uplink Higher Layer Data Time List | List of Integers | [0-SI] | Average amount of time (e.g., in usec) per SI used for uplink transmission of higher layer data, excluding MAC and PHY overheads. This is reported per QoS, per STA corresponding to the request. |

One or more Transmission Attempt Element may include fields. Example fields may be listed in TABLE 49.

TABLE 49

| Name | Type | Valid Range | Description |
|---|---|---|---|
| Target Node ID | Association ID | Any valid AID | Specifies the AID of the peer MAC entity addressed by current Channel Utilization Element. |
| CIR Transmission Attempt Count | Float | [0-mMaxRetryLimit] | Average number of transmission attempts for successful transmission of CIR data packets. |
| CIR Packet Drop Rate | Float | [0-100] | Indicates (e.g., as a percent) the rate of packet drop for CIR traffic since the time of last reporting. |
| EIR Transmission Attempt Count | Float | [0-mMaxRetryLimit] | Average number of transmission attempts for successful transmission of EIR data packets. |
| EIR Packet Drop Rate | Float | [0-100] | Indicates (e.g., as a percent) the rate of packet drop for EIR traffic since the time of last reporting. |
| Management Transmission Attempt Count | Float | [0-mMaxRetryLimit] | Average number of transmission attempts for successful transmission of Management packets. |
| Management Packet Drop Rate | Float | [0-100] | Indicates (e.g., as a percent) the rate of packet drop Management frames since the time of last reporting. |

The Mesh-Transmission-Status-Report.indication primitive may be generated (e.g., periodically) by the MAC Layer to report the transmission status, for example, at times configured by the Mesh Layer using Mesh-Transmission-Status-Reporting-Config.request.

The Mesh-Transmission-Status-Report.indication Mesh Layer may be informed of the transmission status, for example, including relative allotment of channel time per STA and QoS, re-transmission attempts and/or packet drop rate.

The Mesh-TX-Data.request primitive may request transmission of included user data to indicated Peer MAC entity. Mesh management frames may be transferred to the MAC queues using this message by selecting appropriate QoS class.

TABLE 50

Example Mesh-TX-Data.request Primitive

| Name | Type | Valid Range | Description |
|---|---|---|---|
| Sector Number | Integer | 1-mMaxSectorPerNode | This may identify the sector/MAC that is the source or target of the current primitive. |
| Target Node ID | Association ID | Any valid AID | Specifies the AID of the peer MAC entity to which the included data payload is to be transmitted. |
| Type | Enumeration | MANAGEMENT, SEMI_STATIC, DYNAMIC | High-level classification of packet type. |
| QoS | Integer | $[0\text{-}N_{SSQMax} - 1]$ or $[0\text{-}N_{DynQMax} - 1]$ | QoS class of included payload. There are separate QoS classes for semi-static and dynamic allocations. This field is reserved when Type = MANAGEMENT. |
| Num_Pckts | Integer | N/A | Number of packets included in the message. |
| Data | Data packet | N/A | Data packets to be transferred from Mesh Layer to the MAC. Number of packets included in this element is determined by Num_Pckts element. This may also include buffer descriptors. |

The Mesh-TX-Data.request primitive may be generated by the Mesh Layer to transfer data and management frames to the MAC queues.

The Mesh-TX-Data.request primitive may direct the MAC to fill the MAC queues with the transferred data.

The Mesh-Rx-Data.indication primitive may transfer user data and/or mesh management frames from the MAC to the Mesh Layer.

TABLE 51

Example Mesh-Rx-Data.indication Primitives

| Name | Type | Valid Range | Description |
|---|---|---|---|
| Sector Number | Integer | 1-mMaxSectorPerNode | This may identify the sector/MAC that is the source or target of the current primitive. |
| Type | Enumeration | MANAGEMENT, SEMI_STATIC, DYNAMIC | High-level classification of packet type. |
| QoS | Integer | $[0\text{-}N_{SSQMax} - 1]$ or $[0\text{-}N_{DynQMax} - 1]$ | QoS class of included payload. There are separate QoS classes for semi-static and dynamic allocations. This field is reserved when Type = MANAGEMENT. |
| Num_Pckts | Integer | N/A | Number of packets included in the message. |
| Data | Data packet | N/A | Data packets to be transferred from MAC to the Mesh Layer. Number of packets included in this element is determined by Num_Pckts element. This may also include buffer descriptors. |

The Mesh-Rx-Data.indication primitive may be generated by the MAC when incoming data or management frames may be received over the air interface.

The Mesh-Rx-Data.indication primitive may transfer the included payload from the MAC to the Mesh Layer.

The Mesh-Measurement-Config.request primitive may request configuration of interference measurement parameters by the local PCP MAC in the indicated sector.

TABLE 52

Example Mesh-Measurement-Config.request Primitives

| Name | Type | Valid Range | Description |
| --- | --- | --- | --- |
| Sector Number | Integer | 1-mMaxSectorPerNode | This may identify the sector/MAC that is the source or target of the current primitive. |
| Measurement ID | Integer | $[0-2^{16} - 1]$ | This is a value assigned by the Controller to one or more measurement request associated with transmission by a single sector of a mesh node. This value may be used to set up transmissions for interference measurement at a particular sector, and/or reception at one or more other sectors that fall within the interference zone. This value may be supplied by the Controller. |
| Measurement Rx Request | MeaSurementRxRequest | N/A | There are zero or more instances of this element in each request. Details may be described herein. |
| Measurement Tx Request | MeasurementTxRequest | N/A | There are zero or more instances of this element in each request. Details may be described herein |
| Measurement Quiet Period Request | MeasurementQuietPeriodRequest | N/A | There are zero or more instances of this element in each request. Details may be described herein. |

One or more Measurement Rx Request Element may include fields. Fields may be listed in TABLE 53.

TABLE 53

| Name | Type | Valid Range | Description |
| --- | --- | --- | --- |
| Source Node ID List | List of Association IDs | Any valid AID | Specifies the AID of the sectors from which interference measurements are requested. This includes the local PCP MAC and one or more STA sectors that are associated with the PCP. |
| Target Node ID | Association ID | Any valid AID | Specifies the AID of the peer sector towards which antenna must be oriented to make interference measurements. |
| Scheduling Interval Offset | Integer | 1-999 | Specifies the SI number relative to the start of current BI. |
| Start Time Offset | Integer | 0-499 | Specifies the time offset [e.g., in microsecond] relative to start of SI for specified action. |
| Periodicity | Integer | Non-negative integer | Number of Bits between measurements (e.g., successive measurements). |

One or more Measurement Tx Request Element may include fields. The fields may be listed in TABLE 54.

TABLE 54

| Name | Type | Valid Range | Description |
| --- | --- | --- | --- |
| Source Node ID | Association ID | Any valid AID | Specifies the AID of the sector from which transmissions for interference measurements may be requested. |
| Target Node ID | Association ID | Any valid AID | Specifies the AID of the peer sector towards which transmissions for interference measurements may be requested. |
| Schedule Interval Offset | Integer | 1-999 | Specifies the SI number relative to the start of current BI. |
| Start Time Offset | Integer | 0-499 | Specifies the time offset [e.g., in microsecond] relative to start of SI for specified action. |
| Count | Integer | [1-mMaxAssociationsPerSector] | Number of time blocks for which transmission is requested for interference measurement. One or more time block is of duration mInterferenceMeasurentBlockTime. Sectors making measurements change antenna configuration at the end of one or more time block. |
| Periodicity | Integer | Non-negative integer | Number of BIs between measurements (e.g., successive measurements). |

One or more Measurement Quiet Period Request Element may include fields. The fields may be listed in TABLE 55.

TABLE 55

| Name | Type | Valid Range | Description |
| --- | --- | --- | --- |
| Target Node ID List | List of Association IDs | Any valid AID | Specifies the AIDs of the sectors towards which no transmissions must be attempted for the indicated duration. |
| Schedule Interval Offset | Integer | 1-999 | Specifies the SI number relative to the start of current BI. |
| Start Time Offset | Integer | 0-499 | Specifies the time offset [e.g., in microsecond] relative to start of SI for specified action. |
| Periodicity | Integer | Non-negative integer | Number of BIs between measurements (e.g., successive measurements). |

The Mesh-Measurement-Config.request primitive may be generated by the Mesh Layer to configure transmissions or receptions for interference measurement.

The Mesh-Measurement-Config.request primitive may direct the PCP MAC to allocate channel time for transmission or reception associated with interference measurement.

The Mesh-Measurement-Config.confirm primitive may report the result of parameter configuration at the MAC for interference measurement.

TABLE 56

Example Mesh-Measurement-Config.confirm Primitives

| Name | Type | Valid Range | Description |
| --- | --- | --- | --- |
| Sector Number | Integer | 1 – mMaxSectorPerNode | This may identify the sector/MAC that is the source or target of the current primitive. |
| ResultCode | Enumeration | SUCCESS, SCHEDULE_CONFLICT | Reports the result of the configuration request. |

The Mesh-Measurement-Config.confirm primitive may be generated by the MAC to report the status of parameter configuration change.

The Mesh-Measurement-Config.confirm Mesh Layer may be informed of the result of parameter configuration change for interference measurement.

The Mesh-Measurement-Report.indication primitive may report the results of interference measurements to the Mesh Layer.

TABLE 57

Example Mesh-Measurement-Report.indication Primitives

| Name | Type | Valid Range | Description |
| --- | --- | --- | --- |
| Sector Number | Integer | 1 – mMaxSectorPerNode | This may identify the sector/MAC that is the source or target of the primitive. |

TABLE 57-continued

Example Mesh-Measurement-Report.indication Primitives

| Name | Type | Valid Range | Description |
|---|---|---|---|
| Measurement ID | Integer | [0 – $2^{16}$-1] | This is a value that may be assigned by the Controller to one or more measurement request associated with transmission by a single sector of a mesh node. This value may be derived from the corresponding Mesh-Interference-Config.request message. |
| Measurement Report | MeasurementReport | N/A | There are one or more instances of this element. This contains the measurement results. |

One or more Measurement Report Element may contains the fields in TABLE 58.

TABLE 58

| Name | Type | Valid Range | Description |
|---|---|---|---|
| Source Node ID List | List of Association IDs | Any valid AID | Specifies the AID of the sectors from which interference measurements may be requested. This may include the local PCP MAC and one or more STA sectors that may be associated with the PCP. One or more corresponding Source and Target Node ID pair identifies a measurement result. |
| Target Node ID List | List of Association IDs | Any valid AID | Specifies the AID of the peer sectors towards which the antenna was oriented while making the measurements. This may include the local PCP MAC and one or more STA sectors that are associated with the PCP. One oc more corresponding Source and Target Node ID pair identifies a unique measurement result. |
| ANIPI | Integer | Non-negative integer | The average noise plus interference power indicator (e.g., ANIPI) measured on the channel with appropriate antenna configuration. The PCP MAC may collect the measurement results from associated STAs and may aggregates them with results in a single report. |

The Mesh-Measurement-Report indication primitive may be generated by the MAC upon completion of interference measurements to convey the results to the Mesh Layer.

The Mesh-Measurement-Report.indication primitive may include the measurement results associated with interference measurement.

Modified Primitives, such as the MLME-SCAN.request primitive, may add elements listed in TABLE 59.

TABLE 59

Example MLME-SCAN.request Primitive Elements

| Name | Type | Valid Range | Description |
|---|---|---|---|
| Duration Per Direction | Integer | N/A | Indicates the amount of time (e.g., in nanoseconds) per direction/beam. |
| Search type | Enumeration | BLIND SEARCH, TARGET SEARCH | Applicable only if Discovery Mode is 0. Indicates whether synchronization information may be available or not. |

The total scan time per channel may be indicated by setting values in ChannelList, MinChannelTime and/or MaxChannelTime. The calculated value in addition to Duration Per Direction may give the number of directional scans per channel.

Modified Primitives, such as the MLME-SCAN.confirm primitive, may add elements listed in TABLE 60.

TABLE 60

Example MLME-SCAN.confirm Primitive Elements

| Name | Type | Valid Range | Description |
|---|---|---|---|
| MeshDescription | MeshDescription | N/A | This contains parameters related to mesh operation. |

Modified Primitives, such as the MLME-JOIN.confirm primitive, may add elements listed in TABLE 61.

TABLE 61

Example MLME-JOIN.confirm Primitive Elements

| Name | Type | Valid Range | Description |
| --- | --- | --- | --- |
| Timestamp | Integer | $0 - 2^{64} - 1$ | This is the timestamp value extracted from the received DMG Beacon. |

Modified Primitives, such as the MLME-START.request primitive, may add elements listed in TABLE 62.

TABLE 62

Example MLME-START.request Primitive Elements

| Name | Type | Valid Range | Description |
| --- | --- | --- | --- |
| Beaconing Mode | BeaconingDescription | N/A | This contains configuration parameters controlling Beaconing behavior. |
| Mesh Description | MeshDescription | N/A | Contains one or more elements containing parameters. |
| Start Time | Integer | N/A | Time (e.g., in TU or nanoseconds) when DMG Beacon transmissions may start. |

The MLME-STA-Beaconing.request primitive may request DMG Beacon transmission by the STA MAC.

TABLE 63

Example MLME-STA-Beaconing.request Primitives

| Name | Type | Valid Range | Description |
| --- | --- | --- | --- |
| Mesh Description | MeshDescription | N/A | Contains one oe more elements containing parameters. |
| BSS Description | BSSDescription | N/A | This contains the parameters to use while starting new PBSS. |
| Start Time | Integer | N/A | Time (ie.g., n TU or nanoseconds) when DMG Beacon transmissions should start. |
| Beaconing Mode | BeaconingDescription | N/A | This may include configuration parameters controlling Beaconing behavior. |

The MLME-STA-Beaconing.request primitive may be generated by the SME to direct the MAC of a STA sector to start DMG Beacon transmissions.

The MLME-STA-Beaconing.request primitive may trigger DMG Beacon transmission based on the parameters contained in supplied elements. The MAC may issue a MLME-STA-Beaconing.confirm primitive that may reflect the results.

The MLME-STA-Beaconing.confirm primitive may report the results of initiation of DMG Beacon transmission by STA MAC.

TABLE 64

Example MLME-STA-Beaconing.confirm Primitives

| Name | Type | Valid Range | Description |
| --- | --- | --- | --- |
| ResultCode | Enumeration | SUCCESS, INVALID_PARAMETERS | Indicates result of Mesh-STA-Beaconing.request primitive. |

The MLME-STA-Beaconing.confirm primitive may be generated by the MAC entity within an STA sector as a result of Mesh-STA-Beaconing.request primitive. The SME may be notified of the results of the initiation of DMG Beacon transmission.

The MLME-BF-TRAINING.confirm primitive may add the elements listed in TABLE 65.

TABLE 65

Example MLME-BF-TRAINING.confirm Primitive Elements

| Name | Type | Valid Range | Description |
| --- | --- | --- | --- |
| RCPI | Integer | 0-255 | It is a measure of the received RF power measured over the preamble of a received frame. |
| SNR | Integer | 0-255 | This may indicate the SNR measured during the reception of a Control PHY packet. |
| RSSI | Integer | 0-255 | This is a measure by the PHY of the power |

TABLE 65-continued

Example MLME-BF-TRAINING.confirm Primitive Elements

| Name | Type | Valid Range | Description |
|---|---|---|---|
| Channel Measurement Feedback | Channel Measurement Feedback | N/A | observed at the antennas used to receive the current PPDU. RSSI shall be measured during the reception of the PLCP preamble. This may provide detailed channel measurements as measured on TRN-T fields of-BRP-packets or during sector sweep. |
| BeamID | Integer | 1 – mMaxBeamsPerSector | Identifies the beam chosen at the end of BF Training. |

The MLME-BF-TRAINING.indication primitive may add the elements listed in TABLE 66.

TABLE 66

Example MLME-BF-TRAINING.indication Primitive Elements

| Name | Type | Valid Range | Description |
|---|---|---|---|
| RCPI | Integer | 0-255 | It is a measure of the received RF power measured over the preamble of a received frame. |
| SNR | Integer | 0-255 | This indicates the SNR measured during the reception of a Control PHY packet. |
| RSSI | Integer | 0-255 | This is a measure by the PHY of the power observed at the antennas used to receive the current PPDU. RSSI shall be measured during the reception of the PLCP preamble. |
| Channel Measurement Feedback | Channel Measurement Feedback | N/A | This provides detailed channel measurements as measured on TRN-T fields of BRP packets or during sector sweep. |
| BeamID | Integer | 1 – mMaxBeamsPerSector | Identifies the beam chosen at the end of BF Training. |
| Mode | Enumeration | NORMAL, ENHANCED_DISCOVERY | Indicates whether BF-Training occurred in normal mode or as part of Enhanced Discovery. |

The MLME-ASSOCIATE.indication primitive may add elements listed in TABLE 67.

TABLE 67

Example MLME-ASSOCIATE.indication primitive elements

| Name | Type | Valid Range | Description |
|---|---|---|---|
| RCPI | Integer | 0-255 | The RCPI of the received frame. It is a measure of the received RF power measured over the preamble of a received frame. |
| RSNI | Integer | 0-255 | The RSNI of the received Association Request frame. |

SME uses the MLME-PCP-HO.request primitive to initiate the personality switch check. Additionally the MLME-PCP-HO.request primitive may include information to be sent in the handover request message.

TABLE 68

Example MLME-PCP-HO.request Primitives

| Name | Type | Valid Range | Description |
|---|---|---|---|
| Sector Number | Integer | 1 – mMaxSectorPerNode | This identifies the sector/MAC that is the source or target of the current primitive. |
| Remaining BI | Integer | | Recommended min number of beacon intervals after which the target PCP becomes the PCP. |

The MLME-PCP-HO.request primitive may be sent by the SME to the MLME/MAC in STA mode as a result of personality check. The MLME/MAC may transmit handover request message to the source/current PCP.

The MLME-PCP-HO.confirm primitive may be sent by the MAC layer of the STA sector that may be designated as Target PCP upon receiving a Handover Response message from the current/Source PCP.

TABLE 69

Example MLME-PCP-HO.confirm Primitives

| Name | Type | Valid Range | Description |
|---|---|---|---|
| Sector Number | Integer | 1 – mMaxSectorPerNode | This may identify the sector/MAC that is the source or target of the current primitive. |
| Result code | ENUM | SUCCESS, FAILURE TIMEOUT | Indicates the result of the PCP HO |
| Remaining BI | Integer | | Number of beacon intervals after which the target PCP becomes the PCP. |

The MLME-PCP-HO.confirm primitive may be generated by the MAC layer of STA sector to indicate result of PCP Handover with current/Source PCP. The SME may learn about the outcome of the PCP Handover.

The MLME-LINK-REPORT-SETUP.request primitive may request link quality indication corresponding to Peer MAC entity.

TABLE 70

Example MLME-LINK-REPORT-SETUP.request Primitives

| Name | Type | Valid Range | Description |
|---|---|---|---|
| Target Node ID | Association ID | Any valid AID | Specifies the AID of the peer MAC entity for which link quality indicator (e.g., in terms of throughput) is requested. |
| Trigger | Integer | [1-13] | Specifies the threshold for Link Report generation. This is the minimum change in MCS level that triggers the report. Value of 13 may corresponds to no link quality reporting. |
| StartTime | Integer | N/A | Start time of report generation [e.g., in microseconds]. |

TABLE 70-continued

The MLME-LINK-REPORT-SETUP.request primitive may be generated by the SME to determine the link quality associated with specified Peer MAC entity.

The MLME-LINK-REPORT-SETUP.request primitive may initiate the link quality determination by the MAC.

The MLME-LINK-REPORT-SETUP.confirm primitive may report the results of link quality determination with the specified Peer MAC entity indicated in a request (e.g., a previous request).

TABLE 71

Example MLME-LINK-REPORT-SETUP.confirm Primitives

| Name | Type | Valid Range | Description |
|---|---|---|---|
| ResultCode | Enumeration | SUCCESS, FAILURE | Specifies result of mesh link reporting setup. |

The MLME-LINK-REPORT-SETUP.confirm primitive may be generated by the MAC within a STA of PCP sector as a result of MLME-LINK-REPORT-SETUP.request primitive. The SME may be notified of the result of link quality setup for Peer MAC entity.

The MLME-LINK-REPORT.indication primitive may report the results of link quality determination with the specified Peer MAC entity indicated in the request (e.g., previous request).

TABLE 72

Example MLME-LINK-REPORT.indication primitive

| Name | Type | Valid Range | Description |
|---|---|---|---|
| Target Node ID | Association ID | Any valid AID | Specifies the AID of the peer MAC entity for which link quality indicator (e.g., in terms of throughput) may be requested. |
| Throughput | Integer | Any valid 802.11ad throughput value | This contains the throughputs for Tx and Rx for each Peer MAC entity, in units of bits per second. A value of 0 in this report indicates to the SME that the particular link has failed. |

The MLME-LINK-REPORT.indication primitive may be generated by the MAC as a result of change in link quality (e.g., reflected by change in link throughput), for example, according to pre-defined reporting threshold/trigger. The SME may be notified of the link quality indicators for indicated Peer MAC entity.

The MLME-SCHEDULE-ADD.request primitive may request addition of a new transmission schedule at a PCP MAC.

TABLE 73

Example MLME-SCHEDULE-ADD.request Primitives

| Name | Type | Valid Range | Description |
|---|---|---|---|
| Target Node ID | Association ID | Any valid AID | Specifies the AID of the peer MAC entity for which link quality indicator (e.g., in terms of throughput) is requested. |
| Num_Qs | List of Integers | $[1 - N_{SSQMax}]$ OR $[1 - N_{DynQMax}]$ | Number of queues (e.g., corresponding to QoS classes) to be created by MAC. |
| Type | Enumeration | SEMI_STATIC, DYNAMIC | Corresponds to type of schedule request. In case of dynamic, this merely reserves channel time for Poll-SPR exchange. |
| Trigger List | List of Integers | [0 – 100] | This indicates the level at which buffer availability reporting to Mesh Layer is triggered by the MAC. This is expressed as a percent of the total buffer capacity for the particular Target Node ID and QoS. The size of this list is determined by Number of Queues parameter: |
| Tx Time Request | Integer | [0 – 0.5*Scheduling Interval] | May he present when Type = SEMI_STATIC. This May correspond to the amount of Tx time requested for semi-static allocations. |
| Rx Time Request | Integer | [0 – 0.5*Scheduling Interval] | May be present when Type = SEMI_STATIC. This may correspond to the amount of Rx time requested for semi-static allocations. |

The MLME-SCHEDULE-ADD.request primitive may be generated by the SME to request new channel time allocation.

The MLME-SCHEDULE-ADD.request primitive may direct the MAC to make channel time reservation according to included parameters.

The Buffer-Occupancy.request message may request buffer occupancy status report from the Queue Manager at a PCP.

TABLE 74

Example Buffer-Occupancy.request message

| Name | Type | Valid Range | Description |
|---|---|---|---|
| Target Node ID List | Association ID | Any valid MD | Specifies a list of AIDs of the peer MAC entities for which buffer occupancy information is requested. |
| QoS List | Integer | $[0 - QoS_{Max}]$ | List of QoS classes for which report is requested. |

The Buffer-Occupancy.request message may be generated by the Scheduler at the start of the semi-static allocations and after reception of SPR frames in each SI.

The Buffer-Occupancy.request message directs the Queue Manager to report the queue lengths for the listed peer-MAC entities and QoS classes.

The Buffer-occupancy.confirm message may report buffer occupancy status to the Scheduler.

TABLE 75

Example Buffer-occupancy.confirm Message

| Name | Type | Valid Range | Description |
|---|---|---|---|
| Buffer Depth List | List of integers | Positive integer | Contains list of packet sizes (e.g., in bytes) in each QoS queue for requested Target Node ID. The reported results are in the same order as the request list in Buffer-Occupancy.request. |
| Re-tx Attempt List | List of integers | $[0 - ReTx_{Max}]$ | Conveys the current re-transmission attempt count for the reported packets. |

The Buffer-Occupancy.confirm message may be generated by the Queue Manager in a PCP in response to Buffet-Occupancy.request received from the Scheduler.

The Buffer-Occupancy.confirm message directs the Queue Manager to report the queue lengths for the listed peer MAC entities and QoS classes.

The Buffer-Occupancy-STA.request message requests buffer occupancy status report from the Queue Manager at an STA.

TABLE 76

Example Buffer-Occupancy-STA.request.message

| Name | Type | Valid Range | Description |
|---|---|---|---|
| QoS List | Integer | $[0 - QoS_{Max}]$ | List of QoS classes for which report is requested. |

The Buffer-Occupancy-STA.request message may be generated by the MAC at an STA upon receiving a Poll frame from the PCP.

The Buffer-Occupancy-STA.request message may direct the Queue Manager to report the queue lengths for the indicated QoS classes for the associated PCP.

The Buffer-Occupancy-STA.confirm message may report buffer occupancy status to the STA MAC.

TABLE 77

Example Buffer-Occupancy-STA. confirm message

| Name | Type | Valid Range | Description |
|---|---|---|---|
| Buffer Depth List | List of integers | Positive integer | Contains list of packet sizes (in bytes) in each QoS queue for the associated PCP. The reported results are in the same order as the request list in Buffer-Occupancy-STA.request. |

The Buffer-Occupancy-STA.confirm message may be generated by the Queue Manager n an STA in response to Buffer-Occupancy-STA.request received from the MAC.

The Buffer-Occupancy-STA.confirm message may direct the Queue Manager to report the queue lengths for the indicated QoS classes for the associated PCP.

The Resource-Request.indication message may report the channel time request received from an STA to the Scheduler.

TABLE 78

Example Resource-Request.indication Message

| Name | Type | Valid Range | Description |
|---|---|---|---|
| Target Node ID | Association ID | Any valid AID | Specifies the AID of the peer MAC entity for which channel time request is received. |
| QoS List | Integer | $[0 - QoS_{Max}]$ | List of QoS classes for which channel time is requested. |
| Channel time request | Integer | $[0 - T_{SI}]$ | Channel time request received in SPR frame from the STA. In case of modified SPR frames, channel time requests for multiple QoS classes can be received in a single SPR frame. |

The Resource-Request.indication message may be generated by the MAC when a SPR frame is received from an associated STA.

The Resource-Request.indication message may inform the Scheduler about the requested channel time by the associated STA in a particular SI.

The Tx-Data.request message may be sent by the Scheduler to request transmission of the indicated number of data packets belonging to indicated QoS classes by the MAC.

TABLE 79

Example Tx-Data.request Message

| Name | Type | Valid Range | Description |
|---|---|---|---|
| Target Node ID | Association ID | Any valid AID | Specifies the AID of the peer MAC entity for which data transmission is requested. |
| QoS List | List of Integers | $[0 - QoS_{Max}]$ | List of QoS classes for which data packet transmission is requested. |
| Num_Pckts List | List of Integers | N/A | Number of packets from indicated QoS classes to be transmitted. |

The Tx-Data.request message may be generated by the Scheduler to initiate data transmission by MAC.

The Tx-Data.request message may direct the MAC to de-queue and transmit the indicated number of packets from the indicated queues.

The Tx-Management.request message may be sent by the Scheduler to request transmission of indicated 802.11/802.11ad Management frames to the indicated peer MAC-entity.

TABLE 80

Example Tx-Management.request Message

| Name | Type | Valid Range | Description |
|---|---|---|---|
| Target Node ID | Association ID | Any valid AID | Specifies the AID of the peer MAC entity for which data transmission is requested. |
| Type | Integer | [0 – 255] | 802.11/802.11ad Management frame type. |
| Optional Parameters | Integer | N/A | Specific additional parameters depend on the particular Management frame type. |

TABLE 81

Additional parameters for Tx-Management.request

| Type Value | Type Name | Optional Parameters | Notes |
|---|---|---|---|
| 0 | DMG Beacon | N/A | This is sent at start of BTI to initiate DMG Beacon transmission, followed by A-BFT, ATI and CBAP transmissions. |
| 1 | Poll | N/A | Causes a Poll frame to be transmitted to the indicated peer MAC entity which is an associated STA. |
| 2 | Grant | Time in microseconds | This is the channel time allocation determined by the Scheduler. This value is copied to the Allocation duration field of the transmitted Grant frame. |

The Tx-Management.request message may be generated by the Scheduler to initiate 802.11/802.11ad Management frame transmission by the MAC.

The Tx-Management.request message may direct the MAC to transmit the indicated 802.11/802.11ad Management frame to the indicated peer MAC entity.

The Dequeue.request message may be sent by the MAC to the Queue Manager to de-queue the indicated number of packets from the indicated queues belonging to different QoS classes.

TABLE 82

Example Dequeue.request primitives

| Name | Type | Valid Range | Description |
|---|---|---|---|
| Target Node ID | Association ID | Any valid AID | Specifies the AID of the peer MAC entity for which de-queuing of packets is requested. |
| QoS List | List of Integers | $[0 - QoS_{Max}]$ | List of QoS classes for which data packet de-queuing is requested. |
| Num_Pckts List | List of Integers | N/A | Number of packets from indicated queues belonging to various QoS classes to be de-queued. |

The Dequeue.request message may be generated by the MAC to request de-queuing of packets from indicated queues.

The Dequeue.request message may direct the Queue Manager to de-queue indicated number of packets from the indicated queues.

The ACK.indication message may be sent by the MAC to the Queue Manager to indicate that an ACK was received for the previous management or data frame transmission.

The ACK.indication message may be generated by the MAC to indicate status of previous data or management frame transmission.

The ACK.indication message informs the Queue Manager about status of previous transmission.

802.11ad MAC messages may be modified. For MAC frames with multiple optional elements, there may be mmH elements.

Modified 802.11ad MAC message DMG Beacon may include the elements listed in TABLE 84.

TABLE 83

Example DMG Beacon modified elements

| Name | Type | Valid Range | Description |
|---|---|---|---|
| BSS Load | BSS Load | N/A | This element contains information on the current STA population and traffic levels at the node transmitting the DMG Beacon. Details may be described herein. |
| Extended Schedule | ExtendedSchedule | N/A | Contains schedule of the CBAP in current BI. |
| mmH Element | mmHElement | N/A | mmH network specific parameters present as part of Vendor Specific field. |

Figure 55:
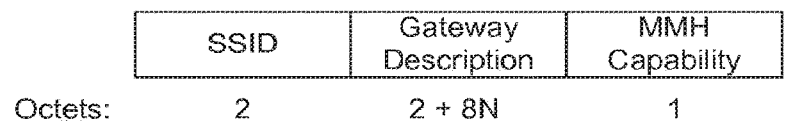
FIG. 55 is a diagram of example mmH element contents.
Figure 56:
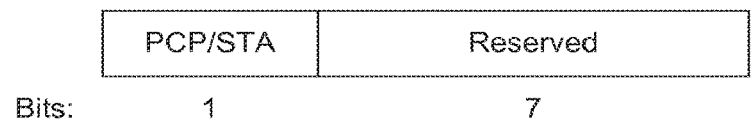
FIG. 56 is a diagram of an example mmH Capability format.

FIG. 55 is an example mmH element contents.
FIG. 56 is an example mmH Capability format
Modified 802.11ad MAC message information Request may include the elements listed in TABLE 85.

TABLE 84

Example Information Request modified elements

| Order | Information |
|---|---|
| 1 | Category—16 |
| 2 | DMG Action—2 |
| 3 | Subject Address—Broadcast (All ones → $2^{48} - 1$) |

Modified 802.11ad MAC message Information Response may include the elements listed in TABLE 85.

TABLE 85

Example Information Response modified elements

| Order | Information |
|---|---|
| 1 | Category—16 |
| 2 | DMG Action—3 |
| 3 | Subject Address—MAC address of STA that is part of PBSS. |

Modified 802.11ad MAC message Handover Request may include the elements listed in TABLE 86.

TABLE 86

Example Handover Request modified elements

| Order | Information |
|---|---|
| 1 | Category—16 |
| 2 | DMG Action—4 |
| 3 | Handover Reason—3 |
| 4 | Handover Remaining BI—variable (default = 1) |

Modified 802.11ad MAC message Handover Response may include the elements listed in TABLE 87.

TABLE 87

Example Handover Response modified elements

| Order | Information |
|---|---|
| 1 | Category—16 |
| 2 | DMG Action—5 |
| 3 | Handover Result—0 (Success)/1 (Failure) |

TABLE 87-continued

Example Handover Response modified elements

| Order | Information |
|---|---|
| 4 | Handover Reject Reason—Reserved and set to 0 if Handover Result = 0. |

Figure 57:
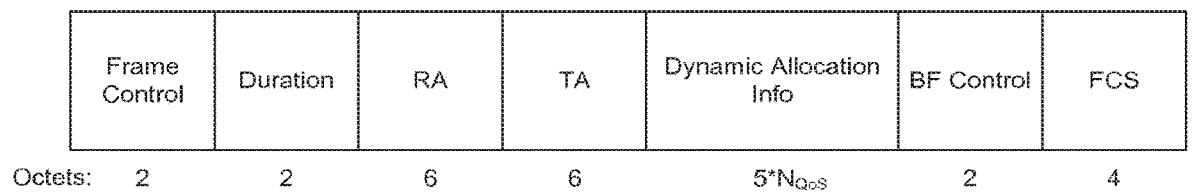
FIG. 57 is a diagram of an example service period request (SPR) frame format.

FIG. 57 is an example SPR frame format.
In FIG. 57, $N_{QoS}$ may be the number of QoS classes supported by the system. The Dynamic Allocation Info field may be repeated for each QoS class. Original 802.11ad SPR frame supports a single QoS class, $N_{QoS}=1$.

Figure 58:
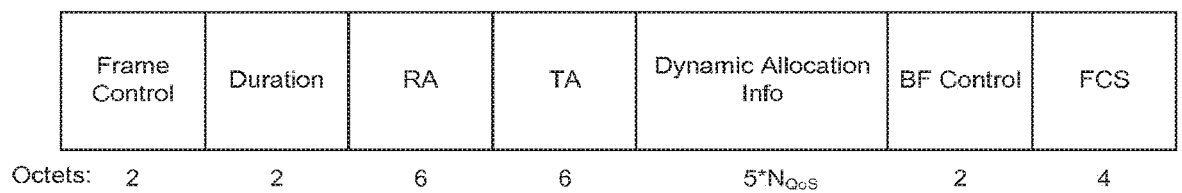
FIG. 58 is a diagram of an example grant frame format.

FIG. 58 is an example grant frame format.
In FIG. 58, $N_{QoS}$ may be the number of QoS classes supported by the system. The Dynamic Allocation Info field may be repeated for each QoS class. Original 802.11ad Grant frame supports a single QoS class, $N_{QoS}=1$.

One or more Mesh-Controller messages: may begin with an example header as listed in TABLE 90.

TABLE 88

Example Headers

| Name | Type | Valid Range | Description |
|---|---|---|---|
| Message type | MESH_CNTLR_MSG_TYPE | 0-MESH_CNTLR_MAX_MSG_TYPE | This identifies the type of message exchanged between Mesh node and Controller node. |
| Node Id | uint64_t | | Provides a unique node id to identify the mesh node. Mesh nodes without a assigned node id, shall fill 0 instead. |
| Transaction Id | uint32_t | 0-0xFFFFFFFF | Transaction id associated with the packet. Replies use the same id as the request message to enable pairing. |
| Length | uint16_t | 0-65535 | Total length of the message |

One or more Mesh-Controller message may include (e.g., excluding MESH_CNTLR_MAX_MSG_TYPE) enum MESH_CNTLR_MSG_TYPE {MESH_CNTLR_HELLO, MESH_CNTLR_CONFIG_SETUP, MESH_CNTLR_CONFIG_COMPLETE, MESH_CNTLR_REPORT_IND, MESH_CNTLR_MAX_MSG_TYPE};

A forwarding table may be similar to the TABLE 89.

TABLE 89

Example Forwarding Table

| | Matching rule | | | | |
|---|---|---|---|---|---|
| Entry ID | Priority | Matching type | Source Addr | Destination Addr | VLAN ID | PCP/QoS |

| Action | | | | |
|---|---|---|---|---|
| Command | Next Hop Addr | S-Tag | PCP/QoS | Status |

The entry ID may identify (e.g., uniquely) the forwarding table entry. The forwarding table entry may be updated (e.g., added/modified/deleted, periodically or always) by the controller and the mesh node may not autonomously change any of the fields. A status field may not be updated similarly. The status field may be autonomously updated by the mesh node according to the link conditions. When the link failure is reported by the sector MAC, the mesh layer may change the status field to disabled in one or more the forwarding table entries having the next hop address for the failed link. The match may be declared to be successful if the matching rule may be true and/or the status field is active.

The MESH_CNTLR_HELLO message may include elements.

TABLE 90

Example MESH_CNTLR_HELLO message elements

| Name | Type | Valid Range | Description |
| --- | --- | --- | --- |
| Version | uint8_t | 0x01 (other values are reserved for this version of specification) | Specifies the Mesh-Controller protocol version supported by the new node. |
| Number of sectors | uint8_t | 0-mMaxSectorPerNode | Number of sectors in the mesh node. |
| Neighbor information | Array of mMaxSectorPerNode of type Neighbor_List | N/A | This IE captures the information about discovered neighbors and the corresponding link metrics |
| Capability information | Capability_Info | N/A | Provides the information about capabilities of the new mesh node |

The MESH_CNTLR_HELLO message may be generated by the Mesh Layer of the new node to inform to the controller about the presence of the new node in the mesh network.

The MESH_CNTLR_HELLO message may enable the controller to identify the new mesh node and result in topology update from the controller point of view.

The MESH_CNTLR_CONFIG_SETUP message may include elements.

TABLE 91

Example MESH_CNTLR_CONFIG_SETUP message elements

| Name | Type | Valid Range | Description |
| --- | --- | --- | --- |
| Node ID | uint64_t | | Provides a unique node id to identify the mesh node. |
| Number of assoc config | uint8_t | 0-mMaxSectorPerNode | Number of association configurations included in the message |
| Association configuration | Array of mMaxSectorPerNode of type Association_Config | N/A | Provides the Neighbor selection and the personality information for each sector in the mesh node. |
| Number of Forwarding table config | uint16_t | 0-65535 | Number of Forwarding table entries included in the message |
| Forwarding table config | Array of MAX_FWD_TABLE_ENTRIES of type ForwardingTable_Config | N/A | Provides the Forwarding table information. |
| Link report config | Array of mMaxSectorPerNode of type LinkReport_Config | N/A | Provides the link reporting related configuration for all the sectors. |
| Buffer report config | Array of mMaxSectorPerNode of type BufferReport_Config | N/A | Provides the buffer reporting related configuration for all the sectors. |
| Number of CIR config | uint8_t | 0-255 | Number of CIR configurations |
| CIR config | Array of CIR_Config | N/A | Provides the details of CIR configuration |
| Number of Interference | uint8_t | 0-255 | Number of interference measurement/management |

TABLE 91-continued

Example MESH_CNTLR_CONFIG_SETUP message elements

| Name | Type | Valid Range | Description |
|---|---|---|---|
| Schedule | | | related configurations |
| Interference Schedule | Array of INTF_Schedule | N/A | Provides the details of interference measurement/management related schedule |

The MESH_CNTLR_CONFIG_SETUP message may be generated by the controller as a response to MESH_CNTRL_HELLO message or as a response to MESH_CNTLR_REPORT_IND or as a result of optimization run in the controller.

The Mesh node may use the configuration provided in the setup. Mesh node is also expected to provide a response (e.g., success or failure) using MESH_CNTLR_CONFIG_CONFIRM message.

The MESH_CNTLR_CONFIG_CONFIRM message may include elements

TABLE 92

Example MESH_CNTLR_CONFIG_CONFIRM message elements

| Name | Type | Valid Range | Description |
|---|---|---|---|
| Result | ResultCode | 0-RESULT_CODE_MAX | Indicates the whether the configuration is successful or fail. In case of configuration failure, the result code captures reason for failure. |
| Number of sectors | uint8_t | 0-mMaxSectorPerNode | Number of sectors with failed association. Non zero only if Result code is RESULT_ASSOC_FAIL |
| Sector Addrs | Array of MAC Address | Any valid MAC Address | Identifies sectors to which association failed. |

The MESH_CNTLR_CONFIG_CONFIRM message may be generated by the Mesh Layer to indicate to the controller that the configuration provided by the MESH_CNTLR_CONFIG_REQUEST is successfully performed. In case of unsuccessful response, the controller may provide further MESH_CNTLR_CONFIG_REQUEST.

The MESH_CNTLR_REPORT_IND message may include elements.

TABLE 93

Example MESH_CNTLR_REPORT_IND message elements

| Name | Type | Valid Range | Description |
|---|---|---|---|
| Report Code | ReportCode | 0-REPORT_MAX_CODE | |
| Number of sectors | uint8_t | 0-mMaxSectorPerNode | Number of sectors in the mesh node. |
| Neighbor information | Array of mMaxSectorPerNode of type Neighbor_List | N/A | This IE captures the information about discovered neighbors and the corresponding link metrics. Optionally present in case of REPORT_PACKET_IN, and event triggered buffer report. In case of Personality switch, this neighbor list includes nodes in own. PBSS (+new node) and respective beam forming results. In case of link failure, this field captures the information about the neighbor corresponding to failed link. |
| Buffer Report | Buffer_Report | N/A | Feedback related to buffer condition. Optionally present in case of REPORT_PACKET_IN, and event triggered buffer report |

TABLE 93-continued

Example MESH_CNTLR_REPORT_IND message elements

| Name | Type | Valid Range | Description |
|---|---|---|---|
| Packet Info | Packet_Info | N/A | Description about the packet corresponding to PACKET_IN event. Absent in case of event triggered and periodic reporting. |
| New node addr | MAC Address | Any valid MAC Address | Sector MAC address new node. |
| Number of interference results | uint16_t | 0-65535 | Number of interference results included in the report. |
| Interference result | Array of Interference_results | N/A | Details of the interference measurement results |

The MESH_CNTLR_REPORT_IND message may be generated by the Mesh Layer when criteria may be satisfied. The criteria may include event for Link or Buffer reporting is satisfied, timer for periodic Link or Buffer reporting is expired, when a packet doesn't match any roles in the forwarding table, and/or when a new node is discovered by a Mesh STA sector (enhanced discovery).

Depending on the controller, the controller may respond with MESH_CNTLR_CONFIG_SETUP. Mesh node may not make any assumptions on the controller actions.

Information Elements GE) ReportCode used in the Mesh-Controller interface messages may be listed in TABLE 94.

TABLE 94

Example ReportCode Information Elements

| Name | Type | Valid Range | Description |
|---|---|---|---|
| Result | enum { RESULT_SUCESS, RESULT_MESSAGE_PARSE_FAIL, RESULT_INVALID_TABLE_CONFIG, RESULT_INVALID_LINK_REPORT_CONFIG, RESULT_INVALID_BUFF_REPORT_CONFIG, RESULT_TABLE_MEMORY_FULL, RESULT_ASSOC_FAIL, RESULT_CODE_MAX } | | Captures the failure codes |

Information Elements (IE) Association_Config used in the Mesh-Controller interface messages may be listed in TABLE 95.

TABLE 95

Example Association_Config Information Elements

| Name | Type | Valid Range | Description |
|---|---|---|---|
| Own Sector Addr | MAC Address | Any valid MAC Address | MAC address identifies the sector belonging to the mesh node receiving the Mesh-Controller message. |
| Peer Sector Addr | MAC Address | Any valid MAC Address | MAC address identifies the sector of the peer mesh node sector. A NULL(all zeros) value for the Peer Sector Addr indicates a PCP personality |

TABLE 95-continued

Example Association_Config Information Elements

| Name | Type | Valid Range | Description |
|---|---|---|---|
| Personality | enum MESH_CNTLR_PERSONALITY_TYPE{ STA_MODE, PCP_MODE }; | Refer enum | for the Own Sector. Identifies the personality of the own sector. The peer sector will then be of the opposite personality. |

Information Elements (IE) ForwardingTable_Config used in the Mesh-Controller interface messages may be listed in TABLE 96.

TABLE 96

Example ForwardingTable_Config Information Elements

| Name | Type | Valid Range | Description |
|---|---|---|---|
| Command | enum | ADD, MODIFY, REMOVE | Command field specifies the operation to be performed on the table entry |
| Entry ID | uint16_t | 0-65535 | Unique ID that identifies each entry in the table. |
| Priority | uint8_t | 0-255 | Priority level of the entry. Higher number indicates higher priority. |
| Rule Type | enum MATCHING_RULE_TYPE{ MATCHING_RULE_DEST_SRC_MAC, MATCHING_RULE_VLAN_TAG, MATCHING_RULE_CODE_MAX }; | N/A | Defines the type of rule to be used for matching |
| Matching Rule | VLAN Tag Matching rule or Destination-Source Matching rule | N/A | Defines rule on which each packet is matched and if the match is successful, the corresponding action is performed. |
| Action | Action_config | N/A | Defines set of actions to be performed when the match is successful |
| Inactivity | Uint16_t | 0-65535 | Inactivity timer (in seconds) for the flow entry. On expiry of the inactivity timer the mesh node shall trigger a report to the controller. Value of 0 means the flow is never reported. |

Information Elements (IE) VLAN Tag Matching Rule used in the Mesh-Controller interface messages may be listed in TABLE 97.

TABLE 97

Example VLAN Tag Matching Rule Information Elements

| Name | Type | Valid Range | Description |
|---|---|---|---|
| VLAN ID | VLAN Tag | 0-4094 | This field refers to the VLAN Tag to be matched for the incoming packet |
| Priority Code Point (PCP) | PCP | 0-7 | This field refers to 802.1p PCP field to be matched for the incoming packet. |

Information Elements (IE) Destination-Source Matching Rule used in the Mesh-Controller interface messages may be listed in TABLE 98.

TABLE 98

Example ForwardingTable_Config Information Elements

| Name | Type | Valid Range | Description |
|---|---|---|---|
| Destination MAC Addr | MAC Address | Any valid MAC Address | This field specifies the Destination MAC addr field to be matched. |
| Source MAC Addr | MAC Address | Any valid MAC Address | This field specifies the Source MAC addr field to be matched. |
| QoS | Int | 0-3 | MAC level QoS field to be matched. |

Information Elements (IE) Action used in the Mesh-Controller interface messages may be listed in TABLE 99.

TABLE 99

Example Action Information Elements

| Name | Type | Valid Range | Description |
|---|---|---|---|
| Command | enum { ACTION_FORWARD, ACTION_DELETE, ACTION_MAX_CODE }; | | In case of ACTION_DELETE the packets matching the rules are deleted and the rest of the fields are absent. |
| Next HOP MAC Addr | MAC Address | Any valid MAC Address | This field specifies the MAC address of next hop mesh node. |
| VLAN ID | VLAN Tag | 0-4094 | This field indicates the S-VLAN tag to be added to the outgoing packet. If this value is zero then outgoing packet is not tagged. |
| Priority Code Point (PCP) | PCP | 0-7 | This field refers to 802.1p PCP field to be added to the outgoing packet. |

Information Elements (IE) LinkReport_Config used in the Mesh-Controller interface messages may be listed in TABLE 100.

TABLE 100

Example LinkReport_Config Information Elements

| Name | Type | Valid Range | Description |
|---|---|---|---|
| Periodicity | uint16_t | 0-65535 | Configures a periodic link reporting timer in units of seconds. The value of 0 indicates that the periodic link reporting is disabled. |
| Threshold | uint8_t | 0-255 | This field configures the threshold for change in MCS level that triggers event triggered reporting. Irrespective of the thresholds/periodicity set here, a link failure triggers event triggered reporting. |

Information Elements (IE) BufferReport_Config used in the Mesh-Controller interface messages may be listed in TABLE 101.

TABLE 101

Example BufferReport_Config Information Elements

| Name | Type | Valid Range | Description |
|---|---|---|---|
| Periodicity | uint16_t | 0-65535 | Configures a periodic buffer reporting timer in units of seconds. The value of 0 indicates that the periodic buffer reporting is disabled. |
| Threshold | uint8_t | 0-100% | This field configures the threshold for change in buffer occupancy that triggers event based buffer reporting. |

Information Elements (IE) Neighbor_List used in the Mesh-Controller interface messages may be listed in TABLE 102.

TABLE 102

Example Neighbor_List Information Elements

| Name | Type | Valid Range | Description |
|---|---|---|---|
| Own Sector | MAC Address | Any valid MAC Address | Own Sector MAC address |
| Number of neighbors | uint8_t | 0-255 | Number of discovered neighbors |
| Neighbor Sector Addrs | Array of MAC Address | Any valid MAC Address | Sector MAC addresses of neighbors |
| Link Report | Array of Link_Reports | N/A | One to one mapping to the neighbor sector |
| Buffer Report | Array of Buffer_Reports | N/A | One to one mapping to the neighbor sector |

Information Elements (IE) Capability_Info used in the Mesh-Controller interface messages may be listed in TABLE 103.

TABLE 103

Example Capability_Info Information Elements

| Name | Type | Valid Range | Description |
|---|---|---|---|
| MCS support | uint8_t | Any valid 802.11ad MCS value | MAX MCS supported by the mesh node. |
| Number of buffers | uint8_t | 0-256 | Max number of buffers maintained at mesh |
| MAX buffer size | uint32_t | 0-0xFFFFFFFF | Max size of each buffer at the mesh layer |

Information Elements (IE) Link_Report used in the Mesh-Controller interface messages may be listed in TABLE 104.

TABLE 104

Example Link_Report Information Elements

| Name | Type | Valid Range | Description |
|---|---|---|---|
| Link Metric | Array of MCS values | Any valid 802.11ad MCS value | Feedback related to link metric. One to one mapping to the neighbor sector |
| Ave Link utilization | uint8_t | 0-100% | Percentage of time (per scheduling interval) used for this link. One to one mapping to the link metric. |
| Available Capacity | Uint8_t | 0-100% | Percentage of free SP |
| Allocated EIR | Array of MAC level QoS | 0-100% | Percentage of SP allocated to each QoS category |

Information Elements (IE) Buffer_Report used in the Mesh-Controller interface messages may be listed in TABLE 105.

TABLE 105

Example Buffer_Report Information Elements

| Name | Type | Valid Range | Description |
|---|---|---|---|
| Average Packet Delay | uint16_t | 0-65525 | Average packet delay in units of milliseconds |
| Average Buffer Occupancy | uint8_t | 0-100% | Average percentage buffer occupancy |

Information Elements (IE) ReportCode used in the Mesh-Controller interface messages may be listed in TABLE 106.

TABLE 106

Example ReportCode Information Elements

| Name | Type | Valid Range | Description |
|---|---|---|---|
| Report_code | enum { REPORT_PERIODIC, REPORT_EVENT_TRIGGERED, REPORT_PACKET_IN, REPORT_NEW_NODE, REPORT_LINK_FAILURE, REPORT_FLOW_EXPIRY, REPORT_PERSONALITY_SWITCH, REPORT_CODE_MAX } | | Identifies the nature of report. REPORT_PACKET_IN is used to report a packet for which a matching rule is not found in the forwarding table. |

Information Elements (IE) Packet_Info used in the Mesh-Controller interface messages may be listed in TABLE 107.

TABLE 107

Example Packet_Info Tnformation Elements

| Name | Type | Valid Range | Description |
|---|---|---|---|
| Destination MAC Addr (or) | MAC Address | Any valid MAC Address | This field specifies the Destination MAC addr field to be matched. |
| VLAN ID | VLAN Tag | 0-4094 | This field indicates the VLAN tag present in the packet. |
| Priority Code Point (PCP) | PCP | 0-7 | This field refers to 802.1p PCP field. |

Information Elements (IE) CIR_Config used in the Mesh-Controller interface messages may be listed in TABLE 108.

TABLE 108

Example CIR_Config Information Elements

| Name | Type | Valid Range | Description |
|---|---|---|---|
| Target Node addr | MAC Address | Any valid MAC Address | This field identifies the next hop MAC addr for which the CIR config is applicable. |
| Bytes per SP | uint16_t | 0-65525 | This field indicates the total number of bytes reserved for CIR traffic in a SP. |

Information Elements (IE) INTF_Schedule used in the Mesh-Controller interface messages may be listed in TABLE 109.

TABLE 109

Example INTF_Schedule Information Elements

| Name | Type | Valid Range | Description |
|---|---|---|---|
| Own Sector Addr | MAC Address | Any valid MAC Address | MAC address identifies the sector belonging to the mesh node receiving the Mesh-Controller message. |
| Operation | enum { INTF_MEASURE, INTF_TRANSMIT, INTF_FORBIDDEN }; | | Identifies the operation to be performed during the time period identified by INTF_Schedule_element. INTF_MEASURE—Perform interference measurements INTF_TRANSMIT—Perform transmissions for other nodes to measure interference INTF_FORBIDDEN—Reserve the time period indicated by INTF_Schedule_element. During this time period the mesh node shall not transmit/receive any data over the air. |
| Number of schedule elements | uint8_t | 0-255 | Number of schedule elements included below. |
| Schedule | Array of INTF_Schedule_element | N/A | Configure the time period to perform the Operation. |

Information Elements (IE) INTF_Schedule_element used in the Mesh-Controller interface messages may be listed in TABLE 110.

TABLE 110

Example INTF_Schedule_element Information Elements

| Name | Type | Valid Range | Description |
|---|---|---|---|
| Measurement Id | uint32_t | 0-0xFFFFFFFF | Each measurement is identified by a unique id. Mesh nodes shall report the measurement result using the same measurement id as the interference measurement schedule message. |
| Start Super frame number | uint32_t | 0-0xFFFFFFFF | Super frame number within which the schedule starts |
| Periodicity | uint16_t | 0-65525 | If the periodicity is 0, then the mesh node shall execute the operation only once. In case of non-zero periodicity, the mesh node shall repeat the operation in every super frame number = (start super frame number % periodicity) |
| Schedule Period Offset | uint16_t | 1-999 | Scheduling period within the beacon interval. |
| Start time Offset | uint16_t | 0-499 | Time (in units of us) within the scheduling interval when the interference is measured |
| Peer Sector | MAC Address | Any valid MAC Address | Used to identify the link towards which the operation needs to be performed. |

Information Elements (IE) Interference_Results used in the Mesh-Controller interface messages may be listed in TABLE 111.

TABLE 111

Example Interference_Results information Elements

| Name | Type | Valid Range | Description |
|---|---|---|---|
| Own Sector Addr | MAC Address | Any valid MAC Address | MAC address identifies the sector belonging to the mesh node sending the Mesh-Controller message. |
| Peer Sector Addr | MAC Address | Any valid MAC Address | MAC address belonging to the peer sector identifying the link over which the interference measurement is made. |
| Measurement Id | uint32_t | 0-0xFFFFFFFF | Each measurement is identified by a unique id. Mesh nodes shall copy the same measurement id as the interference measurement schedule message. |
| ANIPI | uint32_t | 0-0xFFFFFFFF | The average noise plus interference power indicator (ANIPI) measured on the channel with appropriate antenna configuration. The PCP MAC collects the measurement results from associated STAs and aggregates them with its own results in a single report. |

Mmh configuration parameters may be provided.

Node parameters may be provided in TABLE 112.

TABLE 112

Example Node Parameters

| Parameter | Value |
|---|---|
| mMaxSectorPerNode | 4 (default); can go up to 6. |
| mMaxBeamsPerSector | 21 |

System parameters may be provided in TABLE 113.

TABLE 113

Example System Parameters

| Parameter | Value |
|---|---|
| BI | 0.5 sec. |
| SI | 0.5 msec. |
| mMaxAssociationsPerSector | 3 |
| mBeaconSlotsPerBTI | 9 |
| mMaxHopCount | 5 |
| mBeaconReceptionTimeout | 4*Bi |
| mMaxScanDuration | mBeaconSlotsPerBTI* |
| $N_{SSQMax}$ | 4 |
| $N_{DynQMax}$ | 4 |
| mMaxPersonalitySwitchDelay | 8*BI |
| mLinkFailureReportingLimit | 200*SI |
| mDisassociationTimeout | 10*BI |
| mAMSDUMaxSize | 7935 bytes |
| mMaxRetryLimit | 3 |
| mMaxPollingDelay | 4*SI |
| mInterferenceMeasurentBlockTime | 2 microsecond |
| mBRPBeams | 4 |
| mBRPTimeout | 2*BI |

Beacon Header Interval (BHI) Frame Contents and Superframe timing may be provided.

Frame contents may include DMG Beacon. DMG Beacon may include: PLCP Header—5 Bytes.

MAC Header may be provided. For example, MAC Header (total: 14 bytes) may include: Frame Control—2 Bytes, Duration—2 Bytes, BSSID—6 Bytes, FCS—4 Bytes. 802.11ad Mandatory Fields may be provided. 802.11ad Mandatory Fields [Total: 20 Bytes] may include: Timestamp—8 Bytes, Sector Sweep element—3 Bytes, Beacon Interval—2 Bytes, Beacon Interval Control—6 Bytes, DMG Parameters—1 Byte. Optional fields may be provided. Optional fields (total: 24 bytes) may include: Extended Schedule (1 schedule)—17 Bytes, BSS Load—7 Bytes. MmH elements (Vendor Specific field) may be provided. MmH elements (Vendor Specific field) (13 bytes) may include: SSID—2 Bytes, Gateway Description element—2+8*N, N=1 (Default), mmH Capability—1 Byte. Total MAC contents may be 71 bytes SSW Frame may be provided. PLCP header may be 5 bytes. MAC Header may be provided. MAC Header (total: 20 bytes) may include: Frame Control—2 Bytes, Duration—2 Bytes, RA—6 Bytes, TA—6 Bytes, FCS—4 Bytes. MAC Body may be provided. MAC Body (total: 6 bytes) may include: SSW element—3 Bytes, SSW-Feedback element—3 Bytes. Total MAC contents may be 26 bytes.

SSW-Feedback Frame may be provided. PLCP Header—5 Bytes. MAC Header [Total: 20 Bytes] may include: Frame Control—20 Bytes, Duration—2 Bytes, RA—6 Bytes, TA—6 Bytes, FCS—4 Bytes. MAC Body [Total: 8 Bytes] may include: SSW element—3 Bytes, BRP Request—4 Bytes, Beamformed Link Maintenance—1 Byte. Total MAC contents may be 28 bytes.

Announce Frame may be provided. PLCP Header—8 Bytes. MAC Header [Total: 28 Bytes] may include: Frame Control—2 Bytes, Duration—2 Bytes, Address 1—6 Bytes, Address 2—6 Bytes, Address 3—6 Bytes, Sequence Control—2 Bytes, FCS—4 Bytes. MAC Body [Total: 59 Bytes] may include: Category—1 Byte, Unprotected DMG Action—1 Byte, Timestamp—8 Bytes, Beacon Interval—2 Bytes, Extended. Schedule (2 schedules)—32 Bytes, PCP Handover [OPTIONAL]—15 Bytes. Total MAC contents: 87 bytes.

ACK frame may be provided. PLCP Header—8 Bytes. MAC Header [Total: 14 Bytes] may include: Frame Control—2 Bytes, Duration—2 Bytes, RA—6 Bytes, FCS—4 Bytes. Total MAC contents: 14 bytes.

Frame duration may be provided in TABLE 114.

TABLE 114

Example Frame Duration

| Frame | MCS | Preamble [us] | PLCP Header [us] | MAC Contents [us] | PLCP Header + MAC Contents [us] | Total [us] |
|---|---|---|---|---|---|---|
| DMG Beacon | 0 | 4.29 | | | 23.27 | 27.56 |
| SSW | 0 | 4.29 | | | 10.62 | 14.91 |
| SSW-Feedback | 0 | 4.29 | | | 13.96 | 18.25 |
| Announce | 1 | 1.89 | 0.582 | 1.49 | | 3.96 |
| | 2-3 | 1.89 | 0.582 | 0.91 | | 3.38 |
| | 4-5 | 1.89 | 0.582 | 0.62 | | 3.09 |
| | 6-9 | 1.89 | 0.582 | 0.33 | | 2.8 |
| ACK | 1 | 1.89 | 0.582 | 0.62 | | 3.09 |
| | 2-5 | 1.89 | 0.582 | 0.62 | | 3.09 |
| | 6-9 | 1.89 | 0.582 | 0.33 | | 2.8 |

Figure 59:
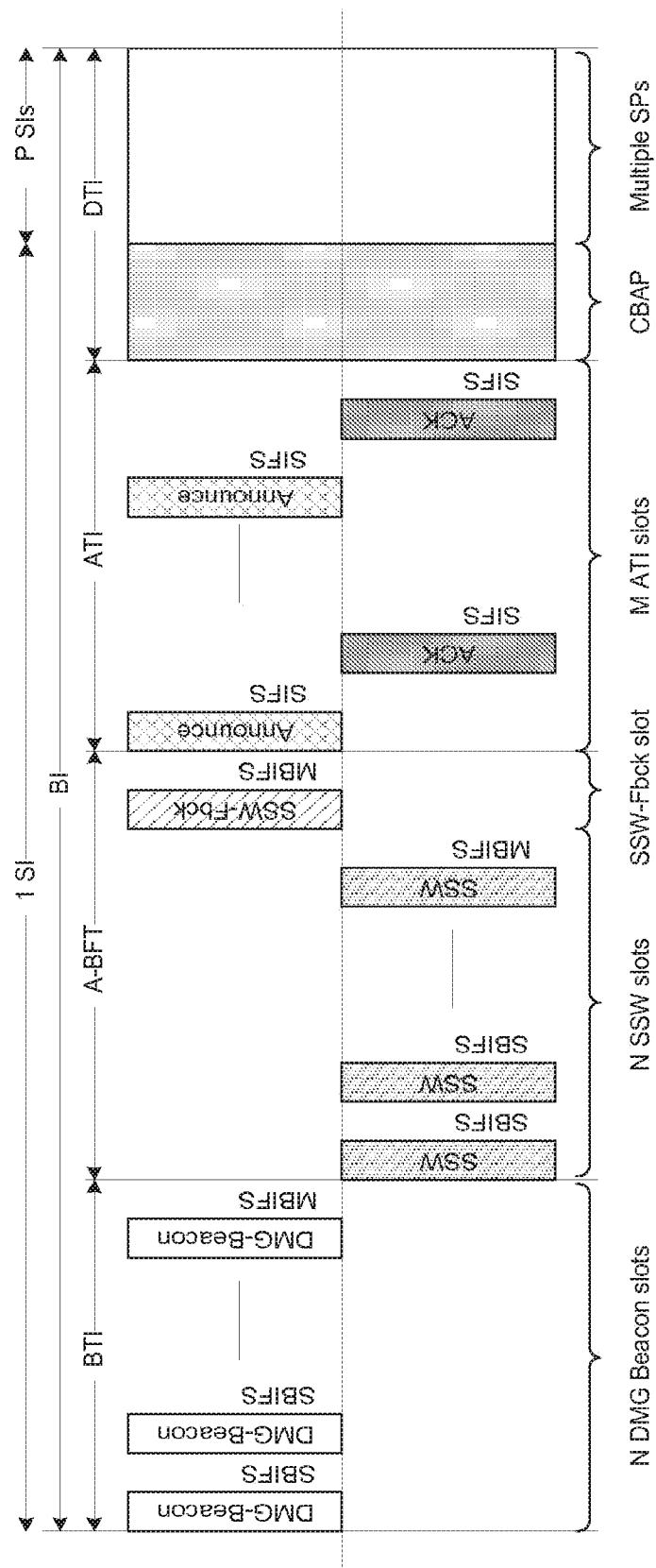
FIG. 59 is a diagram of an example super-frame structure.

Access period duration may be described herein. FIG. 59 is an example super-frame structure. The Beacon Header Interval (BHI) may be provided.

Parameter Default Values may include the following:
Number of DMG Beacon/SSW slots, N=9
Number of ATI slots, M=3 (=Max. number of associations per PCP)
Beacon Interval, BI=0.5 sec.
Scheduling Interval, SI=0.5 ms
Number of SIs available for data transfer in a BI, P=999 (derived value)
Inter-frame Spacing from 802.11ad Specification may include the following:
Short Beamforming Inter-frame Spacing, SBIFS=1 us
Medium Beamforming Inter-frame Spacing, MBIFS=9 us
Short Inter-frame Spacing, SIFS=3 us
Calculated Values may include the following:

Beacon slot (1:N-1)=27.56 us+1 us=28.56 us

Beacon slot (N)=27.56 us+9 us=36.56 us

BTI=8*28.56 us+36.56 us=265.04 us

SSW slot (1:N-1)=14.91 us+1 us=15.91 us

SSW slot (N)=14.91 us+9 us=23.91 us

SSW-Fbck slot=18.25 us+9 us=27.25 us

A-BFT=8*15.91 us+23.91 us+27.25 us=178.44 us

ATI slot (MCS 1)=3.96 us+3 us+3.09 us+3 us=13.05 us

ATI=3*13.05 us=39.16 us

ATI slot (MCS 2-3)=3.38 us+3 us+3.09 us+3 us=12.47 us

ATI=3*12.47 us=37.41 us

ATI slot (MCS 4-5)=3.09 us+3 us+3.09 us+3 us=12.18 us

ATI=3*12.18 us=36.54 usAT1 slot (MCS 6-9)=2.8 us+3 us+2.8 us+3 us=11.6 us

ATI=3*11.6 us=34.8 us

BTI+A-BFT+ATI=482.64 us (MCS 1)/480.89 us (MCS 2-3)/480.02 us (MCS 4-5)/478.28 us (MCS 6-9)

CBAP=500 us−482.64/480.89/480.02/478.28 us=17.36 us (MCS 1)/19.11 us (MCS 2-3)/19.98 us (MCS 4-5)/21.72 us (MCS 6-9)

MCS 1 may be used in ATI. The final timing values for the first SI in one or more BI may include the following:
BTI=265.04 us; A-BFT=178.44 us; ATI=39.16 us; CBAP=17.36 us Design modification for OPNET implementation may be provided in TABLE 115.

TABLE 115

Example Design modification for OPNET implementation

| S. No. | Section | Description |
|---|---|---|
| 1 | 13.1.36 | OPNET implementation uses Num_Pckts = 1 in Mesh-Tx-Data.request. Therefore, only 1 packet is transferred to the MAC at a time. |
| 2 | 13.1.37 | OPNET implementation uses Num_Pckts = 1 in Mesh-Rx-Data.indication. Therefore, only 1 packet is transferred to the Mesh Layer at a time. |
| 3 | 10.2.2 | In OPNET implementation, scheduler provides a single output per SI for dynamic allocation, which also includes the duration of each transmission and reception, for all associated STAs and their QoS classes. The transmission and reception start times are determined based on the order of the fields in the Scheduler output. |
| 4 | 13.1.33 | In OPNET implementation, transmission status reporting is triggered for all queues (for semi-static, dynamic and management types) at once when first Transmission-Status-Reporting-Config.request is received. Results for inactive queues are reported as zero. Reports for all queues .are reported together in a single Transmission-Status-Reporting.indication message. |

MmW link failure causes may be described herein. Failure of a mmW link may be caused due to several factors. Some of these conditions and average link disruption times may be listed in TABLE 116. These factors may affect the default value for mLinkFailureReportingLimit described herein.

TABLE 116

| Failure cause | Average link disruption time [msec] | Notes |
|---|---|---|
| Movement of mounting pole | 60-250 (period of severely oscillation) | Light or signal pole sway may potentially degrade the channel quality between the transmitter and receiver due use of directional antennas. |
| Obstruction due to flying bird obstructing the main beam | 100 | A large bird or a flock of birds flying through the main beam could potentially impact the link quality between the transmitter and the receiver, resulting in momentary failure of the link. |
| Precipitation | N/A | Precipitation in the form of Snow or rain affects link quality and in severe cases could lead to link failures. |
| Slow-moving obstruction | >1000 | Although lamp or signal post mounted nodes are expected to be placed high enough so that they are not normally affected by vehicular movement, but in case of non-LoS paths, vehicular obstruction could also lead to link failures. This failure is expected to last for a period on the order of seconds. |

802.11ad references may be provided in TABLE 117.

TABLE 117

Example 802.11ad references

| S. No. | mmH Feature/Design Document Section | 802.11ad Specification Reference |
|---|---|---|
| 1 | BF-Training: Sector Level Sweep (SLS) phase: | 9.35.2, 10.37, 8.3.1.16, 8.3.1.17, 8.3.4.1 |
| 2 | BF-Training: Beam Refinement Protocol (BRP) phase: | 9.35.3, 10.37, 8.5.22.3 |
| 3 | PCP Handover: | 10.28.2, 8.4.2.143, 8.5.20.4, 8.5.20.5 |
| 4 | Dynamic scheduling using Poll-SPR-Grant: | 9.33.7 (Dynamic Allocation of Service Period) |

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, UE, terminal, base station, RNC, and/or any host computer.

What is claimed is:
1. A station (STA) for use in a wireless network, the STA comprising:
an antenna; and
a processor operatively coupled to the antenna;
the antenna and the processor configured to receive a first request message from an access point (AP), the first request message comprising identity information of one or more other STAs, an indication to perform beamforming measurements of the one or more other STAs, and an indication to request measurement feedback from the STA;

the antenna and the processor further configured to perform, based on the identity information, the beamforming measurements of the one or more other STAs by:
transmitting, to the one or more other STAs, one or more second request messages, wherein each of the one or more second request messages includes an indication to perform beamforming measurements of the one or more other STAs and an indication to request measurement feedback from the one or more other STAs; and
receiving, from the one or more other STAs, one or more first reply messages, wherein each of the one or more first reply messages includes first link metric information associated with each STA of the one or more other STAs, wherein the first link metric information includes the measurement feedback from the one or more other STAs; and
the antenna and the processor further configured to send, to the AP, a second reply message including the first link metric information and second link metric information associated with the STA, wherein the second link metric information includes the measurement feedback from the STA.

2. The STA of claim 1, wherein the beamforming measurements comprise directional measurements.

3. The STA of claim 1, wherein the first link metric information further comprises route information.

4. The STA of claim 1, wherein the first request message further comprises medium access control (MAC) addresses of the one or more other STAs.

5. The STA of claim 1, wherein the STA and the one or more other STAs are in a same personal basic service set (PBSS).

6. The STA of claim 1, wherein a STA of the one or more other STAs is in a different PBSS than the STA.

7. The STA of claim 1, wherein the first request message further comprises a number of the one or more other STAs.

8. The STA of claim 1, wherein the first link metric information further comprises as signal-to-noise ratio (SNR).

9. A method for use in a station (STA) of a wireless network, the method comprising:

receiving a first request message from an access point (AP), the first request message comprising identity information of one or more other STAs, an indication to perform beamforming measurements of the one or more other STAs, and an indication to request measurement feedback from the STA;
transmitting, to the one or more other STAs, one or more second request messages, wherein each of the one or more second request messages includes an indication to perform beamforming measurements of the one or more other STAs and an indication to request measurement feedback from the one or more other STAs;
receiving, from the one or more other STAs, one or more first reply messages, wherein each of the one or more first reply messages includes first link metric information associated with each STA of the one or more other STAs, wherein the first link metric information includes the measurement feedback from the one or more other STAs; and
sending, to the AP, a second reply message including the first link metric information and second link metric information associated with the STA, wherein the second link metric information includes the measurement feedback from the STA.

10. The method of claim 9, wherein the beamforming measurements comprise directional measurements.

11. The method of claim 9, wherein the first link metric information comprises route information.

12. The method of claim 9, wherein the first request message further comprises medium access control (MAC) addresses of the one or more other STAs.

13. The method of claim 9, wherein the STA and the one or more other STAs are in a same personal basic service set (PBSS).

14. The method of claim 9, wherein a STA of the one or more other STAs is in a different PBSS than the STA.

15. The method of claim 9, wherein the first request message further comprises a number of the one or more other STAs.

16. The method of claim 9, wherein the first link metric information further comprises as signal-to-noise ratio (SNR).

* * * * *